(12) United States Patent
Brown

(10) Patent No.: US 11,782,186 B2
(45) Date of Patent: Oct. 10, 2023

(54) EDGE INTELLIGENCE POWERED SECURITY SOLUTIONS AND OTHER APPLICATIONS FOR A SMART CITY

(71) Applicant: Navio International, Inc., San Francisco, CA (US)

(72) Inventor: Ernest C. Brown, Berkeley, CA (US)

(73) Assignee: NAVIO INTERNATIONAL, INC., San Francisco, CA (US)

( * ) Notice: Subject to any disclaimer, the term of this patent is extended or adjusted under 35 U.S.C. 154(b) by 0 days.

(21) Appl. No.: 17/345,840

(22) Filed: Jun. 11, 2021

(65) Prior Publication Data
US 2021/0302621 A1    Sep. 30, 2021

Related U.S. Application Data

(63) Continuation of application No. PCT/US2019/065520, filed on Dec. 10, 2019.
(Continued)

(51) Int. Cl.
*H04W 4/90* (2018.01)
*G01W 1/00* (2006.01)
(Continued)

(52) U.S. Cl.
CPC .............. *G01W 1/00* (2013.01); *G06F 3/14* (2013.01); *G06N 20/00* (2019.01); *H04L 67/10* (2013.01);
(Continued)

(58) Field of Classification Search
CPC ... G01W 1/00; G01W 2001/006; G01W 1/04; G01W 1/06; G01W 1/10; G06N 20/00;
(Continued)

(56) References Cited

U.S. PATENT DOCUMENTS 6,859,831 B1    2/2005   Gelvin et al.
8,502,456 B2    8/2013   Jarrell et al.
(Continued)

FOREIGN PATENT DOCUMENTS

CN    209446797 U    9/2019
CN    214890842 U    11/2021
(Continued)

OTHER PUBLICATIONS

Co-pending U.S. Appl. No. 17/862,176, inventor Brown; Ernest C., filed Jul. 11, 2022.
(Continued)

*Primary Examiner* — Ankur Jain
(74) *Attorney, Agent, or Firm* — Wilson Sonsini Goodrich & Rosati

(57) ABSTRACT

A system for sensing and responding to detected activity or an event in a region is provided. The system may comprise: a modular edge computing platform configured to provide a predetermined functionality for a particular application, the modular edge computing platform is configured to process sensor data to generate processed data, and transmit the processed data; and a remote entity that comprises (i) a cloud analytic configured to receive the processed data from the modular edge computing platform and analyze the processed data, and (ii) a cloud user interface module configured to provide a graphical user interface on a user device, the graphical user interface displays one or more results generated by the cloud analytic upon analyzing the processed data.

18 Claims, 51 Drawing Sheets

Related U.S. Application Data

(60) Provisional application No. 62/882,994, filed on Aug. 5, 2019, provisional application No. 62/784,359, filed on Dec. 21, 2018.

(51) Int. Cl.
    *G06N 20/00* (2019.01)
    *G06F 3/14* (2006.01)
    *H04L 67/10* (2022.01)
    *H04Q 9/00* (2006.01)
    *H04W 4/38* (2018.01)

(52) U.S. Cl.
    CPC ............. *H04Q 9/00* (2013.01); *H04W 4/90* (2018.02); *H04M 2242/04* (2013.01); *H04W 4/38* (2018.02)

(58) Field of Classification Search
    CPC ... G06F 3/14; G06F 17/05; G06F 9/50; H04L 67/10; H04Q 9/00; H04W 4/90; H04W 4/38; H04M 2242/04; Y02P 90/845; G06Q 50/28
    See application file for complete search history.

(56) References Cited

U.S. PATENT DOCUMENTS

| | | | |
|---|---|---|---|
| 8,716,942 B2 | 5/2014 | Jarrell et al. | |
| 8,903,558 B2 | 12/2014 | Jarrell et al. | |
| 8,963,433 B2 | 2/2015 | Jarrell et al. | |
| 9,087,451 B1 | 7/2015 | Jarrell | |
| 9,408,282 B1 | 8/2016 | Springer | |
| 9,521,606 B1* | 12/2016 | Costa | H04W 12/068 |
| 2016/0371406 A1* | 12/2016 | Nicholas | G05B 13/048 |
| 2017/0046524 A1 | 2/2017 | Lee et al. | |
| 2017/0085428 A1* | 3/2017 | Barros | H04L 41/0886 |
| 2017/0180909 A1 | 6/2017 | Gardner et al. | |
| 2017/0301220 A1* | 10/2017 | Jarrell | H04W 4/38 |
| 2017/0372438 A1* | 12/2017 | Peloso | G05B 19/042 |
| 2018/0132015 A1* | 5/2018 | Borrelli | G06F 11/3006 |
| 2018/0285767 A1* | 10/2018 | Chew | H04L 67/12 |
| 2018/0365635 A1 | 12/2018 | Lucrecio et al. | |
| 2020/0167202 A1* | 5/2020 | Huang | G05B 13/0265 |

FOREIGN PATENT DOCUMENTS

| | | | |
|---|---|---|---|
| GB | 2406240 A | 3/2005 | |
| WO | WO-2019136481 A2 | 7/2019 | |
| WO | WO-2019136482 A1 | 7/2019 | |
| WO | WO-2020131497 A1 | 6/2020 | |

OTHER PUBLICATIONS

PCT/US2019/065520 International Search Report and Written Opinion dated Feb. 21, 2020.
U.S. Appl. No. 17/862,176 Office Action dated Dec. 19, 2022.
U.S. Appl. No. 17/862,176 Notice of Allowance dated Jun. 13, 2023.

\* cited by examiner

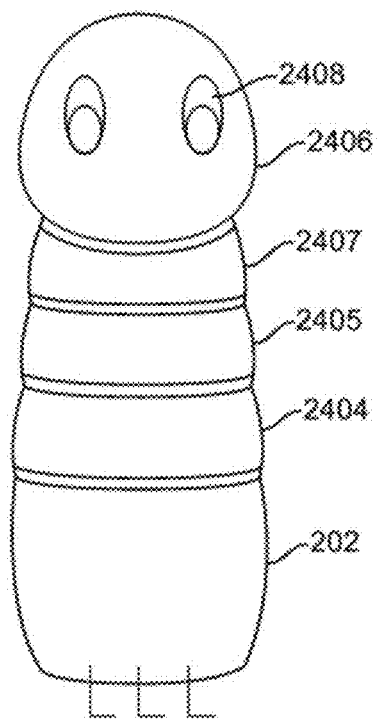
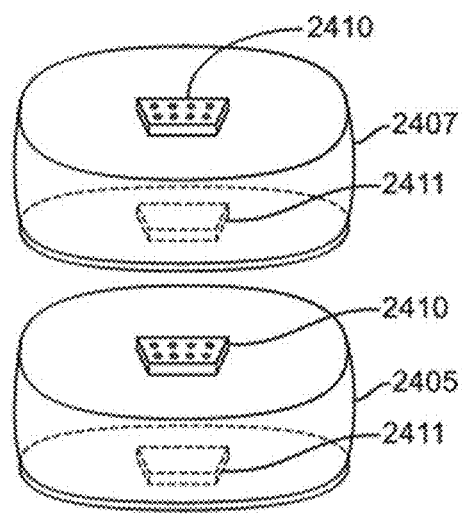
FIG. 24D          FIG. 24E
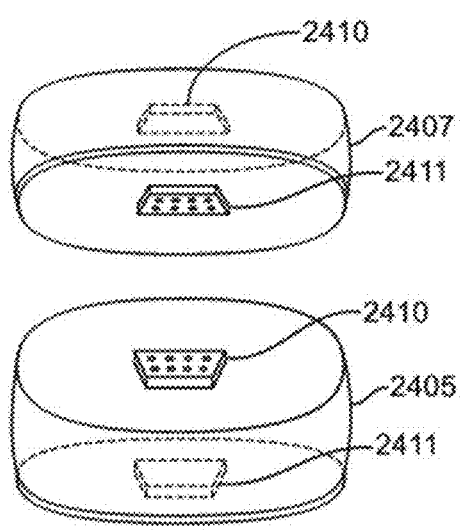
FIG. 24F

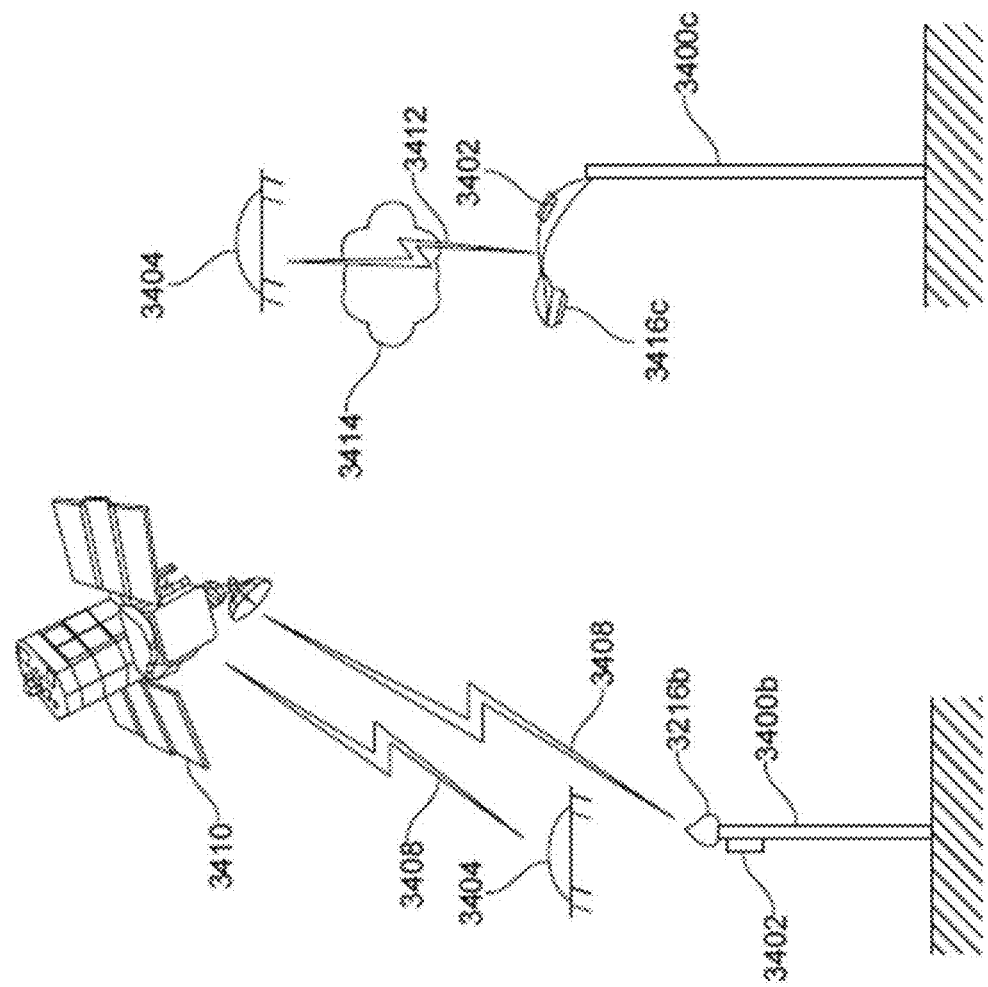
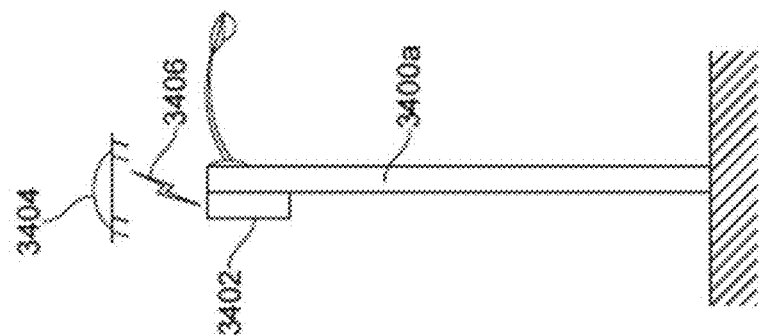
FIG. 34C
FIG. 34B
FIG. 34A

EDGE INTELLIGENCE POWERED SECURITY SOLUTIONS AND OTHER APPLICATIONS FOR A SMART CITY

CROSS-REFERENCE

This application is a continuation of International Application No. PCT/US2019/065520 filed on Dec. 10, 2019, which claims priority to U.S. Provisional Application No. 62/784,359 filed on Dec. 21, 2018, and U.S. Provisional Application No. 62/882,994 filed on Aug. 5, 2019, each of which is entirely incorporated herein by reference.

BACKGROUND

In a smart city design, smart devices are communicating to each other, autonomous vehicles are driving people around or making deliveries, traffic lights are controlled to optimize traffic flow, construction monitoring, street lights are managed for efficient energy use, threats to security in high risk areas are detected and alerts are raised to the appropriate authorities. These are among the many applications that may be seen in a smart city. It may be possible to measure and monitor the impact of environmental and other factors on various systems, provide communications to outside entities or to communications devices, and intelligently coordinate responses from different systems throughout a smart city. Accurate local weather reporting and weather and climate prediction are important for public safety. Yet, existing weather reporting and prediction systems and methods have been unable to provide sufficient information to improve public safety. This is a huge problem for public safety, given the threats of floods, tornadoes, hurricanes, lightening, massive windstorms, and storms, and the resulting damage that often occurs.

Existing weather stations may not have edge computing or artificial intelligence ("AI") and can be difficult and expensive to install. There are only 2000 FAA approved weather stations in the United States which amounts to an average of only one per 2,700 square miles.

Therefore, what is needed is a standard design to improve consistency and accuracy and which includes a camera and AI capability, such that a simple weather station becomes a weather observer, allowing extremely detailed understanding of immediate weather, weather trends and climate change over vast areas of the US and beyond.

SUMMARY

An aspect of the present disclosure provides a modular edge intelligence platform for sensing and responding to detected activity or an event in a region. The edge intelligence platform can include a base station configured to provide communications functionality, and an application module configured to provide a desired functionality for a particular application. In some instances, the application module can be configured to be coupled or releasably coupled to the base station.

The present disclosure provides a weather analysis system, device and method. The weather analysis system or device may be an intelligent, image capturing, cloud formation identification and communication system or device that is deployed atop and powered by streetlights to identify and transmit cloud formation information via low bandwidth wireless communication. In some embodiments, the intelligent, image capturing, cloud formation identification and communication device includes AI algorithms and modules to process cloud formation images and identify cloud formation types with a high degree of accuracy. In some embodiments, the intelligent, image capturing, cloud formation identification and communication device includes a power plug that plugs into streetlight power outlets to power the device.

In an aspect, a modular approach is provided for sensing and responding to detected activity or an event in a region. The modular approach employs a system comprising: a modular edge computing platform configured to provide a desired functionality for a particular application, wherein the modular edge computing platform is configured to process sensor data and transmit processed data to a remote entity for analysis; and the remote entity. The remote entity can comprise a cloud analytic configured to analyze the processed data, a cloud management module configured to develop machine learning models, and a cloud user interface module configured to provide a graphical user interface on a user device for displaying analysis result generated by the cloud analytic.

In another aspect, a system for sensing and responding to detected event and weather in a region is provided. The system may comprise: a modular edge computing platform configured to provide a predetermined functionality for a particular application, the modular edge computing platform is configured to process sensor data to generate processed data, and dynamically transmit at least a portion of the processed data; and a remote entity that comprises (i) a cloud analytic configured to receive and analyze the at least portion of the processed data from the modular edge computing platform, and (ii) a cloud user interface module configured to provide a graphical user interface on a user device, the graphical user interface displays one or more results generated by the cloud analytic upon analyzing the at least portion of the processed data.

In some embodiments, the system comprises a base station mechanically and electronically coupled to the modular edge computing platform. In some cases, the base station is coupled to a support member. In some cases, the base station is configured to be installed and fully operational to provide communications functionality within a range of 10 seconds to 5 minutes. In some cases, the modular edge computing platform is configured to couple with the base station or with a different modular edge computing platform to form a modular assembly.

In some embodiments, the modular edge computing platform is configured to collect, aggregate, or evaluate sensor data using predictive models trained using machine learning algorithms. In some embodiments, the processed data transmitted to the cloud analytic includes intelligence data. In some embodiments, the predetermined functionality is selected from the group consisting of: threat detection or alerting to detected threats; imaging or monitoring features; weather sensing or weather alerts; environmental sensing or environmental alerts; traffic monitoring or traffic alerts; activity sensing or activity alerts; disturbance sensing or disturbance alerts; earthquake movement sensing or earthquake alerts; smoke and fire sensing or smoke and fire alerts; civil unrest and riot detection or alerting to civil unrest and riots; natural disaster sensing or alerting to detected natural disasters; accident sensing or accident alerts; and pollution monitoring.

In some embodiments, the particular application comprises weather analysis. In some cases, the remote entity further comprises a cloud management module configured to train and develop predictive models corresponding to the particular application. In some cases, the cloud management module is further configured to perform continual training of the predictive models. In some cases, at least a portion of the training datasets for the continual training of the predictive models are transmitted from the modular edge computing platform.

In some embodiments, the graphical user interface displays information provided by multiple modular edge computing platforms including the modular edge computing platform. In some embodiments, the graphical user interface further displays sensor data. In some cases, the graphical user interface allows a user to manage the modular edge computing platform or a base station connected to the modular edge computing platform. In some embodiments, the processed data comprises cloud formation information. In some embodiments, the at least portion of processed data is selected and transmitted based on a transmission scheme.

In another aspect, a method is provided for sensing and responding to detected event and weather in a region. The method comprises: providing a modular edge computing platform, wherein the modular edge computing platform is configured to: (i) provide a predetermined functionality for a particular application, (ii) process sensor data to generate processed data, and (iii) dynamically transmit at least a portion of the processed data; receiving and analyzing the at least portion of the processed data from the modular edge computing platform; and displaying one or more analysis results on a graphical user interface provided on a user device upon analyzing the at least portion of the processed data.

In some embodiments, the modular edge computing platform is mechanically and electronically coupled to a base station. In some instances, the base station is coupled to a support member. In some cases, the support member is selected from the group consisting of a streetlight, a utility pole, a vehicle, and a building.

In some cases, the base station is configured to be installed and fully operational to provide communications functionality within a range of 10 seconds to 5 minutes. In some embodiments, the modular edge computing platform is configured to collect, aggregate, or evaluate sensor data using a predictive model. In some embodiments, the particular application comprises weather analysis.

In some embodiments, the method further comprises training and developing predictive models corresponding to the particular application at a remote entity. In some embodiments, the remote entity comprises a cloud management module configured to perform continual training of the predictive models. In some cases, at least a portion of the training datasets for the continual training of the predictive models are transmitted from the modular edge computing platform.

In some embodiments, the graphical user interface displays information provided by multiple modular edge computing platforms including the modular edge computing platform. In some embodiments, the graphical user interface further displays sensor data. In some cases, the graphical user interface allows a user to manage the modular edge computing platform or a base station connected to the modular edge computing platform.

In some embodiments, the processed data comprises cloud formation information. In some embodiments, the processed data is transmitted dynamically based on a transmission scheme. In some cases, the transmission scheme is generated based one or more available communication methods using a predictive model. In some instances, the predictive model is trained and developed on a cloud and is downloaded to the modular edge computing platform.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Consistent with other disclosed embodiments, non-transitory computer-readable storage media can store program instructions, which can be executed by a processor to perform any of the methods described herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 24D depicts an embodiment of a modular assembly including a base station, a plurality of application modules, and a camera unit;

FIG. 24E depicts a top view of an embodiment of two application modules;

FIG. 24F depicts a bottom view of an embodiment of one application module and a top view of an embodiment of a second application module;

FIG. 34A shows a communications station associated with a lighting assembly in communication with a UAV via a wireless communication link;

FIG. 34B shows a communications station associated with a lighting assembly in communication with a UAV via a satellite communication link;

FIG. 34C shows a communications station associated with a lighting assembly in communication with a UAV via a networked communication link;

DETAILED DESCRIPTION

Figure 1:
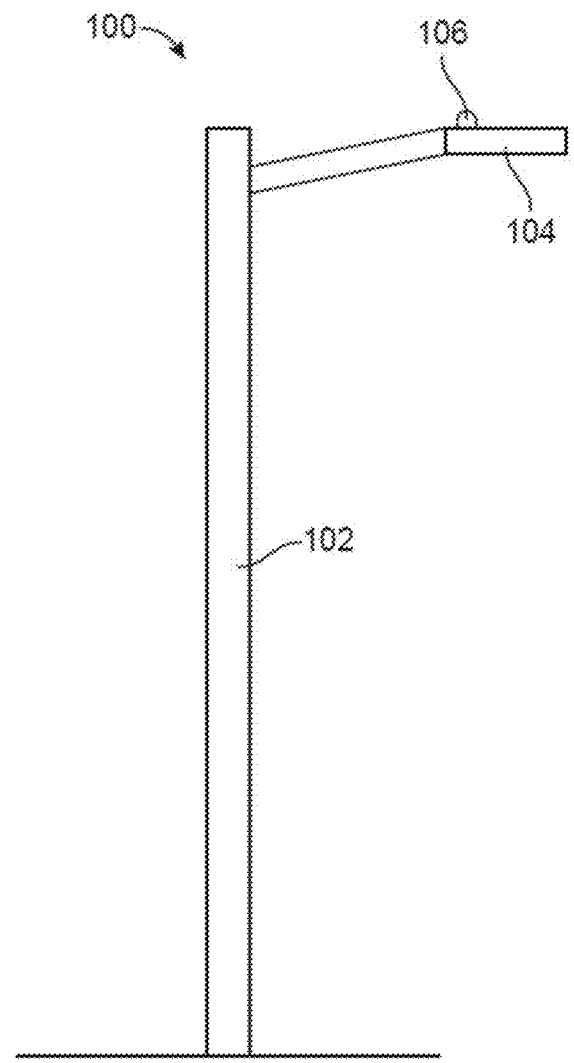
FIG. 1 depicts a conventional streetlight assembly.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "edge computing," as used herein, generally refers to a distributed computing paradigm in which computation is at least partially performed on distributed device nodes, such as smart devices or edge devices, as opposed to primarily taking place in a centralized cloud environment.

A modular approach is provided that facilitates the quick and easy implementation of flexible and customizable applications for localized or wide area coverage of different applications for a smart city. The method and system includes a first unit configured to provide communications functionality and a second unit configured to provide a desired functionality for a particular application. Because the second unit can be configured to be modular and releasably coupled to the first unit, it can be easily swapped out or exchanged for a different unit configured to provide a different functionality or can be used with one or more additional units, each providing its own customizable functionality. The first and second units can be configured to be mechanically connected or mechanically stackable. Additional second units can be mechanically connected to or mechanically stackable with the original first and second unit. Alternatively, the second unit can be activated, deactivated, or reactivated electronically by software. The second unit can be part of or on the same device as the first unit but can be selectively activated, deactivated, or reactivated electronically.

The method and system can employ various sensors and smart devices to sense and detect certain activity or events, can collect, aggregate, and evaluate data generated by the activity or events (for instance, using artificial intelligence, machine learning, and/or data mining techniques), and can provide a response depending on the particular application or purpose. The system may be configured to be easily updated or upgraded over time as newer and more sophisticated sensors and/or communication technology are developed and/or as new technology is developed.

The modular approach can be implemented quickly and easily, essentially providing a turnkey solution or "Smart City in a Box" that can be adapted to different situations and needs to provide a basic, primary, or base level of functionality and/or a desired or customized functionality over localized or wide area coverage for a wide range of different applications. A distinct advantage of this approach is that it may utilize a city's existing infrastructure of streetlights and other support structures to provide a widespread grid of sensors and detectors at a substantially uniform height above ground level. In some embodiments, a smart city base station module can be coupled to a streetlight assembly, or installed or implemented at the top of a streetlight or other support structure within ten, twenty, or thirty seconds and in some cases no more than thirty seconds, or at least within one, two, three, five, ten, or fifteen minutes. The first unit, base unit, or base station can be configured to be fully operational once installed or implemented to provide immediate and instantaneous detection and/or communication functionality at a first, primary, or base level. Similarly, one or more second units or application modules can be installed, implemented, or coupled to the first unit, base unit, or base station at the top of the streetlight or other support structure within ten, twenty, or thirty seconds and in some cases no more than thirty seconds, or at least within one, two, three, five, ten, or fifteen minutes. The second unit or application module can be configured to be fully operational once installed, implemented, or coupled to the first unit or base station and can provide immediate and instantaneous detection and/or communication functionality at a second or secondary level. Thus, a fully operational "Smart City in a Box" system including a first unit or base station and/or a second unit or application module can be installed or implemented at the top of the streetlight or other support structure within ten, twenty, or thirty seconds and in some cases no more than thirty seconds, or at least within one, two, three, five, ten, or fifteen minutes to provide a city with communications, monitoring, and detection functionality nearly instantaneously (e.g. within ten, twenty, or thirty seconds and in some cases no more than thirty seconds, or at least within one, two, three, five, ten, or fifteen minutes). Accordingly, using a "plug and play" attachment as provided by the system and method, a city can set up a security and sensor system in a matter of a few days as opposed to the months or years it can take when using conventional streetlight replacement approaches. The modular system approach is also flexible and customizable in that an application module can be immediately replaced, swapped, or exchanged with a different application module to fit a new situation. Alternatively, if a particular functionality is required in a particular location, an application module customized to provide the particular functionality can be added by simply snapping or otherwise coupling the application module to the first unit or base station, or to another application module that is already coupled to the first unit or base station. In other examples, the application module may be coupled directly to a support member and the base station coupled to the application module by snapping or otherwise coupling the base station to the application module.

The method and system may employ a high speed CPU, memory and support components that provide expansive computer power within the base module. This computer power allows the programming of the streetlight itself, using such standard programs as Python, C and the like, as well as providing an ability to immediately upgrade software in the base module and in the application module to improve performance and security. The computer also allows combined units such as base stations and application modules to assess multiple sensor inputs and to use a set of algorithms, rules and networks to assess whether an event of interest has occurred.

Additionally, the power and sophistication of such programming rules and triggers within the on-board computer are expected to grow rapidly with the development of computer power and memory, allowing an eventual evolution to true Artificial Intelligence (AI) in the streetlight itself. In particular, where an event takes place, the initial programming rules and later AI may autonomously trigger many further steps, such as transmitting alerts, data, video and controlling and flashing the streetlight and selected local streetlights as illumination and warnings, as well as managing cameras and other devices as described herein. The data recorded from events of interest as well as the programming steps and results that can be triggered by the event are streamed after the event occurs to the cloud where existing AI tools, using much more powerful servers and memory, can refine those triggers and programming steps to reduce false positive events and refine responses in the street light level programming.

In some embodiments, data accumulated by the base module and application modules may be transmitted wirelessly, such as by Bluetooth, Zigbee, WiFi, or Cellular, to the cloud and a Cloud Services Provider (CSP). That CSP may accumulate data, report on the health of the modules and the network, aggregate data from multiple data sources within the modules, disaggregate the data for individual transmission (including alerts) in data bursts directed to specific clients who have paid for that specific package of services. These may include public agencies, fire, police, federal departments and private companies and individuals. As an integral part of this system, those clients may be supplied with dashboards that may report the data they wish, both in graphic forms, video, still images and in the actual and historical data streams from their designated venues.

The modular approach can be used to provide a universal security and navigation device capable of real-time visualization, focused and complete 360-degree coverage, and that has customized sensor capability to detect daily activities, perimeter breaches, cars, trucks, or other vehicles, drone flights, extreme weather, and other activities.

Described herein are methods, devices, and systems that can be used to provide a modular approach for streetlight management, information provision, information collection, communications with, or management of, driverless vehicles (such as unmanned aerial vehicles or driverless ground-based vehicles), and other functionality. For example, methods, devices, and systems are described for providing a first unit, referred to herein as a base station, that can provide, for example, communications functionality and streetlight control functionality, and for providing a second unit, referred to herein as an application module, that can be attached to the first unit and can be configured in a variety of configurations to provide a desired functionality for a particular application. In some examples, the base station and the application module can function collaboratively to provide an enhanced set of features.

Some of the discussion herein will focus on methods, devices, and systems that can be used with one or more streetlights. Alternatively, some of the methods, devices, and systems can be used with one or more traffic lights, utility poles, towers (such as cellular communications towers), communications station poles, road signs, display monitors, buildings, trees, billboards, bridges, or any other appropriate support member including vehicles such as cars. While unmanned aerial vehicles (UAVs) are discussed herein, it will be understood that UAVs can include unmanned aerial systems, drones, unmanned aircraft, driverless aerial vehicles, autonomous aerial vehicles, and the like. While autonomous ground vehicles are discussed herein, it will be understood that autonomous ground vehicles can include unmanned ground vehicles, driverless vehicles, unmanned ground systems, assisted ground vehicle, and the like.

In some examples, a base station may be mounted to a streetlight assembly, and an application module may be mounted to the base station. The examples discussed herein will assume that the base station is mounted to a streetlight assembly. For example, the base station may be attached to the streetlight assembly in place of a conventional optical sensor that is commonly found on many current streetlight assembly installations (typically at or near a top of the streetlight assembly), or may be attached in another manner. In some examples, the base station may be mounted to a traffic light, a utility pole, a tower (such as a cellular communications tower), a communications station pole, a road sign, a display monitor, a building, a tree, a billboard, a bridge, or any other appropriate support member.

Alternate power sources located in cars/trucks and commercial-retail/industrial/residential buildings can be utilized and can allow the base station or application module to achieve their respective functionalities as described herein. The alternative power sources may include, for example, 120V AC for houses, jobsites, and commercial purposes and 12V for ground vehicles such as cars and trucks. To utilize these power sources, an ANSI twist plug may be employed to secure the base station or application module to a circular base. The circular base may include a plug for a standard three prong 120V plug and a separate plug for a 12V cord that can plug into a vehicle's cigarette lighter. The 120V power lead can connect to the ANSI plug of the base station or application module and the 12 volt lead can go up through a separate connection to the base station's or application module's 12V to 5V transformer.

In some examples such as implementations where the base station or application module is mounted to a support member other than a streetlight, the base station may either be powered by the support member or a component of the support member, if appropriate, or may be self-powered (for example, powered by one or more batteries), or may be powered in an alternative way (for example, solar power, wind power, hydroelectric power, or the like). In any of these examples, an application module may be attached to the base station.

FIG. 1 depicts a conventional streetlight assembly 100. The streetlight assembly 100 may include a streetlight pole 102, a streetlight unit 104, and an optical sensor 106 attached to the streetlight unit 104, or to another area of the streetlight assembly. The optical sensor may include a photocell or other appropriate optical sensor. The optical sensor may include an electrical plug (not shown) that may be attached to or plugged into an electrical receptacle (not shown) of the streetlight unit. In this manner, the optical sensor may be powered by electrical energy of the streetlight assembly via an electrical connection between the optical sensor and the streetlight assembly. The streetlight unit may include one or more luminaires (not shown) for the streetlight assembly, for example.

Figure 2:
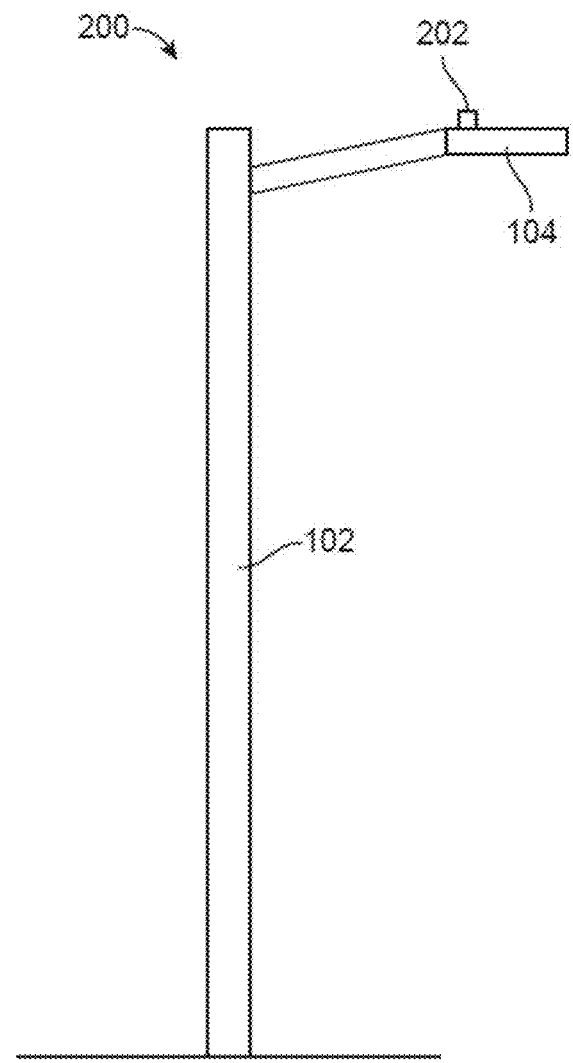
FIG. 2 depicts an example streetlight assembly that includes an example communications and streetlight management module.

FIG. 2 depicts an example streetlight assembly 200 that includes an example communications and streetlight management module 202. The streetlight assembly may include the conventional streetlight pole 102 and streetlight unit 104 depicted in FIG. 1 and described herein. The communications and streetlight management module may be referred to as a base station, as it may provide a base level, or first level, of modular functionality for a system that provides streetlight management, information provision, information collection, and communications with, or management of, driverless vehicles (such as unmanned aerial vehicles or driverless ground-based vehicles), and other functionality. The base station 202, as described herein, may be attached to the streetlight assembly. For example, the base station may include an electrical plug (not shown) that may connect with the conventional electrical receptacle of the streetlight unit that is configured to receive an electrical plug of a photocell. In this manner, components of the base station may be powered by electrical energy from the streetlight assembly via an electrical connection between the base station and the streetlight assembly.

Figure 3A:
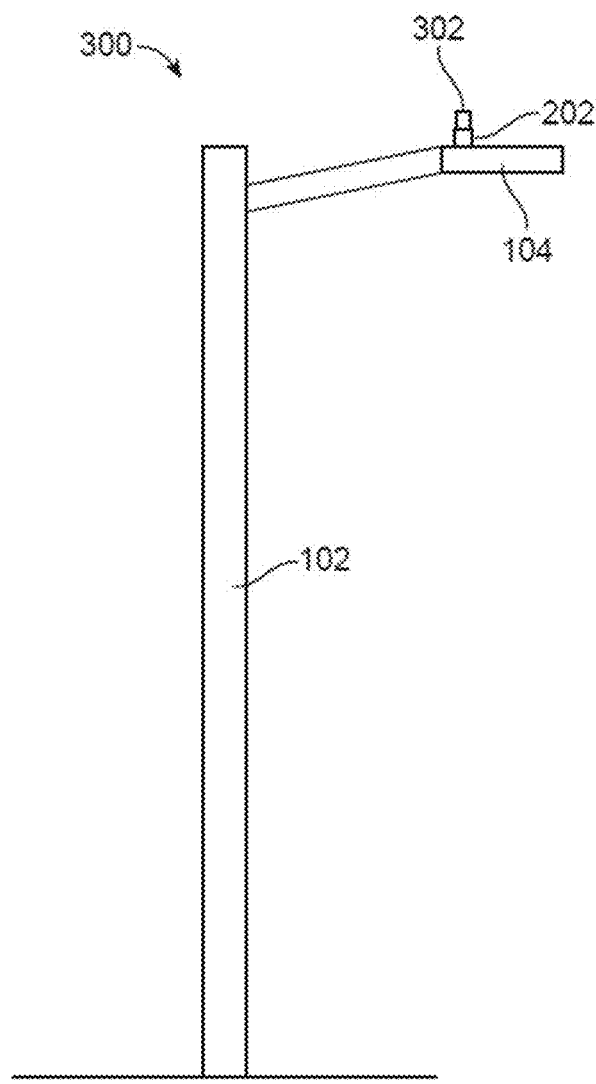
FIG. 3A depicts an example streetlight assembly that includes an example base station and an example application module.

FIG. 3A depicts an example streetlight assembly 300 that includes an example base station 202 and an example application module 302. The streetlight assembly may include a conventional streetlight pole 102 and streetlight unit 104. The streetlight assembly may also include the base station 202 of FIG. 2. The base station may be attached to the streetlight assembly in the same manner as was the base station of FIG. 2. An application module 302 may be attached to the base station, and may provide a second level of modular functionality for a system that provides streetlight management, information provision, information collection, communications with, or management of, driverless vehicles (such as unmanned aerial vehicles or driverless ground-based vehicles), and other functionality. The application module may be attached to the base station, which may be attached to the streetlight assembly. For example, the application module may include an electrical plug or receptacle (not shown) that can connect with a second electrical plug or receptacle of the base station (not shown), and components of the application module may be powered by electrical energy from the base station via the connection between the application module and the base station. The application module may include further sockets such that additional application modules can be selectively added or stacked on the first application module.

Figure 3B:
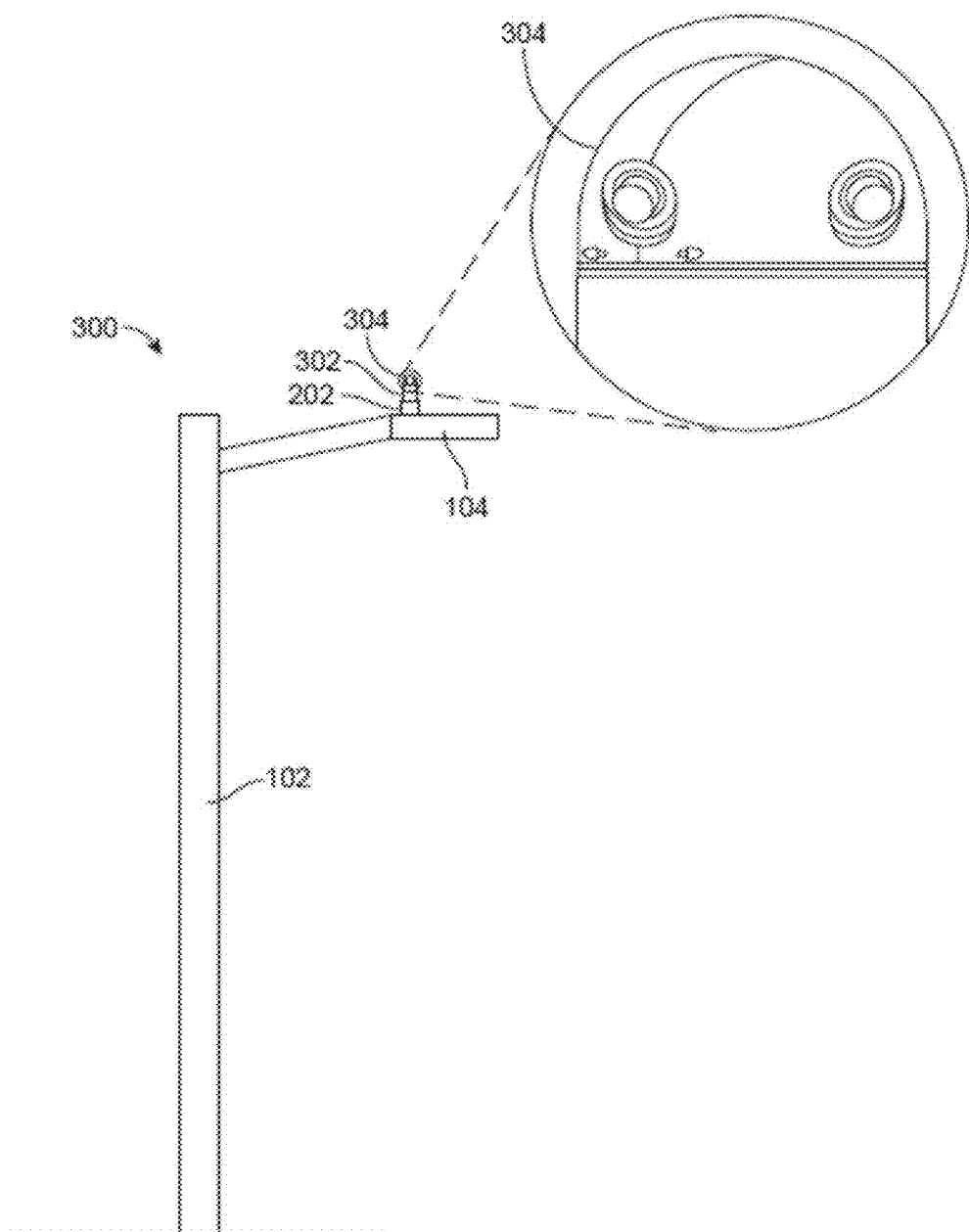
FIG. 3B depicts an example streetlight assembly that includes an example base station, an example application module, and a camera unit.

FIG. 3B depicts an example streetlight assembly that includes an example base station, an example application module, and a camera module or camera unit. The streetlight assembly may include any or all of the elements discussed with reference to FIG. 3A. Additionally, the streetlight assembly may include a camera module or camera unit 304. The camera module or camera unit may be integrated with the base station, so that the base station and camera unit are installed as a single unit. Owing to the frequent use of video in the systems and methods described herein, the base station with an integrated camera unit may be utilized in the majority of applications. However, the camera unit need not be integrated with the base station. In some cases, the camera unit may be a standalone unit or module that is separate from the base station. In such cases, the camera unit may be stacked or used in combination with any one or more of the application modules described herein. For example, the camera unit may be stacked on top of or below any of the application modules described herein. FIG. 3B further depicts an expanded view of the camera unit 304. The camera unit may be approximately dome-shaped. The camera unit may be shaped in any other appropriate manner. The camera unit may include one or more cutout areas that allow one or more cameras to obtain a view of the area surrounding the camera unit. The camera unit may include one, two, three, four, or more than four cameras. The cameras may be arranged in such a manner as to allow a 360 degree view of the area surrounding the camera unit. For instance, four cameras may be spaced at 90 degree angles from one another around a circumference of the camera unit.

The systems described in FIGS. 3A-B may further include an inert module (not shown), which may be located at a position above the base station, any applications modules, and the camera unit. The inert module may be configured to provide protection to the base station, any applications modules, and the camera unit. For instance, the inert module may be configured to provide protection against ultraviolet radiation, dust and other particulate matter, bird droppings, and/or other elements which may degrade performance of the system. The inert module may further facilitate passive thermal design of the system. In some situations, local weather or circumstances indicate the attachment of the inert module, which may include an upper shield or hat to protect the base unit or base station, cameras, and other components of the modular assembly from inclement weather, birds, excessive heat, or ice melting.

The base station and the application module may provide a myriad of utilities. For example, the base station may be mounted singularly to a streetlight (for instance, as depicted in FIG. 2), and may, together with other base stations mounted to other streetlights, provide a network for wireless control of streetlights. The base stations may connect to the streetlights at an existing receptacle of the streetlights and communicate wirelessly with other base stations or with a remote control center, or communicate with other communications devices. Also, the base stations may be easily inserted (such as by a downward or twisting motion) into an existing receptacle or socket of the streetlight. From its perch atop the streetlight assembly, the base station may provide a stable and lockable attachment location for one or more application modules. The application modules may be configured in a variety of configurations to provide functionality tailored for a particular application. Application modules may also be upgradeable, and may be easily interchanged or removed. For instance, the application modules may be easily interchanged or removed with a simple twist of the application module or twist and lift, without disrupting the functionality of the base station. Installation of a base station or an application module may require no wiring or special skills, and the base station and application module may be easily replaced or upgraded individually or as a pair. For instance, the base station and application modules may be replaced or upgraded individually or as a pair by applying an upward force or a twist, or a combination of the foregoing. Because a wide range of functionality may be provided in a modular fashion with configurable application modules, a customer may initially start with a base station only, and may upgrade over time and add one or more application modules, depending on desired functionality. Base stations or application modules may be reusable. Base stations may provide information to application modules and may provide communications functionality and control or processing functionality to application modules. This may minimize a number of components included with an application module.

The base station and/or application modules may each be configured to be coupled or stacked together in an assembly that may resemble a stack of cylinders. In some cases, the assembly including the base station and/or application modules or stack of cylinders may have a dome-shaped top. The dome-shaped top may be a hollow unit, an application module, or a camera module or camera unit having a dome-shape that is mounted to the top of the assembly including the base station and/or application modules. The base station and application modules may each be of relatively large width and relatively small height resembling for example, disks of the same or varying thicknesses. When assembled together, the base station and application modules may have a tapered shape or other shape configured for a specific purpose, such as reducing resistance to wind or for limiting or preventing wind-induced forced resonance and/or aeroelastic flutter.

The use of an easily installed and quickly detachable base station and any of the available modules may present a unique sales, marketing and warrantee strategy. The modules may be easily offered for short-term trials (such as 30 days, 60 days, or 90 days) or short-term leases for use during special events. The installation and removal costs may be low enough that the base station and application modules may be tried out by a potential user without incurring significant expense or risk. There may be little or no cost to removing a street light or retooling existing lights. As such, the modular aspect of the invention may offer substantial advantages over other security equipment or streetlight equipment that requires extensive civil engineering, trenching, and wiring which may be largely irreversible.

Figure 4:
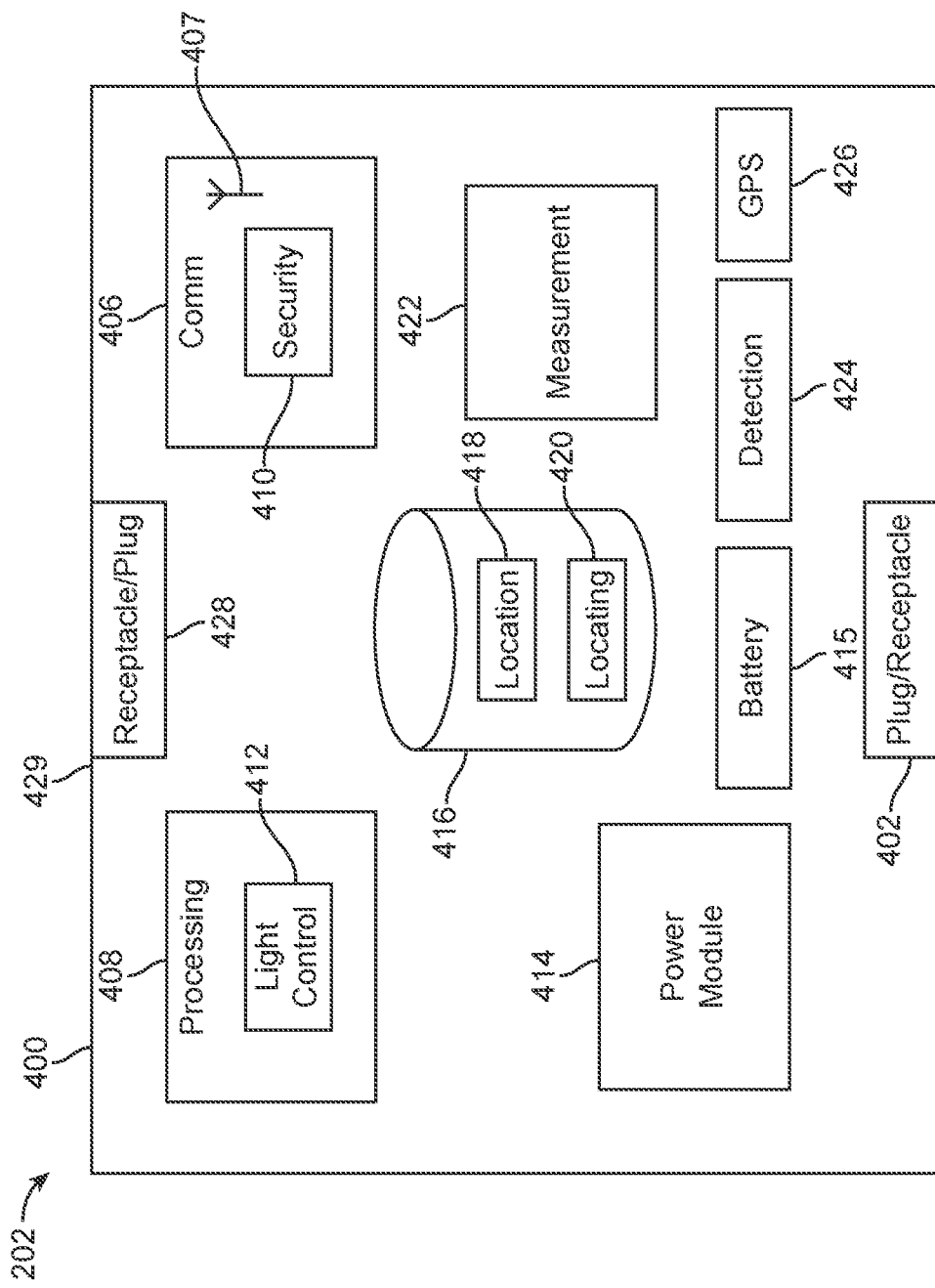
FIG. 4 is a block diagram of an example base station.

FIG. 4 is a block diagram of an example base station 202. The base station 202 may include a housing 400 and one or more components that may provide a first set of functionality. The one or more components may be located within the housing. Some or all of the included components of the base station may be powered, for example, by energy provided by the streetlight assembly (or other support member) to which the base station may be attached. A first electrical plug or receptacle 402 of the base station may be connected with an electrical plug or receptacle of the streetlight assembly. Electrical components of the base station may be powered by energy provided by the streetlight assembly through the connection. The first electrical plug or receptacle of the base station may be included at or near a bottom surface 404 or a downward-facing surface of the housing of the base station. The electrical plug or receptacle of the streetlight assembly may be included at or near an upper surface or an upward-facing surface of the streetlight assembly. The first electrical plug or receptacle of the base station may be a three-prong plug. The first electrical plug or receptacle of the base station may be a three-prong plug plus a data channel, where the three-prong plug provides an electrical connection and grounding and the data channel permits data to be transferred between the base station and the streetlight assembly.

The base station may be quickly mounted to the streetlight assembly by aligning the first electrical plug or receptacle of the base station with the electrical plug or receptacle of the streetlight assembly and applying a downward force on the base station and/or applying a rotating force or a twisting force to the base station. The downward, rotating, and twisting forces may be applied in sequence in any order or in any combination. Some of the examples discussed herein assume that the base station is powered by the streetlight assembly to which it is attached.

In other examples, the base station 22 may not be powered by the streetlight assembly or other support member to which the base station is attached. In these cases, the base station may be powered by a battery, by light energy (such as solar power), by wind energy, by hydroelectric energy, or by other power sources. For example, alternate power sources located in cars/trucks and commercial-retail/industrial/residential buildings can be utilized as power sources and can allow the base station or application module to achieve their respective functionalities. Such alternative power sources may include 120V AC for houses, jobsites, and commercial purposes and 12V for ground vehicles such as cars and trucks. To utilize these power sources, an ANSI twist plug may be employed to secure the base station or application module to a circular base. The circular base may include a plug for a standard three prong 120V plug and a separate plug for a 12V cord that can plug into a vehicle's cigarette lighter. The 120V power lead can connect to the ANSI plug of the base station or application module and the 12 volt lead can go up through a separate connection to the base station's or application module's 12V to 5V transformer. In some cases, the battery energy may be sufficient to ensure the system operate in a power conserving mode for at least a day, a week or a month.

The connection between the first plug or receptacle of the base station and the plug or receptacle of the streetlight assembly may be the lone location of attachment between the base station and the streetlight assembly. One or more additional locations of attachment may be included between the base station and the streetlight assembly. The base station may be physically secured to the streetlight assembly, in addition to the electrical connection, by one or more mechanical connections. For example, a tongue-in-groove mechanical connection between the base station and the streetlight assembly may be used. The base station may be secured to the streetlight assembly with one or more nuts and bolts, screws, or other appropriate attachment components. The base station may include one or more latches (not shown) that may be latched to one or more portions of the streetlight assembly. The streetlight assembly may include one or more latches that may be latched to one or more portions of the base station. The base station may be attached to the streetlight assembly by one or more mechanical connections, without an electrical connection as described above. The base station and the streetlight assembly may be connected in a manner that locks the base station to the streetlight assembly. For example, the base station may include a first locking feature and the streetlight assembly may include a second locking feature. The first locking feature and the second locking feature together may permit the base station to be locked to the streetlight assembly.

The base station may include one or more components that may provide a first set of functionality. For example, the base station may house one or more components that may provide one or more of wireless communications functionality and streetlight control functionality. The base station may include, for example, a communications module 406 and a processing module 408.

The communications module of the base station may include one or more antennas 407. The communications module may communicate wirelessly with one or more other base stations, each of which may be mounted, for example, to a streetlight assembly or to another appropriate support member. The wireless communications may take place over one or more networks. The communications module may be configured to communicate wirelessly using a long-range wireless communications technology or technologies. The base station may also communicate wirelessly with a control center or other entity (such as another communications device) remote from the base station. The control center may include a municipal office or headquarters, a police station, a fire department, an emergency response department, or a mobile unit corresponding to any of the foregoing examples.

The communications module (or another communications module) of the base station may also be configured to communicate wirelessly using comparatively short-range wireless communications technology or technologies. The communications module of the base station may communicate wirelessly with an attached application module using Bluetooth or other appropriate short-range or long-range wireless communication technology.

The communications module may communicate using various modes or protocols, including but not limited to GSM voice calls, messaging protocols (such as SMS, EMS, or MMS messaging), CDMA, TDMA, PDC, WCDMA, CDMA2000, GPRS, 4G protocols (such as 4G LTE), and/or other appropriate protocols. Such communication may occur, for example, through one or more radio-frequency transceivers. In addition, short-range communication may occur, such as using a Bluetooth, Wi-Fi, or other such transceivers. The communications module may communicate messages using one or more networks or communication links, such as one or more cellular or other phone-based networks, over remote control radio frequency links, UHF or L-band frequency links, microwave frequency links, the Internet, the "cloud" or one or more networks providing access to the Internet or the cloud, one or more mesh networks, local or wide-area networks, a microwave network, a radio frequency network, or other appropriate datalinks or networks, a public network and/or a private network, or other appropriate datalinks, networks, or communication paths. The base station, or the base station in combination with one or more application modules, may be considered a router because it may provide wireless communications or route wireless communications to or from one or more other entities.

The communications module of the base station may include a communications security module 410 configured to provide secure communications between the base station and the application module, or between the base station and the entity with which it is communicating. For instance, the communications security module may be configured to provide secure communications between the based station and another base station, a second (or third, fourth, etc.) application module (such as an application module attached to application module 302), an application module that is not attached to the base station (such as a remote application module), a control center, an unmanned aerial vehicle, a driverless ground-based vehicle, or other appropriate entity (such as another communications device).

The processing module of the base station may include one or more processors, such as one or more microprocessors or microcontrollers that are capable of executing instructions to perform desired tasks. The processing module may include a light control module 412. The light control module may be configured to, for example, adjust an intensity of one or more luminaires of the streetlight assembly. The light control module may increase an intensity of a luminaire of the streetlight assembly (i.e., to make the luminaire brighter), decrease an intensity of a luminaire of the streetlight assembly (i.e., to dim or make the luminaire less bright), turn a luminaire of the streetlight assembly completely off, and/or turn on a luminaire of the streetlight assembly.

The base station may receive an instruction to adjust an intensity of one or more luminaires of the streetlight. For example, the communications module of the base station may receive a message that instructs the base station to alter (such as to increase, decrease, turn on, and/or turn off) an intensity of a luminaire of the streetlight assembly. The light control module may cause an intensity of a luminaire of the streetlight to be altered accordingly. The light control module may include a digital relay or mechanical relay or one or more other components than can be used to turn on, turn off, decrease, or increase lighting intensity of one or more luminaires of the streetlight assembly. The streetlight unit may include one or more banks of luminaires. The light control module may be used to adjust intensity in any of the previously described ways for the one or more banks of luminaires.

The base station may include a power module 414. The power module may take as input a first energy signal (such as an alternating current (AC) or direct current (DC) signal) and produce as output one or more output energy signals (such as one or more DC signals). For example, the power module 44 may include one or more AC/DC converters (not shown) and/or may include one or more DC/DC converters (not shown). The power module may produce one or more appropriate voltage signals to power the components of the base station. For example, the power module may receive a first energy signal from the streetlight assembly via the first plug or receptacle and may convert the first energy signal into one or more electrical signals. The converted electrical signals may be appropriate for powering components of the base station, or in some cases for powering components of the base station and components of one or more attached application modules.

The base station may include one or more batteries 415. The batteries may be used to power components of the base station and/or to power components of one or more application modules that may be attached to the base station during power failures. For example, the batteries may provide power when the base station is removed from its support member (such as a streetlight assembly). The power module may include a charging component that charges the one or more batteries. The processing module may detect when the base station has been detached from its support member, and may cause a message to be transmitted via the communications module indicating that the base station has been detached from its support member. This may be useful for detecting and alerting to theft attempts, for example. The transmitted message may include a location identifier provided by a global position system (GPS) module 426, so that if the removed base station is transported to a different location, the message may include an indication of the different location. This may aid in recovery of the base station, for example.

The base station may include a data store 416 that may store information useful for performing the functionality of the base station. The data store may store information useful for functionality performed by an application module, or by a combination of the application module and the base station. A precise location identifier 418 of the base station (or of a portion of the base station) may be stored in the data store. The precise location identifier may include a latitude identifier, a longitude identifier, and/or an elevation identifier. The latitude, longitude, and/or elevation identifiers may correspond to a fixed point on a support member or infrastructure, or to an installed location of the base station or of a portion of the base station. For instance, the installed location may be a centerline or a point on the centerline of the base station at a bottom surface of the base station when installed on a support member (such as at or near an upper surface of a streetlight). The precise location identifier may identify a location on the base station where a charging signal for use by an unmanned aerial vehicle may be provided. The precise location identifier may be determined, for example, by a surveying operation (such as a laser survey) and may be accurate to a higher degree of accuracy than is possible with global positioning system information. For example, the precise location identifier may be accurate to within 1 foot, to within 6 inches, to within 4 inches, to within 3 inches, to within 2 inches, or to within 1 inch. The precise location identifier may be provided by an information service.

The data store may store one or more precise location identifiers 420 for one or more points of interest, such as a location of the support member to which the base station is attached, one or more locations associated with a road in a vicinity of the base station, and/or for one or more airborne locations in a vicinity of the base station. The precise location identifier or the one or more precise location identifiers may be communicated to one or more of an unmanned aerial vehicle or unmanned aerial system, may be communicated to an unmanned ground vehicle system, and/or may assist the unmanned aerial vehicle, unmanned aerial system, or unmanned ground vehicle system. The one or more precise location identifiers may be determined by a surveying operation (such as a laser survey), and may be accurate to a higher degree of accuracy than is possible with global positioning system information. The precision of the location may be a function of the subscription rate paid by a user of a service associated with the base station and/or application modules described herein. A higher precision of the location may give rise to a higher cost to the user. Thus, a title company or surveyor may pay more for a subscription with higher precision (such as precision to the nearest 1 inch, 3 inches, or 6 inches) than a subscriber who needs lower precision (such as precision to the nearest 1 foot).

The base station may include one or more measurement components 422, such as an energy measurement component (for instance, an electrical meter to measure electrical energy used), a temperature measurement component to measure ambient temperature in a vicinity of the base station, an ambient light measurement component (such as a photocell), and/or or other appropriate measurement components. In some cases, the base station may not include the one or more measurement components. The base station may include one or more detection components 424, such as one or more motion detectors that can detect motion in a vicinity of the base station, one or more microphones that can detect sounds in a vicinity of the base station, one or more cameras, one or more radar or lidar components, a communications signal detection component, and/or other appropriate detection components. The one or more detection components may detect a presence of a nearby vehicle (such as an aerial or ground-based vehicle), nearby humans, and/or nearby communications devices. The one or more detection components may detect a removal attempt of the base station from the streetlight assembly. In some cases, the base station may not include the one or more detection component. The base station may include a GPS component 516. The GPS component may be used to provide initial startup location information, until the precise location information is available, or location information that may be useful if the base station is moved to another location. In some cases, the base station may not include the GPS component.

The base station may include a second electrical plug or receptacle 428 configured to mate with an electrical plug or receptacle of the application module. The second electrical plug or receptacle may be located at or near an upper surface 429 of the base station. Electrical components included with the application module may be powered by energy provided by the base station, for example via the streetlight assembly, through the connection between the base station and the application module. The second electrical plug or receptacle may include a male or female Universal Serial Bus (USB) port. Two or more second electrical plugs or receptacles may be included with the base station (for instance, two USB ports, or one USB port and another type of plug or receptacle). The two or more electrical plugs or receptacles may be used for attaching an application module to the base station.

Figure 5:
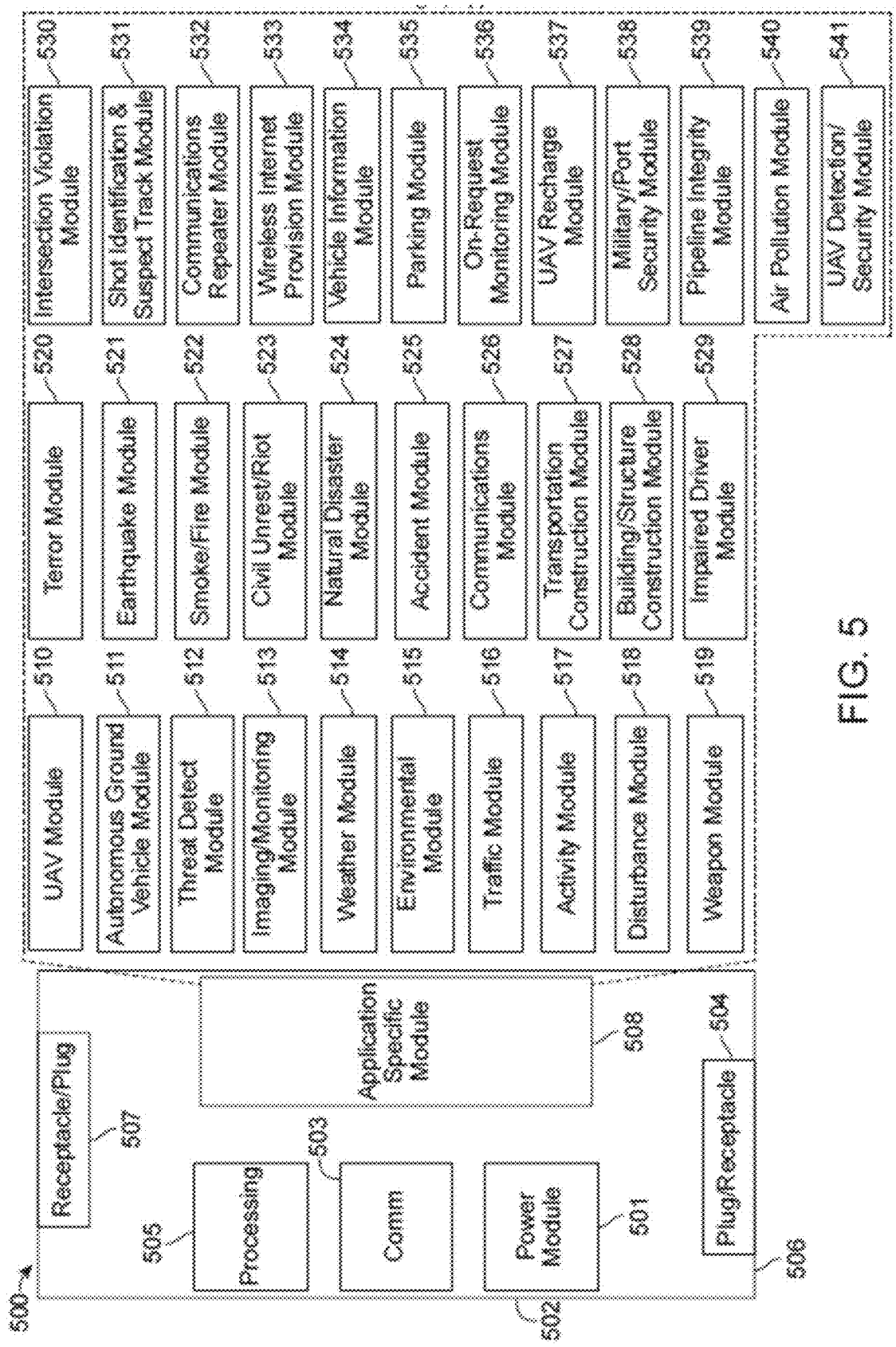
FIG. 5 is a block diagram of an example application module.

FIG. 5 is a block diagram of an example application module 500. The application module may correspond to the application module 302 of FIGS. 3A-B. The application module may include a housing 502 and one or more components that can provide a second set of functionality to complement the functionality provided by the base station. The one or more application module components may be located within the housing of the application module. The application module may include a first electrical plug or receptacle 504 that may attach, in some examples, to the second plug or receptacle 428 of the base station (shown in FIG. 4). The first electrical plug or receptacle of the application module may be located at or near a bottom surface 506 or a downward-facing surface of the application module. The second electrical plug or receptacle 428 of the base station 202 (shown in FIG. 4) may be located at or near the upper surface 429 (shown in FIG. 4) or an upward-facing surface of the base station. The second electrical plug or receptacle 428 of the base station may be covered or protected by a removable cover or a movable cover (not shown). The first electrical plug or receptacle of the application module may include a female or male USB port. Two or more electrical plugs or receptacles may be included with the application module (such as two USB ports, or one USB port and another type of plug or receptacle). The two or more electrical plugs or receptacles may be used for attaching the application module to the base station. The first electrical plug or receptacle of the application module may be used to attach the application module directly to the support member (for instance, directly to a streetlight assembly) without attaching the application module physically to a base station. The connections between the base station and the application modules or camera unit may be configured so as to prevent the attachment of unapproved application modules to the base station or to other application modules. In some cases, the connections may utilize a unique or a proprietary design.

The first electrical plug or receptacle 504 of the application module may include a three-prong plug, and the second plug or receptacle 428 of the base station may include a three-prong receptacle. The first electrical plug or receptacle of the application module may include a three-prong plug plus a data channel, where the three-prong plug provides an electrical connection and grounding and the data channel permits data to be transferred between the application module and the base station. The first electrical plug or receptacle of the application module may a custom plug and the second plug or receptacle of the base station may be a custom receptacle (or vice versa). The application module may be quickly mounted to the base station by aligning the first electrical plug or receptacle of the application module with the second electrical plug or receptacle of the base station and applying a downward force on the application module. The application module may be quickly mounted to the base station by aligning the first electrical plug or receptacle of the application module with the second electrical plug or receptacle of the base station, by applying a downward force on the application module, and then applying a rotating force or a twisting force to the application module. The application module may be quickly mounted to the base station by aligning the first electrical plug or receptacle of the application module with the second electrical plug or receptacle of the base station, and applying a rotating force or a twisting force to the application module.

In some cases, the connector is a standard connector, while in some cases it will be a unique, proprietary connector.

The connection between the first electrical plug or receptacle of the application module and the second electrical plug or receptacle of the base station may be the lone location of attachment between the application module and the base station. One or more additional locations of attachment may be included between the application module and the base station. The application module may be physically secured to the base station, in addition to the electrical connection, by one or more mechanical connections. For example, a tongue-in-groove mechanical connection between the application module and the base station may be used; the application module may be secured to the base station with one or more nuts and bolts, screws, or other appropriate attachment components. The application module may include one or more latches that may be latched to one or more portions of the base station. The base station may include one or more latches that may be latched to one or more portions of the application module. In some case, the application module may be attached to the base station by one or more mechanical connections without an electrical connection. The base station and the application module may be connected in a manner that locks the application module to the base station. For example, the base station may include a first locking feature and the application module may include a second locking feature. The first locking feature and the second locking feature together may permit the application module to be locked to the base station. In addition to electrical power transfer through the connection between the base station and application module, data may be transferred between the base station and the application module via the connection.

The base station may use the first energy signal from the streetlight assembly to produce one or more voltage signals to power the components of the base station and may also pass the first energy signal on to the second electrical plug or receptacle of the base station. In this manner, a power module 501 of the application module may also use the first energy signal to produce one or more output energy signals (such as one or more DC signals). The base station may make one or more of the one or more output energy signals generated by the power module of the base station available at the second electrical plug or receptacle of the base station. The application module may also use the one or more output energy signals of the base station to power components of the application module. In some cases, the application module may not include the power module.

The application module may include a communications module 503 that may include one or more antennas used to wirelessly communicate with the base station to which it is attached. The communications module may be used to communicate with other entities, such as with a driverless vehicle (for instance, an unmanned aerial vehicle or a driverless ground-based vehicle), a base station remote from the application module, a control center, or other appropriate entity (such as another communications device). The communications module may communicate using various modes or protocols, including but not limited to GSM voice calls, messaging protocols (such as SMS, EMS, or MMS messaging), CDMA, TDMA, PDC, WCDMA, CDMA2000, GPRS, 4G protocols (such as 4G LTE), 5G protocols, and/or other appropriate protocols. Such communication may occur, for example, through one or more radio-frequency transceivers. In addition, short-range communication may occur, such as using a Bluetooth, Wi-Fi, and/or other such transceivers. The communications module may communicate messages using one or more networks or communication links, such as one or more cellular or other phone-based networks, over remote control radio frequency links, UHF or L-band frequency links, microwave frequency links, the Internet, the "cloud" or one or more networks providing access to the Internet or the cloud, one or more mesh networks, local or wide-area networks, a microwave network, a radio frequency network, or other appropriate datalinks or networks, a public network and/or a private network, or other appropriate datalinks, networks, or communication paths.

The communications module of the application module may communicate with the communications module of the base station using short-range communications technologies (such as Bluetooth or other appropriate short-range communications technology), and the communications module of the base station (in addition to communicating with the application module) may communicate with other entities using longer-range communication technologies. In this fashion, the base station may serve as a communications hub for an installation of a base station and one or more application modules by providing communications capability to outside entities. The outside entities may include control centers, municipal authorities, police departments, fire departments, first responders, individual patrol officers or private security guards (whether on foot or in vehicles), third party alarm companies and similar private security organizations, vehicles (either air or ground-based), other base stations or application modules, other communications devices, and the like.

The application module may include a processing module 505 that may include one or more processors, such as one or more microprocessors or microcontrollers that are capable of executing instructions to perform desired tasks. In general, the application module may work together with the base station, or work independently, to perform tasks and to wirelessly communicate messages to remote entities (such as control centers, municipal authorities, police departments, fire departments, first responders, vehicles (air or ground-based), other base stations or application modules, other communications devices, and the like).

A second application module or multiple application modules may be "stacked" on top of the application module that is attached to the base station. The application module may also include a second electrical plug or receptacle 507 configured to mate with an electrical plug or receptacle of another application module to provide electrical energy to the another application module. The second plug or receptacle may be located at or near an upper surface or an upward-facing surface of the application module. In some cases, the application module does not include the second plug or receptacle.

The application module may provide a second set of functionality. For example, a wide variety of functionality may be provided by an application module, depending on the configuration of the application module, and the application module may be mounted to the base station as described herein. For instance, an application module may provide functionality related to one or more of the following: a) unmanned aerial vehicle communication or management; b) autonomous ground vehicle (or other type of ground vehicle) communication or management; c) threat detection and/or alerting to same; d) imaging and/or monitoring features; e) weather sensing and/or alerting to same; f) environmental sensing and/or alerting to same; g) traffic monitoring and/or alerting to same; h) activity sensing and/or alerting to same; i) disturbance sensing and/or alerting to same; j) weapon sensing and/or alerting to same; k) terror sensing and/or alerting to same; l) earthquake movement sensing and/or alerting to same; m) smoke and/or fire sensing and/or alerting to same; n) civil unrest and/or riot detection and/or alerting to same; o) natural disaster sensing and/or alerting to same; p) accident sensing and/or alerting to same; q) other communications; r) roadway construction monitoring; s) building and/or structure construction monitoring; t) impaired driver monitoring and/or alerting to same; u) intersection violation monitoring/or and alerting to same; v) shot identification and/or suspect tracking; w) communications repeater; x) wireless internet provision; y) vehicle information logging; z) parking monitoring; and/or aa) pollution monitoring.

The application module may include an application specific module 508. The application specific module may include one or more components/modules to provide specific functionality for a given application, including one or more of the applications described herein. For example, the application specific module may include one or more of: an unmanned aerial vehicle communication and/or management module 510; an autonomous ground vehicle (or other type of ground vehicle) communication and/or management module 511; a threat detection and/or alert module 512; an imaging and/or monitoring module 513; a weather sensing and/or alert module 514; an environmental sensing and/or alert module 515; a traffic monitoring and/or alert module 516; an activity sensing and/or alert module 517; a disturbance sensing and/or alert module 518; a weapon sensing and/or alert module 519; a terror sensing and/or alert module 520; an earthquake movement sensing and/or alert module 521; a smoke and/or fire sensing and/or alert module 522; a civil unrest and/or riot detection and/or alert module 523; a natural disaster sensing and/or alert module 524; an accident sensing and/or alert module 525; a communications module 526; a roadway construction monitoring module 527; a building and/or structure construction monitoring module 528; an impaired driver monitoring and/or alert module 529; an intersection violation monitoring and/or alert module 530; a shot identification and/or suspect monitoring module 531; a communications repeater module 532; a wireless internet provision module 533; a vehicle information logging module 534; a parking monitor module 535; an on-request monitoring module 536; an unmanned aerial vehicle recharge module 537; a military and/or port security module 538; a pipeline integrity module 539; an air pollution module 540; and an unmanned aerial vehicle detection and/or security module 541.

The application specific module of the application module may include only one module of the particular modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541. The application specific module may include any two, three, four, five, six, seven, eight, nine, ten, eleven, twelve, thirteen, fourteen, fifteen, sixteen, seventeen, eighteen, nineteen, twenty, twenty-one, twenty-two, twenty-three, twenty-four, twenty-five, twenty-six, twenty-seven, twenty-eight, twenty-nine, thirty, thirty-one, or thirty-two modules of the particular modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541. In general, any appropriate combination of the individual modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541, or subsets of the modules, may be used.

Each of the particular modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 may include appropriate sensors and components to perform the associated functionality for that particular module. For example, each of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 may include one or more cameras, one or more microphones, one or more activity or motion sensors, one or more gas or particle sensors, one or more environmental or weather sensors, one or more radar detectors, one or more lidar detectors, one or more communications receivers or other communications sensors that detect transmissions, and/or other appropriate sensors or components. Each of the particular modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 may include additional communications components, if appropriate. Each of the particular modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 may include additional processing components and/or one or more data stores, if appropriate.

Figure 6:
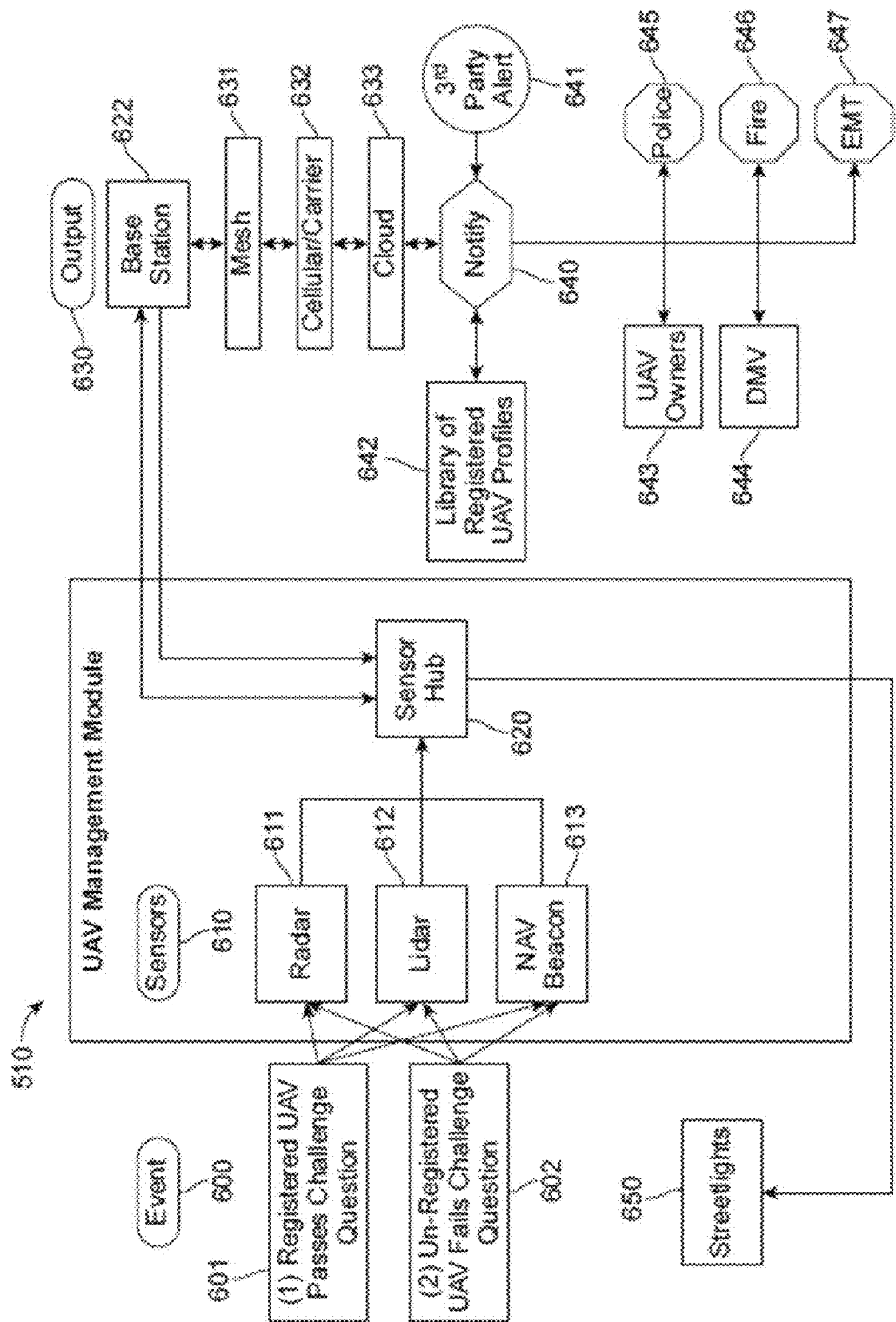
FIG. 6 is a block diagram of an example unmanned aerial vehicle (UAV) management module.

FIG. 6 is a block diagram of an example unmanned aerial vehicle (UAV) management module. The UAV management module 510 may be configured to respond to the occurrence of one or more events 600. The events may occur in response to a challenge question posed to a UAV, as described herein. The events may include a registered UAV passing a challenge question 601 or an unregistered UAV failing a challenge question 602. The events may be wholly or partially detected by one or more sensors 610. The sensors may include one or more radar sensors 611, one or more lidar sensors 612, and/or one or more navigation beacons 613. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes. The UAV management module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send and/or receive communications from a library 642 of registered UAV profiles, as described herein. For instance, the server or software element may query the library of registered UAV profiles to determine whether a UAV detected by the UAV management module has been registered with the library. The library may then send a response to the server or software element regarding whether the UAV is registered in the library. The server or software element may further send signals to and/or receive signals from other UAV owners 643, a department of motor vehicles (DMV) 644, a police department 645, a fire department 646, and/or emergency medical technicians (EMT) 647. The sensor hub may send a signal to operate a streetlight 650, as described herein.

The UAV management module 510 may provide a variety of functionality pertaining to unmanned aerial vehicles, such as any of the functionality provided by the communications stations described herein or in U.S. Pat. No. 9,087,451 to John A. Jarrell, the entire contents of which are hereby incorporated by reference in their entirety for all purposes. The UAV management module 510 may use the precise location identifier associated with the base station or the one or more other precise location identifiers in communicating with unmanned aerial vehicles, and may communicate one or more of the precise location identifiers to an unmanned aerial vehicle.

Communicating with unmanned aerial vehicles from one or more distributed locations proximate typical flying paths of unmanned aerial vehicles may provide advantages. Also, providing one or more precise location identifiers may provide benefits. For example, some problems that may be caused by inaccuracy, unavailability, shadowing or spoofing of GPS signals may be reduced, minimized, or eliminated by providing unmanned aerial vehicles with interactive communication from fixed points near the ground, or near to unmanned aerial vehicle traffic routes.

The UAV management module may be equipped with one or more speakers that may emit a sound, such as an audible or ultrasonic sound that can be detected by an unmanned aerial vehicle. The unmanned aerial vehicle may detect the sound and hover in close proximity to the application module based on the sound. The UAV may use the precise location identifier to calibrate its navigation system, for example. The application module may include a distinctive visual identifier that the UAV may detect (such as with a camera of the UAV) and the UAV may hover in close proximity to the application module. The UAV may use the precise location identifier (which may be stored at the application module) to calibrate its navigation system or determine its current location, for example. As another example, one or more landing areas may include a speaker that emits a sound or a visual identifier, either of which may be detectable by a UAV so that the UAV may hover or land close to the area, and the application module (or the base station) may communicate the precise location identifier associated with the landing area to the UAV so that it may calibrate its navigation system. The application module or the landing area may increase (or decrease) a volume or a pitch of the sound emitted as a UAV gets closer to it (such as based on a determination of the UAV moving closer based on one or more camera images or videos or microphone audio captures) as a way of indicating to the UAV it is moving closer. The sound may be changed (for instance, pulsed) to indicate that the UAV is sufficiently close.

The UAV management module may provide precise aerial locations (for instance, accurate to within 1 foot, 6 inches, 3 inches, or 1 inch) that may correspond to checkpoints past which an unmanned aerial vehicle may fly. This information may be useful to the unmanned aerial vehicle for a variety of purposes. The precise location identifier or the one or more precise location identifiers may be stored for example in the data store of the base station and may be communicated to one or more of an unmanned aerial vehicle or unmanned aerial system. This may assist the unmanned aerial vehicle or unmanned aerial system.

Because one or more UAV management modules may be attached to base stations on streetlights across a neighborhood, city, metropolitan area, state, or country, a seamless grid of interactive stations may be provided for the navigation of unmanned aerial vehicles. A UAV management module (or the base station) may include precise location identifiers corresponding to other locations, such as one or more takeoff or landing areas, and these may be communicated to an unmanned aerial vehicle. Because GPS technology, which may only be accurate to within about ten meters, may be inadequate for some applications such as precise landing or takeoff areas, the application modules may advantageously provide such information to an unmanned aerial vehicle.

The UAV management module (or the base station) may communicate one or more precise location identifiers (such as one or more location identifiers) to an unmanned aerial vehicle, where the precise location identifier includes longitude information, latitude information, and/or elevation information. The precise location identifier may have been determined by a surveying operation (such as a laser survey). The UAV management module (or the base station) may communicate a narrative description (such as a location like $12^{th}$ and Main) that is generally descriptive of a location of the UAV management module or base station, or the support member (such as a streetlight, cell tower, traffic light, or another of the support members discussed herein) to which the base station (and UAV management module) is attached. The narrative description may be useful to a human (for instance, a reading from a smartphone). In some cases, only the one or more precise location identifiers may be transmitted, without transmitting the narrative description. The transmission from the UAV application module (or the base station) may be encrypted, and the transmission may be broadcast at periodic intervals. In some cases, only entities that have subscribed to a service may be provided with information that permits a communication device associated with the entity to decrypt the broadcast encryption and use the information. In this manner, the UAV management module (or the base station) may provide information that may be available for use only by those entities that have subscribed to the information service. For instance, the information may be used by unmanned aerial vehicles, unmanned aerial systems, autonomous ground vehicles, unmanned ground vehicles, communications devices (such as a smart phone or smart wearable device), and/or other devices. As described herein, the precision of the location may be a function of the price paid by a user for a subscription service, with greater precision costing more than lower precision.

The UAV application module may determine unmanned aerial vehicle location based on communications with the unmanned aerial vehicle. One or more sensors may be used to detect unmanned aerial vehicles. For example, one or more cameras, one or more microphones, one or more radar detectors, one or more lidar detectors, one or more communications sensing detectors or sensors (for instance, to detect communications or transmissions on a data channel or video channel), or one or more other sensors may be used to detect a presence of an unmanned aerial vehicle. One, two, three, four, or more directions of radar or lidar may be used to observe or detect an unmanned aerial vehicle. The UAV management module may include one or more cameras, radar detectors, or lidar detectors (and optionally other components or circuitry) that may detect, and in some cases identify, unmanned aerial vehicles. The one or more cameras, radar detectors or lidar detectors may be oriented to scan areas above the ground where unmanned aerial vehicles may be flying, so that a narrowed focus area may be monitored. The application module's position atop a support member (such as a streetlight) may provide an advantageous location for such monitoring, as it may be possible to avoid monitoring ground-based activity. The UAV management module may include one or more microphones (and optionally other components or circuitry) that may detect, and in some cases identify, unmanned aerial vehicles based on characteristic sounds that particular unmanned aerial vehicles make when flying. In some cases, a plurality of UAV management modules may report information on location of unmanned aerial vehicles to a control center, and the control center may aggregate the information to provide citywide information or area-wide information on all currently airborne unmanned aerial vehicles in the city or area, for example. This may be helpful in that it may provide information even in the absence of unmanned aerial vehicles self-identifying, which may be beneficial in identifying rogue drones or drones attempting to carry out a nefarious purpose. This may be useful in identifying and tracking rogue drones or terror drones that may not be following established flight protocols or self-identifying, or in some cases may not be emitting any type of wireless communication signals.

One or more cameras within the application module may capture video of an unmanned aerial vehicle in flight. Based on the captured video of the unmanned aerial vehicle, the UAV management module may determine flight trajectory or path information, such as positional information related to flight trajectory or path of the unmanned aerial vehicle.

Software running on the UAV management module may determine, based on the video, information related to the flight trajectory or flight path of the unmanned aerial vehicle. For example, the UAV management module may determine that the unmanned aerial vehicle flew outside of a designated area within which the unmanned aerial vehicle was restricted to fly within. For instance, the UAV management module may determine that the UAV deviated in a lateral direction (such as to the left or right of the designated area) or in a vertical direction (such as above or below the designated area) or both). The UAV management module may determine a location at which the unmanned aerial vehicle departed from the designated area. The UAV management module may determine a maximum distance that the unmanned aerial vehicle departed from the designated area (such as a maximum lateral distance or a maximum vertical distance that the unmanned aerial vehicle departed from the designated area). The UAV management module may determine an amount of time that the unmanned aerial vehicle was outside of the designated area.

The UAV management module may identify or recognize the unmanned aerial vehicle in the video. The UAV management module may determine positional information for the unmanned aerial vehicle relative to a surrounding environment based on the video, and in some cases based on predetermined information regarding the surrounding environment (such as a predetermined boundary information, predetermined designated area information, predetermined landmark or target information). For example, positional information may be determined for the unmanned aerial vehicle relative to one or more of a designated area (such as a designated fly zone, air corridor, airspace, or the like), relative to one or more stationary objects or entities (such as a building, structure, landmark, target, vehicle, zone, area, pedestrian), or relative to one or more moving objects or entities (such as another unmanned aerial vehicle or other type of vehicle, pedestrian, animal). As the unmanned aerial vehicle moves along its flight path, the UAV management module may continuously track the unmanned aerial vehicle and may continuously determine positional information for the unmanned aerial vehicle relative to the surrounding environment. The information may be stored in one or more memory locations within the UAV management module.

The UAV management module (or an associated base station) may transmit a message that includes the determined information. For example, the UAV management module may transmit a message for receipt by the unmanned aerial vehicle. The message may include information determined based on the video, such as that the unmanned aerial vehicle has departed from a designated area, has entered a prohibited area, or that the unmanned aerial vehicle is within a predetermined distance of a boundary. The message may include a command to make a flight adjustment, such as a command to return to the designated area or to land in an appropriate area or to take an appropriate action. The message may include an indication of a fine or penalty. For example, the UAV management module (or an associated base station) may transmit a message for receipt by one or more remote entities such as control centers, municipal authorities, police departments, fire departments, first responders, vehicles (air or ground-based), other base stations or application modules, other communications devices, and the like. The message may include information determined based on the video, such as that the unmanned aerial vehicle has departed from a designated area, has entered a prohibited area, or that the unmanned aerial vehicle is within a predetermined distance of a boundary.

The UAV management module may monitor, based on the video or communications with the unmanned aerial vehicle or determined by one or more other sensors of the UAV management module, for one or more events related to the unmanned aerial vehicle, such as that the unmanned aerial vehicle has departed from a designated area, has entered a prohibited area, is within a predetermined distance of a boundary, or has been in a collision or near-collision (such as with another aerial vehicle, with a structure, with the ground, or with an object, human or animal, or other entity). If the UAV management module does not detect such an event (or other type of event) within a predetermined period of time, the UAV management module may over-write stored information derived from the video with newer information. If, however, the UAV management module detects such an event (or other type of event) within the predetermined period of time, the UAV management module (or an associated base station) may transmit a message that includes the determined information and may include the video in some examples.

The UAV management module may transmit a video that includes the captured video of the unmanned aerial vehicle augmented with one or more visual indicators determined by the UAV management module. The one or more visual indicators may include a visual indicator of the flight trajectory or path of the unmanned aerial vehicle, or one or more statistics associated with the flight trajectory or path of the unmanned aerial vehicle. As one example, the video may include augmented information that causes a red line (or other appropriate indicator) that corresponds to the trajectory of the unmanned aerial vehicle to be included when the video is displayed, or one or more statistics or indicators associated with the flight. For instance, the video may include a location at which the unmanned aerial vehicle departed from a designated area, a maximum distance that the unmanned aerial vehicle departed from the designated area (such as a maximum lateral distance or a maximum vertical distance that the unmanned aerial vehicle departed from the designated area or an amount of time that the unmanned aerial vehicle was outside of the designated area).

In situations where the unmanned aerial vehicle is involved in a collision or near-collision, this information may be beneficial for accident reconstruction or accident analysis purposes. In situations where an operator or owner of an unmanned aerial vehicle denies that the unmanned aerial vehicle departed from a designated area (or denies culpability for same), this information may be beneficial for settling disagreements or providing evidence of the unmanned aerial vehicle's actions.

The UAV management module may check a license or registration number for an unmanned aerial vehicle, and determine whether the license or registration number is valid. The UAV management module may perform any of the features discussed herein regarding license or registration checking and notifying. The UAV management module may receive a message from an unmanned aerial vehicle, from an unmanned aerial system, from a drone, or from an unmanned aircraft, where the message includes one or more of an ownership number, a make, a model, a type, a year, a serial number, an authorized use, an owner, a registration number, a license number, an authorized pilot in command, and a category. The message received by the UAV management module may be encrypted, and the UAV management module may decrypt the message and interprets the information; in some cases, the received message is not encrypted. The UAV management module may use the information in the received message to determine whether the unmanned aerial vehicle, unmanned aerial system, drone, or unmanned aircraft is authorized to be flying, or in some cases is authorized to be flying in a particular area. If the UAV management module determines that the unmanned aerial vehicle, unmanned aerial system, drone, or unmanned aircraft is not authorized, the UAV management module (or the base station) may transmit a message for receipt by or more of the vehicle, an appropriate authority (such as the police, FAA, or a municipal authority), a central command center, or to an owner of the vehicle. The message may include a flight adjustment that the vehicle should make, such as a command to land (for instance, in a landing zone) or return to a known location. In situations where the UAV management module detects a vehicle, but where the vehicle is not broadcasting its information or is not responding to requests for the information, the UAV management module may suspect that the vehicle is unauthorized, and may transmit a message for receipt by one or more of the vehicle, an appropriate authority (such as the police, FAA, or a municipal authority), a central command center, or to an owner of the vehicle. The message may include a flight adjustment that the vehicle should make, such as a command to land (for instance, in a landing zone) or return to a known location. The message may take any appropriate form, such as an electronic message, an SMS message, a phone call, an electronic mail message, a message via an app, or other appropriate message. Unauthorized, foreign, or rogue vehicles may be identified and tracked using the techniques described herein. An authorized vehicle that may have gotten lost or is off-course may be identified and tracked using the techniques described herein.

The UAV management module (or any of the communication stations described herein below, or the base station) may include one or more cameras that can be used to provide direct line of sight from the pilot or operator to the unmanned aerial vehicle or unmanned aerial system via the UAV management module (or communication station or base station). The UAV management module may transmit real-time video from the one or more cameras for receipt by a communications device used by the pilot or operator, so that the pilot may view the real-time video and operate the unmanned aerial vehicle or unmanned aerial system. The UAV management module (or communication station or base station) may include four cameras, the four cameras generally oriented at about 90 degree angles with respect to the adjacent camera, for 360-degree coverage over an altitude range (or portion thereof) that UAVs are expected to fly. The UAV management module (or communication station or base station) may include five cameras, the first four cameras generally oriented at about 90 degree angles with respect to the adjacent camera, for 360-degree coverage, and the fifth camera oriented generally upward. The UAV management module (or communication station or base station) may include a smaller number of cameras (such as one, two, or three cameras). The smaller number of cameras may be configured to provide focused coverage anywhere between 0 and 360 degrees, and also complete 360-degree coverage over an altitude range (or portion thereof) that UAVs are expected to fly.

The UAV management module (or communication station or base station) may transmit a video from a first camera of the module for receipt by a communications device used by the pilot or operator. As the unmanned aerial vehicle passes from the field of view of the first camera to a field of view of a second camera of the module, the UAV management module may halt transmission of the video from the first camera and may transmit video from the second camera of the UAV management module for receipt by a communications device used by the pilot or operator. In this manner, the UAV management module may transmit an appropriate video so that the pilot or operator maintains a view of the unmanned aerial vehicle at all times.

The UAV management module (or communication station or base station) may communicate with one or more other UAV management modules (or communication stations or base stations) and may coordinate a "handoff" of UAV video provision. For example, as a UAV flies between a first UAV management module and a second UAV management module, the first UAV management module may determine (for instance, based on one or more of a flight path of the UAV, a current location of the UAV, an expected future location of the UAV, and known locations of other UAV management modules or communications stations or base stations) that the second UAV management module should begin transmitting video of the UAV for receipt by the communications device of the pilot or operator. This may occur, for example, when the UAV reaches a halfway point between the first UAV management module and the second UAV management module.

While the above description regarding one or more cameras and transmitting video of a vehicle has been described with respect to the UAV management module 510 and unmanned aerial vehicles or unmanned aerial systems, it will be understood that any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 discussed herein may be configured to include this functionality. Also, any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541, communication stations, or base stations discussed herein can include one or more cameras and configured to provide similar functionality for pilots, operators, or management systems of ground-based vehicles or hybrid ground/air vehicles. For example, the cameras may provide views of ground-based traffic routes and handoffs between modules regarding providing continuous video visibility of the vehicle may similarly be provided.

Figure 7:
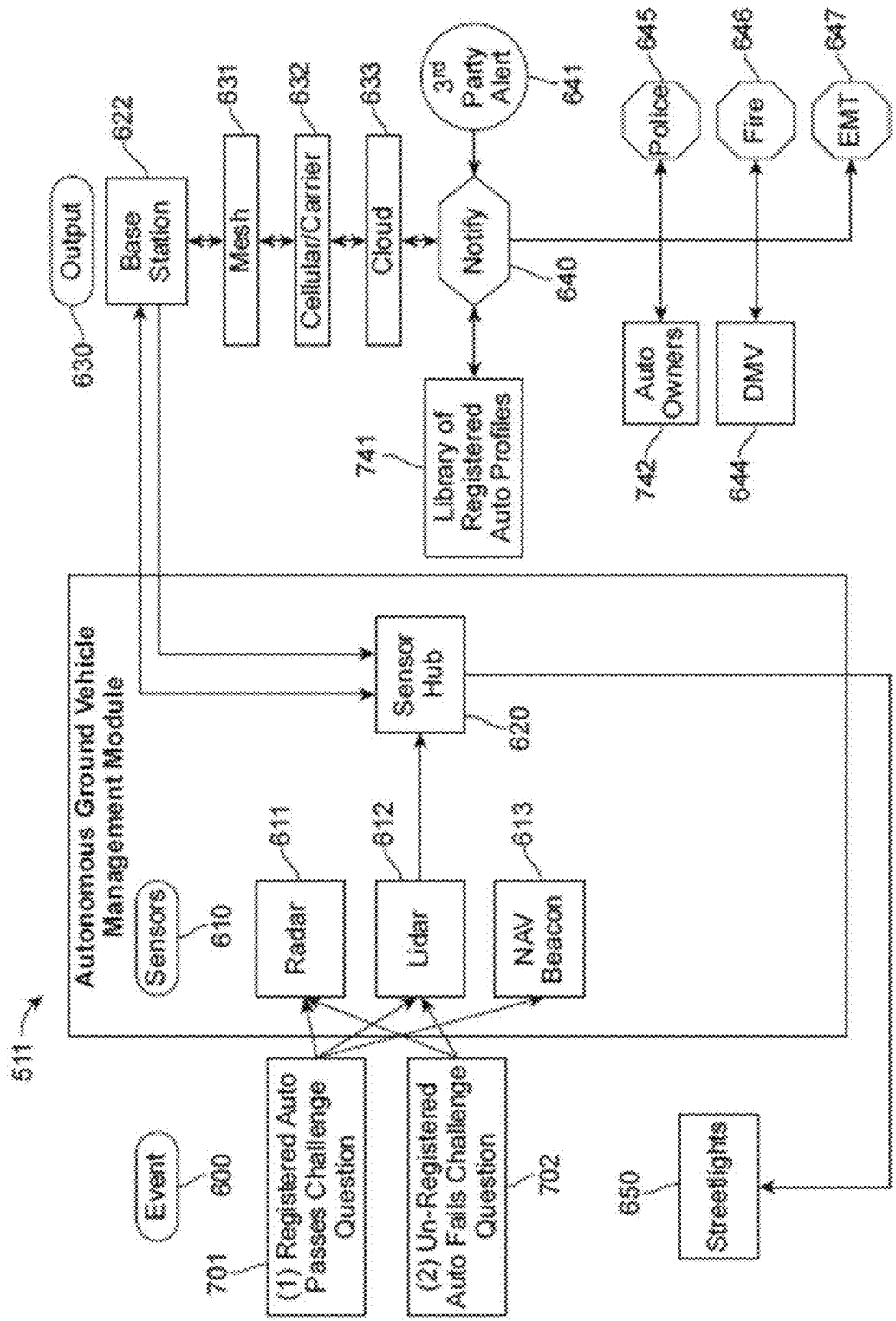
FIG. 7 is a block diagram of an example autonomous ground vehicle management module.

FIG. 7 is a block diagram of an example autonomous ground vehicle management module. The autonomous ground vehicle management module 511 may be configured to respond to the occurrence of one or more events 600. The events may occur in response to a challenge question posed to an autonomous ground vehicle, as described herein. The events may include a registered autonomous ground vehicle passing a challenge question 701 or an unregistered autonomous ground vehicle failing a challenge question 702. The events may be wholly or partially detected by one or more sensors 610. The sensors may include one or more radar sensors 611, one or more lidar sensors 612, and/or one or more navigation beacons 613. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The autonomous ground vehicle management module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send and/or receive communications from a library 741 of registered autonomous ground vehicle profiles, as described herein. For instance, the server or software element may query the library of registered autonomous ground vehicle profiles to determine whether an autonomous ground vehicle detected by the autonomous ground vehicle management module has been registered with the library, as described herein. The library may then send a response to the server or software element regarding whether the autonomous ground vehicle is registered in the library, as described herein. The server or software element may further send signals to and/or receive signals from other autonomous ground vehicle owners 742, a department of motor vehicles (DMV) 644, a police department 645, a fire department 646, and/or emergency medical technicians (EMT) 647. The sensor hub may send a signal to operate a streetlight 650, as described herein.

The autonomous ground vehicle management module 511 may provide communications and information, including any of the information described herein with reference to the UAV management module 510, to autonomous ground-based vehicles, driverless ground-based vehicles, self-driving vehicles, connected vehicles, or other ground-based vehicles. The examples discussed herein will assume autonomous vehicles. For example, the autonomous ground vehicle management module 511 may use the precise location identifier associated with the base station or the one or more other precise location identifiers (such as precise locations along or on a road on which a ground-based vehicle may be travelling) in communicating with ground-based vehicles. The autonomous ground vehicle management module may communicate the precise location identifiers to a ground-based vehicle. Communicating with ground-based vehicles from one or more distributed locations proximate typical traffic routes of ground-based vehicles may provide advantages. Also, providing one or more precise location identifiers may provide benefits. For example, some problems that may be caused by inaccuracy, unavailability, shadowing or spoofing of GPS signals may be reduced, minimized, or eliminated by providing ground-based vehicles with interactive communication from fixed points at or near the ground. The ground-based vehicles may use the information in a manner analogous to the information used by UAVs described herein. The autonomous ground vehicle management may provide precise ground-based locations (for instance, accurate to within 1 foot, 6 inches, 3 inches, or 1 inch) that may correspond to checkpoints past which or over which a ground-based vehicle may drive. This information may be useful to the ground-based vehicle for a variety of purposes, such as to recalibrate its navigation system or to establish its present location. The one or more precise location identifiers, which can be stored for example in the data store of the base station, may be communicated to one or more of an unmanned aerial vehicle or unmanned aerial system, and may be communicated to an unmanned ground vehicle system. This may assist the unmanned aerial vehicle, unmanned aerial system, or unmanned ground vehicle system.

The autonomous ground vehicle management module may determine autonomous ground vehicle location based on communications with the autonomous ground vehicle. One or more sensors may be used to detect autonomous ground vehicles. For example, one or more cameras, one or more microphones, one or more radar detectors, one or more lidar detectors, one or more communications sensing detectors or sensors (for instance, to detect communications or transmissions on a data channel or video channel), or one or more other sensors may be used to detect a presence of an autonomous ground vehicle. One, two, three, four, or more directions of radar or lidar may be used to observe or detect an autonomous ground vehicle. The autonomous ground vehicle management module may include one or more cameras, radar detectors, or lidar detectors (and optionally other components or circuitry) that may detect, and in some cases identify, autonomous ground vehicles. The one or more cameras, radar detectors or lidar detectors may be oriented to scan areas on or near the ground where ground-based vehicles may be travelling, so that a narrowed focus area may be monitored. The autonomous ground vehicle management module's position atop a support member (such as a streetlight) may provide an advantageous location for such monitoring, as it may provide a convenient perch for surveying activity. The autonomous ground vehicle management module may include one or more microphones (and optionally other components or circuitry) that may detect, and in some cases identify, autonomous ground vehicles based on characteristic sounds that particular autonomous ground vehicles makes when moving. A plurality of autonomous ground vehicle management modules may report information on location of autonomous ground vehicles to a control center, and the control center may aggregate the information to provide citywide information or area-wide information on all currently operating autonomous ground vehicles in the city or area. This may be helpful in that it may provide information even in the absence of autonomous ground vehicles self-identifying, which may be beneficial in identifying rogue vehicles or vehicles attempting to carry out a nefarious purpose. This may be useful in identifying and tracking rogue vehicles or terror vehicles that may not be following established protocols or self-identifying, or in some cases may not be emitting any type of wireless communication signals.

The autonomous ground vehicle management module (or the base station) may communicate one or more precise location identifiers (such as one or more precise location identifiers) to an autonomous ground vehicle or unmanned ground vehicle. The precise location identifier may include longitude information, latitude information, and/or elevation information. The precise location identifier may have been determined by a surveying operation (such as a laser survey). The autonomous ground vehicle management module (or the base station) may communicate a narrative description (for instance, $12^{th}$ and Main) that is generally descriptive of a location of the autonomous ground vehicle management module or base station, or the support member (such as a streetlight) to which the base station (and autonomous ground vehicle management module, if applicable) is attached. In some cases, only the one or more precise location identifiers are transmitted, without transmitting the narrative description. The transmission from the autonomous ground vehicle management module (or the base station) may be encrypted, and the transmission may be broadcast at periodic intervals. In some cases, only entities that have subscribed to a service may be provided with information that permits a communication device associated with the entity to decrypt the broadcast encryption and use the information. In this manner, the autonomous ground vehicle management module (or the base station) may provide information that may be available for use only by those entities that have subscribed to the information service. For instance, the information may be available for use only by unmanned aerial vehicles, unmanned aerial systems, autonomous ground vehicles, unmanned ground vehicles, communications devices (such as a smart phone or a smart wearable device), and/or other devices.

The autonomous ground vehicle management module may perform, with reference to ground-based vehicles, any of the features discussed herein regarding license or registration checking and notifying as they pertain to UAVs. The autonomous ground vehicle management module may receive a message from an autonomous ground vehicle, where the message includes one or more of an ownership number, a make, a model, a type, a year, a serial number, an authorized use, an owner, a registration number, a license number, an authorized controller in command, and a category. The message received by the autonomous ground vehicle management module may be encrypted. The autonomous ground vehicle management module may decrypt the message and interpret the information. In some cases, the received message is not encrypted. The autonomous ground vehicle management module may use the information in the received message to determine whether the autonomous ground vehicle is authorized to be in use, or is authorized to be in use in a particular area. If the autonomous ground vehicle management module determines that the autonomous ground vehicle is not authorized, the autonomous ground vehicle management module (or the base station) may transmit a message for receipt by or more of the vehicle, an appropriate authority (such as the police or a municipal authority), a central command center, or to an owner of the vehicle. The message may include a navigation adjustment that the vehicle should make, such as a command to stop or park (for instance, in a parking zone or appropriate area) or return to a known location. In this manner, unauthorized, foreign, or rogue vehicles may be identified and tracked. In situations where the autonomous ground vehicle management module detects a vehicle, but where the vehicle is not broadcasting its information or is not responding to requests for the information, the autonomous ground vehicle management module may suspect that the vehicle is unauthorized, and may transmit a message for receipt by one or more of the vehicle, an appropriate authority (such as the police or a municipal authority), a central command center, or to an owner of the vehicle. The message may include a navigation adjustment that the vehicle should make, such as a command to stop or park (for instance, in a parking zone or appropriate area) or return to a known location. The message may take any appropriate form, such as an electronic message, an SMS message, a phone call, an electronic mail message, a message via an app, or other appropriate message. Unauthorized, foreign, or rogue vehicles may be identified and tracked using the techniques described herein. An authorized vehicle that may have gotten lost or is off-course may be identified and tracked using the techniques described herein.

One or more cameras of the autonomous ground vehicle management module may capture video of a ground-based vehicle in motion. Based on the captured video of the ground-based vehicle, the autonomous ground vehicle management module may determine trajectory or path information, such as positional information related to trajectory or path of the ground-based vehicle. The autonomous ground vehicle management module may transmit a message that includes information, a video, or an augmented video in a manner similar to that described herein with reference to the UAV management module 510.

The threat detection and/or alert module 512 may include one or more sensors and associated components/circuitry to provide functionality such as any of the functionality provided by the lighting assemblies described in any of U.S. Pat. Nos. 8,502,456, 8,716,942, and 8,963,433 to John A. Jarrell and Robert C. Hendrickson, the entire contents of which are hereby incorporated by reference in their entireties for all purposes. The threat detection and/or alert module may be used to detect ignited gunpowder, explosives, gunshots, or other physical threats. Such detection may be useful at airports, military installations, ports, hospitals, schools, universities, banks, iconic structures or institutions, and/or other large-scale operations where there is a threat of intrusion, sabotage, shootings or other terrorist activities, or common street crime. Upon detection of any of the foregoing, the threat detection and/or alert module (or the base station) may send a wireless message to alert of the danger.

The imaging and/or monitoring module 513 may, in some examples, include one or more sensors (such as one or more cameras) and associated components/circuitry to collect images or videos. A location atop a streetlight or other support member may provide an advantageous location for monitoring and rapid assessments. For instance, information collected may be used for time-lapse photography and archiving of cityscapes and social history.

Figure 8:
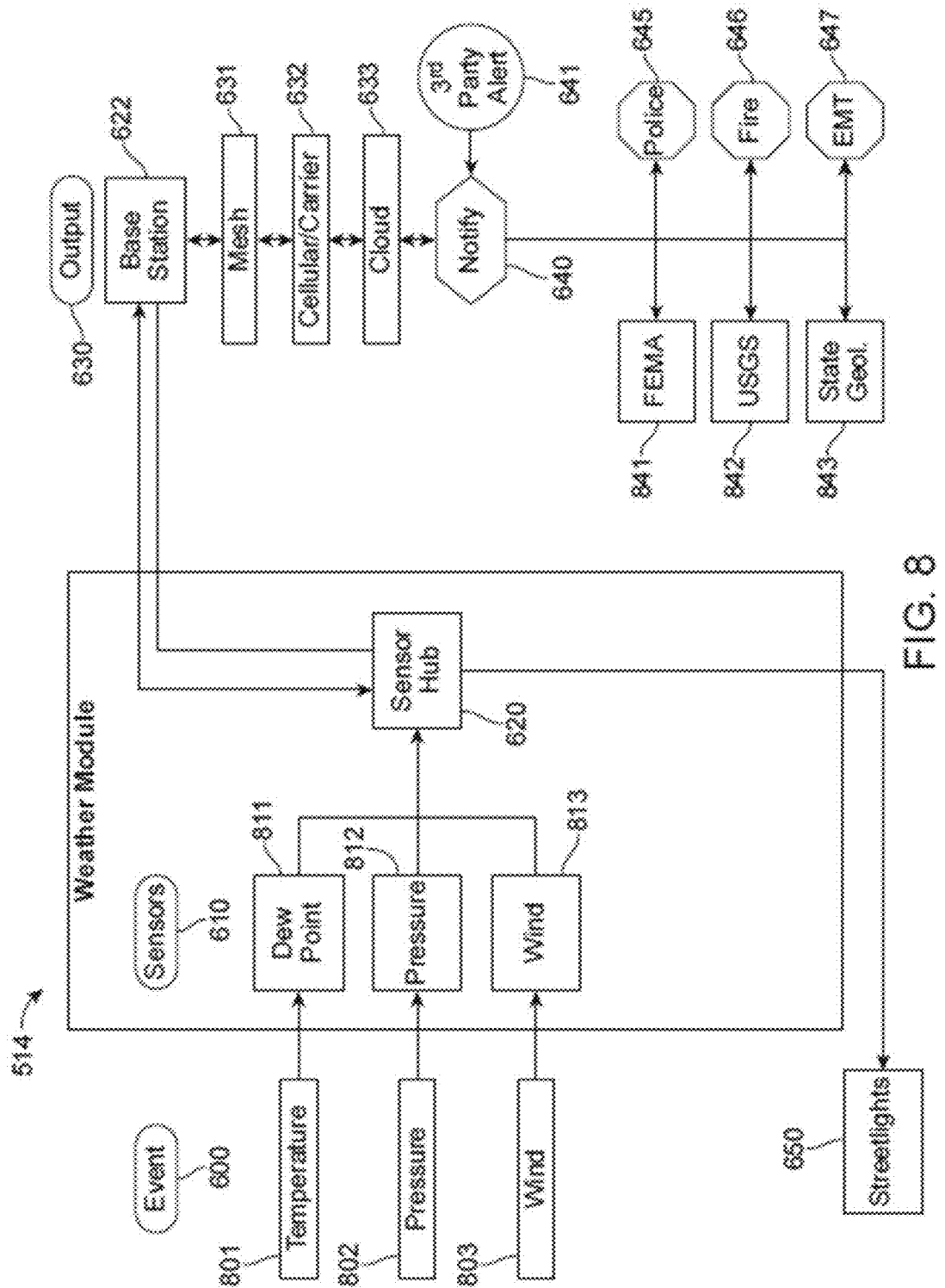
FIG. 8 is a block diagram of an example weather module.

FIG. 8 is a block diagram of an example weather module. The weather module 514 may be configured to respond to the occurrence of one or more events 600. The events may correspond to a measurement of temperature 801, pressure 802, and/or wind 803, as described herein. The events may be wholly or partially detected by one or more sensors 610. The sensors may include one or dew point sensors 811, one or more pressure sensors 812, and/or one or more wind sensors 813. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The weather module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send signals to and/or receive signals from the Federal Emergency Management Agency (FEMA) 841, United States Geologic Service (USGS) 842, one or more state geological agencies 843, a police department 645, a fire department 646, and/or emergency medical technicians (EMT) 647. The sensor hub may send a signal to operate a streetlight 650, as described herein.

Weather events may also be detected by a third party entity. As an example, the modular system may respond to a 3rd party alert of a weather event or provide an output in response to the alert by providing a visual or audio indication, by sending a communication to or communication with one or more outside entities, or by providing for control and management of streetlights. Such a response may indicate the type of weather event. For example, in response to a 3rd party alert, signal, or other communication, the modular system may provide a blinking light or a siren to activate, or may instruct a streetlight or nearby streetlights to increase light intensity or to provide a pattern of varying light intensity. The response may be different depending on the weather event identified by the third party entity and different 3rd party alerts may be used depending on the identified weather event. For example, a different blinking light pattern or siren signal may be used to indicate an earthquake, a storm, a tornado, a hurricane, a typhoon, a tsunami or other weather event versus smoke, fire, suspicious activity, a disturbance, an intrusion, or some other threat or emergency.

The weather sensing and/or alert module 514 may include one or more sensors and associated components/circuitry to provide a weather station that may be used to track and/or communicate information regarding weather in a vicinity of the application module. The weather sensing and/or alert module may include one or more wind sensors, precipitation sensors, temperature sensors, pressure sensors (such as barometric pressure, absolute pressure, and/or relative pressure), humidity sensors, and/or other sensors can be included to provide wind data (such as speed, direction, gust information, and/or rapid change information), temperature data, precipitation data (such as dewpoint), pressure data, and humidity data, for example for outdoor activities, sports competitions (such as baseball, tennis, soccer, and/or other sports), cultural activities, warning of impending rain, wind or lightening, and/or creating a data base of the microclimate and variation of specific venues in the environment. The uniform and fixed elevation above ground of most streetlights may provide a uniform grid at an elevation that may make overall assessment more meaningful. The use of dewpoint and temperature within the weather module as well as other onboard sensors may allow for the prediction of fog, hail, tornado and similar driving threats (such as by referencing temperature and dewpoint weather tables). When coupled with other application modules, camera units, and other sensors (such as particulates sensors and infrared sensors), as well as with other weather modules located at different locations, the weather module and associated base station and network may allow for the creation of a fog, hail, or tornado (or other inclement weather) warning system, either locally and/or through use of the network. Local modules or the network may alert the local road authorities, police, radio, and/or news outlets of impending or current fog, hail, or tornado (or other inclement weather) conditions. Further, the local or cloud based network may flash individual or multiple streetlights to warn of existing or upcoming fog banks or other inclement localized weather events, allowing motorists to avoid finding themselves suddenly encircled in fog or other inclement weather while traveling at a high rate of speed. This may assist drivers or UAVs in avoiding or mitigating individual or multi-vehicle accidents.

The environmental sensing and/or alert module 515 may include one or more sensors (such as one or more hazardous liquid and/or gas sensors, particle sensors, and/or domestic water or sanitary sewer effluent sensors) and associated components/circuitry to detect the presence of particular liquids, gases, or particles in the air. The environmental sensing and/or alert module may send an alert regarding the detection. Examples of gases or particles that may be detected include methane, $O_3$, $SO_2$, CO, anhydrous ammonia, and/or other chemicals. Detection may help regulators keep track of emissions from automobiles, local power plants, refineries, sewage treatment facilities, and factories, to list few examples. The environmental sensing and/or alert module may be used, for example, in the vicinity of a liquid or gas pipeline, and one or more sensors of the environmental sensing and/or alert module may detect gases or particles indicative of a leak or rupture in the pipeline so that an alert may be immediately issued. The environmental sensing and/or alert module may also include one or more microphones that may be used to monitor or track noise levels from various activities, including unmanned aerial vehicles or other aircraft, and/or ground vehicle traffic. The traffic module may use the sensors and processes in the manner described herein to provide weather data in the evaluation and management of traffic in the vicinity of the traffic module.

Figure 9:
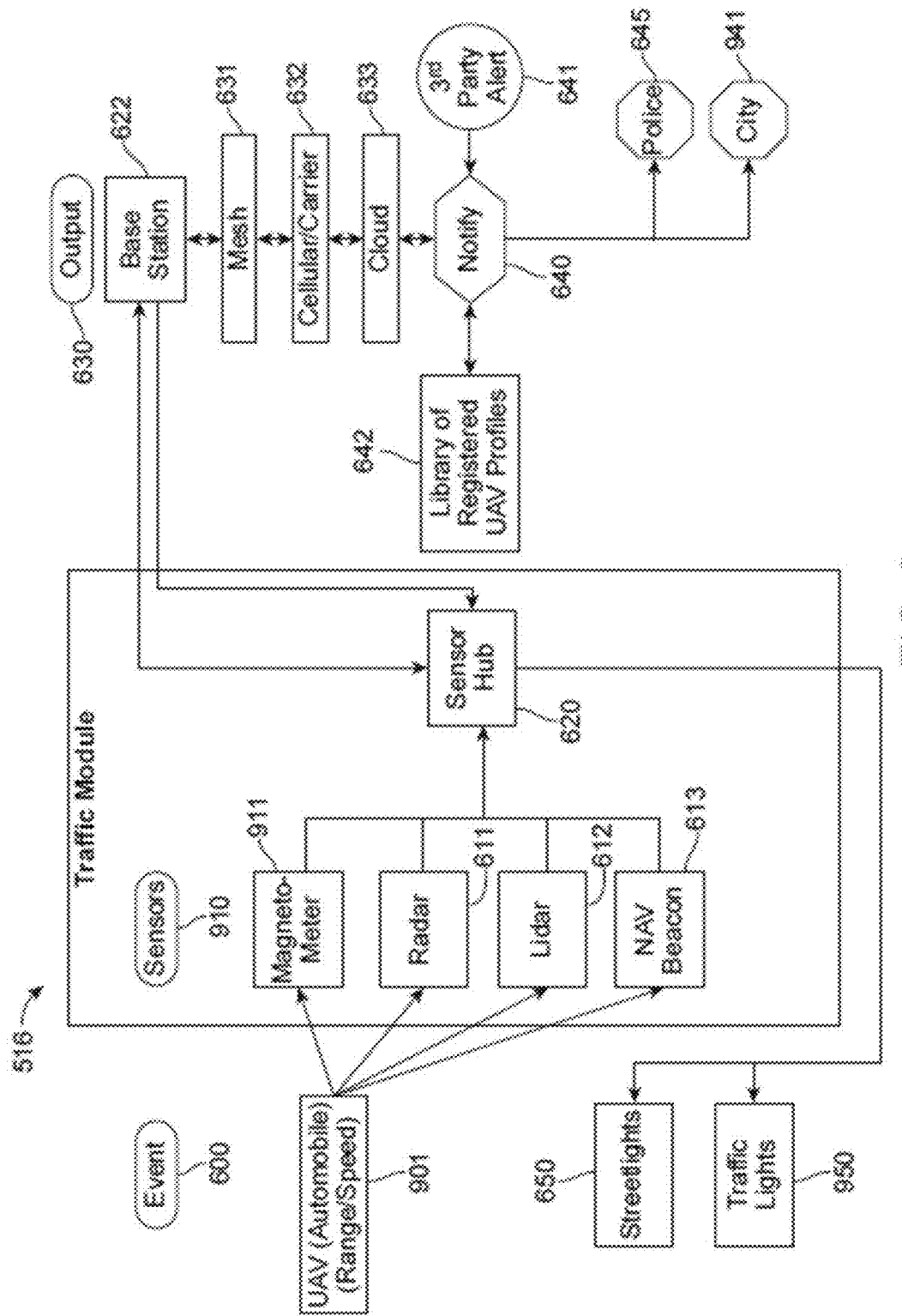
FIG. 9 is a block diagram of an example traffic module.

FIG. 9 is a block diagram of an example traffic module. The traffic module 516 may be configured to respond to the occurrence of one or more events 600. The events may include a UAV or automobile range or speed measurement 901. The events may be wholly or partially detected by one or more sensors 610. The sensors may include one or more magnetometers 911, one or more radar sensors 611, one or more lidar sensors 612, and/or one or more navigation beacons 613. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The traffic module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send and/or receive communications from a library 642 of registered UAV profiles, as described herein. For instance, the server or software element may query the library of registered UAV profiles to determine whether a UAV detected by the UAV management module has been registered with the library, as described herein. The library may then send a response to the server or software element regarding whether the UAV is registered in the library, as described herein. The server or software element may further send signals to and/or receive signals from a police department 645 and/or a city 941. The sensor hub may send a signal to operate a streetlight 650 or traffic lights 950, as described herein.

The traffic monitoring and/or alert module 516 may include one or more sensors (such as one or more cameras, microphones, motion detectors, radar, lidar, and/or one or more magnetic and/or other sensors) and associated components/circuitry to detect automobiles using magnetic or visual tracking technology. The traffic monitoring and/or alert module may alert traffic planners and police of current situations and accumulate detailed data of traffic flows for future planning efforts.

The activity sensing and/or alert module 517 may include one or more sensors (such as one or more cameras, motion detectors, radar, lidar, and/or other sensors) and associated components/circuitry to sense activity and provide functionality, such as any of the functionality provided by the lighting assemblies described in any of U.S. Pat. Nos. 8,502,456, 8,716,942, and 8,963,433 to John A. Jarrell and Robert C. Hendrickson, the entire contents of which are hereby incorporated by reference in their entireties for all purposes. The activity sensing and/or alert module may be used to trigger the luminaire of the streetlight to brighten or dim with the level of activity. It may also report suspicious or prohibited activity at or near an installed location, such as suspicious or prohibited nighttime activity at or near school buildings or sports facilities.

The disturbance sensing and/or alert module 518 may include one or more sensors (such as one or more cameras, audio sensors, radar, lidar, and/or other sensors) and associated components/circuitry to detect specific types of sounds or sound levels that indicate a fight, argument or other disturbance, or video or still picture images that may indicate same, and send a message to trigger intervention or inquiry by police or local building security. The disturbance sensing and/or alert module may provide functionality such as any of the functionality provided by the lighting assemblies described in any of U.S. Pat. Nos. 8,502,456, 8,716, 942, and 8,963,433 to John A. Jarrell and Robert C. Hendrickson, the entire contents of which are hereby incorporated by reference in their entireties for all purposes.

The activity sensing and/or alert module 517 and disturbance sensing and/or alert module 518 can each be used alone or in combination to monitor activity and disturbances for security purposes in high risk areas such as construction or building sites, and in areas requiring monitoring for a specific purpose, such as border patrol and for homeland security.

Suspicious activity and disturbances may also be detected by a third party entity such as a private security company or other company that may have a security system deployed in a location such as a residence, industrial building, construction site, or other building structure or site. As an example, a security company may provide a 3rd party alert, signal, or other communication to alert an area that suspicious activity or a disturbance has been detected in a location or a nearby location. The modular system may respond to the alert or provide an output in response to the alert by providing a visual or audio indication, by sending a communication to or communication with one or more outside entities, or by providing for control and management of streetlights. Such a response may indicate the location of the suspicious activity, disturbance, threat, or emergency. For example, in response to a 3rd party alert, signal, or other communication, the modular system may provide a blinking light or a siren to activate, or may instruct a streetlight or nearby streetlights to increase light intensity or to provide a pattern of varying light intensity. The response may be different depending on the suspicious activity, disturbance, threat, or emergency identified by the third party entity and different 3rd party alerts may be used depending on the identified activity, disturbance, threat, or emergency. For example, a different blinking light pattern or siren signal may be used to indicate suspicious activity or a disturbance versus smoke, fire, an earthquake, a storm, or some other event or emergency.

Issues of homeland security may also be addressed by the weapon sensing and/or alert module 519, which may include one or more sensors (such as one or more cameras, audio sensors, gas or particle sensors, and/or other sensors) and associated components/circuitry for detecting weapons. For example, the weapon sensing and/or alert module may detect firearms, discharge smoke, gunshots, and/or other indicators of the existence of weapons in areas where they are not allowed or expected. The weapon sensing and/or alert module may detect toxic gases, explosive gases, chemical agents, biological agents, radiation, and/or secondary effects of the foregoing threats (such as excessive lead or the products of radiological decomposition).

The terror sensing and/or alert module 520 may also be used for homeland security applications and can include one or more sensors (such as one or more cameras, microphones, motion detectors, radar, lidar, and/or other sensors) and associated components/circuitry to sense or detect acts of terror or plots regarding terror acts. For example, the application-specific module may include one or more cameras and control circuitry configured to detect firearms or other weapons, or suspicious activity (such as groups of individuals carrying firearms, oversized backpacks, duffel bags, and/or wearing heavy coats when prevailing weather conditions would not warrant such apparel). The terror sensing and/or alert module may detect toxic gases, explosive gases, chemical agents, biological agents, radiation, and/or secondary effects of the foregoing threats (such as excessive lead or the products of radiological decomposition).

The earthquake movement sensing and/or alert module 521 may include one or more sensors and associated components/circuitry to detect earth movement (such as movement caused by an earthquake). The earthquake movement sensing and/or alert module may include one or more accelerometers. The earthquake movement sensing and/or alert module may include one or more 9-axis directional accelerometers, or other appropriate sensors configured to sense earth movement. The earthquake movement sensing and/or alert module may include one or more sensors that detect primary waves (P waves) and one or more sensors that can detect secondary waves (S waves). The earthquake movement sensing and/or alert module may distinguish between normal or conventional movement of the streetlight or support member (such as movement caused by wind) and earth movement indicative of an earthquake. The earthquake movement sensing and/or alert may use this information to determine precise ground movement. The movement experienced by an accelerometer in a particular module attached to a streetlight or other fixed structure may not be exactly the same as ground movement associated with an earthquake. In this case, onboard computational units may utilize structural analysis, such as the Euler Equations, to calculate the actual ground movement (AGM) based upon the arrangement and materials of the streetlight. In addition, the long-term correlation of known wind speeds and streetlight movement, as well as actual data from streetlights during actual earthquakes with known ground movements (from other data sources), may allow the tabulation of precise correlation tables using static and/or dynamic parameters. A seismic detector may also include lidar or radar sensor or similar precision distance measuring devices that may yield 3-D images and/or precise relative motions of streetlights, streets, and buildings and/or other data that may be useful in measuring earthquake ground movement, building movement, seismic ground speeds, and/or the dynamic relationships among these parameters. This may allow rapid assessment of likely earthquake damage to infrastructure and buildings, as well as assist in predicting the structural dynamics of public and private infrastructure for improving structural design models and the development of more effective earthquake codes. These modules may allow the monitoring of non-seismic effects such as subsidence and differential settlement of infrastructure and buildings due to ground movement, dewatering of construction sites, and withdrawal of oil, gas, other minerals, and/or groundwater. The earthquake movement sensing and/or alert module may detect motion in a longitudinal direction, a latitudinal direction, and/or in a vertical direction. Such modules may be installed in multiple elevated locations throughout a city (such as on streetlights at various locations about a city). For instance, the modules may be installed in more than 10 locations, more than 100 locations, or more than 1,000 locations throughout the city. Upon detection, the module may provide an immediate alert and assessment of ground motion. This may provide responders with a good idea of the expanse of the earthquake and its relative impacts on liquefaction and impact on foundation soils in the vicinity. The assessment may be obtained rapidly, as opposed to relying on much slower and less accurate telephone reports and news helicopter reports. An alert may provide an instantaneous warning to evacuate fire stations, police stations, hospitals and other critical facilities if they are deemed to have sustained excessive ground motion for their physical status. An immediate assessment may be made for assigning a priority level (for instance, a red tag, yellow tag, or green tag) for ranking purposes. An extra few minutes, an extra minute, or an extra number of seconds of warning may be provided using the techniques, devices and systems described herein, as compared to detection by conventional methods. This extra warning time may save lives and may permit extra time to shut down liquid or gas pipelines or other infrastructure.

Figure 10:
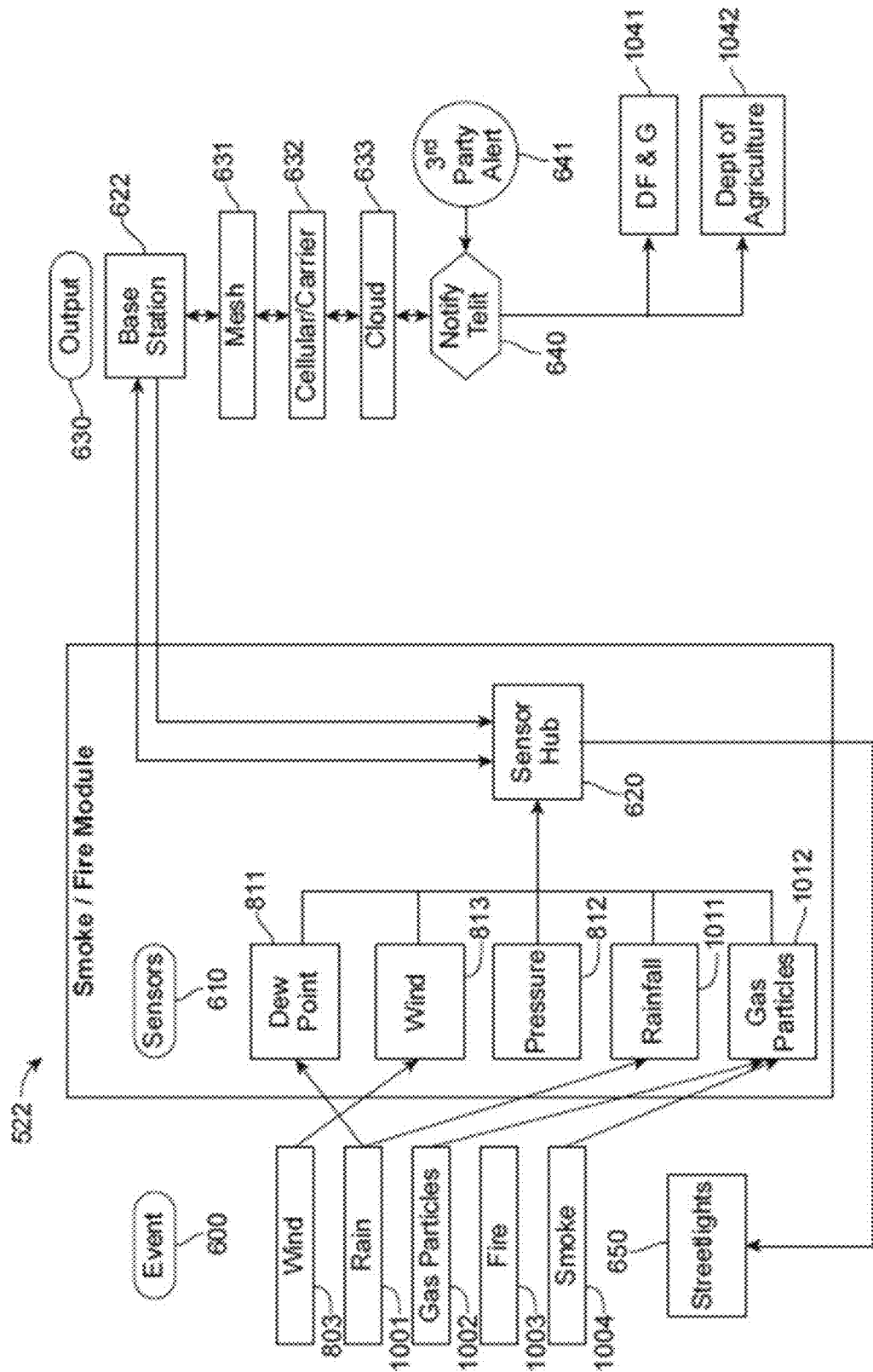
FIG. 10 is a block diagram of an example smoke/fire module.

FIG. 10 is a block diagram of an example of a smoke/fire module. The smoke/fire module 522 may be configured to respond to the occurrence of one or more events 600. The events may correspond to a measurement of wind 803, rain 1001, gas particles 1002, fire 1003, and/or smoke 1004, as described herein. The events may be wholly or partially detected by one or more sensors 610. The sensors may include one or more dew point sensors 811, one or more pressure sensors 812, one or more wind sensors 813, one or more rainfall sensors 1011, and/or one or more gas particle sensor 1012. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The smoke/fire module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send signals to and/or receive signals from a Department of Fish and Game (DF&G) 1041 and/or to a Department of Agriculture 1042. The sensor hub may send a signal to operate a streetlight 650, as described herein.

The smoke and/or fire sensing and/or alert module may include one or more sensors (such as one or more cameras or microphones, one or more gas or particle detectors, heat sensors, and/or infrared detectors) and associated components/circuitry to detect smoke, fire, and/or extreme heat. Detection of smoke and/or fire may alert local fire and police and help assess the extent and spread of widespread fires due to lightning strikes, wildfires, terrorism and/or arson attacks. When coupled with a network of mini-weather stations (such as provided by the weather sensing and/or alert module 514), the emergency response may be immediately tailored to provide guidance on response. An alert may also warn firefighting and EMT personnel of the potential for gusts that may cause firestorms or backdraft events in time for them to take evasive action.

Smoke and/or fire may also be detected by a third party entity such as a private security company or other company that may have a smoke and/or fire alert system deployed in a location such as a residence, industrial building, construction site, or other building structure or site. As an example, a security company may provide a 3rd party alert, signal, or other communication to alert an area that smoke and/or fire has been detected in a location or a nearby location. The modular system may respond to the alert or provide an output in response to the alert by providing a visual or audio indication, by sending a communication to or communication with one or more outside entities, or by providing for control and management of streetlights. Such a response may indicate the location of the threat or emergency. For example, in response to a 3rd party alert, signal, or other communication, the modular system may provide a blinking light or a siren to activate, or may instruct a streetlight or nearby streetlights to increase light intensity or to provide a pattern of varying light intensity. The response may be different depending on the threat identified by the third party entity and different 3rd party alerts may be used depending on the identified threat. For example, a different blinking light pattern or siren signal may be used to indicate smoke or fire versus suspicious activity, a disturbance, an intrusion, an earthquake, a storm, or some other event or emergency.

The civil unrest and/or riot detection and/or alert module 523 may include one or more sensors (such as one or more cameras or audio sensors, motion detectors, radar, lidar, and/or other sensors) and associated components/circuitry to detect riots, civil unrest, and/or suspicious activity. One or more microphones or other sound detection components, or one or more cameras or other video or image detection components may be used to detect civil unrest or riots, and provide an alert regarding the civil unrest, riot, or suspicious activity. This may give public officials early warning of a peaceful event becoming dangerous or conflict-ridden. The civil unrest and/or riot detection and/or alert module may include sensors capable of detecting bricks, heavy sticks, baseball bats, volatile and/or flammable mixtures, and/or other objects that may be indicative of a heightened threat environment. In addition, by using artificial intelligence, machine learning, and/or data mining techniques to do for example, facial recognition and other pattern recognition, visual, audio and otherwise, key information may be extracted from data collected by the sensors and other detection components.

The natural disaster sensing and/or alert module 524 may include one or more sensors (such as one or more cameras, microphones, wind sensors, pressure sensors, accelerometers, humidity sensors, and/or other environmental sensors) and associated components/circuitry to detect natural disasters. One or more wind sensors and/or pressure sensors and associated components/circuitry may be included. The sensors may be used to provide early warning and immediate assessment of a variety of natural disasters, such as tornados, hurricanes, and tsunamis. An extra few minutes, an extra minute, or an extra number of seconds of warning may be provided using the techniques, devices and systems described herein, as compared to detection by conventional methods. This extra warning time may save lives and may permit extra time to shut down liquid or gas pipelines or other infrastructure which may prevent greater damage or destruction.

The accident sensing and/or alert module 525 may include one or more sensors (such as one or more cameras, audio sensors, motion detectors, radar, lidar, and/or other sensors) and associated components/circuitry to detect accidents. The accident sensing and/or alert module may include one or more cameras or one or more microphones and control components tuned to specifically detect, locate and/or alert to accidents relating to automobile (manned or driverless), train (manned or driverless), aircraft (manned or driverless), or the like, and to provide immediate alerts and assessments.

The communications module 526 may include one or more sensors (such as communications sensors) and associated components/circuitry to detect communications signals. A detector of cellular communications signals, a detector of wireless communications signals, or a detector of Wi-Fi signals may be included to detect such signals and provide an alert regarding detection of such signals. Such detectors may sense one or more of such signals and provide an alert regarding use of cellular or wireless devices. This may be useful, for instance, in areas where use of such devices is prohibited or restricted. For instance, this may be useful in areas such as prisons, hospitals, at border crossings, and/or at customs-checking locations. The detectors may also be used to detect potential detonation devices in abandoned backpacks, duffel bags, and/or packages that are left in public areas. The communications module may be used to provide communications functionality to nearby users. For example, the communications module may include a router to provide WiFi connectivity to nearby users.

Figure 11:
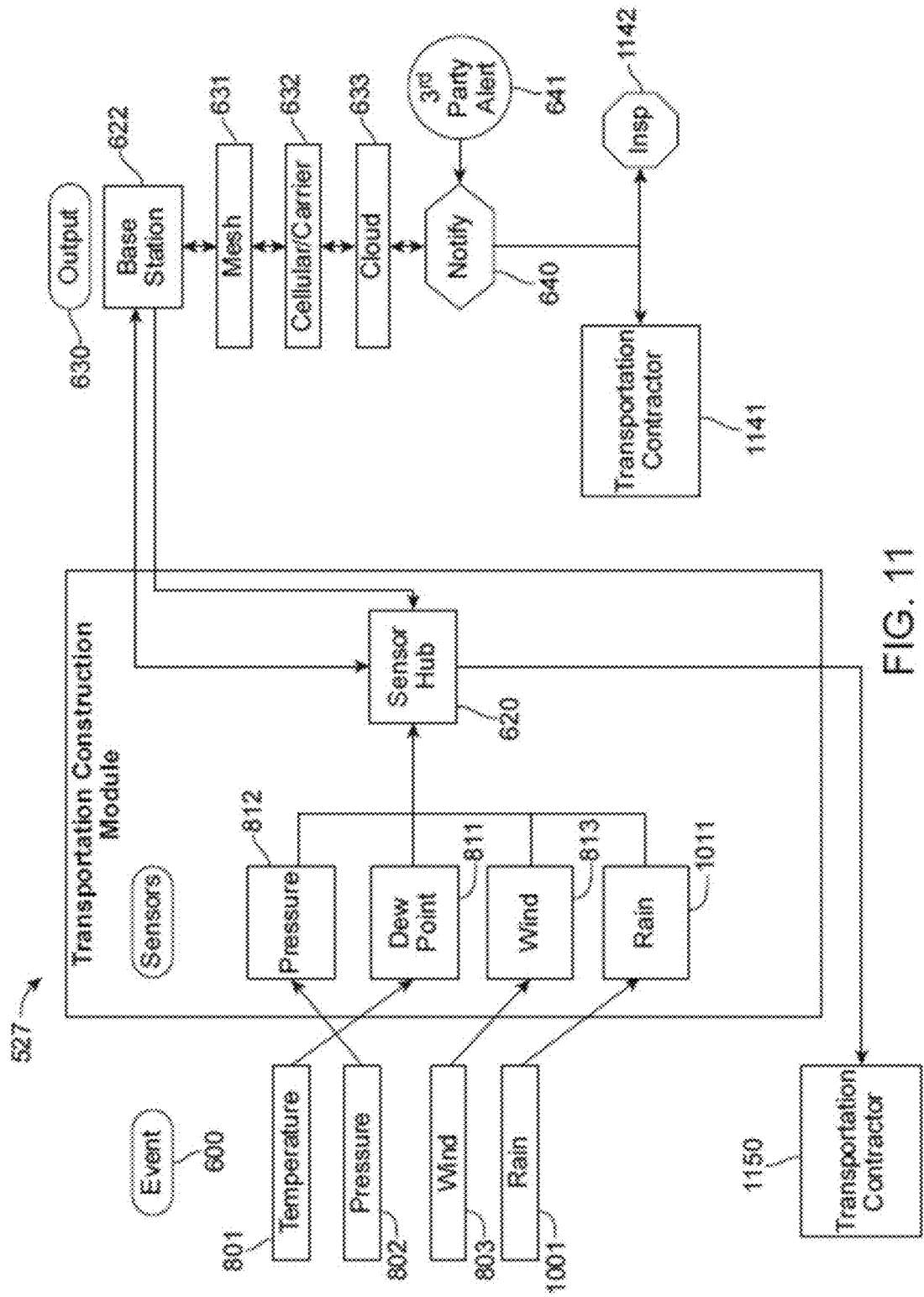
FIG. 11 is a block diagram of an example transportation construction module.

FIG. 11 is a block diagram of an example transportation construction module. The transportation construction module 527 may be configured to respond to the occurrence of one or more events 600. The events may correspond to a measurement of dew point 801, pressure 802, wind 803, and/or rain 1001, as described herein. The events may be wholly or partially detected by one or more sensors 610. The sensors may include one or more dew point sensors 811, one or more pressure sensors 812, one or more wind sensors 813, and/or one or more rainfall sensors 1011. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The transportation construction module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send signals to and/or receive signals from a transportation contractor 1141 and/or to an inspector 1142. The sensor hub may send a signal to a transportation contractor 1150, as described herein. For instance, the sensor hub may send signals to or receive signals from a transportation contractor's field office.

The transportation construction module may include one or more sensors (such as one or more cameras, microphones, sound meters, temperature sensors, ambient light sensors, wind sensors, and/or other environmental sensors) to monitor transportation construction projects (such as road projects, railway projects, subway projects, light-rail or elevated train projects, bridge or tunnel projects, and the like), and in some cases to monitor weather and/or environmental factors relevant to transportation construction projects. For instance, a temperature sensor may allow monitoring of the ambient temperature during the pouring, setting, and/or placement of concrete, asphalt, and/or other construction materials at a jobsite. Such operations may only be performed within strict temperature ranges during course of a job, pursuant to building codes, specifications, and industry standards. The real-time measurement of temperature at a job location may provide warning of inappropriate temperatures for these situations and may create a record of the temperatures for quality control, quality assurance, and/or forensics purposes. One or more cameras may provide images or video of a transportation construction project, which may be used to monitor progress of the project. One or more cameras may provide video or images regarding traffic delays associated with the transportation construction project. The transportation construction module may calculate a delay indicator, such as an indication of an existing or present delay associated with the transportation construction project as compared to normal traffic delay for a particular time at a particular location in the absence of the construction project. A message that includes the delay indicator may be transmitted by the transportation construction module or by the base station to which the module is attached. The message may be transmitted for receipt by one or more of a message board, a vehicle proximate the general location of the transportation construction module or approaching the general location of the transportation construction module, a municipal authority, and/or other communications device, and may provide helpful information regarding the delay so that an alternate route may be chosen, if appropriate. The transportation construction module may determine an alternate route, and may include information regarding the alternate route in the message with the delay indicator or in another message. The transportation construction module may communicate (for instance, via the attached base station or independently) with one or more other application modules or base stations, such as application modules or base stations positioned at other locations along or proximate to the construction project. A temperature sensor may be included with the transportation construction module to measure ambient temperature at the location of the module, and may provide an alert if the measured temperature falls outside of a predetermined temperature range or if the measured temperature exceeds a predetermined threshold temperature. For example, it may be unsafe or not recommended to lay asphalt or pour concrete when the ambient temperature is too warm or too cold. If such a condition is determined, the transportation construction module (or alternatively the base station) may transmit an alert to a construction foreperson. The transportation construction module may determine, prior to sending the alert, that both construction work is currently ongoing (for instance, based on one or more captured images or videos) and that the ambient temperature is presently a concern (for instance, based on comparing a measured temperature to a predetermined threshold or range). The transportation construction module may use a microphone and sound meter to measure noise levels associated with the transportation construction project, and may send an alert if a measured noise level exceeds a predetermined noise level threshold. In some cases, there may be restrictions that prohibit construction work absent a sufficient amount of ambient light, and the transportation construction may monitor ambient light conditions (for instance, using a photocell and/or other light detector) and provide an alert if the transportation construction module determines that construction work is occurring during a period of insufficient light (such as too early in the day or too late in the day). Similarly, an alert may be provided when other weather or environmental conditions (such as measured by a sensor of the transportation construction module) may make construction work dangerous, unsafe, or inappropriate (for instance, during a storm). Because a transportation construction project may span a significant area or distance, a deployed group of transportation construction modules or base stations at various locations along or near the project may provide advantageous and localized information not possible using existing methods. In this manner, a coordinated tracking or monitoring system may be established that leverages a deployed group of base stations and/or application modules to advantageously provide area-wide coverage.

Figure 12:
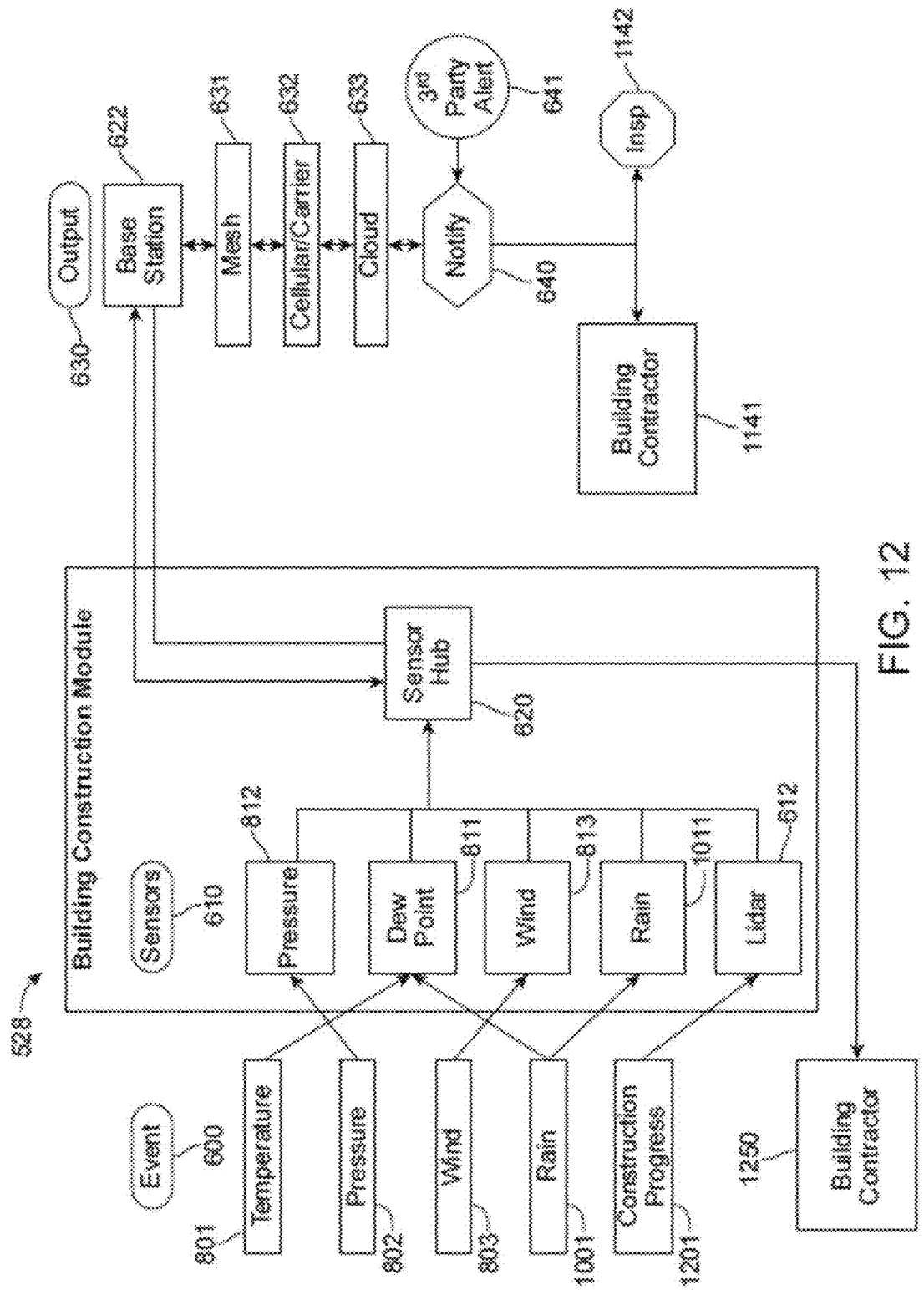
FIG. 12 is a block diagram of an example building construction module.

FIG. 12 is a block diagram of an example building construction module. The building construction module 528 may be configured to respond to the occurrence of one or more events 600. The events may correspond to a measurement of dew point 801, pressure 802, wind 803, rain 1001, and/or construction progress 1201 as described herein. The events may be wholly or partially detected by one or more sensors 610. The sensors may include one or more dew point sensors 811, one or more pressure sensors 812, one or more wind sensors 813, one or more rainfall sensors 1011, and/or one or more lidar sensors 612, as described herein. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The building construction module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send signals to and/or receive signals from a building contractor 1241 and/or to an inspector 1142. The sensor hub may send a signal to a building contractor 1250, as described herein. For instance, the sensor hub may send signals to or receive signals from a building contractor's field office.

The building or structure construction module may include one or more sensors (such as one or more cameras, microphones, sound meters, temperature sensors, ambient light sensors, wind sensors, and/or other environmental sensors) to monitor building or structure construction projects (such as skyscrapers, office buildings, commercial buildings, municipal buildings, stadiums or arenas, residential buildings, multi-unit housing buildings, and the like), and in some cases to monitor weather or environmental factors relevant to building or structure construction projects. One or more cameras may provide images or video of a building or structure construction project, which may be used to monitor progress of the project. The one or more cameras may be movable cameras capable of focusing, based on a command or request, on any of several areas of the building or construction project. The one or more cameras may be capture images or videos according to a programmed sequence. For example, a first image or video may be captured corresponding to a first location on the building or structure. A second image or video may be captured corresponding to a second location on the building or structure, and so on according to a predefined sequence that may be periodically repeated, for example. One or more cameras may provide video or images regarding traffic delays associated with the transportation construction project, if applicable, and may provide information or alerts similar to those described herein with reference to the transportation construction module 527. The building construction module may communicate (for instance, via the attached base station or independently) with one or more other application modules or base stations, such as one or more other application modules or base stations associated with the building or structure construction project (for instance, positioned at an alternate vantage point with respect to the project). A temperature sensor may be included with the building construction module and may measure ambient temperature at the location of the building construction module. The building construction module may provide an alert if the measured temperature falls outside of a predetermined temperature range or if the measured temperature exceeds a predetermined threshold temperature. A wind sensor may be included with the building construction module and may measure wind conditions (such as wind velocity or gust information) at the location of the building construction module. The wind sensor may provide an alert if the measured wind information indicates an unsafe or dangerous condition for construction work. If such a condition is determined, the building construction module (or alternatively the base station) may transmit an alert to a construction foreperson, for example. The module may determine, prior to sending the alert, that both construction work is currently ongoing (for instance, based on one or more captured images or videos) and that the ambient temperature or wind (or other weather or environmental factor) is presently a concern (for instance, based on comparing a measured temperature or wind to a predetermined threshold or range). The building construction module may use a microphone and sound meter to measure noise levels associated with the building or structure construction project, and may send an alert if a measured noise level exceeds a predetermined noise level threshold. In some cases, there may be restrictions that prohibit construction work absent a sufficient amount of ambient light, and the building construction module may monitor ambient light conditions (for instance, using a photocell or other light detection sensor) and provide an alert if the module determines that construction work is occurring during a period of insufficient light (for instance, too early in the day or too late in the day). Similarly, an alert may be provided when other weather or environmental conditions (such as measured by a sensor of the module) may make construction work dangerous, unsafe, or inappropriate (such as during a storm).

Figure 13:
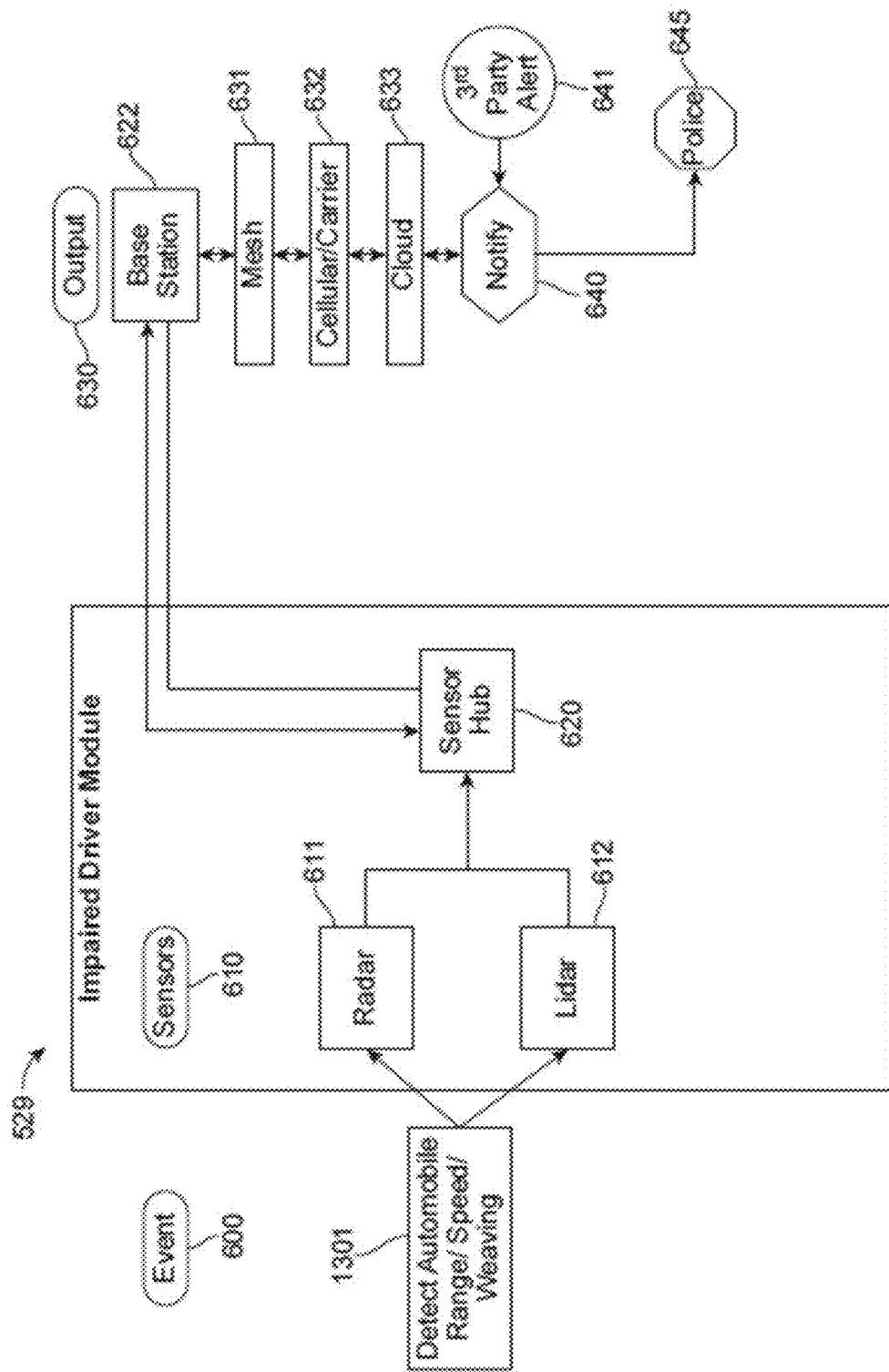
FIG. 13 is a block diagram of an example impaired driver module.

FIG. 13 is a block diagram of an example impaired driver module. The impaired driver module 529 may be configured to respond to the occurrence of one or more events 600. The events may correspond detecting an automobile range, speed, and/or weaving, as described herein. The events may be wholly or partially detected by one or more sensors 610. The sensors may include one or more radar sensors 611 and/or one or more lidar sensors 612, as described herein. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The impaired driver module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send signals to and/or receive signals from a police department 645.

The impaired driver detection module may include one or more sensors (such as one or more cameras, microphones, radar or lidar components, or other sensors) that may be used to monitor for erratic or reckless driving behavior that may indicate an impaired driver or a driver taking unnecessary risks. The impaired driver module may determine that a particular vehicle is being driven erratically, and may transmit a message for receipt by a police department or police communications device with an indication of a location and an indication of the vehicle. For instance, the impaired drive module may transmit the license plate number, make, model, style (such as sedan, SUV, minivan, or station wagon), color, or the like. The video or images used in making the determination may be provided with the message or with another message. The impaired driver module may send an alert message for receipt by one or more of the vehicle (which may then present a warning to the driver based on the received message, for example), an appropriate authority (such as a police department or police communications device or a municipal authority), and/or a central command center. For example, a camera may monitor for a vehicle that is swerving in-and-out of a lane. In some cases, a threshold number of such swerves may be detect, such as one, two, three, four, or another appropriate number, before triggering an alert. The impaired driver module may monitor for a vehicle that is wandering between lanes, for a vehicle that is driving at an unsafe speed (for instance, too fast or too slow for the particular area), for a vehicle that contacts a barrier, structure, or another vehicle, or for other indications of impaired driving. The impaired driver module may monitor for one or more instances where one wheel or two wheels of a vehicle cross a traffic line or lane boundary and a correction occurs thereafter. The impaired driver module may alter the criteria used to determine erratic driving based on a time of day. For example, on weekend evenings or near or after bar-closing time, the impaired driver module may use a lower threshold for determining erratic driving. The impaired driver module may factor a location of the module into its determination of erratic driving. For example, an impaired driver module located near a bar, liquor store, or other location where alcoholic drinks are sold or served may use a lower threshold for determining erratic driving. Some states require individuals convicted of a drunk driving violation to use license plates having a distinctive feature (such as a distinctive look, color, prefix, suffix, or the like), and in some cases the impaired driver module may recognize vehicles with license plates having the distinctive feature and may use a lower threshold for determining erratic driving for those vehicles. The impaired driver module (or alternatively the base station) may communicate with another application module or base station to provide an indication of a vehicle suspected of erratic driving. The impaired driver module or base station may send a message that includes an indication of a vehicle, and information relating to the vehicles route or when the other application module or base station may expect the vehicle to enter a vicinity of the other application module or base station. In this manner, a coordinated tracking or monitoring system may be established that leverages a deployed group of base stations and/or application modules to advantageously provide area-wide coverage. Early detection of impaired drivers may permit law enforcement to intercept the driver before the driver potentially injures himself or herself, others, or causes property damage.

The impaired driver module may detect and alert to distracted driving. For example, the impaired driver module may detect when a driver is using an electronic device in violation of traffic laws. The impaired driver module may detect when a driver is texting or sending an email message using a smartphone, tablet device, computing device, wearable smart device, or the like. The determination of distracted driving may be based on a number of factors. The impaired driver module may include a communications detector that can detect when a driver is sending a text message or email. A camera of the impaired driver module may capture an image or video of a distracted driver using an electronic device in an impermissible way. The impaired driver module may determine that is particular vehicle is being driven erratically or by a distracted driver, and may transmit an alert message for receipt by one or more of the vehicle (which may then present a warning to the driver based on the received message, for example), an appropriate authority (such as a police department or police communications device or a municipal authority), and/or a central command center. The message or alert may include an indication of a location (such as a location of vehicle when observed, location of application module or streetlight, expected current or future location of vehicle based on route) and an indication of the vehicle. For instance, the indication of the vehicle may include a license plate number, make, model, style (such as sedan, SUV, minivan, or station wagon), color, or the like. An indication of the distraction type may be included in the message or in another message. A captured image or video used in the determination may be included with the message or another message. The impaired driver module may detect a driver who is not wearing a seatbelt, and may send an alert message for receipt by one or more of the vehicle (which may then present a warning to the driver based on the received message, for example), an appropriate authority (such as police or a municipal authority), and/or a central command center.

A first impaired driver module (or alternatively base station) may make a first determination that a vehicle is operating or being driven erratically, or that there is a likelihood that the vehicle is being operated by an impaired driver. The first application module may transmit a message or alert as described above. The first application module may transmit a message to one or more other application modules (such as one or more application modules that are "downstream of" or in the direction of travel of the vehicle) and provide one or more of an indication of the vehicle, an indication of the first determination, and an instruction to monitor the vehicle. Upon receipt of the message, a second impaired driver module may monitor the vehicle to assess for erratic or reckless driving, and in some cases the second impaired driver module may apply a different threshold (such as a lower threshold based on the indication from the first application module that the vehicle is already suspected of erratic or reckless driving) in determining whether the vehicle is being driven erratically or recklessly. If the second impaired driver module determines that the vehicle is being driven erratically or recklessly based on the different threshold, or in some examples based on the same threshold as used by the first impaired driver module, the second impaired driver module may transmit a message or alert for receipt by one or more of the vehicle (which may then present a warning to the driver based on the received message), an appropriate authority (such as a police department or police communications device or a municipal authority), and/or a central command center.

Figure 14:
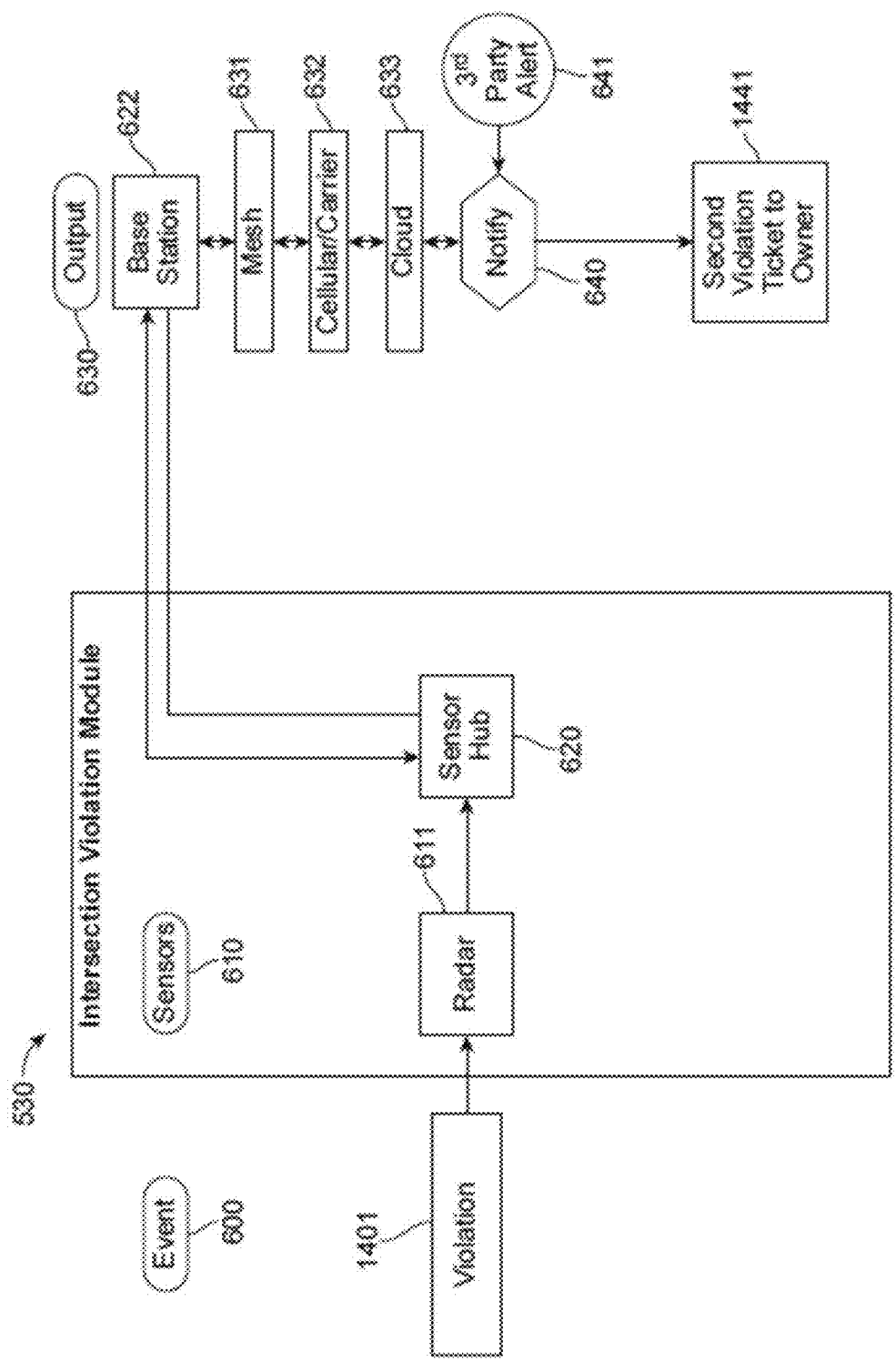
FIG. 14 is a block diagram of an example intersection violation module.

FIG. 14 is a block diagram of an example intersection violation module. The intersection violation module 530 may be configured to respond to the occurrence of one or more events 600. The events may correspond to detecting an intersection violation, as described herein. The events may be wholly or partially detected by one or more sensors 610. The sensors may include one or more radar sensors 611, as described herein. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The intersection violation module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send a violation ticket to an owner 1441.

The intersection violation and/or management module may include one or more sensors (such as one or more cameras, microphones, radar or lidar components, and/or other sensors) that can be used to monitor for intersection violations such as a driver running a red light or failing to yield to a pedestrian in a crosswalk, to list a few examples. The intersection violation module may send an alert message for receipt by one or more of the vehicle (which may then present a warning to the driver based on the received message), an appropriate authority (such as the police or a municipal authority), and/or a central command center to alert the violation. The intersection violation module may also assess traffic flow in the vicinity of the intersection and communicate a message or command to one or more traffic lights at the intersection (or at an intersection upstream or downstream from the instant location). The message or command may provide information or instruction on the current traffic so that traffic flow may be optimized by appropriate adjustments to the traffic light output pattern. The intersection violation module may determine how the traffic light should adjust its output pattern, and may communicate the adjustment to the traffic light. The intersection violation module may provide information regarding the current traffic and the traffic light may use the information to determine an appropriate adjustment.

The shot identification and/or suspect monitoring module 531 may include one or more sensors (such as one or more cameras, microphones, radar or lidar components, gunshot detectors, flash detectors, infrared detectors, and/or other sensors) that can be used to identify a gunshot, assess characteristics of the gunshot, and/or enable area-wide monitoring in response to detection of the gunshot. The gunshot detector may identify a gunshot based on a sound emitted by a gun during discharge. The shot identification and/or suspect monitoring module may, upon detection of a gunshot, process information about the gunshot to identify one or more of a location of the gunshot, a weapon type or model associated with the gunshot, a cadence of the gunshot (in situations where multiple rounds are fired), and a strength of the gunshot. The shot identification and/or suspect monitoring module may include one or more cameras that may continuously record video and may include two or more memory stores. The shot identification and/or suspect monitoring module may include four cameras, the four cameras generally oriented at about 90 degree angles with respect to the adjacent camera, for 360-degree coverage, and each of the cameras may be continuously recording (or periodically recording according to a predetermined pattern or non-predetermined pattern). Alternatively, one, two, three, four, five, six or any number of cameras may be used to provide focused coverage anywhere between 0 and 360 degrees, or to provide complete 360-degree coverage. The shot identification and/or suspect monitoring module may store a first duration (such as 5 minutes, 10 minutes, 20 minutes, 30 minutes, 40 minutes, 50 minutes, 60 minutes, or more than 60 minutes) of recorded video. The video may be obtained from one or more (for instance, all) of the cameras of one or more areas proximate the shot identification and/or suspect monitoring module in the first memory store, and then may store a subsequent contiguous time period (of the same or different duration) in the second memory store. The video stored in a particular memory store may be erased or overwritten after a sufficient period of time where no gunshot events were detected. The use of multiple streetlights and similar locations for gunshot detection may provide numerous advantages. The use of multiple locations may allow for a more granular analysis of shot location and characteristics. Unlike approaches that use a wide area detection system to generally place the gunshot, the use of tens, hundreds, thousands, or more microphones in a wide area may result in dozens of sensors reporting the same event. That multiplicity of reporting locations may allow a greater ability to sort out echoes, deflections, ambient noise, and/or other elements that typically act to degrade estimates of time, location, and characteristics of the gunshots.

When the shot detection and/or suspect monitoring module detects a gunshot event, it may activate one or more microphones to record audio (where the microphones may previously have been inactive, the one or more microphones being different from the gunshot detector in some cases). The shot detection and/or suspect monitoring module may transmit the real-time video and audio captured for one or more areas proximate the shot identification and/or suspect monitoring module or an area where the gunshot event was determined to have occurred for receipt by one or more of an appropriate authority (such as a police department, fire department, or other municipal authority) and control center. The shot identification and/or suspect monitoring module may transmit the information determined by the shot identification and/or suspect monitoring module regarding the gunshot event (such as the location of the gunshot, a weapon type or model associated with the gunshot, a cadence of the gunshot (in situations where multiple rounds are fired), and a strength of the gunshot) for receipt by one or more of the aforementioned entities. The shot identification and/or suspect monitoring module may also transmit stored video for a predetermined time preceding (for instance, video for the 30 minutes preceding the gunshot event) the gunshot event for receipt by one or more of the aforementioned entities, so that it may be scrutinized for suspects or suspicious activity. The shot identification and/or suspect monitoring module may also include a motion detector that can identify motion, such as motion in an area near the area determined based on the detected gunshot, and the one or more cameras can record or transmit (or both) video of these areas. The shot identification and/or suspect monitoring module may also, upon detection of a gunshot event, cause a streetlight, or command the base station to cause the streetlight, to illuminate one or more luminaires of the streetlight to maximum intensity. The shot identification and/or suspect monitoring module may, upon detection of a gunshot event, transmit a message for receipt by a plurality of other shot identification and/or suspect monitoring modules or base stations (or other types of modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541). For example, all such modules or base stations within a three-block radius of the shot identification and/or suspect monitoring module may cause their respective streetlight, if applicable, to illuminate at maximum intensity, and to begin transmitting real-time or previously recorded video and audio for receipt by one or more of the aforementioned entities. In some cases, the video may be stored locally for a pre-determined time (e.g., a day, two days, a week, two weeks, etc) in case of catastrophic failure.

When the shot identification and/or suspect monitoring module detects a gunshot event, the module may transmit a message that includes a command to launch an autonomous drone to film a location of the gunshot event. The drone may film the location of the gunshot event using one or more of conventional cameras and infrared (for instance, night vision) cameras. It will be understood that any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 described herein, upon detection of an event by the respective module, may similarly transmit a message that includes a command to launch an autonomous drone to film a location of the event. Any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 may flash streetlights in the vicinity of the gunshot, for instance to warn bystanders of the potential danger.

Figure 15:
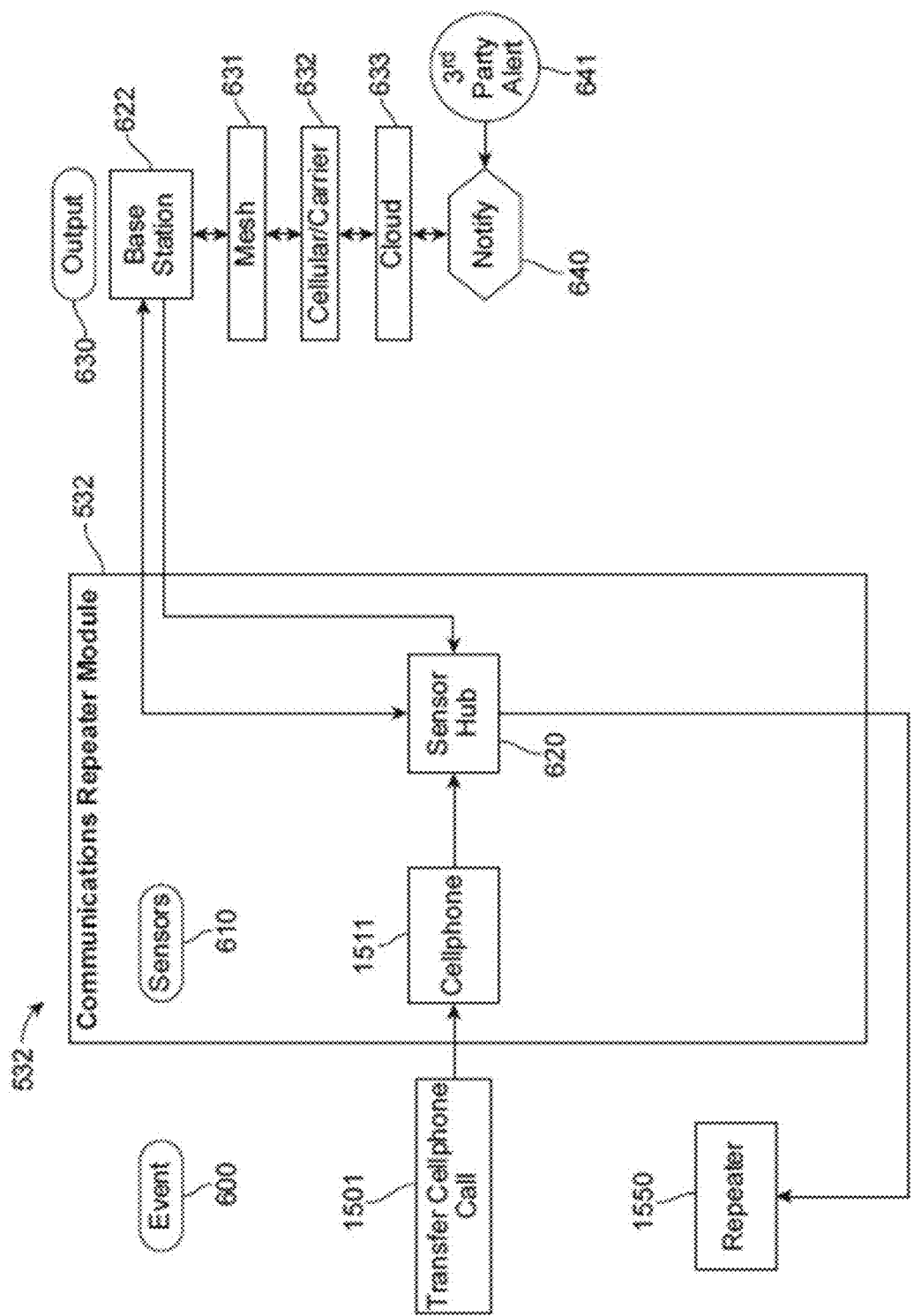
FIG. 15 is a block diagram of an example communications repeater module.

FIG. 15 is a block diagram of an example communications repeater module. The communications repeater module 532 may be configured to respond to the occurrence of one or more events 600. The events may correspond to transferring a cellphone call 1501, as described herein. The events may be wholly or partially detected by one or more sensors 610. The sensors may include one or more cellphones 1511, as described herein. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The communications repeater module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The sensor hub may send a signal to a repeater 1550, as described herein.

The communications repeater module may include one or more first antennas configured to receive an initial communications signal, one or more amplifiers to amplify or boost the received initial communications signal, and/or one or more second antennas to transmit or broadcast the amplified or boosted signal. The communications repeater module may be used to repeat or boost a WiFi signal. In this manner, the communications repeater module or multiple communications repeater modules may extend a WiFi signal to cover a neighborhood, for example. The communications repeater module may be used to extend cellular coverage (e.g., LTE networks, CDMA networks, GSM networks, or other mobile phone networks) for wireless telephones.

Figure 16:
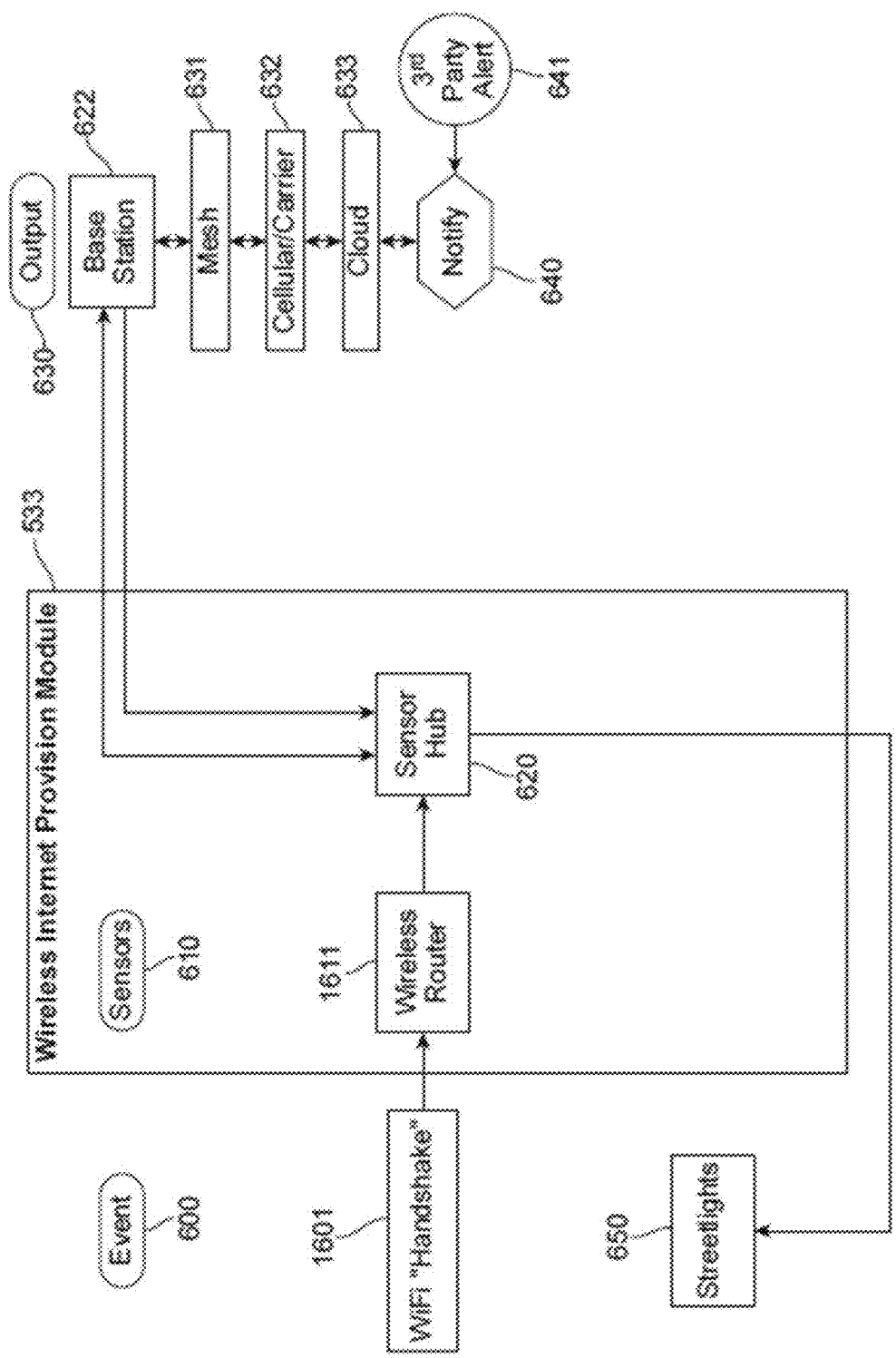
FIG. 16 is a block diagram of an example wireless Internet provision module.

FIG. 16 is a block diagram of an example wireless Internet provision or WiFi module. The wireless Internet provision or WiFi module 533 may be configured to respond to the occurrence of one or more events 600. The events may correspond to a WiFi "handshake", as described herein. The events may be wholly or partially detected by one or more sensors 610. The sensors may include one or more wireless routers 1611, as described herein. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The wireless Internet provision or WiFi module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The sensor hub may send a signal to streetlights 650, as described herein.

The wireless Internet provision module may include a wireless router that may provide wireless Internet access to users. The wireless Internet access may be provided free of charge. The wireless Internet access may be provided to users having a subscription to a service. The wireless Internet provision module may require a password for access to the wireless Internet. In some cases, the wireless Internet provision module may not require a password for access to the wireless Internet. The wireless Internet provision module may provide advertising or promotional content with the wireless Internet access.

The vehicle information logging module 534 may include one or more sensors (such as one or more cameras, microphones, radar or lidar components, and/or other sensors) that may be used to record when a vehicle (for instance, an unmanned aerial vehicle, unmanned aerial system, autonomous ground vehicle, unmanned ground vehicles, and/or other type of vehicle) passes by or is within a proximity of the vehicle information logging module. A time stamp may be recorded corresponding to the time that the vehicle was observed or detected passing by or within the proximity. The vehicle information logging module may communicate with the vehicle. In some cases, the vehicle information logging module does not communicate with the vehicle. An identification number for the vehicle may be stored, along with a time stamp indicating the time that the vehicle passed by the vehicle information logging module or was in a proximity of the vehicle information logging module.

Figure 17:
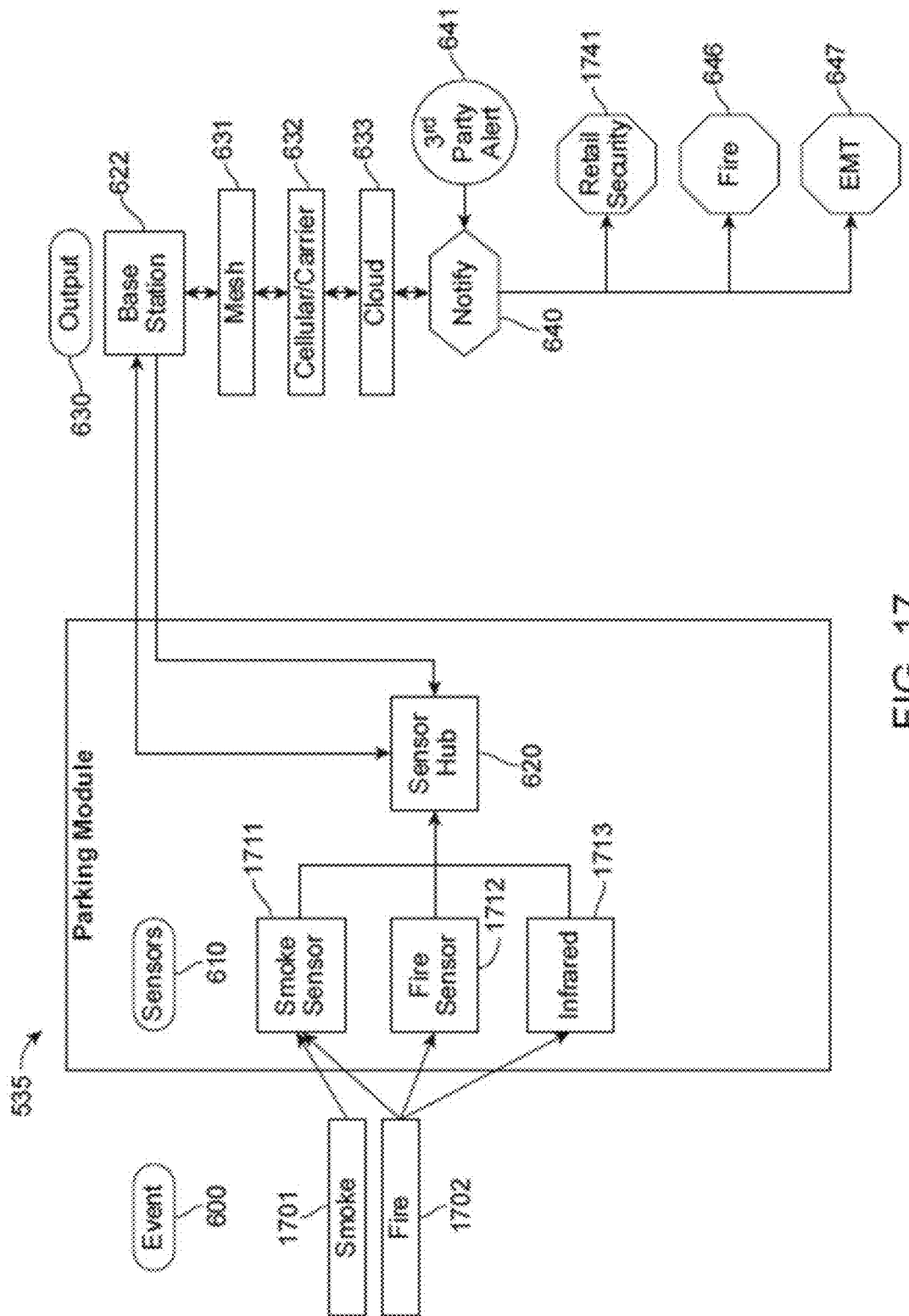
FIG. 17 is a block diagram of an example parking module.

FIG. 17 is a block diagram of an example parking module. The parking module 535 may be configured to respond to the occurrence of one or more events 600. The events may include the occurrence of smoke 1701 or fire 1702. The events may be wholly or partially detected by one or more sensors 610. The sensors may include one or more smoke sensors 1711, one or more fire sensors 1712, and/or one or more infrared sensor 1713. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The parking module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may further send signals to and/or receive signals from retail security 1741, a fire department 646, and/or emergency medical technicians (EMT) 647.

The parking module may include one or more sensors (such as one or more cameras, microphones, radar or lidar components, and/or other sensors) that may be used to monitor parking spaces and vehicles occupying the parking spaces, and may be used to identify vehicles that are parked illegally or that have overstayed a period of time paid for or otherwise associated with a parking event duration for the parking spot or the vehicle occupying the spot. When the parking module determines a parking violation for a particular vehicle, the module may transmit an alert message for receipt by one or more of the vehicle, a communications device of the owner or driver of the vehicle (such as a smartphone, tablet device, smartwatch, or other wearable device, or the like), an appropriate authority (such as a police department or police communications device, municipal authority, parking attendant, and/or parking ticket issuer), and a central command center.

The on-request monitoring module 536 may include one or more sensors (such as, one or more cameras, microphones, radar or lidar components, and/or other sensors) that can be used to monitor an area in response to a third-party request for monitoring services. The on-request monitoring module may receive a wireless message that includes a monitoring request, and in response may activate one or more cameras or other sensors to record or transmit (or both) one or more of video, images, and audio, or combinations of the foregoing, captured by the one or more cameras or other sensors. The one or more cameras or other sensors may capture video, images or sound of an area in a vicinity to the on-request monitoring module. In response to the monitoring request, the on-request monitoring module may communicate a request to increase an intensity of one or more luminaires associated with the streetlight to the base station. The on-request monitoring module or base station may cause the one or more luminaires of the streetlight to illuminate at a maximum intensity, so that the area may be better illuminated. As one example, a security system in a nearby building may detect an event and in response may transmit a message that includes a monitoring request for receipt by one or more on-request monitoring modules within a proximity of the nearby building (for instance, all on-request monitoring modules within a three-block range or other appropriate range). In response to receiving the message, each of the on-request monitoring modules may activate their one or more cameras or other sensors to capture video, images, and/or audio of the area. As another example, suppose that an act of terrorism is committed at a particular location, and suppose that an active shooter remains on the loose. The on-request monitoring module, or each of the on-request monitoring modules within an appropriate distance of the event, may receive a message that includes a monitoring request from a police department, fire department, first responder, or the like, and may activate in response their one or more cameras (or other sensors) to record or transmit (or both) video, images, audio, and/or combinations of the foregoing to assist officers and responders in assessing the situation or for improved safety during active engagement with the suspects. The on-request monitoring module may receive a request from a pedestrian (such as from a computing device such as a smartphone, tablet device, smartwatch, or other wearable device, of a pedestrian) and in response may cause (or request the base station to cause) the one or more luminaires of the streetlight to illuminate at a maximum intensity, so that the area may be better illuminated, for example, and in some cases may also activate one or more cameras or other sensors to record or transmit (or both) one or more of video, images, and audio, or combinations of the foregoing, captured by the one or more cameras or other sensors to the computing device of the pedestrian, for example for storage on the computing device of the pedestrian as a video record of an environment where the pedestrian is or of actions that occur with or to the pedestrian. Such an on-demand record may be used, for example, to capture evidence of a crime or incident that may be of interest to authorities. In some examples, such an on-demand record may be used to chronicle ones actions in a situation where one may be concerned that's ones actions may be misconstrued or unfairly viewed in a negative light, absent proof to the contrary that the on-demand record may provide.

Figure 18:
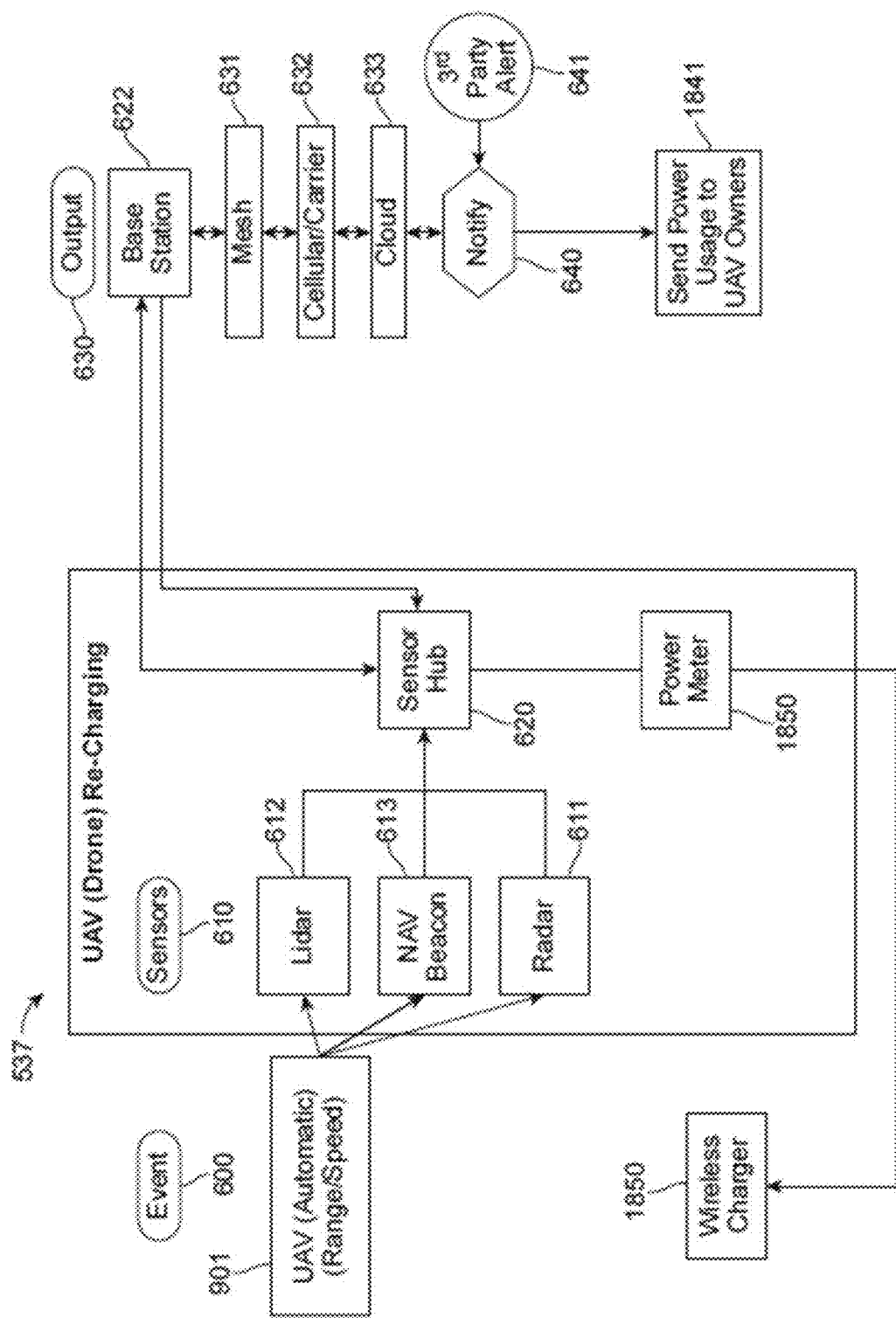
FIG. 18 is a block diagram of an example UAV re-charging module.

FIG. 18 is a block diagram of an example UAV re-charging module. The UAV re-charging module 537 may be configured to respond to the occurrence of one or more events 600. The events may include the detection of a UAV and/or automobile through its range and/or speed 901. The events may be wholly or partially detected by one or more sensors 610. The sensors may include one or more radar sensors 611, one or more lidar sensors 612, and/or one or more navigation beacons 613. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The UAV re-charging module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may further send signals to and/or receive signals from UAV owners 1841. For instance, the server or software element may send an indication of power usage at the UAV re-charging module to the UAV owner. The power usage may be measured by a power meter 1850 connected to a wireless charger 1860. The power meter may be configured to send signals to and/or receive signals from the sensor hub.

The UAV re-charging module may be configured to store and charge a stockpile of batteries that may be picked up and used by UAVs or moved to another location where they are more needed. The UAV re-charging module may be configured to maximize the rate of a re-charge and minimize the time required for re-charge without the need for accurate alignment of charging elements.

Figure 19:
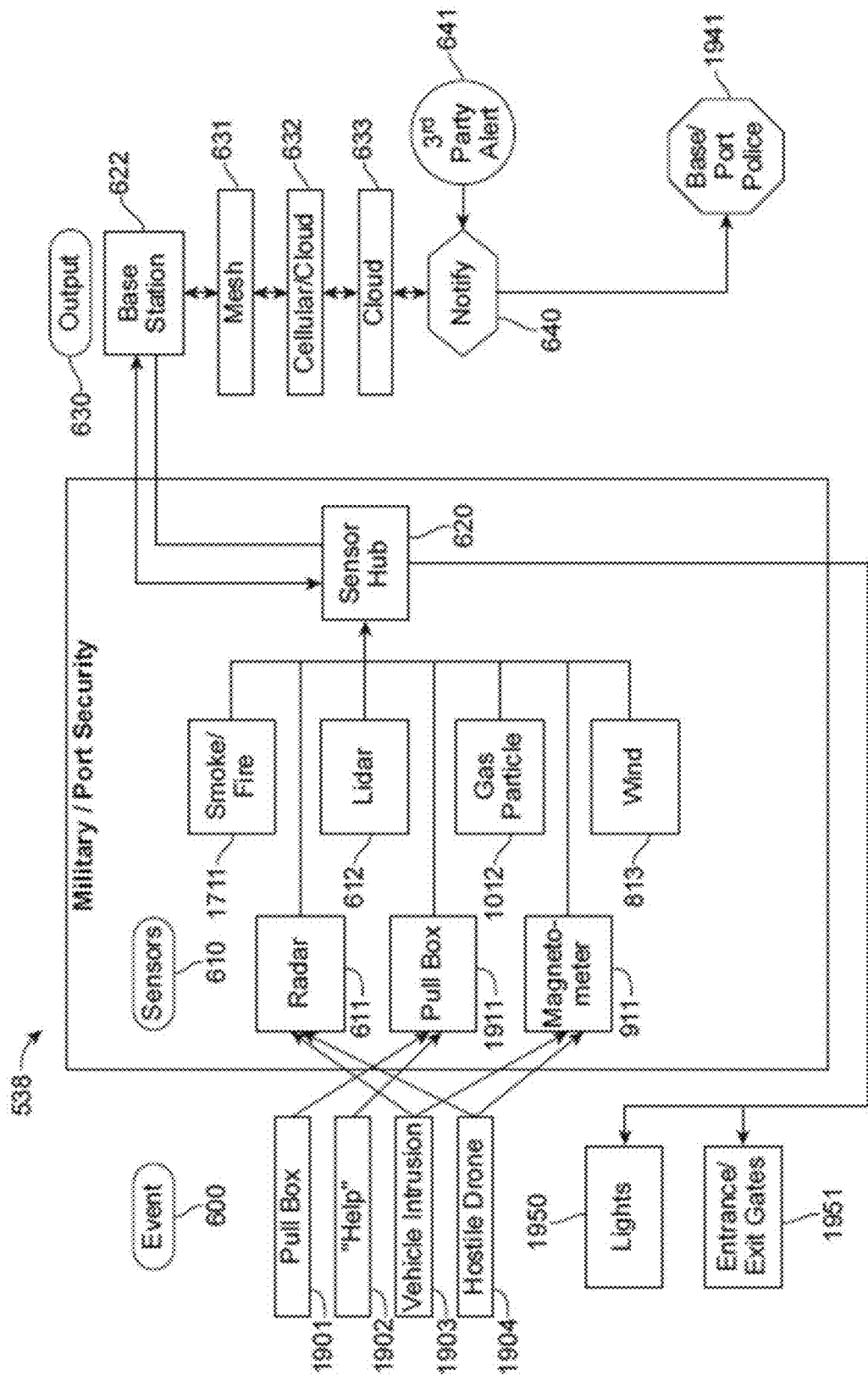
FIG. 19 is a block diagram of an example military/port security module.

FIG. 19 is a block diagram of an example military/port security module. The military/port security module 538 may be configured to respond to the occurrence of one or more events 600. The events may include the detection of the operation of a pull box 1901, a "help" signal 902, a vehicle intrusion 1903, and/or a hostile drone 1904. The events may be wholly or partially detected by one or more sensors 610. The sensors may include one or more radar sensors 611, one or more lidar sensors 612, one or more magnetometers 911, and/or one or more pull boxes 1911. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The military/port security module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may further send signals to and/or receive signals from base or port security 1941. The sensor hub may send a signal to lights 1950 and/or to entrance or exit gates 1951, as described herein.

The military and port security module may also include a loudspeaker to provide human-controlled and/or autonomous warnings or commands to service personnel or to intruders regarding the nature of the installation, the severity of trespass events, and/or the potential for armed or potentially lethal responses by personnel or vehicles (manned or unmanned).

Figure 20:
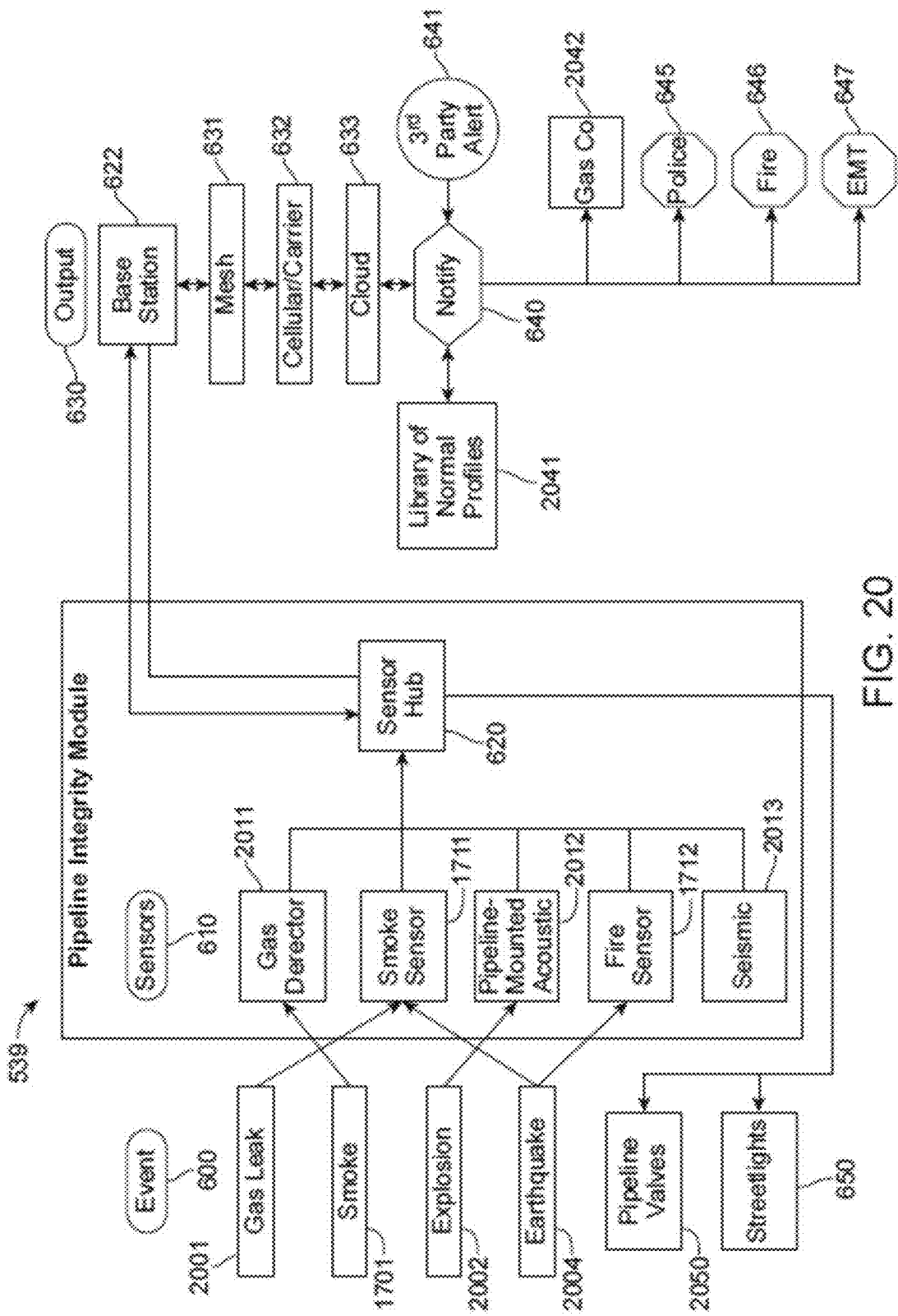
FIG. 20 is a block diagram of an example pipeline integrity module.

FIG. 20 is a block diagram of an example pipeline integrity module. The pipeline integrity module 539 may include one or more sensors and associated components/circuitry to provide functionality such as any of the functionality provided by the systems and methods described in U.S. Pat. No. 8,903,558 to John A. Jarrell and Robert C. Hendrickson, the entire contents of which are hereby incorporated by reference in their entirety for all purposes. The pipeline integrity module 539 may be configured to respond to the occurrence of one or more events 600. The events may include the detection of a gas leak 2001, smoke 1701, fire 1702, an explosion 2002, and/or an earthquake 2003. The events may be wholly or partially detected by one or more sensors 610. The sensors may include one or more gas detectors 2011, one or more smoke sensors 1711, one or more fire sensors 1712, one or more acoustic detectors 2012, and/or one or more seismic sensors 2013. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The pipeline integrity module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may further send signals to and/or receive signals from a gas company 2042, a police department 645, a fire department 646, and/or EMT 647. The sensor hub may send a signal to streetlights 650 and/or to pipeline valves 2050, as described herein.

The pipeline integrity module may receive short distance signals from remote sensors to detect physical damage, impacts, digging, corrosion, and/or other factors that may lead to a breach or the line. The remote sensors may detect surface tilt, which may be a warning of a potential landslide. The remote sensors may detect salinity, depth of water table, stray electrical currents, galvanic corrosion cells, and/or other indications of the potential for corrosion. The sensors may include strain gauges to how determine physical stresses (such as stretching of the pipeline, the effects of heat or cold on joints and pipeline or valve connectors, or direct physical impacts from car, truck, or train collisions) may have affected the structural or material integrity of the pipeline.

Figure 21:
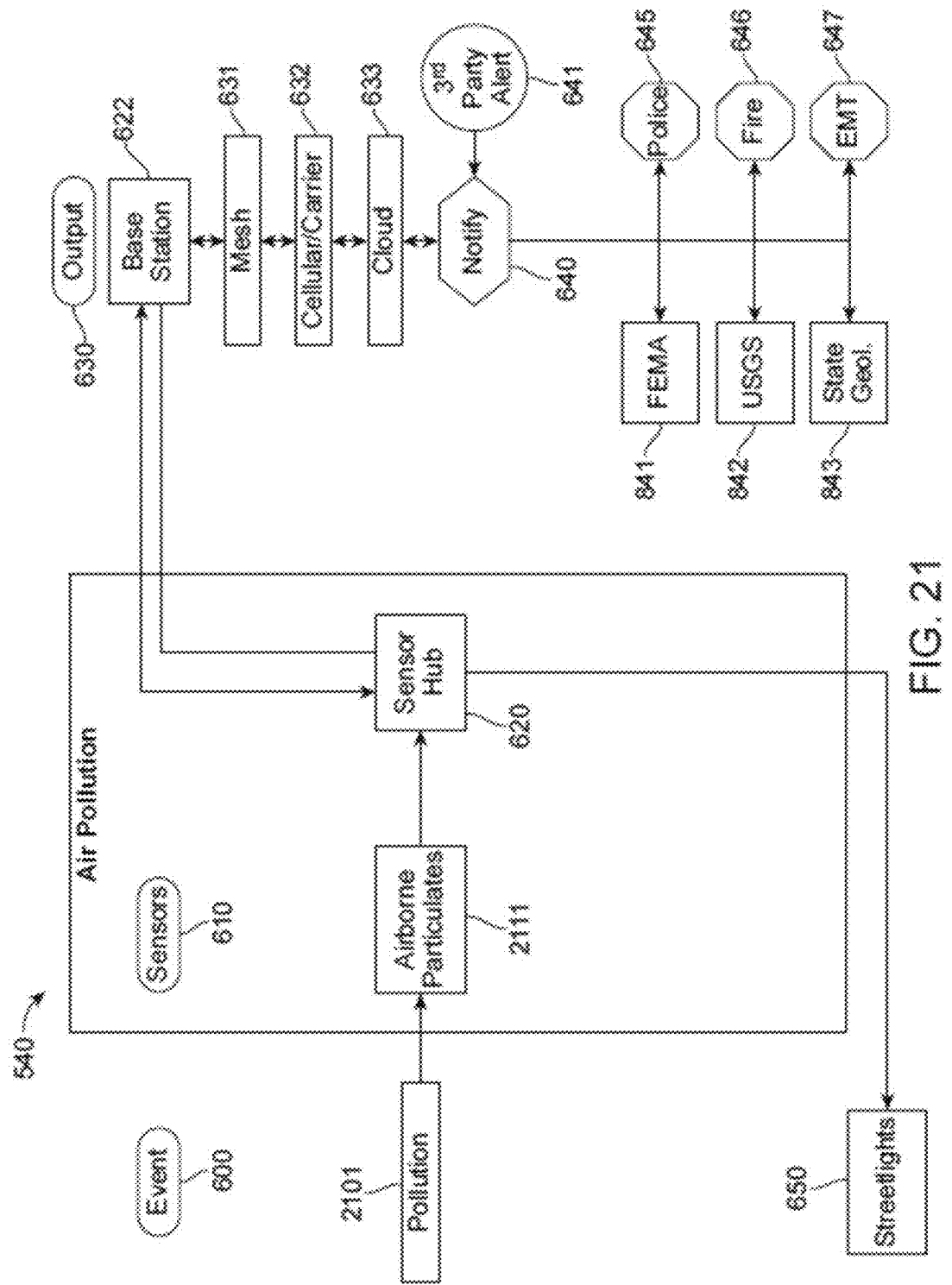
FIG. 21 is a block diagram of an example air pollution module.

FIG. 21 is a block diagram of an example air pollution module. The air pollution module 540 may be configured to respond to the occurrence of one or more events 600. The events may include the detection of pollution 2101. The events may be wholly or partially detected by one or more sensors 610. The sensors may include one or more airborne particulate sensors 2111. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The air pollution module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may further send signals to and/or receive signals from the Federal Emergency Management Agency (FEMA) 841, the United States Geological Survey (USGS) 842, one or more state geological agencies 843, a police department 645, a fire department 646, and/or EMT 647. The sensor hub may send a signal to streetlights 650, as described herein.

The air pollution sensors may include sensors for gases, radiological particles, and/or organic or inorganic chemical compounds. The air pollution module may be configured to make measurements and/or issue alerts in response to pollution events that occur over an extended period of time (such as smog) and/or to pollution events that occur over a much shorter period of time (such as a catastrophic accident at a chemical facility or refinery).

Figure 22:
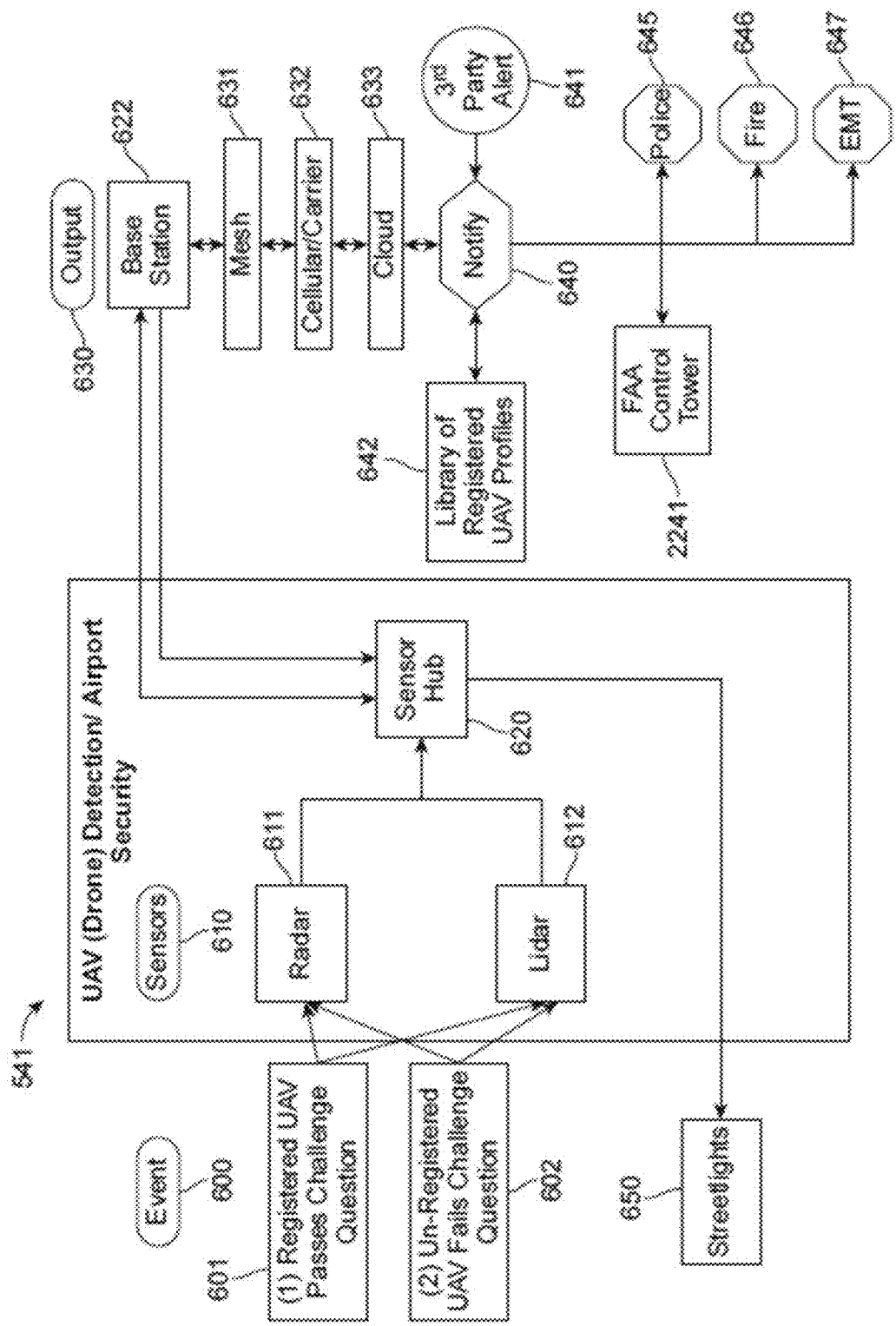
FIG. 22 is a block diagram of an example UAV detection/airport security module.

FIG. 22 is a block diagram of an example UAV detection/airport security module. The UAV detection/airport security module 541 may be configured to respond to the occurrence of one or more events 600. The events may occur in response to a challenge question posed to a UAV, as described herein. The events may include a registered UAV passing a challenge question 601 or an unregistered UAV failing a challenge question 602. The events may be wholly or partially detected by one or more sensors 610. The sensors may include one or more radar sensors and/or one or more lidar sensors 612. The sensors may register one or more measurements which may be passed to a sensor hub 620. The sensor hub may communicate the results of the one or more measurements to a base station 202 via one or more communications channels. The sensor hub may be powered by the base station. For instance, the sensor hub may be powered by a 5V or 12V digital signal from the base station. The base station and/or sensor hub may be powered by alternative power sources, including power sources located in ground vehicles such as 12V for cars and trucks and stepped-down AC for commercial-retail, industrial, and residential buildings, such as 120V, 240V, and/or 480V AC for houses, jobsites, and commercial purposes.

The UAV detection/airport security module may produce one or more outputs 630 in response to the sensed events. The base station may communicate the outputs to a mesh 631, a cellular network 632, the cloud 633, and/or a server or software element 640. The mesh, cellular network, cloud, and server or software element may be configured to communicate with one another through one or more communications channels, such as one or more wireless communications channels. The server or software element may receive a 3rd party alert 641. The server or software element may send and/or receive communications from a library 642 of registered UAV profiles, as described herein. For instance, the server or software element may query the library of registered UAV profiles to determine whether a UAV detected by the UAV management module has been registered with the library, as described herein. The library may then send a response to the server or software element regarding whether the UAV is registered in the library, as described herein. The server or software element may further send signals to and/or receive signals from a police department 645, a fire department 646, and/or emergency medical technicians (EMT) 647. The sensor hub may send a signal to operate a streetlight 650, as described herein.

The use of the UAV detection module in area-wide streetlights may push the defensive perimeters of airports out to a distance of several miles. While more sophisticated detection systems (such as airport radar) and anti-UAV countermeasures may be deployed in the airport's near perimeter, the ability to detect potential threats at great distances and at low flight levels (such as at altitudes below the airport's radar coverage), may allow an early and autonomous warning of a potential rogue, fly-away, or malicious drone. This may allow more aggressive detection and counter-measures to be more rapidly brought to bear by airport authorities and security and law enforcement personnel. The deployment of such detection and cameras at the edge of the perimeter may also increase the chance of interception, disruption, and/or apprehension of the operators of the illicit UAVs, whether the UAVs are controlled near to the perimeter or launched from a vehicle or building.

Any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 (or base stations) discussed herein may be deployed on a generally permanent basis, or may be deployed on a generally temporary basis. It may be beneficial to deploy a module or base station (or combination) on a temporary basis to provide functionality appropriate for an event or time period where demand for the service or functionality is expected to exceed normal or static demand. Some examples of situations where temporary (or permanent) deployment may be applicable may include sporting events, gatherings, rallies, parades, processions, celebrations, festivals, areas where protests are expected, areas experiencing an increase in crime or a high level of crime, areas less likely to be patrolled by police units, areas where one or more persons of interest reside, areas affected by a natural disaster, areas where an accident has occurred or areas prone to experiencing accidents, and/or other appropriate areas.

Any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 discussed herein (or the base station) may include artificial intelligence capability to permit the application module (or base station) to improve performance or provide new functionality based on past data collected or past results. Specific techniques to employ facial recognition and other pattern recognition may also be used. As an example, one or more of the unmanned aerial vehicle communication or management module 70, autonomous ground vehicle communication or management module 71, and traffic monitoring and/or alert module 76 may collect information regarding traffic congestion, and may use the information collected to make improved future traffic management decisions to improve or optimize traffic congestion based on the collected information. The improved traffic management decisions may be communicated (for instance, by the application module or by the base station) to one or more traffic lights, or to a communications system associated with the one or more traffic lights, and the improved traffic management decisions may be used to regulate one or more traffic lights. One or more of the aforementioned modules, or the corresponding base station, may communicate the collected information (or a decision determined based on the collected information) to another computing device (such as another base station (for instance, an "upstream" or "downstream" base station), another application module (for instance, an "upstream" or "downstream" application module), or to a central control center) and the another computing device may use the information to improve or optimize traffic congestion based on the collected information.

Providing the functionality described herein in a modular manner by providing a first set of functionality with a base station and by providing a second set of functionality with an application module may provide benefits. For example, the cost of base stations may be kept low because they can be mass produced at high quantities and low costs with a limited or first set of functionality. The application modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and 541 may use the same enclosure or housing as the base station uses, and by having a large variety of application module configurations, the amount of components and circuitry in any individual application module may be reduced, which can also lower cost of the application modules. A public agency or utility benefit of a widespread, instantaneous grid at uniform height above the ground level (such as at streetlight-height) is the ability to instantly aggregate the data from these sources and create an overall assessment of a situation, something that may be difficult or impossible with sporadic reports, scattered news reports, or randomly placed sensors. Another benefit of a streetlight modular system and sensor grid, in some examples, is the option to immediately replace or change out an application module to fit a new situation. For example, a fire and smoke detection application module (i.e. an application module that includes smoke or fire sensing and alert module 522) may be swapped out (or supplemented with) with an application module that includes environmental sensors (i.e. an application module that includes environmental sensing and/or alert module 515) after a fire to detect residual toxic fumes, or an application module that includes an activity sensor (i.e. an application module that includes activity sensing and/or alert module 517) with high sensitivity microphones to detect survivors in a particular neighborhood or business center affected by a mass disaster. Such swapping out or supplementing of (such as by stacking on top of) application modules may take only a few minutes and may not require reestablishing the electronic grid with a new group of communications modules, as the base stations may remain in place. An existing application module may be moved to a new location. For example, an environmental study of local bird nesting and flight behavior may be completed and a collection of application modules designed for that purpose may be moved to a new study location with minimal effort. Such reconfiguration may be performed by simply updating the firmware of the modules or using accumulated data from standard application modules in a new way.

As described herein, a wide variety of application modules may be possible with configurations tailored to a specific application. Appropriate combinations of application module functionality may be packaged for particular applications, and the packaging may include one or more of a distinctive color or pattern on the housing of the application module. A collection of application module functionality may be provided in an application module for weather station applications, and the housing of the weather station application module may include one or more particular colors or patterns; for example, the housing may be blue with a white stripe (or may have another appropriate distinctive representation). As another example, a collection of application module functionality may be provided in an application module for environmental sensing applications, and the housing of the environmental sensing application module may be white with a green stripe (or may have another appropriate distinctive representation). As yet another example, a collection of application module functionality may be provided in an application module for industrial gas monitoring or pipeline monitoring applications, and the housing of the industrial gas monitoring or pipeline monitoring application module may be green with a red stripe (or may have another appropriate distinctive representation). As yet another example, a collection of application module functionality may be provided in an application module for parking lot or industrial security applications, and the housing of the parking lot or industrial security applications application module may be red with a white stripe (or may have another appropriate distinctive representation). As yet another example, a collection of application module functionality may be provided in an application module for drone detection, identification, and/or threat assessment applications, and the housing of the drone detection, identification, and/or threat assessment application module may be black with a white stripe (or may have another appropriate distinctive representation). As yet another example, a collection of application module functionality may be provided in an application module for drone navigation and traffic management, and the housing of the drone navigation and traffic management application module may be black with two white stripes (or may have another appropriate distinctive representation). As yet another example, a collection of application module functionality may be provided in an application module for ground-based autonomous vehicle navigation and traffic management, and the housing of the ground-based autonomous vehicle navigation and traffic management application module may be black with three white stripes (or may have another appropriate distinctive representation). Providing distinctive markings on application modules may provide a quick visual indication, viewable by a human from the ground, for example, of the functionality provided by the application module.

The base station or application module may include circuitry for managing an external energy generation unit, such as a solar power energy generation unit, a wind power energy generation unit, a hydroelectric power energy generation unit, or other appropriate energy generation unit. The energy gleaned from the energy generation unit may be used to power the base station, one or more application modules, the streetlight (if applicable), and/or other support member electronics (if applicable). Energy gleaned from the energy generation unit may be used to supplement one or more other sources of energy to power the base station, one or more application modules, the streetlight (if applicable), or other support member electronics (if applicable).

Figure 23:
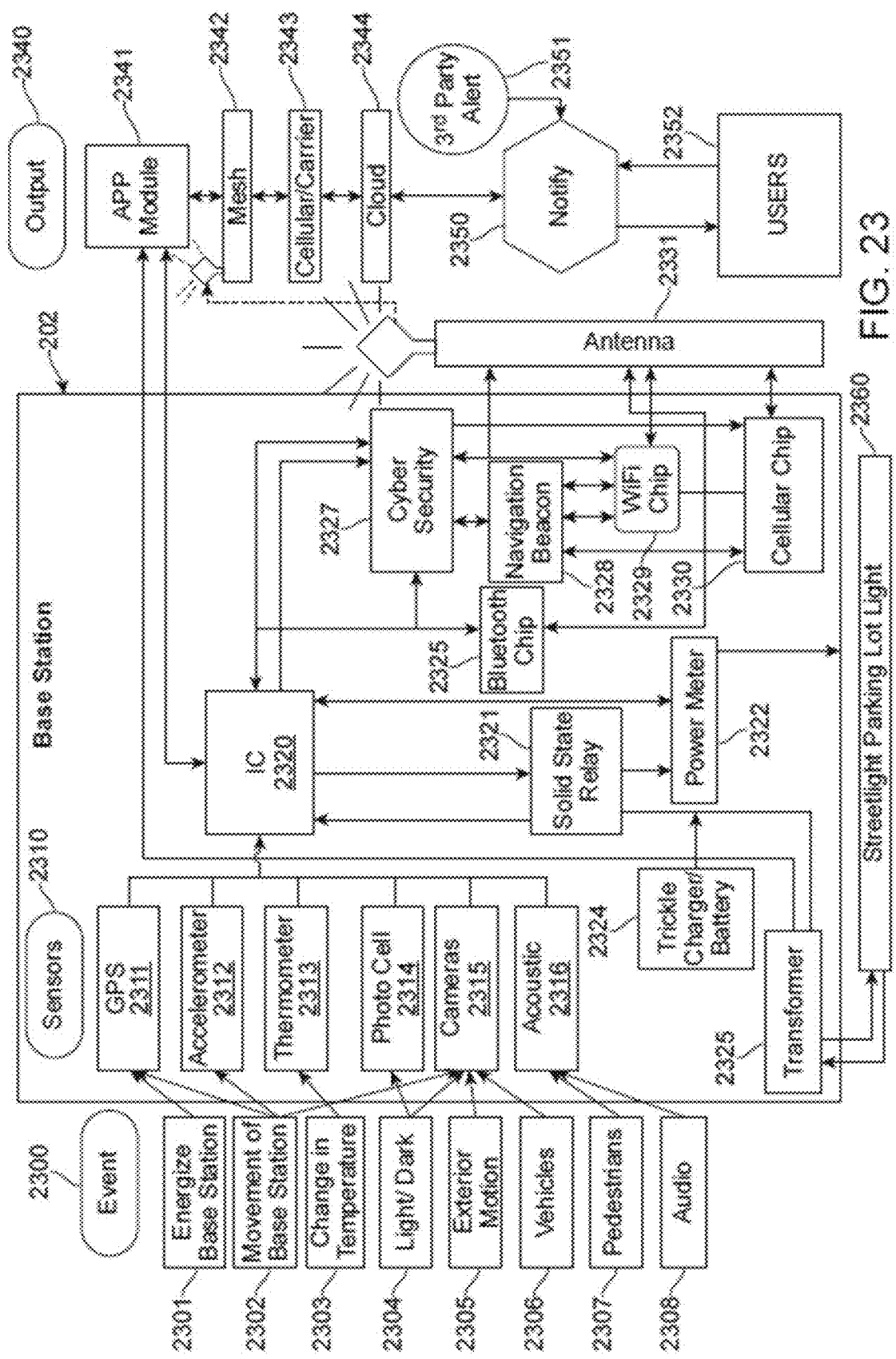
FIG. 23 is a block diagram of an example base station.

FIG. 23 is a block diagram of an example base station. The base station 202 may be configured to respond to the occurrence of one or more events 2300. The events may include detection of energizing of that base station 2301, movement of the base station 2302, a change in temperature 2303, light or darkness 2304, exterior motion 2305, the presence of vehicles 2306, the presence of pedestrians 2307, and/or audio events 2308 (such as gun shots, alarms, yelling of the word "help" or other vocal attempts to elicit assistance, a car crash, broken glass, and the like). The events may be wholly or partially detected by one or more sensors 2310. The sensors may include one or more global positioning system (GPS) sensors 2311, one or more accelerometers 2312, one or more thermometers 2313, one or more photo cells 2314, one or more cameras 2315, and/or one or more acoustic sensors 2316. The sensors may register one or more measurements which may be passed to an integrated circuit (IC) 2320. The IC may act as a controller for operating a plurality of electronic components of the base station. The IC may be operatively couple to a solid state relay 2321. The solid state relay may be operatively coupled to a power meter 2322. The power meter may measure a power usage of the base station and any attached modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541. The power meter may send measurements of the power usage to the IC. The IC may send signals to and/or receive signals from an app module 2341. The app module and solid state relay may be operatively coupled to a trickle charger/battery 2324 and to a transformer 2325. The transformer may be configured to convert an electrical input from a streetlight or parking lot light 2360, as described herein. The transformer may be configured to provide an AC-AC electrical conversion or an AC-DC electrical conversion. The trickle charger/battery may be configured to provide electrical power to the components of the base station and/or to store electrical power for future use by the base station. The IC may be configured to send signals to and/or receive signals from a Bluetooth chip 2326 and a cyber security module 2327. The cyber security module may be configured to send signals to and/or receive signals from a navigation beacon 2328. The cyber security module and navigation beacon may be configured to send signals to and/or receive signals from a WiFi chip 2329. The cyber security chip, navigation beacon, and WiFi chip may be configured to send signals to and/or receive signals from a cellular chip 2330. The Bluetooth chip, cyber security module, WiFi chip, and cellular chip may be configured to send signals to and/or receive signals from an external antenna 2331. The external antenna may be configured to send wireless signals to and/or receive wireless signals from a mesh 2342. The base station may produce one or more outputs 2340 in response to sensed events. The base station may communicate the outputs to a mesh 2342, a cellular network 2343, the cloud 2344, and/or a server or software element 2350. The mesh, cellular network, cloud, and server or software element may be configured to communicate with one another through one or more communications channels, such as one or more wireless communications channels. The server or software element may receive a 3rd party alert 2351. The server or software element may further send signals to and/or receive signals from one or more users 2352.

The components depicted in FIGS. 6, 7, 8, 9, 10, 11, 12, 13, 14, 15, 16, 17, 18, 19, 20, 21, 22, and/or 23 may include separate electronic components on single or multiple circuit boards, or may be grouped together or a single circuit board or single chip for ease of manufacture, reduced size, speed, memory, and/or cost considerations.

Figure 24A:
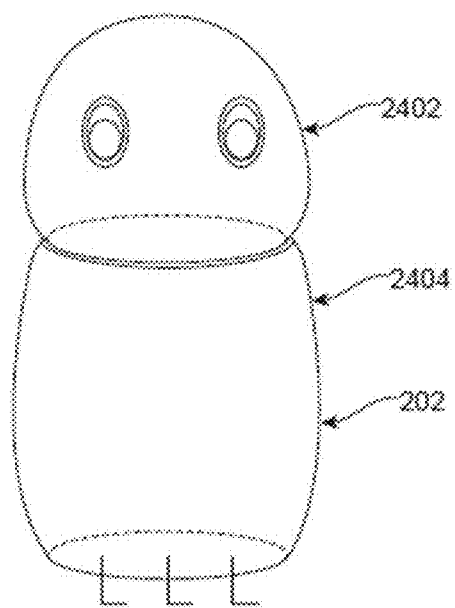
FIG. 24A depicts an embodiment of a modular assembly including a base station and a camera unit.

FIG. 24A depicts an embodiment of a modular assembly or modular streetlight assembly including a base station and a camera unit. The modular streetlight assembly may be mounted atop a streetlight, a utility pole, or other support member using a base station 202, as described herein. The base station may include a plurality of electrical connections for drawing electrical power from, sending signals to and/or receiving signals from the streetlight or other structure. The modular streetlight assembly may further include a camera unit 2402. The camera unit may include one or more cameras 2408, as described herein. The camera unit may include one, two, three, four, or more than four cameras. The cameras may be arranged to provide a 360 degree view around the camera unit.

Figure 24B:
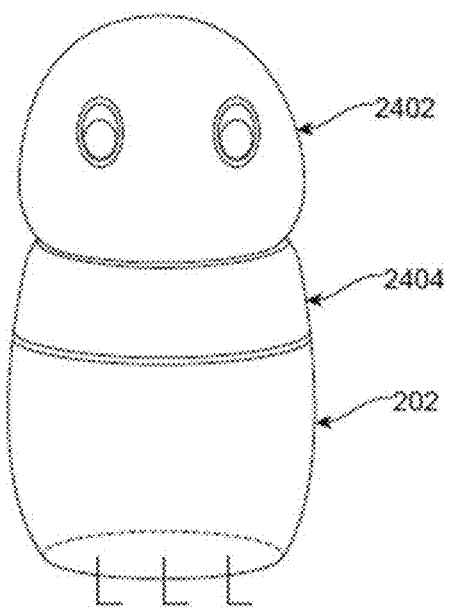
FIG. 24B depicts an embodiment of a modular assembly including a base station, an application module, and a camera unit.

FIG. 24B depicts an embodiment of a modular assembly or modular streetlight assembly including a base station, an application module, and a camera unit. The modular streetlight assembly may be mounted atop a streetlight or other support member using a base station 202, as described herein. The base station may include a plurality of electrical connections for drawing electrical power from, sending signals to and/or receiving signals from the streetlight or other structure. The modular streetlight assembly may further include a camera unit 2402. The camera unit may include one or more cameras 2408, as described herein. The camera unit may include one, two, three, four, or more than four cameras. The cameras may be arranged to provide a 360 degree view around the camera unit. The camera unit may include one or more additional cameras pointed in an upward direction to monitor the area above the camera unit. The modular streetlight assembly may further include an application module 2404. The application module may be mounted between the base station and the camera unit. The application module may be any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541 described herein.

Figure 24C:
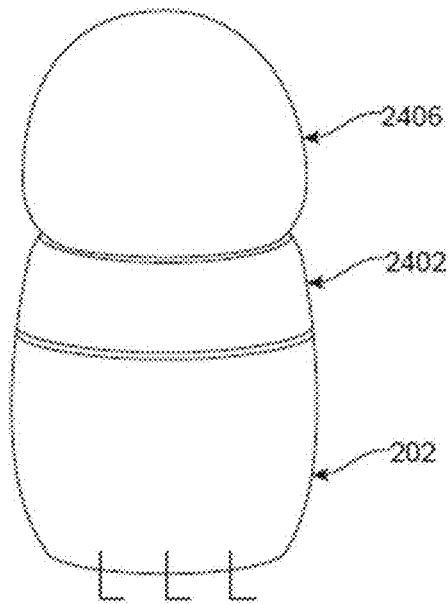
FIG. 24C depicts an embodiment of a modular assembly including a base station, an application module, and a hollow cap.

FIG. 24C depicts an embodiment of a modular assembly or modular streetlight assembly including a base station, an application module, and a hollow cap. The modular streetlight assembly may be mounted atop a streetlight or other support member using a base station 202, as described herein. The base station may include a plurality of electrical connections for drawing electrical power from, sending signals to and/or receiving signals from the streetlight or other structure. The modular streetlight assembly may further include an application module 2404. The application module may be mounted atop the base station. The application module may be any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541 described herein. The modular streetlight assembly may further include a hollow cap 2406 mounted atop the application module in place of the camera unit. The modular assembly may also include a plug-in light that can be coupled to the base station or to an application module. In some cases, the hollow cap may enclose the camera unit thereby providing a protection. One, two, three or more cameras may be housed in the hollow cap. The hollow cap may be made of transparent materials thus the field of view of the cameras is not blocked while providing a shield to the cameras.

FIG. 24D depicts an embodiment of a modular assembly or modular streetlight assembly including a base station, a plurality of application modules, and a camera unit. The example shown in FIG. 24D depicts three application modules 2404, 2405, and 2407 releasably coupled together in a stacked configuration. The application module 2404 at the bottom of the stack of three application modules is shown releasably coupled to a base station 202, and the application module 2407 at the top of the stack of three application modules is shown releasably coupled to a camera unit 2406. Although FIG. 24D depicts three application modules, the modular method and system is not limited to a specific number of application modules and any number of application modules may be coupled together in a stacked configuration as needed to provide a desired functionality or set of functionalities. The modular assembly can be customized specifically to suit the desired need simply by selecting application modules having the desired functionalities.

In some embodiments, the base station or application modules can have the same or different diameters and thicknesses. For example, a first application module configured to couple to the base station that may be disposed at the bottom of a stack of a plurality of application modules can have a larger diameter than a second application module connected to the top surface of the first application module.

FIG. 24E depicts a top view of an embodiment of two application modules 2405 and 2407 and FIG. 24F depicts a bottom view of an embodiment of one application module 2407 and a top view of an embodiment of a second application module 2405. As shown in FIG. 24E and FIG. 24F, each base station or application module can include a first connector 2410 on a top surface of the base station or application module and a second connector 2411 on a bottom surface of the base station or application module. The first connector 2410 can be configured to engage or connect with the second connector 2411. In this manner, each base station or application module can be coupled, engaged, or connected to another base station or application module in a stacked configuration such that the top connectors and bottom connectors of adjacent modules matingly engage to form a connection. Each base station or application module can be configured to have the same first connector 2410 on each of their respective top surfaces as the base station and each of the other application modules. Similarly, each base station and application module can be configured to have the same connector 2411 on each of their respective bottom surfaces to facilitate coupling with different modules. In a preferable embodiment, the first connector 2410 is a female connector while the second connector 2411 is a male connector. The male connector 2411 disposed on a bottom surface of a base station 202 can be configured to couple with or connect to a connector disposed on a support member such as a streetlight or a utility pole.

Figure 25B:
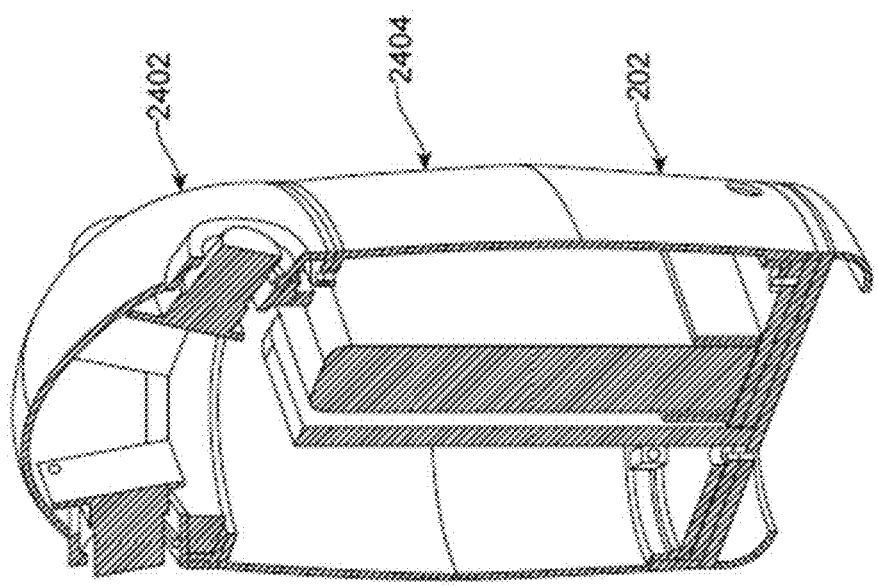
FIG. 25B depicts a cross-sectional view of an additional embodiment of a modular streetlight assembly including a base station, an application module, and a camera unit.
Figure 25A:
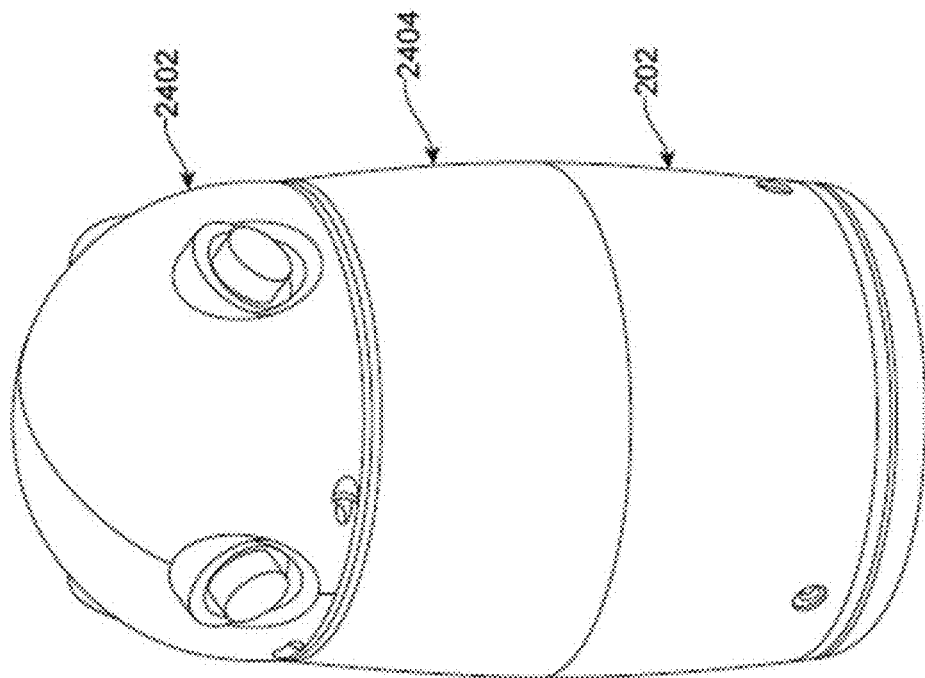
FIG. 25A depicts an additional embodiment of a modular streetlight assembly including a base station, an application module, and a camera unit.

FIGS. 25A-B depict an additional embodiments of a modular streetlight assembly including a base station, an application module, and a camera unit.

FIG. 25A depicts another example of a modular streetlight assembly including a base station, an application module, and a camera unit. The modular streetlight assembly may be mounted atop a streetlight or other support member using a base station 202, as described herein. The base station may include a plurality of electrical connections for drawing electrical power from, sending signals to and/or receiving signals from the streetlight or other structure. The modular streetlight assembly may further include a camera unit 2402. The camera unit may include one or more cameras 2408, as described herein. The camera unit may include one, two, three, four, or more than four cameras. The cameras may be arranged to provide a 360 degree view around the camera unit.

The modular streetlight assembly may further include an application module 2404. The application module may be mounted between the base station and the camera unit. Alternatively, the application module may be mounted on top of the base station and the camera unit, or the camera unit may be part of the application module and not the base station. The application module may be any of the modules 510, 511, 512, 513, 514, 515, 516, 517, 518, 519, 520, 521,

522, 523, 524, 525, 526, 527, 528, 529, 530, 531, 532, 533, 534, 535, 536, 537, 538, 539, 540, and/or 541 described herein.

FIG. 25B depicts a cross-sectional view of another embodiment of a modular streetlight assembly including a base station, an application module, and a camera unit.

Figure 26:
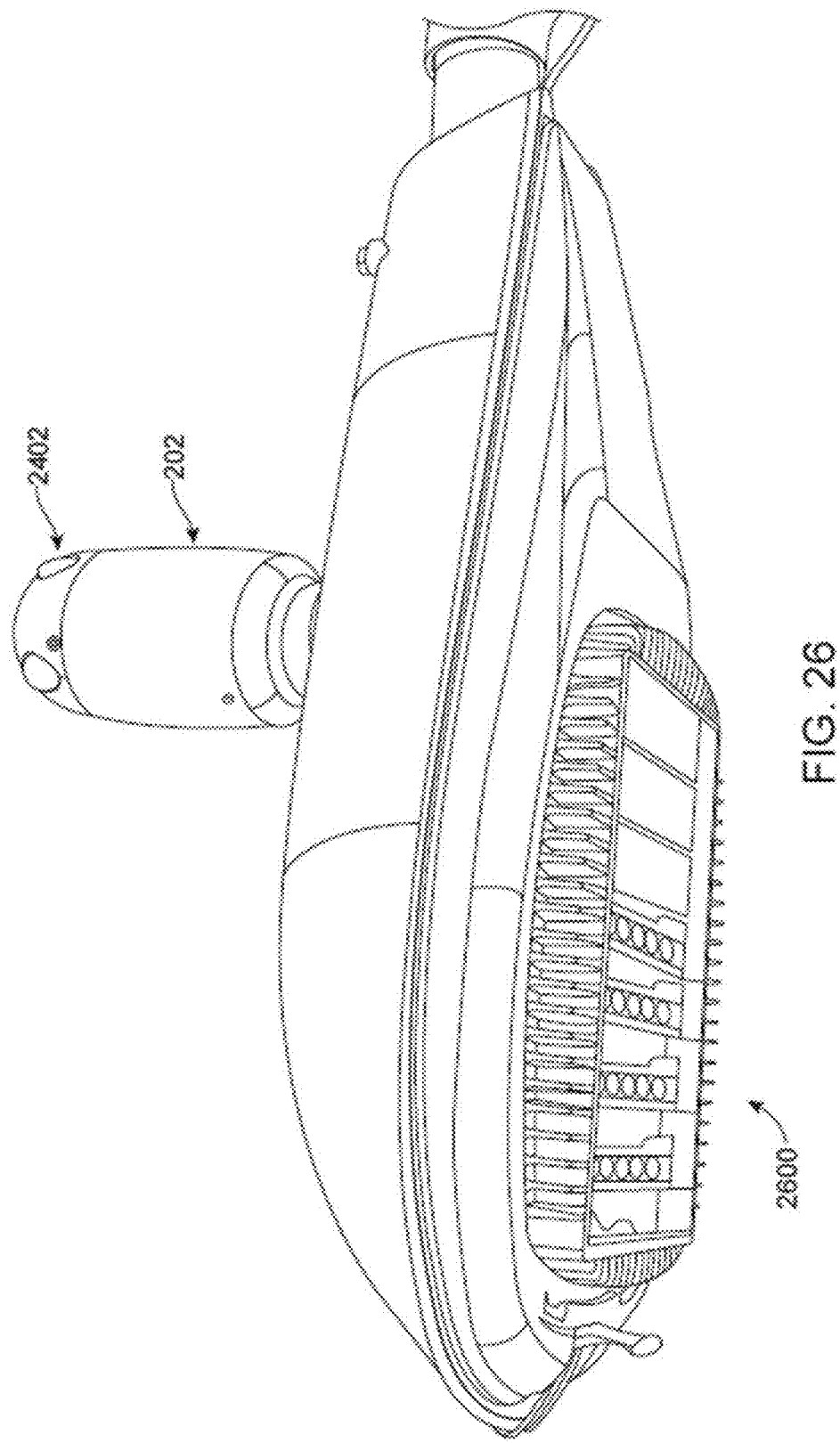
FIG. 26 depicts a modular streetlight assembly mounted atop a streetlight.

FIG. 26 depicts a modular streetlight assembly mounted atop a streetlight, as described herein. The modular streetlight assembly may include a base station 202 and a camera unit 2402. Alternatively, the modular streetlight assembly may include a base station 202, an application module 2404, and a camera unit 2402, and each of these components may be attached or coupled together in any order. Alternatively, the modular streetlight assembly may include a base station 202, an application module 2404, and a hollow cap 2406, and each of these components may be attached or coupled together in any order. The modular streetlight assembly may be mounted atop a streetlight 2600. Alternatively, the modular streetlight assembly may be mounted atop another support member (such as a traffic light, utility pole, tower, communications station pole, road sign display monitor, building, tree, billboard, bridge, house, apartment building, commercial building, industrial building, car, truck, other vehicle, or the like), as described herein.

Figure 27:
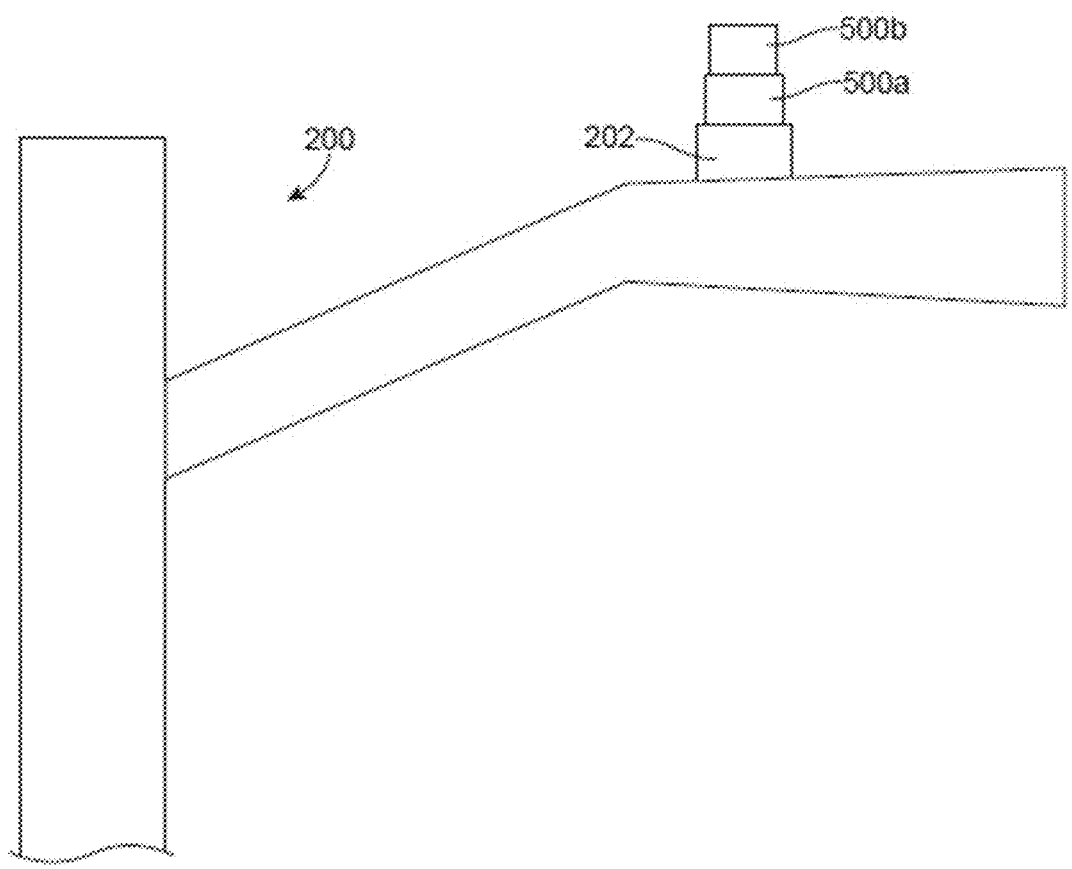
FIG. 27 depicts an example base station attached to an example support member featuring a second application module attached to a first application module.

FIG. 27 depicts an example base station attached to an example support member featuring a second application module attached to a first application module. The support member 200 may include a streetlight on any other support member (such as a traffic light, utility pole, tower, communications station pole, road sign display monitor, building, tree, billboard, bridge, house, apartment building, commercial building, industrial building, car, truck, other vehicle, or the like) described herein. A first application module 500a (for instance, any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541) may be attached to the base station. A second application module 500b (for instance, any of the modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541) may be attached to the first application module. A third application module (not shown) may be attached to the second application module 500b. A fourth application module (not shown) may be attached to the third application module. Any additional number of application modules may be utilized, with each successive application module attached to the previously attached application module. Each successive application module may be stacked on top of the previous application module in similar fashion as application module 500b is stacked on top of module 500a.

Although many of the examples have described the base station 202 as attaching to a support member (such as a streetlight) near a top or upward facing portion of the support member, the base station may also be mounted at one or more alternative locations on a support member. For example, when a base station is mounted to a parking lot light or to a streetlight, the base station may be mounted interior of the pole of the parking lot light or the streetlight.

Figure 28:
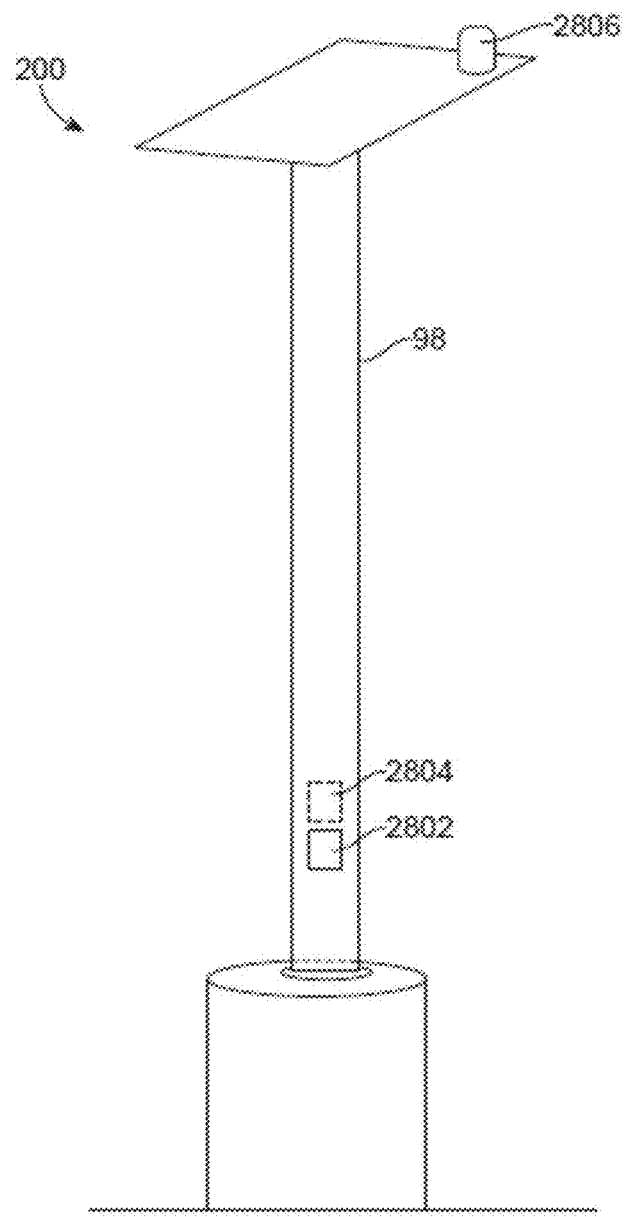
FIG. 28 depicts an example base station mounted interior of a pole of a support member.

FIG. 28 depicts an example base station mounted interior of a pole of a support member. The base station 2804, which may be similar to base station 202 and provide the same or similar functionality as described earlier herein with reference to base station 202, may be mounted interior of a pole 2806, which may correspond to a parking lot light, a streetlight, a traffic light, or another support member, as described herein. The base station 2804 may be the same or similar to base station 202, described herein, with the exception that the base station 2804 may not include the receptacle or plug. Base station 2804 may have an alternative power connection component as compared to the plug or receptacle of base station 202. Base station 2804 may be mounted on an inside surface of the pole or to an appropriate support member interior of the pole, and may be mounted in a vicinity to a door or cover 2802 of the pole, which may be opened to provide access to an interior of the pole. The door or cover may be lockable so that unauthorized access to the interior of the pole is prevented. The components of the base station 2806 may be powered by electrical energy received from the streetlight assembly via an electrical connection to the base station 2806.

Also depicted in FIG. 28 is an application module 508 mounted near the top of the support member. The application module may correspond to any of the application modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541 discussed herein, except that the application module may not mount directly to the base station. The application module 11 may provide functionality as described with reference to any of application modules 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, and/or 541 or combinations thereof. The application module may be powered in a variety of ways. The application module may draw power from the support member. The application module may include circuitry for managing an external energy generation unit (not shown in FIG. 28), such as a solar power energy generation unit, a wind power energy generation unit, a hydroelectric power energy generation unit, or other appropriate energy generation unit, as described herein. The application module may be powered by the base station, for instance by wired connection or wireless connection. The application module may be battery powered. The application module may include a motion detect sensor that, when motion is detected, causes one or more luminaires of a lighting assembly (for examples in which the support member is a lighting assembly), to illuminate or increase an intensity of illumination. The application module may include one or more cameras or other sensors that may be activated in response to detected motion for security purposes, for example. Images, video, audio, or combinations of the foregoing may be transmitted by the application module, as described herein.

As described herein, the base station, application module, or both may be powered by electrical energy provided by a support member (such as a streetlight, traffic light, parking lot light, message board, display monitor, building, and the like). The base station, application module, or both, may be powered by alternative arrangements. For example, alternate power sources located in cars/trucks and commercial-retail/industrial/residential buildings can be utilized and can allow the base station or application module to achieve their respective functionalities as described herein. The alternative power sources may include, for example, 120V AC for houses, jobsites, and commercial purposes and 12V for ground vehicles such as cars and trucks. To utilize these power sources, an ANSI twist plug may be employed to secure the base station or application module to a circular base. The circular base may include a plug for a standard three prong 120V plug and a separate plug for a 12V cord that can plug into a vehicle's cigarette lighter. The 120V power lead can connect to the ANSI plug of the base station or application module and the 12 volt lead can go up through a separate connection to the base station's or application module's 12V to 5V transformer.

Figure 29:
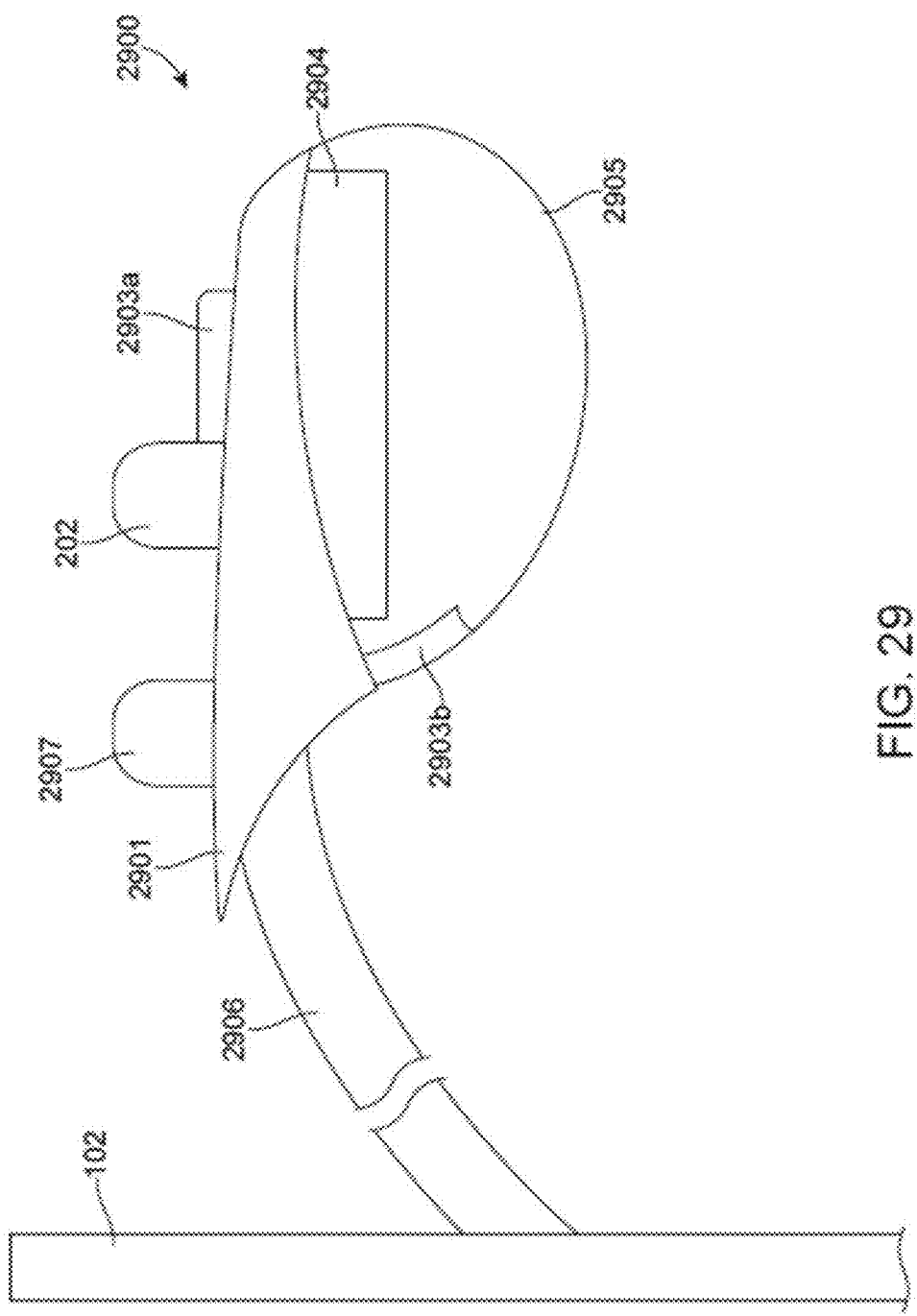
FIG. 29 is a view of an example streetlight assembly including a streetlight housing and one or more luminaires.

FIG. 29 is a view of an example streetlight assembly including a streetlight housing and one or more luminaires. The streetlight 2900 may include a streetlight housing 2901 and one or more luminaires 2904. The streetlight assembly may include an optical sensor 2907 (such as a photocell or other appropriate optical sensor) attached to the streetlight assembly in a conventional manner. In some cases the streetlight assembly may not include the optical sensor. The streetlight housing may be attached to a streetlight pole 102 via a connecting support member 2906.

The streetlight assembly may further include a base station 2902 that is attached to the streetlight housing 901. Base station 2902 may be similar to base station 202 described herein (for instance, in functionality, appearance or both). Base station 2902 may not include a first electrical plug or receptacle. Base station 2902 may be mechanically mounted to the streetlight housing, to a connection support member 2906, or the streetlight pole, using any appropriate mounting hardware or component. Base station 902 may be powered by one or more power generation components. Base station 2902 may include one or more batteries that may be charged by the one or more power generation components. For example, the base station 2902 may be powered by one or more light energy collection devices, which may collect light energy and convert the light energy to electrical energy to power the base station 2902 or to charge the one or more batteries of the base station 2902.

The streetlight assembly may further include a first light energy collection device 2903a and a second light energy collection device 2903b. The streetlight assembly may include more or fewer light energy collection devices (such as zero, one, three, four, or more than four light energy collection devices). The first light energy collection device may be mounted to the streetlight housing, and the second light energy collection device may be mounted to the streetlight housing, or in some examples to an underside of a globe 2905 of the streetlight assembly. Each of the light energy collection devices may include one or more photovoltaic cells capable of receiving incident light energy and converting the received light energy to electrical energy. Each of the light energy collection devices may be electrically coupled to the base station 2902, such that the electrical energy generated based on the received light energy may be used to power the base station 2902 or to charge one or more batteries of the base station 2902. The light energy collection devices may be coupled to the base station 2902 via an electrical coupling. The electrical coupling or couplings between the light energy collection devices and the base station 2902 may be, for example, one or more wires or other electrically conductive components (such as conductive bars, strips, bands, cables, conductive traces, conductive flex components, and the like).

The first light energy collection device may be mounted to a generally upward-facing surface of the streetlight housing, and may collect light energy from the sun or from light-producing devices in the vicinity of the streetlight. The second first light energy collection device may be mounted such that it may collect light energy from the one or more luminaires 2904 of the streetlight assembly. Each of the light energy collection devices may have any appropriate size and any appropriate shape (such as square, rectangular, circular, donut-shape surrounding the base station, or another appropriate shape).

One or more application modules may be mounted to base station 2902 in a similar manner as described herein with reference to base station 202. Base station 2902 may include a subset of the components described herein with respect to base station 202, such as a reduced subset of components as compared to base station 202. The light energy collection devices may be replaced by, or augmented with, one or more of a wind power energy generation unit, a hydroelectric power energy generation unit, or another appropriate energy generation unit. The depicted example shows a base station, but it will be understood that an application module may similarly be powered by one or more light energy collection devices or alternative power generation components.

Any of the functionality described herein with reference to communication stations may be included, for example, in an application module 500. Any of the features described herein may be included with an unmanned aerial vehicle communication or management module 510, or with an autonomous ground vehicle communication or management module 511 (with the functionality generally applied to ground-based vehicles as opposed to aerial vehicles, as described herein). For any of the modular functionality described herein as being provided across two or more modules, similar or equivalent functionality may be provided by a single module (such as by a base station or a communication station) by inclusion of appropriate components and features within a single module.

Described herein are systems, devices and methods that can be used for one or more of managing unmanned aerial vehicle access to (for instance, relating to one or more of ingress entry, egress departure, and movement within the airspace) private property airspace, public property airspace, and restricted airspace; establishing, implementing, and managing permissions for an unmanned aerial vehicle to enter or depart private property airspace, public property airspace, and restricted airspace; providing communications with unmanned aerial vehicles; providing information to, and receiving information from, unmanned aerial vehicles; aiding unmanned aerial vehicles; logging, chronicling, or validating routes of unmanned aerial vehicles; managing aspects of unmanned aerial vehicle traffic; alleviating, reducing, or mitigating privacy concerns associated with unmanned aerial vehicles; checking or validating registration or license information for unmanned aerial vehicles; improving reliability of unmanned aerial vehicle operations; sensing or monitoring for unmanned aerial vehicles; and improving public safety conditions associated with unmanned aerial vehicle operations. In general, the techniques, systems, and devices discussed herein may be used with any type of unmanned aerial vehicle, drone, unmanned aircraft, remotely piloted or remotely operated aircraft, or unmanned aircraft system, without limitation. For simplicity, the examples discussed herein will generically refer to unmanned aerial vehicles.

Unmanned aerial vehicles (UAVs) are aircraft that fly without a human pilot onboard the aircraft and have been used for many different purposes. While military-grade UAVs have long existed for carrying out military operations or special operations applications, it is expected that general-purpose UAVs may become increasingly common in day-to-day life. For example, UAVs may be used for various civil applications (such as police departments, fire departments, search and rescue departments, and/or disaster response), recreational applications, commercial applications, or other applications in the future. As one example of a potential future commercial use, some businesses have considered using UAVs to perform delivery functions currently being performed by ground-based delivery personnel who deliver goods via car, truck, bicycle, or by foot. Such deliveries may be from a retailer or warehouse location to a consumer's residence, for example, or from a retailer or warehouse to another business (related to a business-to-business transaction).

Unmanned aerial vehicles typically use aerodynamic forces to provide lift and permit the aircraft to achieve flight. Some UAVs include one or more fixed wings; some UAVs include one or more rotary blades or rotors; and some UAVs include both one or more fixed wings and one or more rotary blades or rotors. Some UAVs can take off and land without direct human assistance, while others require some form of human assistance, such as to assist in lifting off or taking flight initially. Some UAVs are gas (or other type of fuel) powered, while others are battery powered. Some UAVs are powered by a combination of gas- or fuel power and battery power.

UAVs can have many shapes, sizes, styles, and levels of complexity. Military-grade UAVs have tended to be large, complex, and expensive, and have been equipped to fly for long distances without refueling or recharging. For example, some versions of the Predator drone are 27 feet long with wingspans of nearly 50 feet have a payload capacity of over 1000 pounds, weigh over 2000 pounds when loaded, have a flight range of nearly 700 miles, and have a unit cost of about $4 million. It is expected that many UAVs to be used for commercial or other purposes, by contrast, will be much smaller, simpler, less expensive, and have a much smaller flight range. For example, some versions of an "octocopter" UAV, which includes eight small rotors, are about the size of some traditional remote-controlled airplanes, are battery powered, have a payload capacity of about five pounds, and have a flight range of about ten miles. Other delivery UAVs have been proposed that may have a payload capacity of up to 55 pounds, and a somewhat longer flight range.

Traditionally, UAVs have been controlled or piloted in real time by a ground-based operator, who controls or partially controls the UAV using a ground-based control system. Communications between the ground-based control system and the UAV can occur over one or more wireless datalinks or communication paths. In some cases, the communication signals can include one or more video channels or feeds. In some examples, satellite communications can be used, where communications from the ground-based control system to the UAV, and vice versa, pass though one or more orbiting satellites. Alternatively, communications from the ground-based control system to the UAV, and vice versa, may pass over one or more networks or communication links, such as one or more cellular or other phone-based networks, over remote control radio frequency links, UHF or L-band frequency links, microwave frequency links, or other appropriate datalinks, networks, or communication paths.

Some UAVs are equipped with autopilot functionality to autonomously control their flight using one or more onboard computers and associated sensors and other navigational instrumentation and control circuitry. Autonomously controlled UAVs typically receive positional updates via received Global Positioning System (GPS) signals. However, some types of GPS and other satellite-based communications can be susceptible to poor weather conditions, can be restricted to areas that have a line-of-sight to an appropriate satellite, or can be susceptible to jamming, spoofing, or hacking attacks. In some examples, UAVs that fly autonomously send and/or receive information over one or more wireless datalinks, networks, or communication paths such as, for example, one or more of the datalinks, networks, or communication links discussed above. In some examples, combinations of the foregoing communications methods can be used.

Figure 30:
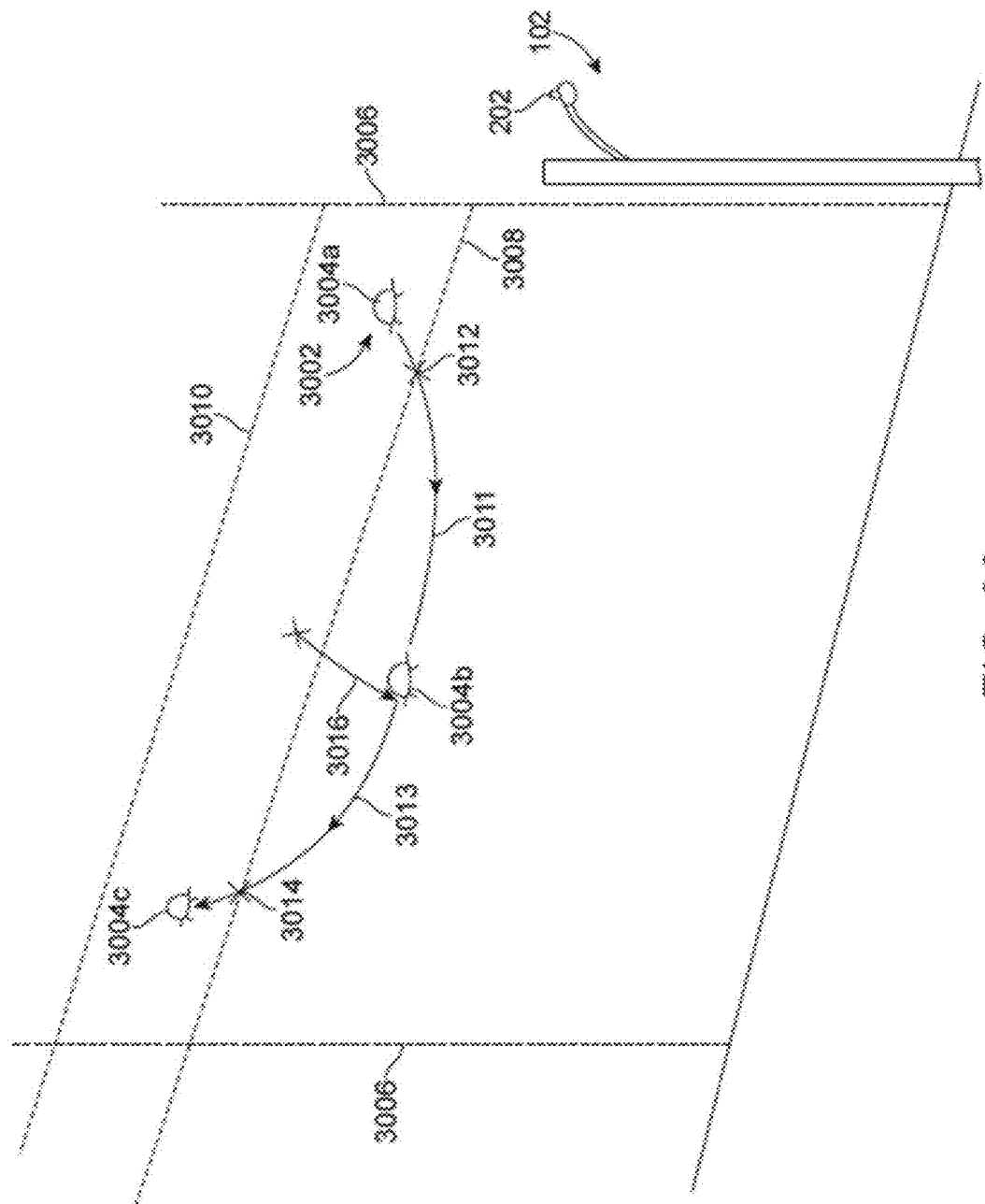
FIG. 30 depicts an example flight path of an unmanned aerial vehicle from an initial location on the flight path, through a second location on the flight path, to a third location on the flight path.

FIG. 30 depicts an example flight path of an unmanned aerial vehicle from an initial location on the flight path, through a second location on the flight path, to a third location on the flight path. The unmanned aerial vehicle 3002 proceeds from an initial location 3004a to a second location 3004b to a third location 3004c. An example base station 202 may be mounted on an example support member 102. The base station may have a UAV management module 510 mounted or otherwise operatively coupled to it. A lateral boundary 3006 is depicted, which may represent a left boundary of a designated airspace, for example. Similarly, a first vertical boundary 3008, which may represent a lower boundary of the designated airspace, and a second vertical boundary 3010, which may represent an upper boundary of the designated airspace, are depicted. In the depicted example, the unmanned aerial vehicle is shown departing from the designated area at a location 3012 (indicated by an "X" in FIG. 30) and following a flight path 3011 to arrive at the second location. At the second location, the unmanned aerial vehicle is at a distance 3016 from the designated area (for instance, a distance 3016 outside of the lateral boundary 3006 of the designated area). In the depicted example, the unmanned aerial vehicle is shown returning to the designated area at a location 3014 (indicated by an "X" in FIG. 30) and following a flight path 3013 to arrive at the third location. The flight path (as well as flight information preceding the first location and following the third location) may be captured or recorded by one or more cameras of the module UAV management module (or the base station), as described herein. The UAV management module (or the base station) may analyze the captured video.

Figure 31:
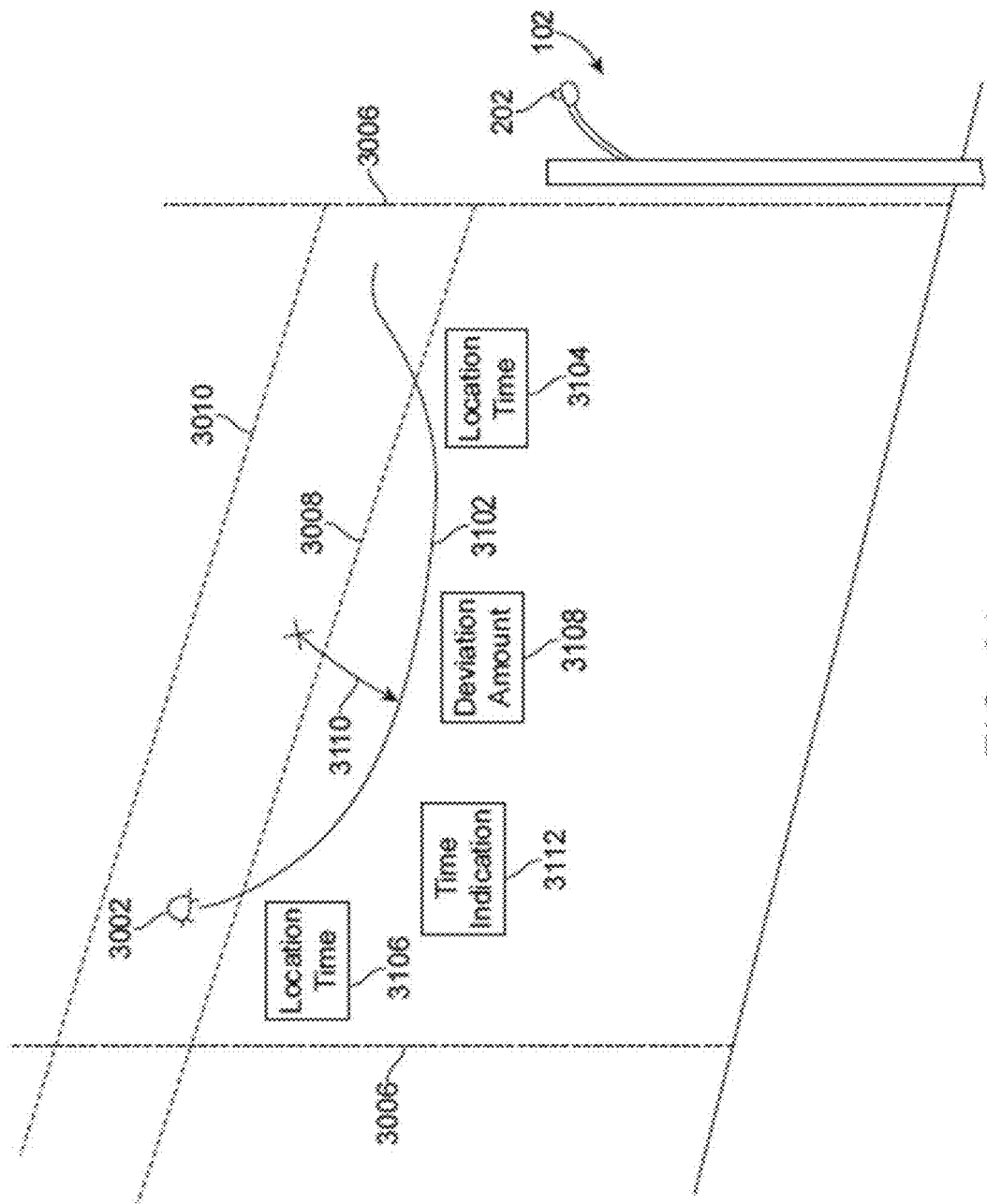
FIG. 31 is a view of a screen capture of a video that can be provided by a UAV management module.

FIG. 31 is a view of a screen capture of a video that can be provided by a UAV management module. The video may include the captured footage of the unmanned aerial vehicle showing the flight path of the unmanned aerial vehicle. The video may also show information derived from analysis of the video and added to the video to augment the video and provide additional information. For example, a trajectory or path 3102 may be displayed, so that even after the unmanned aerial vehicle reaches the third location, the trajectory or path may remain displayed for a period of time in the augmented video provided by the UAV management module (or base station). The video may further display first information 3104, which may include one or more of a location where the unmanned aerial vehicle departed from the designated area and a time at which the departure occurred. The video may further display second information 3106, which may include one or more of a location where the unmanned aerial vehicle returned to the designated area and a time at which the return occurred. The video may further display third information 3108 and an indicator 3110, which may include a maximum deviation distance that the unmanned aerial vehicle strayed from the designated area, for example, and a graphical indication of the distance. The video may further include fourth information 3112, which may include an amount of time that the unmanned aerial vehicle spent outside of the designated area. Indications of the various boundaries 3006, 3008, 3010, or other boundaries may also be displayed.

The examples described in relation to FIGS. 30 and 31 relate to an event of a lateral departure from a designated area; however, the UAV management module (or base station) may conduct a similar analysis and provide a similar augmented video for other events including a vertical departure (for instance, above or below an altitude boundary) from a designated area, for entry into a prohibited area, or the like. In some cases, an augmented video that includes trajectories or flight paths of two or more unmanned aerial vehicles may be provided, such as in response to a midair collision of UAVs.

Figure 32:
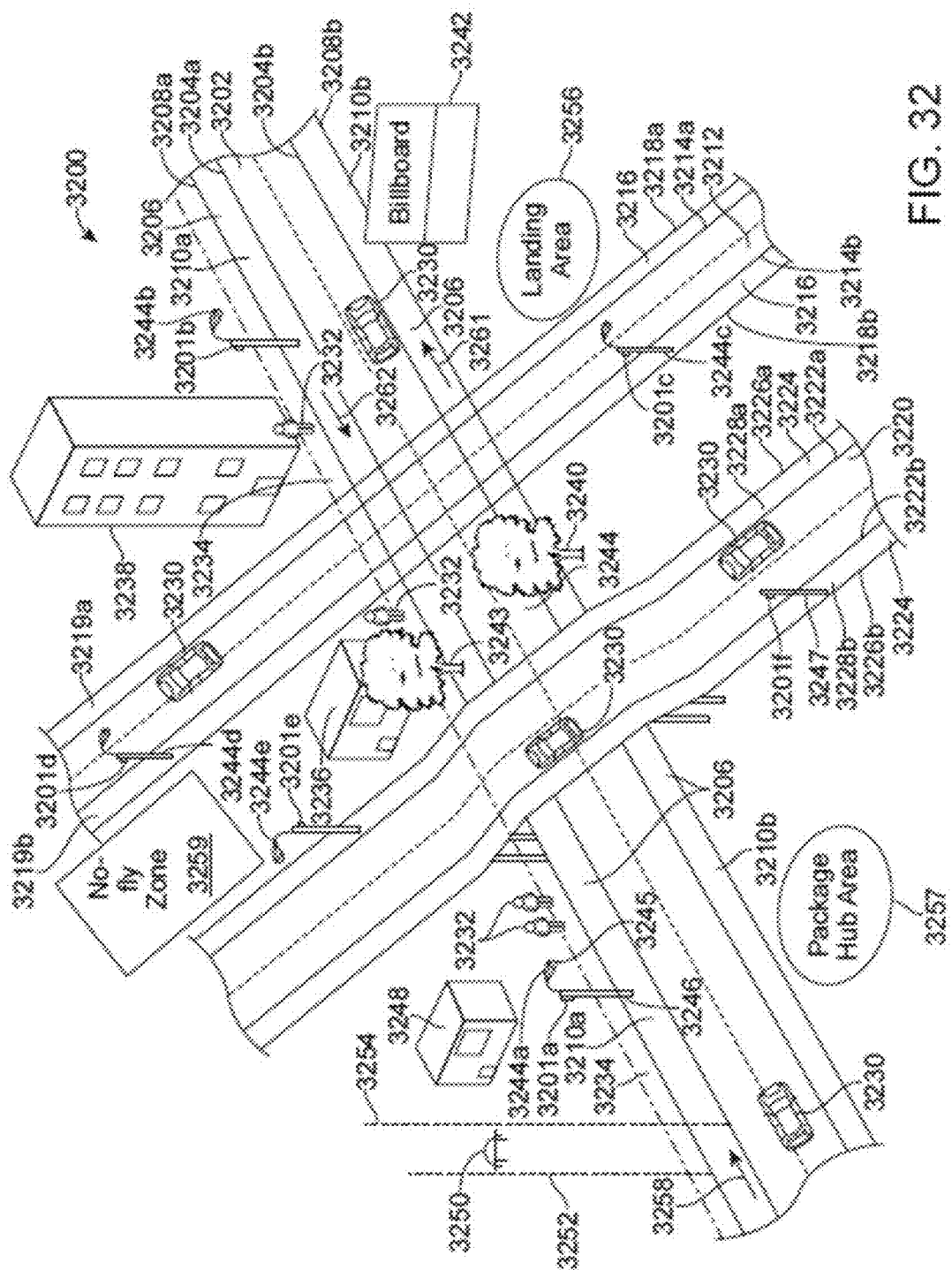
FIG. 32 is a conceptual diagram of an example unmanned aerial vehicle flight environment and an example system for communicating with unmanned aerial vehicles operating within (or outside of) the environment.

FIG. 32 is a conceptual diagram of an example unmanned aerial vehicle flight environment and an example system for communicating with unmanned aerial vehicles operating within (or outside of) the environment. The environment 3200 may represent, without limitation, a portion of a town, city, or metropolitan area, for example. In general, communications stations 3201 (for instance, stations 3201a, 3201b, 3201c, 3201d, 3201e, and 3201f, though any number of communications stations may be present) can be used to communicate with UAVs. The communications stations 3201a, 3201b, 3201c, 3201d, 3201e, and 3201f may be positioned on streetlights, traffic lights, utility poles, towers (such as cell towers), communications station poles, road signs or display monitors, buildings, trees, billboards, bridges, or other structures within a proximity of a roadway or a right-of-way. The communications stations 3201a, 3201b, 3201c, 3201d, 3201e, and 3201f may also provide information to, and receive information from, UAVs; aid UAVs; log, chronicle, or validate routes of UAVs; manage aspects of UAV traffic; alleviate, reduce, or mitigate privacy concerns associated with UAVs; check or validate registration information for UAVs; sense or monitor for UAVs; improve reliability of UAV operations; and/or improve public safety conditions associated with UAV operations.

A roadway 3202 is bounded by a first roadway edge 3204a and a second roadway edge 3204b, and is associated with a right-of-way 3206, which is defined by a first right-of-way boundary 3208a and a second right-of-way boundary 3208b. The right-of-way may be a public right-of-way. The right-of-way may be a legal right-of-way. In the depicted example, the roadway is located within the right-of-way, and is roughly centered between the boundaries of the right-of-way. The roadway may have a width (i.e., the distance between edges 3204a and 3204b) of about 24 feet to about 32 feet for a two-lane roadway, and the right-of-way may have a width (i.e., the distance between boundaries 3208a and 3208b) of about 35 feet to about 60 feet, for example. For simplicity, the roadway is depicted as a two-lane highway or road, but in may have more (such as three, four, five, six, seven, eight, nine, ten, eleven, twelve, or more) or fewer (such as one or zero) lanes, and may be an interstate highway, a federal or state highway, a county road, a city street, or the like. The roadway may have any appropriate width, and the right-of-way may similarly have any appropriate width. The roadway may be contained within right-of-way or one or more portions of the roadway may extend outside of the right-of-way.

The first right-of-way boundary 3208a and the first roadway edge 3204a may define a first right-of-way zone 3210a therebetween, and the second right-of-way boundary 3208b and the second roadway edge 3204b may define a second right-of-way zone 3210b therebetween. As one example, for two-lane roadway, the roadway may have a width of about 32 feet and the right-of-way may have a width of about 60 feet. The roadway may generally be centered within the right-of-way, so that the first right-of-way zone has a width of about 14 feet and the second right-of-way zone has a width of about 14 feet. As described herein, the systems, devices, and methods discussed herein may facilitate UAV traffic in the airspace or airspaces above one or more of the first right-of-way zone and the second right-of-way zone (or above other right-of-ways or right-of-way zones).

The environment may also include a second roadway 3212, bounded by roadway edges 3214a and 3214b, and a second right-of-way 3216, defined by boundaries 3218a and 3218b. Right-of-way zones 3219a and 3219b may be defined between roadway edge 3214a and boundary 3218a, and between roadway edge 3214b and boundary 3218b, respectively. The environment may similarly include a third roadway 3220, bounded by roadway edges 3222a and 3222b, and a third right-of-way 3224, defined by boundaries 3226a and 3226b. Right-of-way zones 3228a and 3228b may be defined between roadway edge 3222a and boundary 3226a, and between roadway edge 3222b and boundary 3226b, respectively. The third roadway may include a bridge 3229.

Several cars or trucks 3230 may be driving on the roadways 3202, 3212, and 3220, and several pedestrians 3232 may be walking on a sidewalk 3234. The pedestrians may be approaching or departing from a retail store 3236 or an office building 3238. A tree 3240 and a billboard 3242 may be present. The tree may be located just outside of the second right-of-way zone 3210b. Due to the location of the tree, some of the branches and leaves 3244 of the tree may protrude into the airspace above right-of-way-zone 3210b. The billboard may be located near the second right-of-way zone 3210b. A second tree 3243 may be located in first right-of-way zone 3210a.

A first lighting assembly 3244a may be located within a proximity of a roadway, or of a right-of-way, or both. The first lighting assembly may be a streetlight, and may include a luminaire 3245 and a pole 3246 (for instance, a light pole). Communications station 3201a may be associated with the lighting assembly 3244a. Communications station 3201a may be associated with light pole 3246 (for instance, attached to the light pole).

The communications station 3201a may communicate with a UAV 3250 operating in the environment. The communications station 3201a may communicate with UAVs 3250 as they fly in the environment, such as when the UAV flies in a vicinity or within communications range of the communications station 3201a. The communications station 3201a may broadcast a first message that includes an identifier associated with the communications station 3201a, with the first lighting assembly 3244a, or with both the communications station 3201a and the first lighting assembly 3244a. The UAV may receive the first message from the communications station 3201a, and may transmit a second message that includes an identifier associated with the UAV, which may be received by the communications station 3201a. In various implementations, the communications station 3201a may transmit a third message, for receipt by the UAV, that includes an indication of an altitude at which the UAV should fly, as described herein.

The UAV may communicate with the first communications station 3201a when it is in a vicinity of the first communications station, and may communicate with a second communications station 3201b when it is in a vicinity of the second communications station. A second lighting assembly 3244b may be also located within a proximity of the roadway 3202 (and the right-of-way 3206), and a second communications station 3201b may be associated with the second lighting assembly 3244b (attached to the lighting assembly 3244b). As the UAV flies in a direction 3258, for example, the UAV may communicate with communications station 3201a while in a vicinity of the communications station 3201a, and may communicate with communications station 3201b while in a vicinity of the communications station 3201b.

A communications handoff of the UAV from the first communications station 3201a to the second communications station 3201b may be executed. For example, as the UAV flies in direction 3258 away from the first communications station 3201a and towards the second communications station 3201b, one or more of communications station 3201a or 3201b may determine that communications station 3201b should assume a larger communications role with the UAV, and/or that communications station 3201a should assume a smaller communications role with the UAV (or both). This determination may occur at or about the time that the UAV reaches a location that is closer to the second communications station 3201b than to the first communications station 3201a. The UAV may communicate with both communications station 3201a and communications station 3201b. One or more of the communications stations 3201a or 3201b may inform the UAV which of the communications stations 3201a or 3201b may be considered a primary communications station for the UAV at a given time. The UAV may make a determination as to which of the communications stations 3201a or 3201b it will communicate with or will primarily communicate with (for instance, based on signal strengths of received signals from one or more of the stations, based on flight route and station locations, based on current or expected UAV location, or other factors). As discussed herein, communications stations can communicate with one another, for example over one or more networks, such as any of the networks discussed herein or other appropriate networks.

A third lighting assembly 3244c may be located within a proximity of roadway 3212 and right-of-way 3216, and a third communications station 3201c may be associated with the lighting assembly 3244c (for instance, attached to the lighting assembly 3244c). A fourth lighting assembly 3244d may be similarly located within a proximity of roadway 3212 and right-of-way 3216, and a fourth communications station 3201d may be associated with the lighting assembly 3244d (attached to the lighting assembly 144d in this example). A fifth lighting assembly 3244e may be located within a proximity of roadway 3220 and right-of-way 3224, and a fifth communications station 3201e may associated with the lighting assembly 3244e (for instance, attached to the lighting assembly 3244e). A pole 3247 may be also located within a proximity of roadway 3220 and right-of-way 3224. A sixth communications station 3201f may be associated with the pole 3247. Pole 3247 may be a utility pole. Pole 3247 may be a communications or communications station pole.

As the UAV proceeds along its flight path, it may communicate with communications stations (for instance, one or more of communications stations 3201a, 3201b, 3201c, 3201d, 3201e, and 32010 along the way. The particular communications station may initiate communications with the UAV. The UAV 150 may initiate communications with the particular communications station.

The communications stations 3201a, 3201b, 3201c, 3201d, 3201e, and/or 3201f may provide altitude information to the UAV. For example, a communications station may provide an indication of altitude to the UAV. The indication of altitude may include an altitude that the UAV is currently flying at. The communications stations 3201a, 3201b, 3201c, 3201d, 3201e, and/or 3201f may include one or more sensors that the communications stations may use to determine an altitude that the UAV is flying at. The communications station 3201a, 3201b, 3201c, 3201d, 3201e, and/or 3201f may determine the altitude based on information that is included in a message received by the communications station from the UAV. For example, the message received from the UAV may include a location identifier (such as one or more GPS coordinates or one or more latitude, longitude, and/or elevation indications) that provides an indication of an altitude of the UAV. The communications stations 3201a, 3201b, 3201c, 3201d, 3201e, and/or 3201f may determine the altitude based on a location indicator of the unmanned aerial vehicle and on a location identifier associated with the lighting assembly or communications station (such as one or more GPS coordinates or elevation or altitude indications for the lighting assembly or communications station).

The indication of an altitude can include an altitude or an altitude range that the UAV should fly at, or an identifier of an air corridor in which the UAV should fly, as described herein. The communications stations 3201a, 3201b, 3201c, 3201d, 3201e, and/or 3201f may provide an indication of an altitude, an altitude range, or of one or more air corridors that the UAV should avoid flying at or in.

Other information that can be provided by the communications stations 3201a, 3201b, 3201c, 3201d, 3201e, and/or 3201f to the UAV may include indications of one or more obstacles that the UAV may encounter during its flight, or that the UAV should avoid during its flight. For example, the communications stations 3201a, 3201b, 3201c, 3201d, 3201e, and/or 3201f may provide the UAV with an indication of the office building 3238 or of the retail store 3236, of the trees 3240 or 3243, or of the branches 3244 that protrude into the airspace of the right-of-way 3210b, of the billboard 3242, of the bridge 3229, of utility poles or power lines, traffic lights, construction equipment (such as large cranes), mountains or hills, or of other obstacles or impediments that the UAV should avoid during its flight. In some examples, the indications of obstacles may include a location identifier (such as one or more GPS coordinates or one or more latitude and longitude indications or latitude, longitude, an elevation indications) associated with the corresponding obstacle.

The communications stations 3201a, 3201b, 3201c, 3201d, 3201e, and/or 3201f may provide an indication of a landing area 3256 (for instance, an emergency landing area or safe landing area) where it may be safe for the UAV to land should the UAV need to make an unscheduled landing. The indication of the landing area may include a location identifier (such as one or more GPS coordinates or one or more latitude and longitude or latitude, longitude, and elevation indications) associated with the landing area. The indication of the landing area may include directions to the landing area based on a current location or position of the UAV. The landing area may include one or more charging stations, and a UAV may use one of the charging stations to recharge one or more batteries of the UAV. In some examples, the landing area or a portion of the landing area may overlap a portion of a right-of-way (for instance, right of way 3206) or may overlap a portion of a right-of-way zone (for instance, zone 3210b).

The communications stations may provide an indication of a package hub area 3257, which may correspond to a package pick-up or drop-off location or area. For example, when the UAV is used to deliver packages, the communications stations 3201a, 3201b, 3201c, 3201d, 3201e, and/or 3201f may provide an indication of a package hub area 3257 where one or more retailers may drop off merchandise or packages to be delivered by a delivery service or company that utilizes UAVs to deliver the merchandise or packages.

The indication provided by the communications stations may include a location identifier (such as one or more GPS coordinates or one or more latitude and longitude or latitude, longitude, and elevation indications) for the package hub area. The indication may include directions to the package hub area based on a current location or position of the UAV. The package hub area may include one or more warehouses (not shown in FIG. 32). In some examples, a single retailer may use the package hub area to stage package delivery; in other cases, several retailers may use the package hub area to stage package delivery. The package hub area may include one or more charging stations, and a UAV may use one of the charging stations to recharge one or more batteries of the UAV. The package hub area or a portion of the package hub area may overlap a portion of a right-of-way (such as right of way 3206) or may overlap a portion of a right-of-way zone (such as zone 3210b).

In some cases, UAVs may fly directly from point-to-point (such as directly from a warehouse to a residence) without regard for right-of-ways or right-of-way zones, or with only partial regard for right-of-ways or right-of-way zones, and in such cases the communications stations discussed herein may communicate with the UAVs in similar manners as discussed herein, including providing any of the information discussed herein to the UAV or receiving any of the information discussed herein from the UAV, without limitation.

The communications station 3201a, 3201b, 3201c, 3201d, 3201e, and/or 3201f may provide an indication of weather to the UAV. For example, the communications stations may provide a localized (such as in the area of the communications stations or the UAV) indication of wind speed and/or wind direction, which the UAV may use to make navigational corrections. The communications stations 3201a, 3201b, 3201c, 3201d, 3201e, and/or 3201f may provide indications of severe weather warnings or conditions. The communications stations may be equipped with one or more sensors that can sense one or more weather conditions. The communications stations 3201a, 3201b, 3201c, 3201d, 3201e, and/or 3201f may convey the one or more sensed weather conditions to the UAV, such as by a wireless message. The communications stations 3201a, 3201b, 3201c, 3201d, 3201e, and/or 3201f may receive a message (for instance, from a remote weather station or weather service) that includes weather-related information, and the communications stations may transmit a message to the UAV that includes the weather-related information. Examples of weather related information that can be conveyed from the communications stations 3201a, 3201b, 3201c, 3201d, 3201e, and/or 3201f to the UAV can include, without limitation, wind speeds and wind directions, visibility levels, severe weather warnings, indications of lightning, indications of temperature, indications of humidity, and/or indications of hail, sleet, snow, or rain.

The communications stations 3201a, 3201b, 3201c, 3201d, 3201e, and/or 3201f may provide the UAV with an indication of one or more areas to avoid, or one or more no-fly zones where the UAV may not be permitted to fly. A no-fly zone 3259 is depicted in FIG. 32. The no-fly zone may be a permanent no-fly zone, such as an area corresponding to an airport, a high security area (such as the White House, Pentagon, military installation or base, or the like), or areas where UAVs may be unwelcome (such as near schools, near some businesses, near an athletic stadium, or near an historic site). The no-fly zone may correspond to an area that is temporarily restricted due to a temporary condition or situation. Examples of such temporary conditions or situations can include, without limitation, natural disasters (such as earthquakes, tornados, hurricanes, typhoons, or floods) or other weather-related conditions, emergencies (such as fires, accidents, police or emergency response situations, and the like), congested areas (such as congested due to UAV traffic, ground-based vehicle traffic, pedestrian traffic or gatherings, or the like), restricted areas, areas for which a threat has been identified or received, or areas associated with a temporary danger or cause for concern. In some cases, the communications stations 3201a, 3201b, 3201c, 3201d, 3201e, and/or 3201f may inform the UAV of an alternate route to bypass the no-fly zone or the one or more areas to avoid. In some examples, if a communications station determines that a UAV is flying in a no-fly zone, is flying within a predetermined distance of a no-fly zone, or appears to be on course towards a no-fly zone, the communications station may transmit a warning message for receipt by the UAV. Upon such a determination, the communications station may transmit a warning message for receipt by one or more of a police or fire department, civil airspace authority, Federal Aviation Administration, a first responder, a security department, an owner of the UAV, or the like. The communications station may store an indication of the UAV (such as an identification or registration number) in a memory location of the communications station. The communications station may issue a ticket or fine to a UAV that violates one or more of the no fly zone restrictions. The communications station may transmit a message that includes information regarding the ticket or fine for receipt by one or more of the offending UAV, by a control center 3248 remote from the communications station, by a police department, or by an owner or operator of the UAV. The communications station may store an indication of the ticket or fine in a memory location of the communications station.

No-fly zones may be imposed during recurring periods of time, such as each day from 11:00 PM to 5:00 AM, or each day from 9:00 PM to 6:00 AM, or each day from 6:00 PM to 7:00 AM. For example, a city or local government may determine that there should not be UAV traffic during certain hours (for instance, during hours in which a "UAV curfew" applies), and may impose a UAV no-fly zone over a portion or all of the city during the appropriate times. The communications stations 3201a, 3201b, 3201c, 3201d, 3201e, and/or 3201f may communicate such no-fly zone information (for instance, one or more of locations, times, and the like) to UAVs.

The communications stations 3201a, 3201b, 3201c, 3201d, 3201e, and/or 3201f may provide an indication of speed to the UAV. For example, a communications station may determine a speed that the UAV is flying at (i.e., a velocity of the UAV), and may provide an indication of the determined speed to the UAV. The communications station may include one or more sensors that may be used to determine a velocity of the UAV. The communications station may determine a velocity of the UAV based on information received from the UAV. For example, if the UAV provides an indication of its location in first and second messages from the UAV to the communications station, the communications station may calculate a distance travelled by the UAV over a period of time (such as the time between messages), and may calculate the velocity by dividing the distance travelled by the period of time. The time period between the two messages may be determined based on when the messages were received by the communications station, and in some examples may be determined based on information included with the messages, such as one or more time stamps.

The communications station 3201a, 3201b, 3201c, 3201d, 3201e, and/or 3201f may provide the UAV with an indication of a speed limit, or of multiple speed limits (such as an upper limit and a lower limit), for an area proximate the communications station or for an area that the UAV is flying in, flying towards, or destined for. The UAV may use this speed information to make appropriate adjustments to comply with the provided information, for example. Speed limits at which UAVs may fly may vary throughout the environment 3200. For example, the first communications station 3201a may communicate one or more first speed limits when communicating with a UAV based on prevailing speed limits for an area associated with the first communications station 3201a (or with the first lighting assembly 3244a), while the second communications station 3201b may communicate one or more second speed limits (which may differ from the first speed limits) when communicating with the UAV based on prevailing speed limits for an area associated with the second communications station 3201b (or with the second lighting assembly 3244b). The communications station 3201a, 3201b, 3201c, 3201d, 3201e, and/or 3201f may issue a speeding ticket or fine to a UAV that violates one or more of the speed limits or restrictions. The communications station may transmit a message that includes information regarding the speeding ticket or fine for receipt by one or more of the offending UAV, by a control center 3248 remote from the communications station, by a police department, or by an owner or operator of the UAV. The communications stations 3201a, 3201b, 3201c, 3201d, 3201e, and/or 3201f may store an indication of the ticket or fine in a memory location of the communications station.

The communications station 3201a, 3201b, 3201c, 3201d, 3201e, and/or 3201f may provide an indication of a noise level or sound level to the UAV. For example, the communications station may provide an indication of a maximum permissible noise or sound level associated with operation of the UAV. The communications station may provide an indication of an emissions level to the UAV. For example, the communications station may provide an indication of a maximum permissible emissions level associated with operation of the UAV (for UAVs that are gas-powered or otherwise emit emissions). The UAV may use this noise or emissions information to make appropriate adjustments to comply with the provided information, for example. Similar to the speed limits discussed herein, noise levels or emissions levels may vary for different areas, and different communications stations may communicate the levels associated with their particular area or location, for example. A communications station may issue a noise ticket or fine or an emissions ticket or fine to a UAV that violates one or more of the noise or emission limits or restrictions. The communications station may transmit a message that includes information regarding the noise ticket or fine or the emissions ticket or fine for receipt by one or more of the offending UAV, by a control center 3248 remote from the communications station, by a police department, or by an owner or operator of the UAV. The communications station may store an indication of the ticket or fine in a memory location of the communications station.

The communications station 13201a, 3201b, 3201c, 3201d, 3201e, and/or 3201f may log, chronicle, or validate a route of the UAV. For example, the communications stations may store, in a memory location of the communications stations, one or more of an identifier associated with the UAV, an indication that the UAV was in communication with the communications station, or an indication that the UAV flew in a vicinity of the communications station. In some examples, the communications stations may store one or more time stamps or time indications along with one or more of the foregoing to establish the relevant time or times that the UAV was interacting with or in a vicinity of the communications stations. As the UAV flies its route, for example, each of communications station 3201a, 3201b, 3201c, 3201d, 3201e, and/or 3201f along the route may log, chronicle, or record an indication that the UAV was in communication with the communications station, and optionally the time or times at which the communications occurred. In this manner, an unbiased and verifiable record of UAV flight patterns or activity may be collected and stored, which may validate that the UAV flew its intended route. Such records may be used to alleviate privacy concerns, for example, and may permit companies that use UAVs to provide proof that the UAVs operated as expected.

The communications stations 3201a, 3201b, 3201c, 3201d, 3201e, and/or 3201f may transmit a message for receipt by a control center 3248 remote from the lighting assembly 3244 or communications station. The message may include the identifier associated with the UAV, and optionally the time stamp. The control center may aggregate such messages, which may be received by the control center from one or more of communications stations 3201a, 3201b, 3201c, 3201d, 3201e, and/or 3201f (for instance, from all of the communications stations 101 within a city or within a portion of a city, region, neighborhood, or the like). The control center may use the received messages to map flight paths or activities of the corresponding UAVs. A single control center may communicate with all or substantially all of the communications stations within a city or region. In other cases, a city may include multiple control centers. The UAV may store one or more indications of its communications with one or more communications stations in a memory location on the UAV.

One or more of communications stations 3201a, 3201b, 3201c, 3201d, 3201e, and/or 3201f may receive a message with information concerning a UAV and an expected route of the UAV. In some examples, such messages may be received from UAVs, and in other examples such messages may be received from a control center or from a business that operates UAVs. The message may indicate an identifier for the UAV, and a time, time window, or time range during which the UAV is expected to be in a vicinity of, and/or in communication with, the communications station. The communications stations may monitor this time, time window, or time range, and if the UAV fails to communicate with the communications station at the identified time or during the time window or time range, the communications station may transmit one or more messages in response to the failure to communicate. For example, the communications station may transmit a warning message to alert that the UAV has not been in contact with the communications station at the expected time or during the expected time window or range. A communications station may communicate with one or more other communications stations and attempt to locate the unaccounted-for UAV based on communications that may have been established between the one or more other communications stations and the unaccounted-for UAV.

Communications stations 3201a, 3201b, 3201c, 3201d, 3201e, and/or 3201f may determine whether a UAV has a valid or current registration or license. For example, a communications station may request a registration or license identifier from the UAV, and may receive a message from the UAV that includes a registration or license identifier of the UA. The communications stations may compare the received registration or license identifier from the UAV with a list of valid (or in some examples, invalid) registration or license identifiers. The communications stations may store a list of registration or license identifiers in a memory of the communications station, and may compare received registration or license identifiers with identifiers on the stored list. The communications station may determine validity or invalidity of the registration identifier based on the identifier itself or information or a designator or code within the identifier. In any of these or other manners, the communications stations may determine whether the received registration or license identifier is valid or invalid (for instance, expired).

One or more of communications station 3201*a*, 3201*b*, 3201*c*, 3201*d*, 3201*e*, and/or 3201*f*, upon receiving the registration or license identifier from the UAV, may communicate with a control center 3248 remote from the communications station, to authenticate or validate the registration or license identifier of the UAV, or to determine that the registration or license identifier is invalid. For example, the communications stations may transmit a message for receipt by the control center that includes the received registration or license identifier from the UAV. The communications stations may then receive from the control center a message that includes an indication (for instance, valid or invalid) regarding the registration or license identifier from the UAV. The control center may provide a list, and the communications stations may compare the UAV registration or license identifier to the list and make a determination regarding the UAV's compliance.

If the UAV has an invalid registration or license, communications station 3201*a*, 3201*b*, 3201*c*, 3201*d*, 3201*e*, and/or 3201*f* may transmit a message to the UAV informing the UAV that it has an invalid registration or license, for example. In some cases, the communications station may transmit a message for receipt by a communications device at police department (such as at a police station, police vehicle, or with a police officer) or civil airspace authority (or other appropriate authority), to inform that the UAV has invalid registration or license. The communications station may issue a "ticket" or fine due to the expired or invalid registration or license. The communications station may store an indication of the ticket or fine in a memory location of the communications station, may transmit a message for receipt by the UAV or by a police communications unit or civil airspace authority, or may transmit a message for receipt by a control center 3248 or by a command station associated with the UAV (for instance, at a command station for the company that operates the UAV). Such tickets may also be issued by the communications station for violations of speed limits, emissions levels, noise levels, no-fly zones, or for other infractions discussed herein.

One or more of communications station 3201*a*, 3201*b*, 3201*c*, 3201*d*, 3201*e*, and/or 3201*f* may determine that the registration or license is currently valid, but that it will be expiring soon. In such cases, the communications station may transmit a message for receipt by the UAV (or by a command station associated with the UAV) to inform the UAV that its registration or license will be expiring soon. Such a message may include the date of expiration, for example.

The techniques, systems, and devices discussed herein may be used to promote, direct, or enforce UAV traffic management features, such as requiring, advising, or providing information to assist UAVs to fly within particular airspaces. As one example, a communications station may require, advise, or provide information to a UAV to assist that the UAV flies in one or more particular air corridors. The air corridor may refer to an airspace generally bounded laterally or horizontally (such as an airspace bounded to the left and to the right), and in some examples also bounded vertically (such as an airspace that includes a lower boundary, an upper boundary, or both lower and upper boundaries).

One or more of communications stations 3201*a*, 3201*b*, 3201*c*, 3201*d*, 3201*e*, and/or 3201*f* may provide a UAV with information that instructs the UAV to fly within one or more air corridors located above one or more of the right-of-way zones (such as zones 3210*a*, 3210*b*, 3219*a*, 3219*b*, 3228*a*, or 3228*b*) described herein. Such air corridors may be bounded or defined, to the left or the right, by a boundary of a right-of-way or by an edge of a roadway (or by the airspace directly above the boundary or edge), for example, or in some cases may be bounded or defined by a predetermined lateral extension applied to a boundary of a right-of-way or an edge of a roadway (for instance, 2 feet, 5 feet, 10 feet, 15 feet, 20 feet, or another appropriate lateral extension).

One or more of communications station 3201*a*, 3201*b*, 3201*c*, 3201*d*, 3201*e*, and/or 3201*f* may provide the UAV with location information associated with an air corridor, or with an airspace in which the UAV should fly. For example, the communications station may provide one or more GPS coordinates or other location indicators (such as latitude and longitude information, or latitude, longitude, and elevation information) associated with one or more corridors (for instance, corresponding to a left or right boundary of the corridor, or corresponding to an upper or lower boundary of the corridor, or one or more combinations of the foregoing).

One or more of communications stations 3201*a*, 3201*b*, 3201*c*, 3201*d*, 3201*e*, and/or 3201*f* may provide the UAV with positional information regarding a position or location of the UAV, or regarding a position or location of the UAV with respect to an air corridor, to an air corridor boundary, to a right-of-way boundary, or to an airspace in which the UAV should fly. For example, the communications station may determine a position or location of the UAV (for instance, based on one or more sensor readings from one or more sensors of the communications station, or based on information provided by the UAV in a message), and may determine that the UAV is not flying where it should be flying (such as outside of a particular air corridor or airspace in which the UAV should be flying).

One or more of communications stations 3201*a*, 3201*b*, 3201*c*, 3201*d*, 3201*e*, and/or 3201*f* may send a message to the UAV informing the UAV that the UAV is not flying in the particular air corridor or airspace in which the UAV should be flying. The communications station may send a message to the UAV that includes one or more positional or location identifiers, or one or more airspace identifiers. The UAV may use this information to adjust its route so that the UAV may fly in a proper air corridor or airspace. The communications station may send a message to the UAV that includes directions on how the UAV should adjust its route so that the UAV may fly in the proper air corridor or airspace. The communications station may issue a "ticket" or fine when the UAV flies outside of a prescribed area or an area that the UAV should be flying in (for instance, if the UAV is flying at the wrong altitude, in an incorrect altitude range, or in an incorrect air corridor). The communications station may store an indication of the ticket or fine in a memory location of the communications station, may transmit a message for receipt by the UAV or by a police communications unit, civil airspace authority unit, or control center 3248, or may transmit a message for receipt by a command station associated with the UAV (for instance, at a command station for the company that operates the UAV). The communications station may hold, detain, or restrict a UAV from proceeding until it assumes a proper altitude (such within a proper altitude range or air corridor). For example, the communications station may send a message to the UAV that informs the UAV that it may not proceed on its route until the UAV begins to fly at a proper altitude, altitude range, or within a proper air corridor. If and when the UAV complies, the communications station may release its hold on the UAV (for instance, by sending a message to the UAV that informs the UAV it may proceed), and the UAV may proceed on its route.

Referring again to FIG. 32, the UAV may be located in an airspace associated with the right-of-way 3206. In particular, the UAV may be flying in an airspace bounded laterally by the right-of-way boundaries 3208a and 3208b (for instance, by a vertical extension of the boundaries 3208a and 3208b). In the depicted example, the UAV is additionally located in an airspace associated with the right-of-way zone 3210a, and is flying in an airspace bounded laterally by the right-of-way boundary 3208a and the roadway edge 3204a (for instance, bounded by vertical extensions 3252 and 3254, respectively, of the boundary 3208a and the roadway edge 3204a).

The air corridors may further be bounded or defined, from above and below, by appropriate altitude levels, such as a predetermined minimum altitude level and a predetermined maximum altitude level. Example upper and lower altitude boundaries for the air corridors may be, for example: a first corridor with a lower altitude boundary of 100 feet above ground level (AGL) and an upper altitude boundary of 150 feet AGL; a second corridor with a lower altitude boundary of 150 feet AGL and an upper altitude boundary of 200 feet AGL; a third corridor with a lower altitude boundary of 200 feet AGL and an upper altitude boundary of 250 feet AGL; a fourth corridor with a lower altitude boundary of 250 feet AGL and an upper altitude boundary of 300 feet AGL; a fifth corridor with a lower altitude boundary of 300 feet. AGL and an upper altitude boundary of 350 feet AGL; and a sixth corridor with a lower altitude boundary of 350 feet AGL and an upper altitude boundary of 400 feet AGL, where each of the first through sixth corridors are bounded on the left by an airspace above right-of-way boundary 3208a and on the right by an airspace above roadway edge 3204a (or alternatively by an airspace above right-of-way boundary 3208b).

In some cases, a single air corridor may be defined above a right-of-way zone (for instance, above zone 3210a, 3210b, 3219a, 3219b, 3228a, or 3228b), having upper and lower boundary 400 feet and 100 feet, respectively. One or more of the air corridors (such as the first, second, and third corridors) may be reserved for UAV traffic in a first direction, and one or more of the air corridors (such as the fourth, fifth, and sixth corridors) may be reserved for UAV traffic in a second direction (for instance, in a direction opposite of the first direction). As another example, the first, third, and fifth corridors may be reserved for UAV traffic in a first direction, and the second, fourth, and sixth corridors may be reserved for UAV traffic in a second direction (for instance, in a direction opposite of the first direction).

One or more of communications stations 3201a, 3201b, 3201c, 3201d, 3201e, and/or 3201f may direct traffic or provide traffic management information such that all or substantially all UAV traffic in an airspace above a right-of-way zone travels in the same direction. The communications stations may direct traffic or provide traffic management information such that all or substantially all UAV traffic in an airspace associated with a right-of-way zone flows in a direction consistent with vehicular traffic near the right-of-way zone. For example, the communications stations may direct traffic or provide traffic management information such that UAV traffic in a first direction 3261 is confined to the airspace above right-of-way zone 3210b, and that UAV traffic in a second (opposite) direction 3262 is confined to the airspace above right-of-way zone 3210a. Such UAV traffic in the directions 3261 and 3262 may be consistent with the vehicular traffic in the traffic lanes of roadway 3202 nearest the respective right-of-way zones 3210a and 3210b.

As described herein, a given communications station may be in communication with several UAVs at a given time or during a given window of time. For example, first communications station 3201a may maintain contact or communications with each of the UAVs within a proximity of the communications station 3201a, within a predetermined distance from the communications station 3201a, within communications range of the communications station 3201a, or for which the communications station 3201a is the station nearest the UAV's location at a given time. As such, the communications station 3201a may maintain or have visibility to the location or position of each of the UAVs that the communications station 3201a is in contact or in communication with at a given time or during a given window of time.

Communications station 3201a may determine that a first UAV is too close to a second UAV (such as within a predetermined distance of the second UAV, or vice versa), and may send a warning message to one or both of the first UAV and the second UAV. The communications station 3201a may determine one or more navigational adjustments for one or both of the first UAV and the second UAV, and may communicate the one or more navigational adjustments to the first UAV or the second UAV, or may communicate a first navigational adjustment to the first UAV and a second navigational adjustment to the second UAV. The first UAV, second UAV, or both UAVs may use the one or more navigational adjustments to alter a position or route, for example, to maintain a safe distance between the UAVs and/or avoid a collision between the UAVs. This may reduce collisions between UAVs and improve safety relating to UAV operating conditions.

A UAV may request permission from a communications station to fly outside of a designated area (for instance, outside of a prescribed airspace above a right-of-way or outside of a prescribed airspace above a right-of-way zone). For example, the UAV may be delivering a package to a personal residence, and may need to fly outside of a prescribed airspace to make the delivery, as described herein. In delivering the package to a residence, the UAV may temporarily need to fly outside of a right-of-way airspace. The communications station may receive the request, and may grant permission for the UAV to fly outside of the prescribed airspace. The communications station may monitor the UAV to ensure that the UAV returns to the prescribed airspace within a predetermined period of time. In some cases, the UAV may not request permission from the communications station to fly outside of a designated area.

The techniques, systems, and devices discussed herein may instruct, advise, or inform a UAV regarding flying in an airspace above a right-of-way, such as directly above right-of-way 3206, 3216, or 3224, or within a predetermined distance outside of a space directly above right-of-way 3206, 3216, or 3224. The techniques, systems, and devices discussed herein may instruct, advise, or inform a UAV regarding flying in an airspace above one of the right-of-way zones 3210*a*, 3210*b*, 3219*a*, 3219*b*, 3228*a*, or 3228*b*. For example, the UAV may be flying in an airspace directly above one of the right-of-way zones 3210*a*, 3210*b*, 3219*a*, 3219*b*, 3228*a* or 3228*b*, or within a predetermined distance outside of a space directly above one of the right-of-way zones 3210*a*, 3210*b*, 3219*a*, 3219*b*, 3228*a* or 3228*b*, such as a lateral extension to the zone.

In some cases, a plurality of the modular systems may be coupled to a plurality of lighting assemblies to monitor a zone. The plurality of modular systems may be distributed and deployed to monitor the same zone (e.g., intersection of roads, plaza, gate, etc) from different angles thereby monitoring information about every spot in the monitored zone. For instance, each of the modular system may comprise one or more cameras and by positioning the cameras in different locations surround the zone, the field of views of the cameras may intersect at the zone and all the spots in the zone can be monitored. In an example, four cameras may be generally oriented at about 90 degree angles with respect to the adjacent camera, so as to provide 360-degree coverage over a monitored zone or area.

Figure 33:
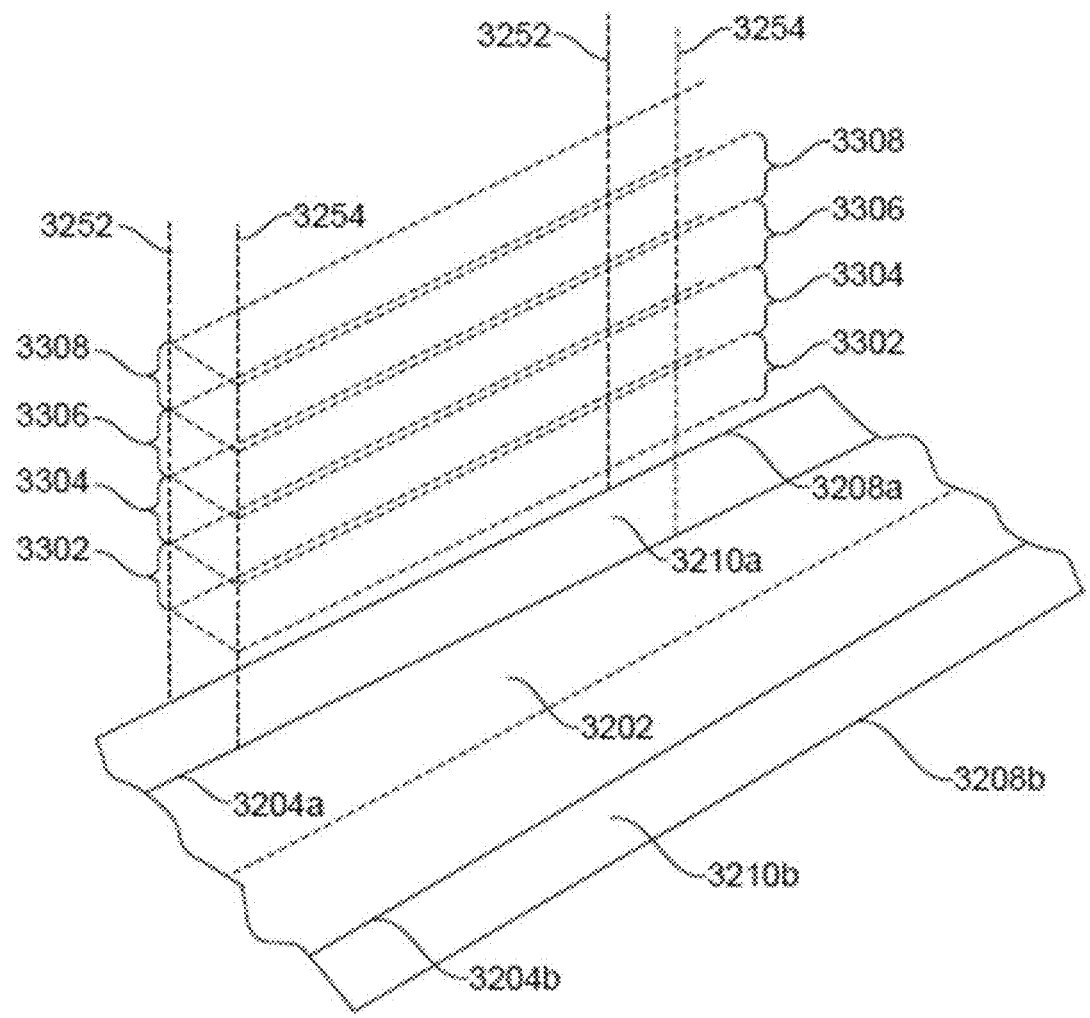
FIG. 33 is a conceptual diagram of example air corridors.

FIG. 33 is a conceptual diagram of example air corridors. Shown in FIG. 33 is the roadway 3202 and right-of-way that includes right-of-way zones 3210*a* and 3210*b* of FIG. 32. Also shown from FIG. 32 are the vertical extensions 3252 and 3254, respectively, of the right-of-way boundary 3208*a* and the roadway edge 3204*a*. A first air corridor 3303, located above right-of-way zone 3210*a* may be defined to have an example lower boundary altitude (for instance, a predetermined minimum altitude) of 100 feet AGL and an example upper boundary altitude (for instance, a predetermined maximum altitude) of 175 feet AGL; a second air corridor 3304 may located directly above the first air corridor, and may be defined to have an example lower boundary altitude of 175 feet AGL and an example upper boundary altitude of 250 feet AGL; a third air corridor 3306 may be located directly above the second air corridor, and may be defined to have an example lower boundary altitude of 250 feet AGL and an example upper boundary altitude of 325 feet AGL; and a fourth air corridor 3308 may be located directly above the third air corridor, and may be defined to have an example lower boundary altitude of 325 feet AGL and an example upper boundary altitude of 400 feet AGL. For simplicity, air corridors are depicted only above right-of-way zone 3210*a*, but similar air corridors may also be defined above right-of-way zone 3210*b*, for example. The altitude boundary levels discussed herein are intended to be illustrative, and any appropriate altitude boundaries may be used for the air corridors. Also, while air corridors are described herein as located above right-of-way zones, it will be understood that the air corridors described herein may exist across the entire width of right-of-ways, above roadways, above combinations of the foregoing, above areas outside of right-of-ways, above areas adjacent to right-of-ways (such as areas outside of or included in a lateral extension of a right-of-way), above areas detached from a right-of-way, or above any appropriate area.

One or more of communications station 3201*a*, 3201*b*, 3201*c*, 3201*d*, 3201*e*, and/or 3201*f* may transmit a message for receipt by the UAV that includes an altitude at which the UAV should fly. For example, the message may instruct the UAV as to a particular air corridor in which that the UAV should fly. The message may instruct the UAV to fly within an altitude range, for example within the altitude range of 200 feet AGL to 300 feet AGL. The information included in the message from the communications station may include an indicator of a right-of-way or of a right-of-way zone. The information included in the message from the communications station may include an indicator of a direction of travel.

One or more of communications stations 3201*a*, 3201*b*, 3201*c*, 3201*d*, 3201*e*, and/or 3201*f* may make a determination regarding an appropriate air corridor or indicator of right-of-way or right-of-way zone, direction of travel, or altitude range based on local UAV traffic levels in some implementations, or based on one or more other factors including predetermined UAV flight patterns, weather conditions, the style or type of UAV, and others. The communications station may coordinate UAV traffic in an area proximate the communications station in a manner analogous to how an air traffic controller coordinates aircraft traffic in a vicinity of an airport. In some examples, for each UAV that enters an area proximate the communications station or for which the communications station is responsible, the communications station may provide information regarding where the UAV should fly.

By facilitating UAV traffic in airspace above right-of-way zones, safe and predictable operating conditions may be promoted. For example, UAVs generally restricted to flying above right-of-way zones may cause less damage if they lose control and crash within the right-of-way zones, as opposed to crashing on a roadway or in an area frequented by pedestrians. Landing areas, such as landing area 3256 (see FIG. 32), including emergency landing areas or safe landing areas should a UAV need to make an unscheduled landing, may also be communicated to the UAVs, as described herein. Also, by facilitating UAV traffic according to particular air corridors, UAV traffic congestion may be better managed and potential for UAV collisions may be reduced or minimized.

By facilitating or confining UAV traffic to or substantially to airspaces above right-of-ways or right-of-way zones for all or for a portion of a UAV's flight route, privacy concerns relating to UAVs may be reduced or alleviated. For example, by restricting UAVs to generally fly in airspaces above such right-of-ways or above such right-of-way zones, the public may be less concerned about privacy invasion, intrusive surveillance, or potential for nuisance that may be caused by UAVs flying unregulated or without restriction regarding where the UAV may fly in relation to private residences or private property. It will be understood that, in general, for UAV flight routes, such as for UAVs making deliveries of packages to private residences or to businesses, or picking up or dropping off packages from package hub areas, or for other reasons, that the UAVs may have to fly above areas not associated with right-of-ways during a portion of the UAV's flight route.

One or more of communications station 3201*a*, 3201*b*, 3201*c*, 3201*d*, 3201*e*, and/or 3201*f* may operate as a UAV toll station. For example, a communications station may assess a toll on UAVs that fly within a particular airspace, such as within a particular air corridor. The communications stations may store an indication of an identifier associated with the UAV, and optionally an indication of the toll, in a memory location of the communications station. The communications station may transmit a message that includes information regarding the toll for receipt by one or more of the UAV, by the control center 3248 remote from the communications station, or by an owner or operator of the UAV.

One or more of the air corridors may be an "express" corridor. For example, an owner or operator of a UAV may purchase a license or pass that may permit the UAV to fly in the designated express corridor, and the communications station may limit access to the express corridor to only those UAVs that have the license or pass to operate in the express corridor. If one or more communications stations determine that a UAV is flying in an express corridor without a license or pass that entitles the UAV to fly in the express corridor, the communications station may issue a ticket or fine in a manner similar to those discussed herein with reference to other types of tickets or fines.

FIGS. 34A-C show conceptual diagrams of example communication styles that an example communications station can use to communicate with an example UAV.

FIG. 34A shows a communications station associated with a lighting assembly in communication with a UAV via a wireless communication link. The communications station 3402 may be associated with a first lighting assembly 3400*a*. The communications station may communicate with a UAV 3404 via a direct wireless communication link 3406. The direct wireless communication link may include, without limitation, a Bluetooth communication link, a near field communication (NFC) link, a machine-to-machine (M2M) communication link, a cellular link, an IEEE802-style (using any of the various IEEE802-based protocols) communication link, an infrared communication link, an ISM band communication link, a radio frequency identification (RFID) communication link, or another appropriate direct wireless communication link.

FIG. 34B shows a communications station associated with a lighting assembly in communication with a UAV via a satellite communication link. The communications station 3402 may be associated with a second lighting assembly 3400*b*. The communications station may communicate with the UAV 3404 via a satellite communication link 3408, where communications between the communications station and the UAV pass through a satellite 3410.

FIG. 34C shows a communications station associated with a lighting assembly in communication with a UAV via a networked communication link. The communications station 3402 may be associated with a third lighting assembly 3400*c*. The communications station may communicate with the UAV 3404 via a networked communication link 3412, where communications between the communications station and the UAV pass through one or more networks 3414 (illustrated by a "cloud" in FIG. 34C). Examples of networks may include one or more cellular or other phone-based networks, the Internet, the "cloud" or one or more networks providing access to the Internet or the cloud, one or more mesh networks, a local or wide-area network, a microwave network, a radio frequency network, or other appropriate datalinks or networks. The one or more networks may include a public network and/or a private network.

In FIGS. 34A-C, the communications station 3402 is depicted near the top of the light pole of the lighting assembly. One advantage to locating the communications stations on lighting assemblies is that the lighting assemblies already are wired for power. Locating the communications station near the top of the light pole may dissuade vandals from attempting to tamper with, gain access to, damage, or misappropriate the communications station. In other examples, the communications station 3402 may be located at other locations on the light pole or on the lighting assembly, such as nearer the luminaire as depicted in FIG. 34C. The communications station may be located on a generally horizontal or arched portion of the lighting assembly.

The lighting assembly 3400*a* may similar to the lighting assemblies 3244 depicted in FIG. 32. FIGS. 3B and 3C show alternative lighting assemblies 3400*b* and 3400*c*, respectively, and in general the communications stations discussed herein may be associated with any type of lighting assembly (such as a streetlight, parking lot light, traffic light, or display monitor). Assembly 3400*b* may include a luminaire 3416*b* that is generally located above the light pole of the assembly 3400*b*. Assembly 3400*c* may include a luminaire 3416*c* generally shaped like a panel, for example. As described herein, the communications stations also or alternatively be located on traffic lights, utility poles, communications station poles, towers (such as cell towers), road signs or display monitors, buildings, trees, billboards, bridges, or other structures within a proximity of a roadway or a right-of-way. In some cases, the communications station may not be located within a proximity of a roadway or a right-of-way.

In some examples, a mobile communications station may be used. For example, a vehicle (such as a car, truck, van, or the like) may be equipped with a communications station as described herein or with the functionality of a communications station as described herein. The mobile communications station may be used to provide mechanical, electrical, or information technology support to a UAV, for example. The mobile communications station may be used to respond to UAVs that land in a safe landing area. The mobile communications station may provide charging services to a UAV that has landed, so that the UAV may recharge its batteries, for example. The mobile communications station can retrieve UAVs that may be inoperable or otherwise unable to fly to their intended destination or return to their base. The mobile communications station may be in communication with one or more of the communications station described herein (such as any of the communications stations 3201*a*, 3201*b*, 3201*c*, 3201*d*, 3201*e*, 3201*f*, 3402, or other communications stations described herein).

Figure 35:
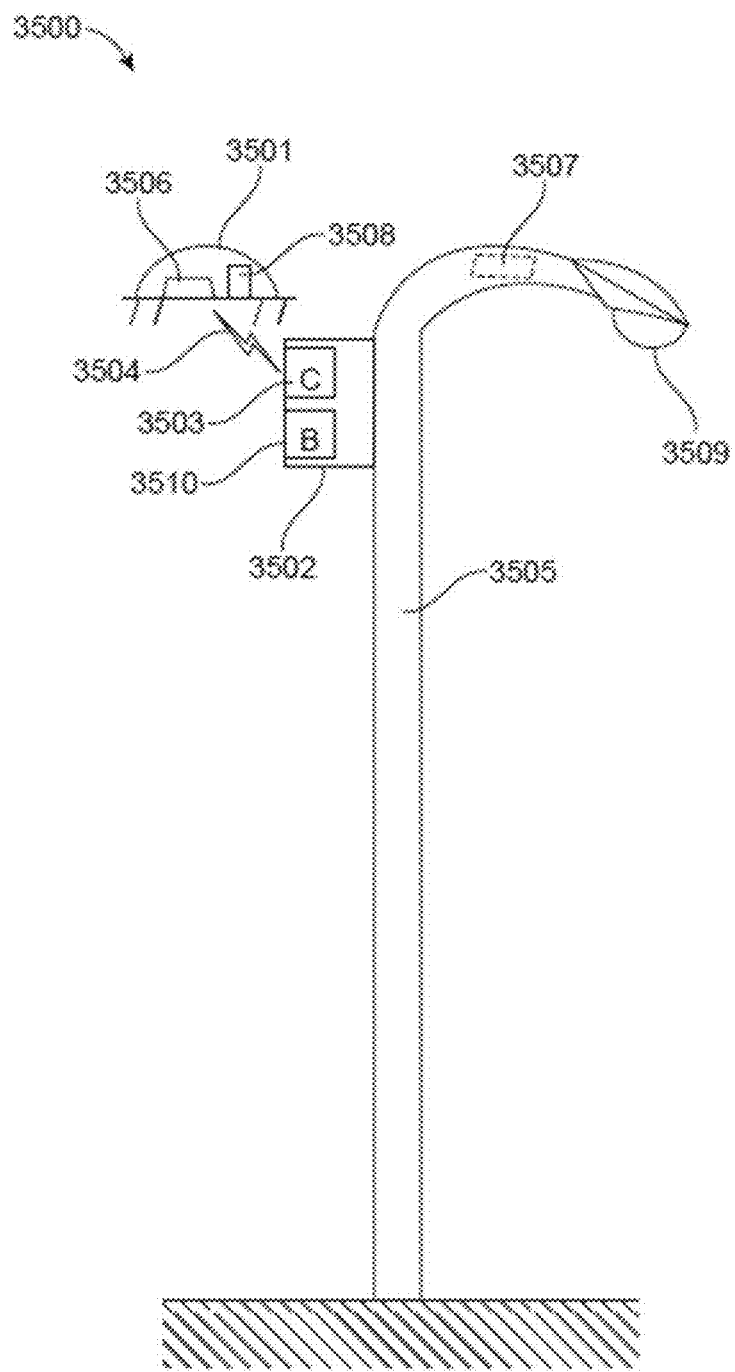
FIG. 35 is a conceptual diagram depicting an example UAV receiving a charging signal from an example communications station.

FIG. 35 is a conceptual diagram depicting an example UAV receiving a charging signal from an example communications station. The UAV 3501 may receive a charging signal from the communications station 3500. The UAV may be hovering relatively close to the communications station. A charging unit 3503 of the communications station may transmit a charging signal 3504 for receipt by a charging module 3506 of the UAV. The charging module of the UAV may use energy received via the charging signal to charge one or more batteries 3508 of the UAV. In this manner, the UAV may wirelessly charge the one or more batteries of the UAV without returning to a base. The UAV may wirelessly charge the one or more batteries of the UAV without landing (i.e., while remaining airborne). The wireless charging may be carried out by near field charging (NFC) technologies or other appropriate charging technologies.

The UAV may hover relatively near the communications station, and may drop or lower a communications or charge cord (not shown), that may make contact with a portion of the communications station. The charging unit may send a charge signal via the charge cord to provide wired charging for the UAV. The UAV may drop a cable or cord that may or may not make physical contact with the communications station, but may be in close proximity to the communications station, and may be used to provide ultra-short range communications (such as messaging communications, wireless charging capability, and the like), which may permit the UAV to hover at a distance (such as several feet, yards, or meters from the communications station) yet permit the cable or cord, or a portion of the cable or cord to get much closer to the communications station (for instance, within a couple of feet, within one foot, within a few inches, within an inch, or physically touching or contacting), to better facilitate wireless or contact-based charging. A releasable magnetic contact may be used to facilitate contact between a portion of the cable or cord and the communications station, for example.

The communications station may be attached to an example lighting assembly 3505 that includes a luminaire 3509. Dashed outline 3507 shows an example of an alternative location on the lighting assembly where the communications station may be located. The communications station may be located at any other appropriate location on the lighting assembly.

The communications station may track a quantity associated with the charging signal, such as an amount of energy provided by the communications station to the UAV, and a billing module 3510 of the communications station may cause a message to be transmitted that includes an indication of an identifier associated with the UAV and the quantity associated with the charging signal. In this fashion, UAV operators may be billed an appropriate amount of money for their energy usage, for example.

The communications station may interrogate the UAV regarding a remaining battery charge for one or more batteries of the UAV. The communications station may interrogate the UAV regarding a fuel level for the UAV. The communications station may assess, based on the response from the UAV, whether the UAV has sufficient battery power or fuel to reach its intended destination. If the communications station determines that the UAV may not have sufficient battery power or fuel to reach its intended destination, the UAV may suggest (for instance, via a transmitted message) that the UAV charge its batteries (for instance, via the communications station as described herein), or may suggest that the UAV land in a safe landing area, where the UAV may refuel or recharge its batteries, or may obtain other assistance. As another example, the communications station may suggest that the UAV land near a location where a mobile communications station is currently located.

A communications station may detect a presence of a UAV in a manner other than by establishing communications with the UAV. For example, the communications stations may include one or more sensors that detect a presence of a UAV. The communications station may include one or more cameras that can detect a UAV, as by comparing a captured image of the UAV or of a portion of the UAV (such as an identification number or other identifier) with a stored image of a UAV or portion of a UAV. After the communications station has detected the presence of the UAV, the communications station may interact with the UAV in one or more of the ways discussed herein.

The communications station may include a first directional microphone that may be directed generally upward (for instance, toward the sky), and a second directional microphone that may be directed generally downward (for instance, toward the ground). The communications station may monitor signals provided by the first microphone and the second microphone, and may subtract the signal of the second microphone from the signal of the first microphone. The communications station may use sound isolation or noise cancellation techniques to isolate the background sound to allow the detection of the UAV. The communications station may compare the resulting signal with a stored signal representation of a UAV to determine a presence of the UAV. After the communications station has detected the presence of the UAV, the communications station may interact with the UAV in one or more of the ways discussed herein. In some examples, a single microphone may be used to detect a presence of a UAV.

A communications station may detect a UAV (for instance, by communicating with the UAV, or as by detection using one or more cameras or microphones) that is unresponsive or uncooperative with the communications station. The communications station may store, in a memory location of the communications station, an indication of the UAV such as an identifier associated with the UAV, one or more photos or videos that the communications station captures of the UAV (for instance, using the one or more cameras discussed herein), or one or more audio recordings that the communications station captures of the UAV (for instance, using one or more microphones). In some examples, the communications station may transmit a message with an indication of the unresponsive or uncooperative UAV, for receipt by a police unit, civil airspace authority unit, Federal Aviation Administration, or control center or station remote from the communications station, for example. The message may include an identifier associated with the UAV, one or more photos or videos of the UAV, and/or one or more audio recordings associated with the UAV, as well as an indication of the communications station and/or with an area associated with the communications station (such as a location identifier or address).

The communications station may detect whether a UAV includes a weapon. For example, the communications station may capture a photo, image or video of the UAV, and compare with one or more stored photos, images, or videos to determine that the UAV includes a weapon and may be a threat. The communications station may transmit a message with an indication of the UAV determined to include a weapon, for receipt by a police unit, civil airspace authority unit, Federal Aviation Administration, or control center or station remote from the communications station, for example. The message may include an identifier associated with the UAV, one or more photos or videos of the UAV, and/or one or more audio recordings associated with the UAV, as well as an indication of the communications station and/or with an area associated with the communications station (such as a location identifier or address).

Figure 36:
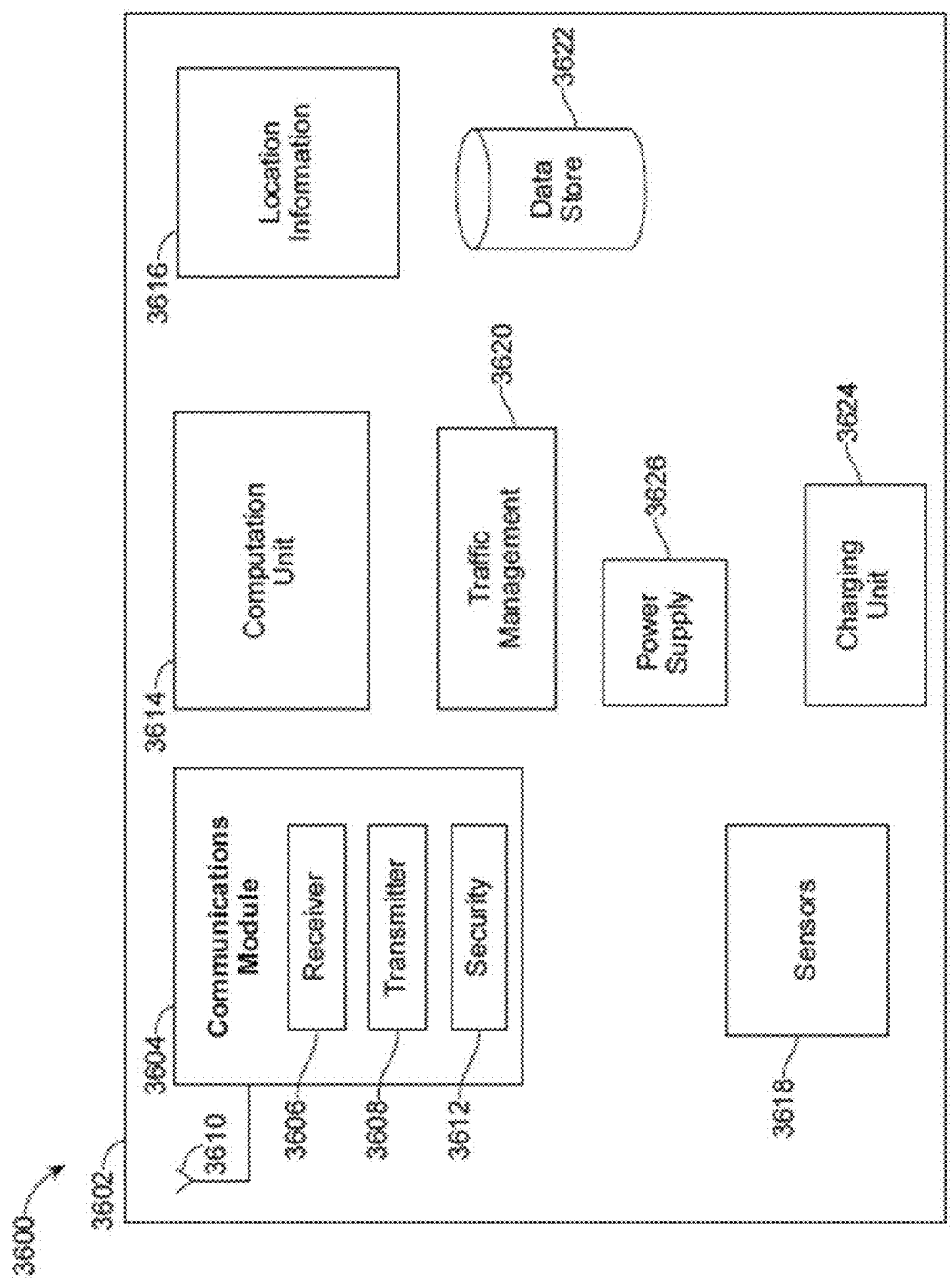
FIG. 36 is a block diagram of an example communications station.

FIG. 36 is a block diagram 3600 of an example communications station. The communications station 3602 may correspond to any of the communications stations described herein. The communications station may include a communications module 3604, which may include a communications receiver 3606 that may receive wireless (or wired) messages and a communications transmitter 3608 that may transmit wireless (or wired) messages. The communications receiver and communications transmitter may receive and transmit messages, respectively, over one or more antennas 3610. The communications module may further include a security component 3612, which may be used to encrypt or encode messages to be sent, to decrypt or decode received messages, and optionally to provide a security question and answer. The security component may provide for secure communications between the communications station and a UAV, as described herein.

The communications station may include a computation unit 3014 that may include one or more processors capable of executing instructions (such as software instructions, firmware instructions, or the like) and perform functions for the communications station. The communications station may include location information 3616. For example, the location information may include location information associated with the communications station, or associated with a lighting assembly (such as a lighting assembly that the communications station 252 is associated with). The location information may include, without limitation, location information associated with one or more roadways or right-of-ways, with one or more right-of-way zones, with one or more air corridors, with one or more obstacles or impediments, with one or more safe landing zones, with one or more delivery hub areas, with one or more no-fly zones, and/or with one or more other communications stations. Examples of location information can include one or more GPS coordinates, one or more of latitude and longitude information or latitude, longitude, and elevation information, one or more Internet Protocol (IP) addresses or other communications-based addresses, or the like.

The communications station may include one or more sensors 3618. For example, the communications station may include one or more sensors that can determine wind velocity and/or wind direction. The communications station may include other weather-related sensors (such as an ambient light sensor, a precipitation sensor, a thermometer, an air quality sensor, or the like). The communications station may include one or more altitude-detecting or altitude-determining sensors that may be used to determine an altitude at which a UAV is flying. The communications station may include one or more position-detecting sensors that may be used to determine a position of a UAV. The communications station may include one or more velocity-detecting sensors that may be used to determine a velocity at which a UAV is flying, for example. The communications station may include one or more cameras or microphones, for example.

The communications station may include a traffic management module 3620. The traffic management module may be used to manage UAV traffic, as described herein. For example, the traffic management module may determine an appropriate altitude that a UAV should fly at, and the communications station may communicate an indication of the altitude to the UAV. The traffic management module may determine an appropriate air corridor that a UAV should fly in, and the communications station may communicate an indication of the air corridor to the UAV. The traffic management module may determine an appropriate altitude range that a UAV should fly within, and the communications station may communicate an indication of the altitude range to the UAV. The traffic management module may determine that a UAV is not flying where it is supposed to be flying, and the communications module may transmit a message as described herein. The traffic management module may determine a route for a UAV, or an alternative route based on prevailing traffic conditions, congestion, in-force restrictions (such as one or more no-fly zones), or the like. The traffic management module may determine that that a first UAV is too close to a second UAV (such as within a predetermined distance of the second UAV, or vice versa), and the communications station may send a warning message to one or both of the first UAV and the second UAV.

The communications station may include a data store 3622 that may be used to store information, such as information received from one or more UAVs, or information that the communications station uses in performing the functions described herein. The communications station may store an identifier associated with a UAV in the data store. The communications station may store an identifier associated with a UAV and a time stamp in the data store. The communications station may store an identifier associated with a UAV in the data store after establishing communications with the UAV. The communications station may store route information associated with a UAV in the data store. The communications station may store registration information (for instance, for particular UAVs or registration lists) in the data store. The communications station may store route information associated with a UAV in the data store. The communications station may store information associated with other communications station in the data store. The communications station may store photos, images, audio files or recordings, and/or other information in the data store. The communications station may store information associated with a police department, fire department, civil airspace authority, Federal Aviation Authority, weather service, location service, control center, delivery hub area, mobile communications station, and/or delivery company in the data store. The communications station may store information associated with a ticket or fine (such as a speeding ticket, noise ticket, emissions ticket, no-fly zone ticket, or the like) in the data store.

The communications station may include a charging unit 3624 that may provide a charging signal that a UAV can use to charge one or more batteries of the UAV. A power source 3626 may provide one or more voltages to the various electronic components of the communications station. The communications station may be housed in an enclosure, which may be made of any appropriate material such as plastic, metal, graphite or other composite material, or other appropriate materials. The enclosure may protect the components of the communications station from the elements, and in some cases from nefarious attempts to gain physical access to the communications station.

The lighting assembly with which the communications station is associated may include a power meter that tracks an amount of power used by the communications station (for instance, over a predetermined period of time). The power meter may be included with the communications station (not shown in FIG. 36). The power meter may be read or interrogated to determine the amount of power used. The power meter may transmit out such information for receipt by a utility company, for example, or by a control center.

A first communications station may communicate with one or more other communications stations. For example, the first communications station may communicate with one or more other communications station within a predetermined distance of the first communication station at periodic intervals (such as once per minute, per two minutes, per five minutes, per ten minutes, per hour, or the like) to confirm that the one or more other communications stations are operational (for instance, by receiving a response message from the one or more other communications stations). In the event that one or more of the other communications stations is not operational or is inoperable (such as because of a failure), the first communications station may assume communications responsibility for the one or more inoperable communications stations. For example, the first communications station may initiate communications with UAVs in a vicinity of the one or more failed communications stations in the manner that the failed communications stations would ordinarily communicate with the UAVs when operating correctly. In this manner, a redundancy may be built into the system, which may provide for more robust performance. The first communications station may store, in one or more memory locations of the first communication station, information regarding the one or more other communications stations within the predetermined distance of the first communication station to permit the first communications station to assume the communications responsibility if needed, for example.

Figure 37:
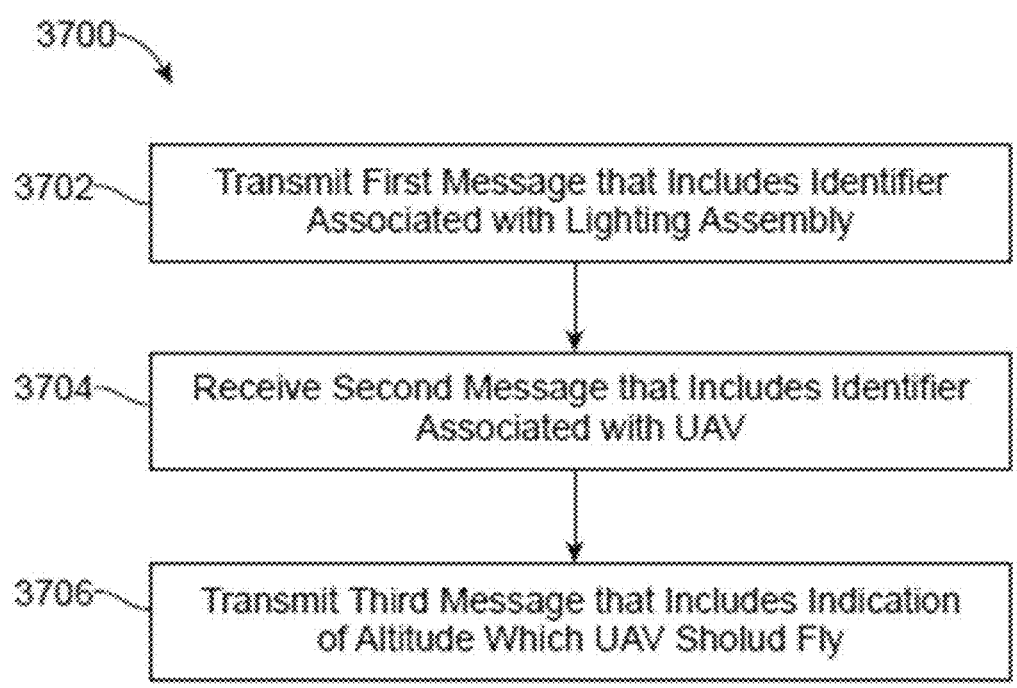
FIG. 37 is a flowchart of an example method that may be used to communicate with an unmanned aerial vehicle.

FIG. 37 is a flowchart of an example method that may be used to communicate with an unmanned aerial vehicle. The method 3700 may include the steps of transmitting a first message including an identifier associated with a lighting assembly, receiving a second message including an identifier associated with a UAV, and transmitting a third message including an indication of an altitude at which a UAV should fly.

At a first step 3702, a first message may be transmitted for receipt by a UAV. The first message may include an identifier associated with a lighting assembly. The first message may be transmitted via a communications transmitter of a lighting assembly. The lighting assembly may be located within a proximity of a roadway. The identifier associated with the lighting assembly may be an identifier of the lighting assembly or of a communications station associated with the lighting assembly. The identifier may be a location indicator, such as one or more GPS coordinates, latitude and longitude information, or latitude, longitude, and elevation information associated with the lighting assembly or with a communications station that is associated with the lighting assembly. The first message may include an indication of weather. The first message may include an indication of speed (such as a speed limit). The first message may include an indication of a noise level or of an emissions level. The first message may include an indication of one or more safe landing zones, or of one or more delivery hub areas. The first message may include an indication of one or more obstacles or impediments. The first message may include an indication of a no-fly zone. In some cases, the first message may include an identifier associated with a support member rather than with a lighting assembly.

A second message may be received, at a second step 3704, from the UAV. The second message may include identifier associated with the UAV. The second message may include location information associated with the UAV (such as one or more GPS coordinates, latitude and longitude information, or latitude, longitude, and elevation information of the UAV). The second message may include route information. The second message may include information descriptive of the UAV, such as the type of UAV, a company that the UAV is associated with, registration information or license information for the UAV, and the like. The second message may include a request for charging energy that the UAV can use to charge one or more batteries of the UAV.

At step 3706, a third message may be transmitted for receipt by the UAV. The third message may include an indication of an altitude at which the UAV should fly. The indication of the altitude at which the UAV should fly may include an indication of an air corridor, where the air corridor is associated with a predetermined minimum altitude and a predetermined maximum altitude. The third message may include an indication of an altitude of the UAV (e.g., an altitude that the UAV is currently flying at). The third message may include one or more altitude levels. For example, the third message may include an altitude range to indicate that the UAV should fly within the altitude range. The third message may include an indication of direction (such as a heading or compass heading). In some examples, the third message may include an indication of velocity, such as a velocity that the UAV is currently flying at or one or more speed limits (such as a maximum speed, a minimum speed, or both). The third message may include one or more of the possible message items discussed herein with reference to the first message at step 3702.

Communications between a communications station and a UAV, or between communications stations, or between a communications station and a control center or station or other entities discussed herein, may include a security feature that may be used to help combat against nefarious intent by unauthorized parties. For example, in addition to message encryption on the transmission side and decryption on the receive side, transmitted messages may include a challenge question. A receiver of the message may then interpret the challenge question and provide an answer to the challenge question. If the receiver provides the correct answer to the challenge question, the receiver may gain effective access to a payload of the message, whereas if the receiver provides an incorrect answer to the challenge question, the receiver may not be able to access the payload of the message.

Figure 38:
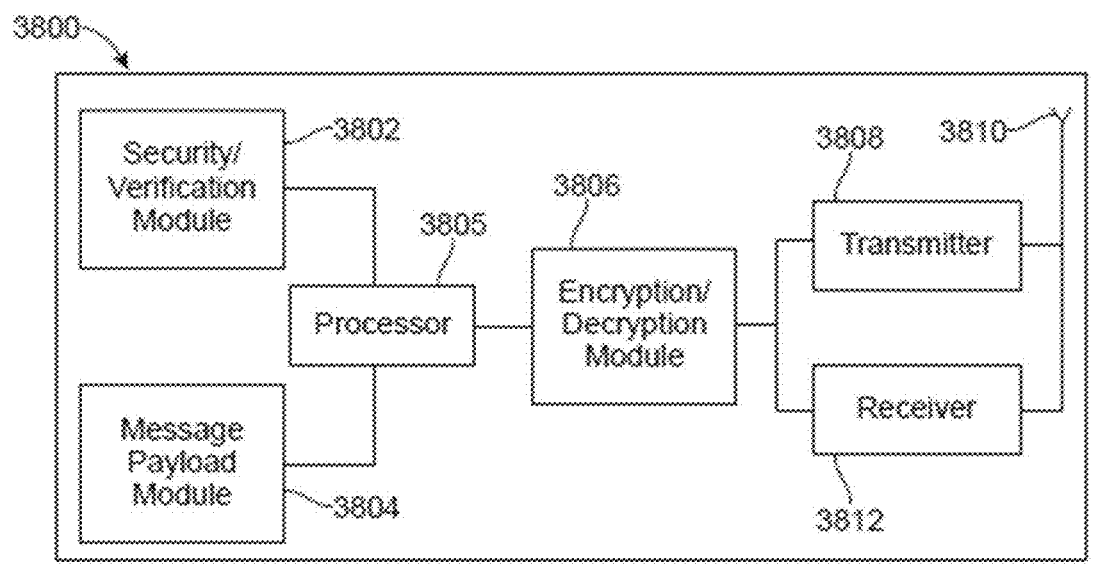
FIG. 38 illustrates an example of equipment that can be used to implement an example heightened security communications protocol.

FIG. 38 illustrates an example of equipment that can be used to implement an example heightened security communications protocol. The system 3800 may include a plurality of module. A security/verification module 3802 may create a challenge question and a corresponding answer to the challenge question, and a message payload module 3804 may create a payload for the message. A processor 3805 may receive the challenge question and answer from the security/verification module and may receive the message payload from the message payload module. The processor may arrange the message payload and forward it to an encryption/decryption module 3806. Some or all of the functions of the message payload module may be performed by the processor. The payload, challenge question, and answer may be encrypted by the encryption/decryption module. The payload, challenge question, and answer may be signed by the encryption/decryption module. Thereafter, a transmitter 3808 may transmit the message wirelessly via one or more antennas 3810. Wired transmission may also be possible. The message may be transmitted over one or more networks, or in one or more manners as described herein.

A message may be wirelessly received via the one or more antennas at a receiver 3812. The receiver may deliver the encrypted message to the encryption/decryption module, where the message is authenticated and the payload may be decrypted. The decrypted payload may then be delivered to the processor, which may parse the payload and pass the payload to the message payload module for parsing. The processor may also deliver the challenge question to the security/verification module. The security/verification module may interpret the challenge question and reply with an answer to the question. The processor may verify that the response from the security/verification module matches the answer included in the message, and may process the payload if the answer is correct. If the answer is incorrect, the processor may not be able to process the payload. This may add an extra layer of security to standard encryption/decryption methods, and may add a specific check on security. An entity in charge of the communications stations may be the only party with access to the security/verification module. Challenge-response security pairs may be one-time-use only, and may be time-limited. The security/verification module may need to provide a correct response within a predetermined period of time; otherwise a timeout may prevent further action.

If a security question is incorrectly answered one or more times (such as at a UAV or at a communications station), or after a predetermined number of times, the communications station may notify police, civil airspace authorities, the Federal Aviation Administration, the control center, or another appropriate authority. Some airspaces may be closed down if it is determined that a threat condition exists. Closing an airspace may also occur when other emergency or threat conditions described herein occur (for instance, when it is determined that a UAV may present a threat or may include a weapon).

Encryption and decryption provided by the encryption/decryption module may be sufficient to alleviate security concerns. However, in some cases the extra security afforded by the challenge question (or security question) and answer functionality may be desired. System components that send messages may be configured to provide payloads and challenge questions and responses. System components that receive messages may be configured to receive and process the payloads and challenge questions. The communications algorithms used by the various components may include detection of attempts by unauthorized parties to jam or hijack the system, as by a type of cyber-attack, or nuisance disturbances designed to trick the system. A single IP address may be used for communication between components of the system. In some cases, two or more IP addresses may be used for communication between components of the system. In addition, the IP address may be changed used for communication between components of the system may be changed periodically every half hour, or every hour, or daily, or in any time increment as chosen to minimize the risk or to prevent the risk of hacking into the system. Heightened security communications may not be needed, and communications may occur without security questions and answers.

Some or all of the techniques discussed herein may be used to supplement existing UAV communications protocols. For example, for UAVs that rely primarily on received GPS signals to navigate, some or all of the techniques discussed herein may provide secondary, supplemental, or redundant information or support to the UAV at times when the UAV is unable to communicate (for instance, transmit, receive, or both) in its primary manner. This may provide a more robust operating environment for UAVs.

Figure 39:
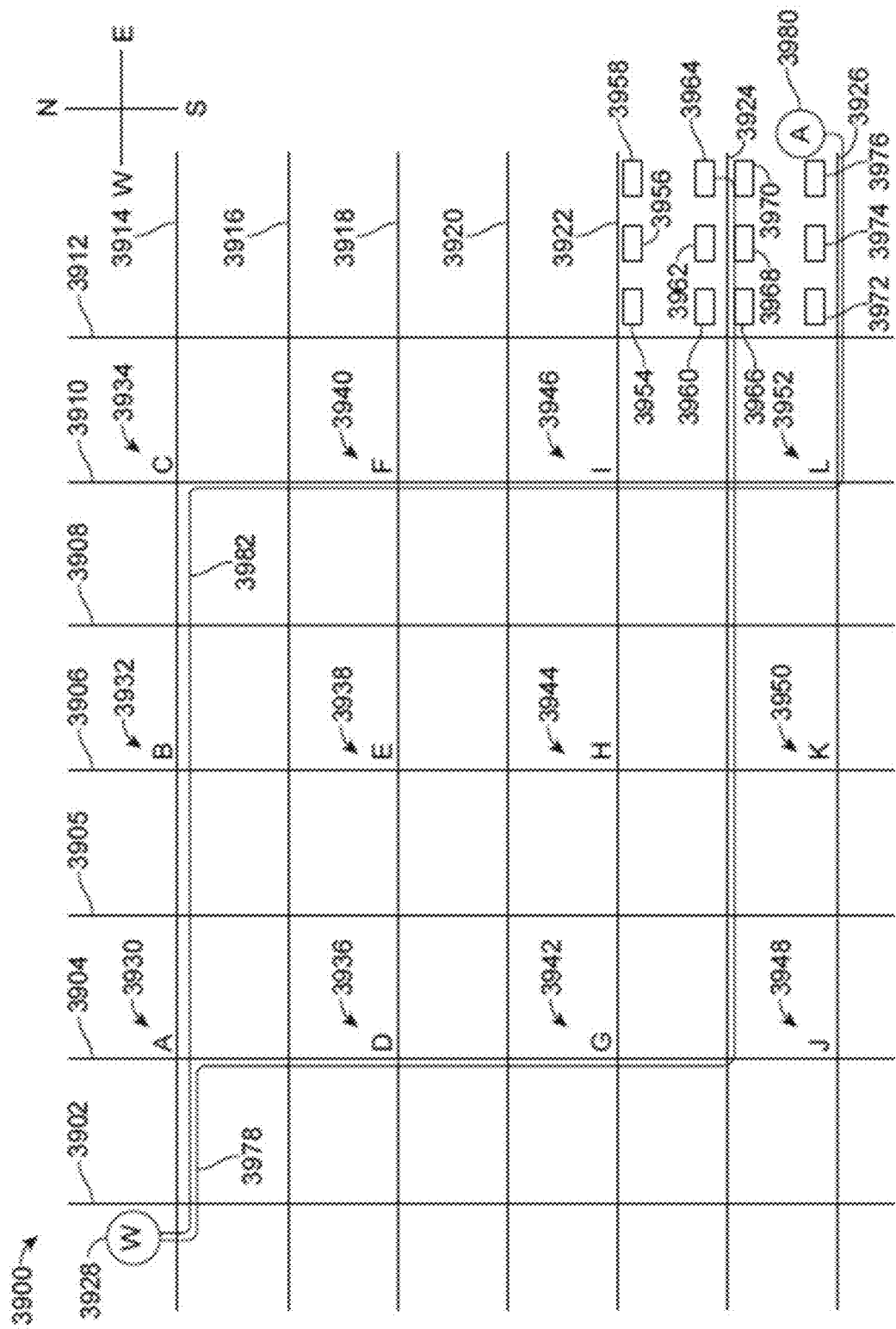
FIG. 39 is a conceptual diagram of an example unmanned aerial vehicle flight environment and an example system for communicating with unmanned aerial vehicles operating within the environment.

FIG. 39 is a conceptual diagram of an example unmanned aerial vehicle flight environment and an example system for communicating with unmanned aerial vehicles operating within the environment. The environment 3900 may represent, without limitation, a portion of a town, city, or metropolitan area. The environment may include a series of streets or roadways, where the streets or roadways may generally be located within rights-of-ways (such as within public rights-of-ways, legal-rights-of-ways, or both). For simplicity, roadways, right-of-ways, and one or more right-of-way zones associated with the roadway and/or the right-of-way are depicted as a single line in FIG. 39. North/south roadways or right-of-ways are depicted and represented by numerals 3902, 3904, 3905, 3906, 3908, 3910, and 3912. Similarly, east/west roadways or right-of-ways are depicted and represented by numerals 3914, 3916, 3918, 3920, 3922, 3924, and 3926. A warehouse 3928 is located near the intersection of roadways or right-of-ways 3902 and 3914, and may represent a retail delivery departure location, for example. UAVs may depart from warehouse 3928 to deliver packages. The warehouse may alternatively represent a delivery service provider or a package hub area, as described herein. Twelve example communications stations (communications station A 3930, communications station B 3932, communications station C 3934, communications station D 3936, communications station E 3938, communications station F 3940, communications station G 3942, communications station H 3944, communications station I 3946, communications station J 3948, communications station K 3950, and communications station L 3952) are depicted in the environment 3900. One or more of the communications stations 3930, 3932, 3934, 3936, 3938, 3940, 3942, 3944, 3946, 3948, 3950, and 3952 may be associated with a lighting assembly, such as a streetlight, a traffic light, a parking lot light, a message board, or the like, and may be attached to the lighting assembly. One or more of the communications stations may be associated with a building, a billboard, a tree, a bridge, a tower, a utility pole, a communications pole, a road sign, or other structures. In some examples, the communications stations 3930, 3932, 3934, 3936, 3938, 3940, 3942, 3944, 3946, 3948, 3950, and 3952 may correspond to any of the communications stations discussed herein. A plurality of residences 3954, 3956, 3958, 3960, 3962, 3964, 3966, 3968, 3970, 3972, 3974, 3976 (for instance, houses, apartments, townhouses, condominiums, or the like) are depicted in the environment.

A UAV may follow a flight route 3978 to deliver a package from the warehouse to the residence 3964. Route 3978 may begin at or near the warehouse, crosses roadway or right-of-way 3914, proceed east until near the intersection of roadway or right-of-way 3904 and roadway or right-of-way 3914, turn south along roadway or right-of-way 3904 and continue to near the intersection of roadway or right-of-way 3904 and roadway or right-of-way 3924, and turn east along roadway or right-of-way 3924, until arriving at residence 3964 (for instance, crossing over roadway or right-of-way 3924), where it may deliver the package.

As described herein, the UAV may generally fly within airspaces associated with one or more of right-of-ways, right-of-way zones, roadways, or with any of the foregoing including lateral extensions to the right-of-ways, right-of-way zones, or roadways. In general, communications stations 3930, 3932, 3934, 3936, 3938, 3940, 3942, 3944, 3946, 3948, 3950, and 3952 may provide to the UAV any of the information described herein. The communications stations 3930, 3932, 3934, 3936, 3938, 3940, 3942, 3944, 3946, 3948, 3950, and 3952 may also collect information from the UAV as described herein. The communications stations 3930, 3932, 3934, 3936, 3938, 3940, 3942, 3944, 3946, 3948, 3950, and 3952 may provide information that instructs the UAV to fly in a particular airspace or air corridor. The communications stations 3930, 3932, 3934, 3936, 3938, 3940, 3942, 3944, 3946, 3948, 3950, and 3952 may also log, chronicle, or record the route 3978 of the UAV, or may record an indication of communications with the UAV or of the UAV's presence in a vicinity of a particular communications station, including an indication of the time or times that such communications occurred.

Communications station A may establish communications with the UAV before the UAV departs from the warehouse, and may initially be the primary communications station for the UAV based on its proximity to the UAV's departure point as the UAV travels along its route. Communications station A may remain the primary communications station for the UAV until the UAV reaches a location at or near the intersection of roadway or right-of-way 3904 and roadway or right-of-way 3916, where communications station D may take over for communications station A as the primary communications station for the UAV. Communications station D may remain the primary communications station for the UAV until the UAV reaches a location at or near the intersection of roadway or right-of-way 3904 and roadway or right-of-way 3920, where communications station G may take over for communications station D as the primary communications station for the UAV.

Communications station G may remain the primary communications station for the UAV until the UAV reaches a location at or near the intersection of roadway or right-of-way 3904 and roadway or right-of-way 3924, where communications station J may take over for communications station G as the primary communications station for the UAV. Alternatively, communications station G may remain the primary communications station for the UAV until the UAV reaches a location at or near the intersection of roadway or right-of-way 3905 and roadway or right-of-way 3924, where communications station K may take over for communications station G as the primary communications station for the UAV. Communications station K may remain the primary communications station for the UAV until the UAV reaches a location at or near the intersection of roadway or right-of-way 3908 and roadway or right-of-way 3924, where communications station L may take over for communications station K as the primary communications station for the UAV. Communications station L may remain the primary communications station for the UAV while the UAV delivers its package to residence 3964.

After making the delivery to the residence, the UAV may return to the warehouse. The UAV may return in the opposite direction along route 3978, for example, and may generally communicate with the communications stations described with reference to route 3978. The UAV may follow a similar route to route 3978, but fly on the opposite sides of the roadways or right-of-ways as compared to the delivery route, so as to be flying in generally the same direction as the nearest ground-based traffic lane. So, for example, on its return flight from residence 3964 to warehouse 3928, the UAV may fly along the north side of roadway or right-of-way 3924, along the east side of roadway or right-of-way 3904, and along the north side of roadway or right-of-way 3914, while generally still following route 3978.

One or more residences may be associated with an aggregate delivery area 3980 (labeled "A" in FIG. 39). For example, to facilitate easier UAV delivery of packages, the residences 3966, 3968, 3970, 3972, 3974, and 3976 may be associated with aggregate delivery area 3980, which may correspond to a location that a UAV may deliver packages for any of the corresponding residences 3966, 3968, 3970, 3972, 3974, and 3976. Residences 3966, 3968, 3970, 3972, 3974, and 3976 may correspond to residences on a particular block or in a particular neighborhood, for example, or within a particular housing development or association, or according to any other appropriate grouping. In other cases, an aggregate delivery area may be used for one or more businesses or retailers, or combinations of residences and businesses or retailers.

In some examples, a UAV may follow a flight route 3982 to deliver a package from the warehouse to the aggregate delivery area 3980. Route 3982 may begin at or near the warehouse, cross roadway or right-of-way 3914, proceed east until near the intersection of roadway or right-of-way 3910 and roadway or right-of-way 3914, turn south along roadway or right-of-way 3910 and continue to near the intersection of roadway or right-of-way 3910 and roadway or right-of-way 3926, and turn east along roadway or right-of-way 3926, until arriving at aggregate delivery area 3980 (for instance, crossing over roadway or right-of-way 3926).

Communications station A may establish communications with the UAV before the UAV departs from the warehouse, and may initially be the primary communications station for the UAV based on its proximity to the UAV's departure point. Communications station A may remain the primary communications station for the UAV until the UAV reaches a location at or near the intersection of roadway or right-of-way 3905 and roadway or right-of-way 3914, where communications station B may take over for communications station A as the primary communications station for the UAV. Communications station B may remain the primary communications station for the UAV until the UAV reaches a location at or near the intersection of roadway or right-of-way 3908 and roadway or right-of-way 3914, where communications station C may take over for communications station B as the primary communications station for the UAV. Communications station C may remain the primary communications station for the UAV until the UAV reaches a location at or near the intersection of roadway or right-of-way 3910 and roadway or right-of-way 3916, where communications station F may take over for communications station C as the primary communications station for the UAV. Communications station F may remain the primary communications station for the UAV until the UAV reaches a location at or near the intersection of roadway or right-of-way 3910 and roadway or right-of-way 3920, where communications station I may take over for communications station F as the primary communications station for the UAV. Communications station I may remain the primary communications station for the UAV until the UAV reaches a location at or near the intersection of roadway or right-of-way 3910 and roadway or right-of-way 3924, where communications station L may take over for communications station I as the primary communications station for the UAV. Communications station L may remain the primary communications station for the UAV while the UAV delivers its package to aggregate delivery area 3980.

One or more of the communications stations 3930, 3932, 3934, 3936, 3938, 3940, 3942, 3944, 3946, 3948, 3950, and 3952 may communicate with one another (for instance, share information), and may communicate UAV traffic information, such as general UAV traffic or congestion levels, UAV traffic or congestion levels associated with a particular air corridor or group of air corridors, UAV traffic or congestion levels associated with a particular right-of-way or right-of-way zone, or UAV traffic or congestion levels associated with a particular area of the environment (such as a particular neighborhood, an area in the vicinity of an event, situation, structure, or the like). A communications station may use this traffic information to determine an appropriate route or route adjustment for a UAV. For example, if UAV traffic is particularly heavy along one or more portions of route 3978, communications station A (or another communications station) may instead suggest that the UAV fly south along roadway or right-of-way 3905, 3906, 3908, 3910, or 3912, rather than along roadway or route 3904 (as depicted in route 3978). The communications station A may communicate this route or route adjustment, or another appropriate route adjustment, to the UAV, for example.

Figure 40:
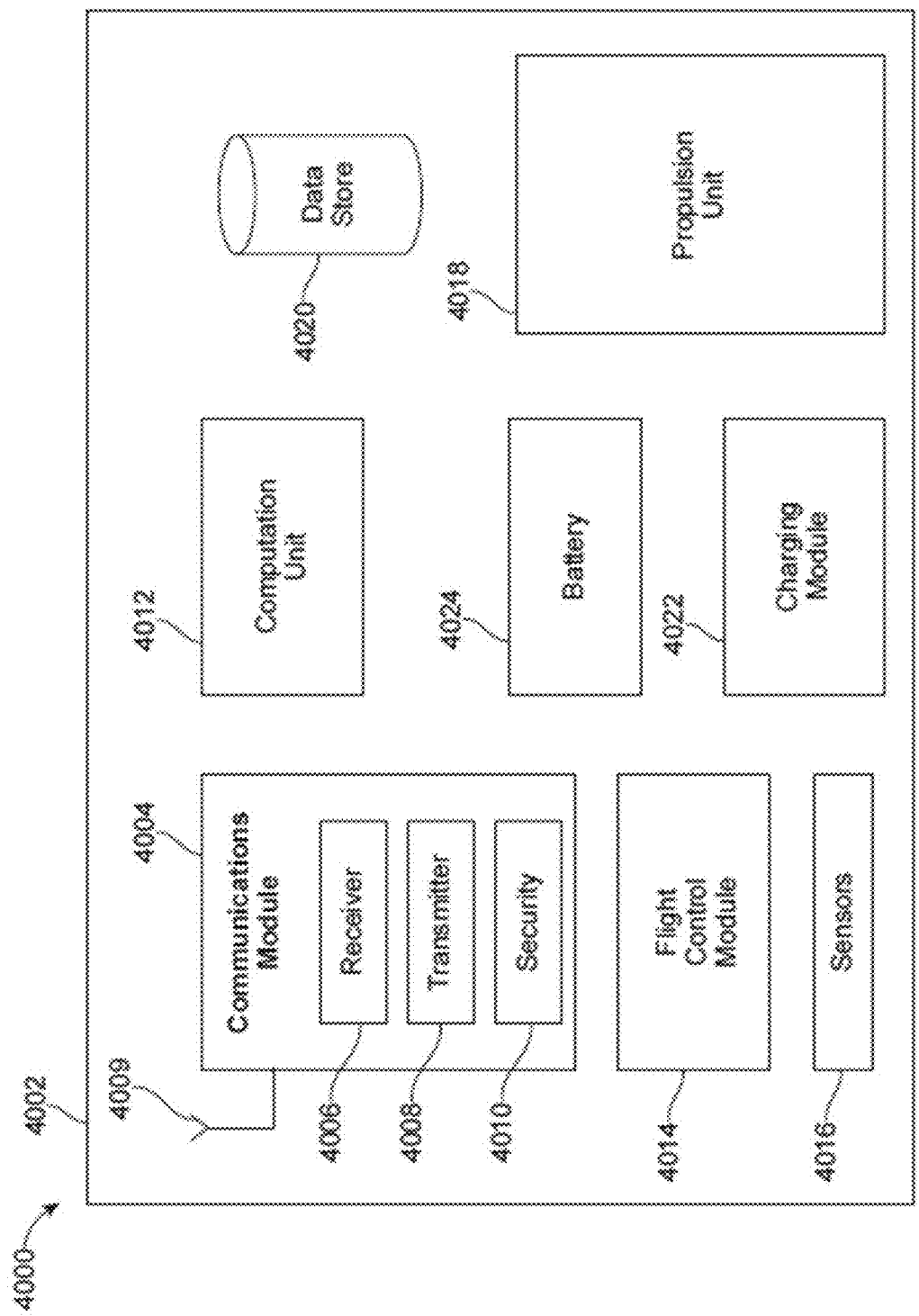
FIG. 40 is a block diagram of an example UAV.

FIG. 40 is a block diagram 4000 of an example UAV. The example UAV 4002 is depicted in a simplified representation, and may represent any of the UAVs discussed herein. The UAV may represent any of various types of UAVs with which the communications stations discussed herein may communicate.

The UAV may include a communications module 4004, which may include a communications receiver 4006 that may receive wireless messages and a communications transmitter 4008 that may transmit wireless messages. The communications receiver and communications transmitter may receive and transmit messages, respectively, over one or more antennas 4009. The communications module may further include a security component 4010, which may be used to encrypt or encode messages to be sent, decrypt or decode received messages, and optionally to provide a security question and answer, to provide for secure communications between a communications station and the UAV, as described herein. In some examples, wired communications can be used.

A computation unit 4012 may include one or more processors that may execute instructions (such as software instructions, firmware instructions, or the like) and perform functions for the UAV. The UAV may include a flight control module 4014 that controls flight operations for the UAV. The flight control module 4014 may control operations relating to takeoff, landing, and in-flight operations. The flight control module 4014 may control navigation operations for the UAV. The flight control module may include navigational instrumentation. The flight control module may respond to navigational commands (for instance, from a communications station such as described herein, from a ground-based control station or system, from a mobile control station or system, or the like), and implement them at the UAV. The UAV may include one or more sensors 4016 that may be used to aid in aspects of operating the UAV. The UAV may include a propulsion unit 4018 that may be used for propelling and providing altitude control and directional control for the UAV.

The UAV may include a data store 4020 that may be used to store information for aspects of UAV operation. Examples of information that may be stored in the data store may include, without limitation, route information, communications station information, registration or license information, communications protocol information, weather information, map-related information, retailer order and delivery information, product information, permission information, and other information.

A charging module 4022 may be used to charge one or more batteries 4024 of the UAV. The charging module may wirelessly receive a charging signal from a communications station, as described herein. The UAV may recharge one or more of its batteries while airborne, as by receiving a charging signal from a communications station described herein. Wired charging may also be used. The one or more batteries may provide propulsion power to the UAV and one or more voltages for operating the electronic components of the UAV. In some examples, the UAV may be powered by gas or by another appropriate fuel, to provide propulsion power.

The UAV may include a parachute (not shown), and a parachute deployment module (not shown). The parachute deployment module of the UAV may determine that the UAV should deploy its parachute, which may assist the UAV in landing. The UAV 502 may receive a message from a communications station (such as a communications station described herein) that instructs the parachute deployment module of the UAV to deploy the parachute of the UAV.

The UAV may include an airbag (not shown), and an airbag deployment module (not shown). The airbag deployment module of the UAV may determine that the UAV should deploy its airbag, which may partially or completely surround the UAV and protect the UAV, and which may assist the UAV in landing. For example, the airbag may protect the UAV or limit damage to the UAV in a crash landing, as well as potentially protecting or minimizing damage or injury to pedestrians, vehicles, or property. The UAV may receive a message from a communications station (such as a communications station described herein) that instructs the airbag deployment module of the UAV to deploy the airbag of the UAV. In some examples, the airbag may be deployed in combination with a deployment of the parachute, as discussed herein.

Various communications protocols may be used between the communications stations discussed herein and a UAV. The communications station may transmit or emit a beacon message periodically (for instance, once per second, once per couple seconds, once per five seconds, once per 10 seconds, once per 15 seconds, once per 20 seconds, once per 25 seconds, once per 30 seconds, once per minute, or the like), and a UAV may receive the beacon message and reply by transmitting a message for receipt by the communications station. The message may be encrypted or unencrypted. The UAV may receive the message, which may include any of the information discussed herein, and may not reply to the communications station.

The UAV may transmit or emit a beacon message periodically (for instance, once per second, once per couple seconds, once per five seconds, once per 10 seconds, once per 15 seconds, once per 20 seconds, once per 25 seconds, once per 30 seconds, once per minute, or the like) and a communications station may receive the beacon message and reply by transmitting a message for receipt by the UAV. The message may be encrypted or unencrypted. In implementations where the UAV periodically transmits a beacon message, the beacon message may include, for example, one or more of a license number for the UAV, an FAA registration number for the FAA, a serial number of the UAV, a make of the UAV, a model of the UAV, a year of manufacture of the UAV, a type of the UAV, a class of the UAV, an owner of the UAV, a pilot of the UAV, an exemption number for the UAV or associated with a flight or route of the UAV, insurance information, task information, permitted use information, route information, destination information, origination information, or other appropriate information. Any of the foregoing types of information may be included in other messages transmitted by the UAV, such as messages after a communication session has already been established with a communications station, for example.

The communications stations or communications devices described herein, and/or the UAVs described herein, may include one or more of the following components: processors, memory (such as random access memory (RAM) and/or other forms of volatile memory), storage devices (such as solid-state hard drive, hard disc drive, and/or other forms of non-volatile memory), high-speed interfaces connecting various components to each other (such as connecting one or more processors to memory and/or to high-speed expansion ports), and/or low speed interfaces connecting various components to each other (such as connecting one or more processors to a low speed bus and/or storage devices). Such components may be interconnected using various busses, and may be mounted across one or more motherboards or circuit boards that are communicatively connected to each other, or in other appropriate manners.

Figure 41:
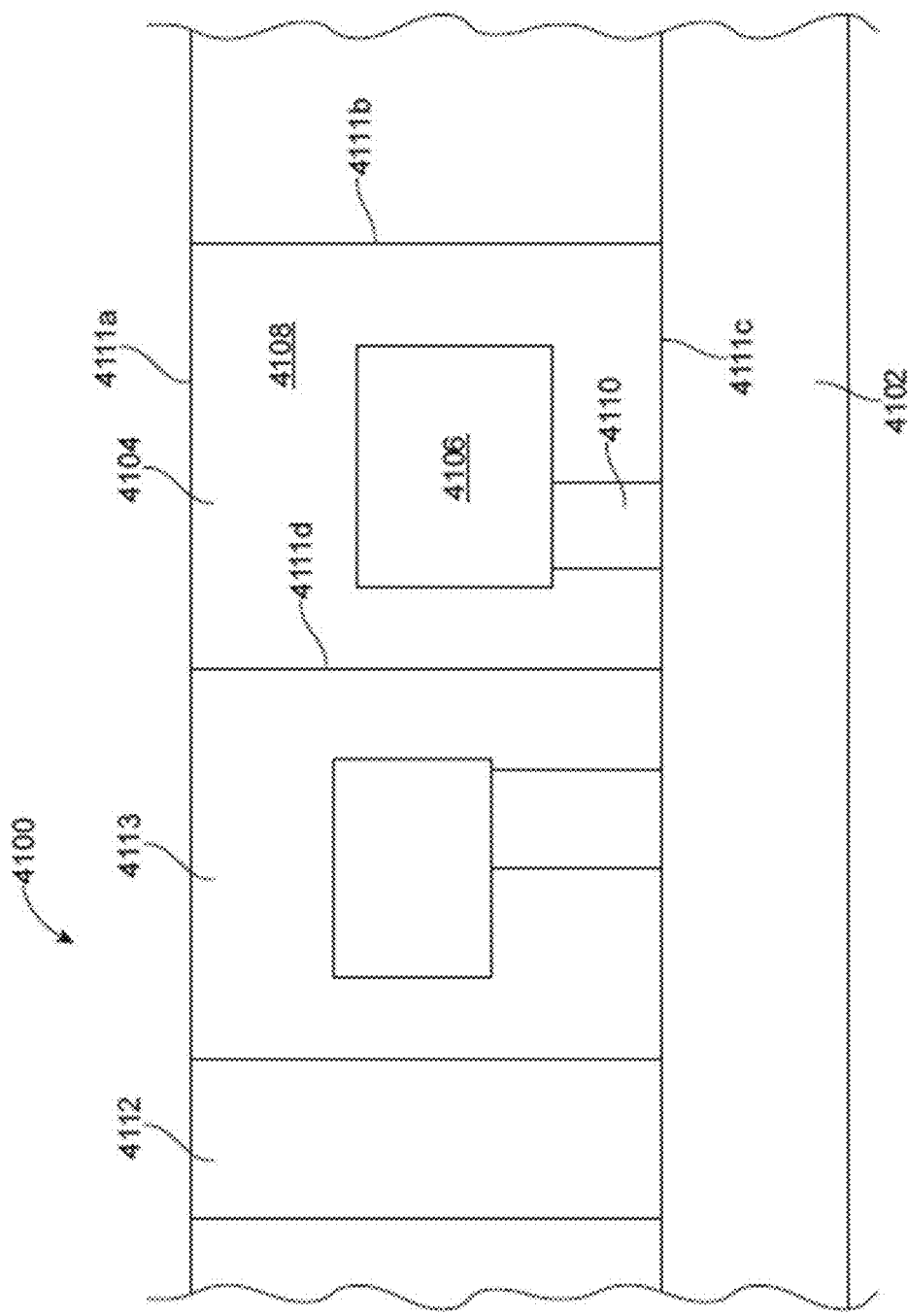
FIG. 41 is a conceptual diagram of an example environment that includes a designated or prescribed airspace and airspace associated with private property.

FIG. 41 is a conceptual diagram of an example environment that includes a designated or prescribed airspace and airspace associated with private property. The example environment 4100 may include a designated or prescribed airspace 4102 and airspace associated with private property 4104 (such as real estate property). Designated or prescribed airspace may correspond to airspace where an unmanned aerial vehicle is generally permitted to fly (such as airspace associated with a right-of-way, airspace associated with a roadway, airspace associated with a traffic corridor, airspace associated with an air corridor, lateral extensions of the foregoing, or another area where an unmanned aerial vehicle is generally permitted to fly). Private property may correspond to a residential lot that includes a residence 4106, a yard 4108, and/or a driveway 4110. Private property is generically depicted to have rectangular shape with property boundaries 4111*a*, 4111*b*, 4111*c*, and 4111*d* in this example, but in other examples private property may have any appropriate size and shape and may be defined by any appropriate number of boundaries. Restricted area 4112 may correspond to an area where drones are restricted from flying according to one or more rules. For instance, restricted area 4112 may be a no-fly zone, as described herein. In some cases, restricted area 4112 may have less restrictive conditions on access than a no-fly zone. Restricted area 4112 may have any appropriate size or shape, and may include buildings, structures, and the like. Restricted area 4112 may be permanent, with one or more restrictions on access that are generally ongoing, and in some examples restricted area 4112 may be temporary, with one or more restrictions on access that are expected to be lifted after a period of time or at a conclusion of an event, occurrence or situation. Public property 4113 may correspond to property (such as, real estate property) owned by a non-private entity, and may include one or more manmade structures in some examples. Examples of public property 4113 may include a city park, state park, national park, a local, state or national government building or structure, or other public properties. Restricted area 4112 may correspond to private property or public property.

An unmanned aerial vehicle may generally be prohibited, absent granted permission, to fly in airspace associated with private property (such as airspace above private property 4104 or above private property 4104 below a predetermined altitude, such as 500 feet AGL, 400 feet AGL, 300 feet AGL, 200 feet AGL, 100 feet AGL, or another appropriate altitude) or airspace of restricted area 4112 or public property 4113. Such restriction on flying by the UAV may be based on local or municipal rules, restrictions, ordinances, or the like, or such restriction on flying by the UAV may be based on state or national rules or restrictions.

Described herein are methods, systems, and devices for managing unmanned aerial vehicle access to private property airspace, public property airspace, or restricted airspace. Described herein further are methods, systems, and devices for registering, establishing, implementing and managing permissions for an unmanned aerial vehicle to enter or exit private property airspace, public property airspace, or restricted airspace, and for registering, establishing, implementing and managing permissions for delivery areas, pickup areas, landing areas, liftoff areas (or combinations of the foregoing) for unmanned aerial vehicles. The examples that follow describe how a private property owner or representative may establish rules for access to airspace above their property, but similarly an authorized user may establish rules for access to airspace above public property 4113 or above restricted area 4112.

A user (such as a property owner) may register unmanned aerial vehicle access rights to property or to airspace associated with a property (such as airspace above real estate property). For example, methods, systems and devices may be provided to permit the owner of private property 4104 to register unmanned aerial vehicle access rights (including delivery, pickup, landing, and/or liftoff rights) to private property 4104 (such as to airspace above private property 4104), or to a portion of private property 4104 that is less than the entire property 4104 (such to airspace above a portion of private property 4104 but not above the entirety of property 4104). In this manner, a user may exercise control regarding whether an unmanned aerial vehicle may be permitted to fly in airspace above the property or a portion of the property. The user may authorize certain unmanned aerial vehicles (such as UAVs associated with one or more delivery companies or businesses) or classes of unmanned aerial vehicles (such as UAVs having a particular type of registration or identifier), or with a particular unmanned aerial vehicle having a unique identifier or license number. The user may indicate a time duration (such as one minute, two minutes, three minutes, five minutes, ten minutes, or the like) that an unmanned aerial vehicle is permitted to occupy airspace above the property or above the access grant area. The user may indicate one or more time periods during a particular day (such as Wednesday, May 4, 2016), during a class of days (such as weekdays, weekends, each Friday, only Mondays and Tuesdays, and the like) or generally (such as every day) when unmanned aerial vehicles may occupy airspace above the property. Alternatively, the user may, indicate periods when UAVs are not permitted to occupy airspace above the property (such as from Tuesday, April 26 to Saturday, April 30 because the owner will be away on vacation during that period). A user may change a registration of one or more access grant areas for a property or area.

A user interface may be presented, and input from a user may be received that specifies an address, such as a property address, or otherwise identifies the property of interest. For example, the owner of property 4104 may provide the corresponding address of the property, or may select the property from a displayed map to specify the address or indicate the property. In response to the receipt of the address or indication of the property, a representation of the property may be provided. For example, a map or depiction of the property (such as property 4104) corresponding to the received address may be displayed. The representation of the property may show adjoining or nearby properties (such as other private properties or public properties).

Figure 42:
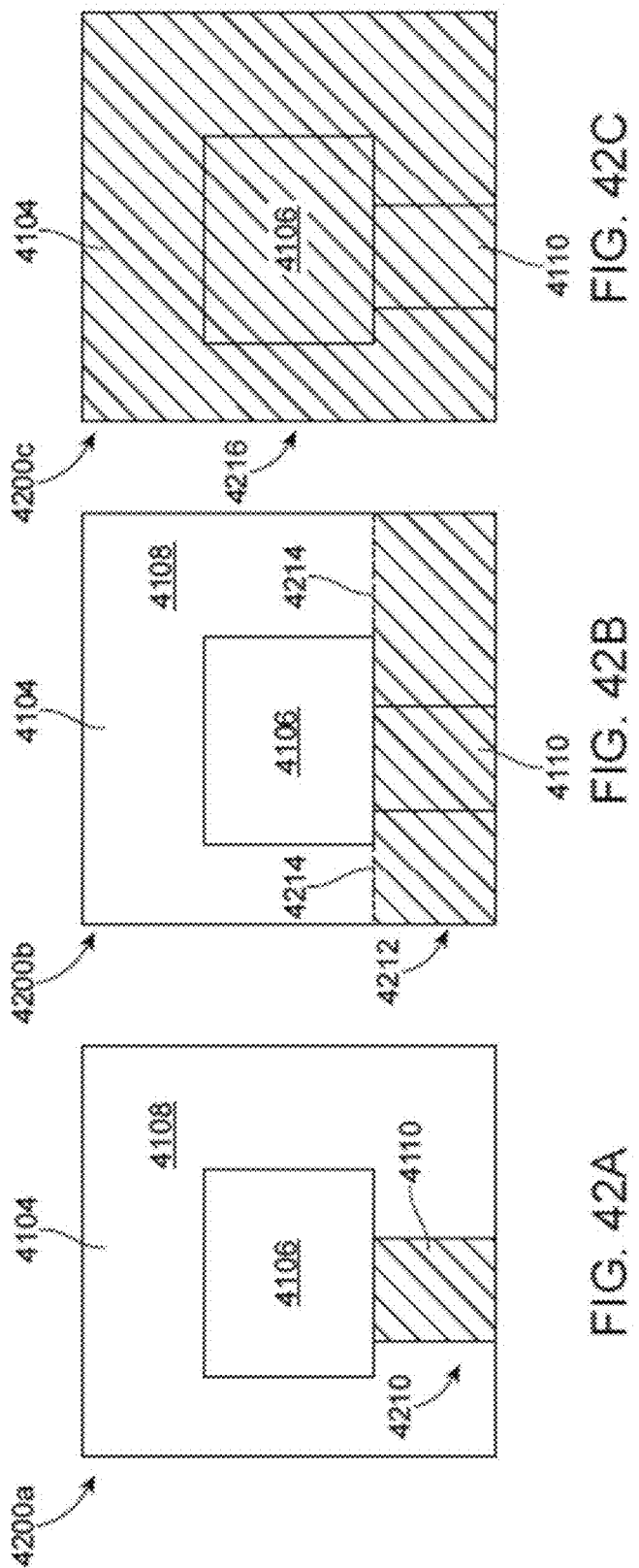
FIG. 42A is a conceptual diagram of an example property and a first example access grant area.
FIG. 42B is a conceptual diagram of an example property and a second example access grant area.
FIG. 42C is a conceptual diagram of an example property and a third example access grant area.

FIGS. 42A-C are conceptual diagrams of example property (such as real estate property) representations 4200a, 4200b, and 4200c, respectively, and example access grant areas 4210, 4212, and 4216, respectively. Each of representations 4200a, 4200b, and 4200c may correspond to property 4104 of FIG. 41, and may include residence 4106 and driveway 4110.

Referring first to representation 4200c of FIG. 42C, a first access grant area 4216 (indicated by shading), which corresponds to airspace over the entirety of property 4104, may indicate that the user wishes to grant permission to unmanned aerial vehicles (such as one particular UAV, certain UAVs, a class of UAVs, or the like) to fly in airspace above the entirety of property 4104. In some examples, first access grant area 4136 may represent an approved appurtenant airway.

Representation 4200a of FIG. 42A includes a second access grant area 4210, indicated by shading, that corresponds to airspace over the driveway 4110, but not to airspace over the remainder of property 4104 (i.e. not corresponding to airspace above residence 4106 or above the yard 4108). This may indicate that the user wishes to grant permission to unmanned aerial vehicles (such as one particular UAV, certain UAVs, a class of UAVs, or the like) to fly in airspace above the driveway 4110 but does not grant permission to unmanned aerial vehicles to fly in airspace over any other portion of the property 4104. In some examples, second access grant area 4210 may represent an approved appurtenant airway.

Representation 4200b of FIG. 42B includes a third access grant area 4212, indicated by shading, that corresponds to airspace over the driveway 4110 and over a front portion of the yard, but not to airspace over the remainder of property 4104 (such as not to airspace above residence 4106 or above yard 4108 from the front of the residence 4106 rearward). This may indicate that the user wishes to grant permission to unmanned aerial vehicles (such as one particular UAV, certain UAVs, a class of UAVs, or the like) to fly in airspace above the driveway 4110 or above the front portion of the yard (such as forward of the residence 4106, defined by boundary line 4214), but does not grant permission to unmanned aerial vehicles to fly in airspace over any other portion of the property 4104. In some examples, third access grant area 4212 may represent an approved appurtenant airway.

A user may indicate that no portion of the airspace above their property should be accessible to unmanned aerial vehicles (such as by a checking a radio button (not shown) in an interface, as described herein). The access grant areas of FIGS. 42A-C represent examples of access grant areas, but many other examples can be used. For example, in some cases a property owner, out of respect for neighbors, may specify an access grant area that maintains an appropriate distance (such as 5 feet, 10 feet, 20 feet, or the like) from one or more property lines. A user may specify one or more parameters associated with a package delivery or pickup, such as specifying that a package should be delivered or picked up at a particular location on the property (such as near a door, on a porch, on a deck, on a portion of the driveway (such as the left side or right side), in a receptacle, on a platform, and the like). The property depictions in FIGS. 42A-C may be displayed in a map area of a user interface, as described herein and a user may indicate the one or more areas to grant access by highlighting the particular area. In some examples, perspective views depicting the property in three dimensions may also be displayed, and may permit the user to specify the access grant area in three dimensions (surface dimensions, plus altitude).

A system may receive and store access grant areas (or alternatively areas where access is prohibited), each of which may be associated with a property address or with an identification of a property or an owner of a property. In this manner, access grant areas may be registered, which may permit landowners, property owners, or authorized representatives to exercise control over whether all or a portion of the airspace above their property is to be accessible to unmanned aerial vehicles. A user's privacy concerns may be aided by restricting unmanned aerial vehicle access above their property to only certain portions of the property, or to forbid unmanned aerial vehicle access to any portion of their property. As described herein, in addition to receiving indication of access grant areas, the system may receive one or more conditions or rules relating to the access grant area, such as a time duration associated with UAV access, a time period during which UAV access is permitted or forbidden, an indication of those UAVs that are permitted to access (or alternatively of those that are forbidden to access), and one or more areas where one or more of landing, liftoff, delivery, or pickup is permitted on the property, to list just a few examples.

An access grant area may be communicated to one or more entities for management of UAV access to the area. For example, one or more access grant areas may be communicated to a communications station, such as any of the communications stations described herein, and the communications station may manage UAV access to the area. An access grant area that corresponds to a residence may be communicated to a communications station, and the communications station may store the access grant area associated with the residence and may manage UAV traffic in the vicinity of the residence and may manage UAV access to airspace associated with the residence.

A UAV may request permission from a communications station to enter airspace above a private property, above a public property, or above a restricted area. Upon receiving the request from the UAV, the communications station may determine whether such access is permitted, for example based on one or more access grant areas for the property or area and one or more conditions associated therewith, and may grant permission to the UAV if the requested access is permitted or deny permission to the UAV if the requested access is not permitted. For example, the communications station may refer to access grant area information for the private property, public property, or restricted area, which may be associated with a property address or indication of the property or area, and may determine whether such access is permitted. If such access is permitted, the communications station may transmit a message for receipt by the UAV that grants permission for the UAV to enter airspace above the private property, public property or restricted area in accordance with the access grant area associated with the property or area, and in accordance with one or more rules or conditions of such access. If such access is not permitted, the communications station may transmit a message for receipt by the UAV that denies permission for the UAV to enter airspace above the private property, public property, or restricted area.

In granting permission to the UAV to access the property or area, the communications station may include with the message (or in a separate message) location information associated with the access grant area, such as boundary information for the area permitted to be accessed by the UAV, or one or more landing areas, liftoff areas, delivery areas, or pickup areas. Such location information may include one or more GPS coordinates, latitude and longitude information, latitude, longitude, and elevation information, an image of a feature of the area, or other appropriate location information. The property owner or representative may place one or more beacons on the property or area that may define or indicate an access grant area or portion of an access grant area. The one or more beacons may be active or passive, in various implementations, and the UAV may be equipped to recognize or detect the one or more beacons. In some examples, a beacon may emit or transmit a signal (such as an identifier, message, and/or waveform) that the UAV may detect.

In some examples, a command center may monitor in-flight tracking of package delivery or transport, for example by communicating with one or more communications stations that may have communicated with an unmanned aerial vehicle transporting a package, as described herein. The communications station may have collected location information from the UAV (or may have determined location information for the UAV), and may have associated the information with a time stamp, for example. Such in-flight tracking may provide for better delivery or arrival time estimates, and may assist in recovering lost or missing packages or UAVs.

A communications device may be included at or near the private property, public property, or restricted area, and the communications device may communicate with a UAV regarding UAV access to airspace above the private property, public property, or restricted area. For example, the communications device may be within the residence of a private property owner, attached to an exterior of the residence or other structure on the property, located at or near a receptacle or area designated for UAV deliveries or pick-ups, or located elsewhere on or near the property. A UAV may transmit a message for receipt by the communications device associated with the private property, public property, or restricted area, where the message includes a request to access airspace above the private property, public property, or restricted area. The communications device may receive the message, and may determine whether such access is permitted, for example based on one or more access grant areas for the property or area, and may grant permission to the UAV if the requested access is permitted or deny permission to the UAV if the requested access is not permitted (for example, by transmitting a message for receipt by the UAV with an indication of the access grant or denial). The communications station may refer to access grant area information for the private property, public property, or restricted area, which may be associated with a property address or indication of the property, and may determine whether such access is permitted. If such access is permitted, the communications station may transmit a message for receipt by the UAV that grants permission for the UAV to enter airspace above the private property, public property, or restricted area in accordance with the access grant area associated with the property or area, and in accordance with one or more rules or conditions of such access. If such access is not permitted, the communications station may transmit a message for receipt by the UAV that denies permission for the UAV to enter airspace above the private property, public property, or restricted area.

A UAV may wish to enter airspace associated with a private property, public property, or restricted area to make a delivery or to pick up a package, for example. As the UAV approaches the target address or property, the UAV may request permission to enter airspace associated with the target address to make the delivery or to pick up the package, as by transmitting a message for receipt by a communications station or communications device.

A UAV that has been granted permission and has entered airspace above a private property or restricted area may, upon exiting the airspace above the private property or restricted area, transmit a message for receipt by the communications station that indicates that the UAV has exited the airspace. The UAV may include in the transmitted message an indication of a task, such as an indication that a package was delivered or an indication that a package was picked up. The communications station or communications device may receive the transmitted message, and may store an indication of the message in a memory location.

A grant of permission to access the airspace above the private property, public property, or restricted area may be contingent upon receipt, by the communications station or communications device, of a password or other security construct from the UAV. In some examples, the communications station or communications device may request a password or security construct from the UAV, and in other examples the communications station or communications device may not request a password or security construct from the UAV. In cases where a password or security construct is required, the communications station or communications device may deny access to a UAV that is unable to satisfy the password or security construct requirement.

A control center, as described herein, may include a device or system that may register access grant areas for private property, public property, or restricted areas. In some examples, the device or system, as a step in the registration, may communicate information regarding the access grant areas to an appropriate public entity (such as a local or municipal public entity, a state-level public entity, or a national public entity) so that the public entity may review and approve or deny the request, and the device or system may receive the result of the review from the public entity.

The device or system may communicate appropriate information to an appropriate communications station or communications device, so that the communications station or communications device can manage UAV access to airspace of the private property, public property, or restricted area, for example based on the one or more access grant areas pertaining to the property. The device or system, or a portion of the device or system, may be included at another appropriate location. The device or system that registers the access grant areas can communicate information regarding an access grant area to a business (such as a delivery company, a retailer, a supplier, or the like), to a municipal entity, to a police department, fire department, or first responder.

Figure 43:
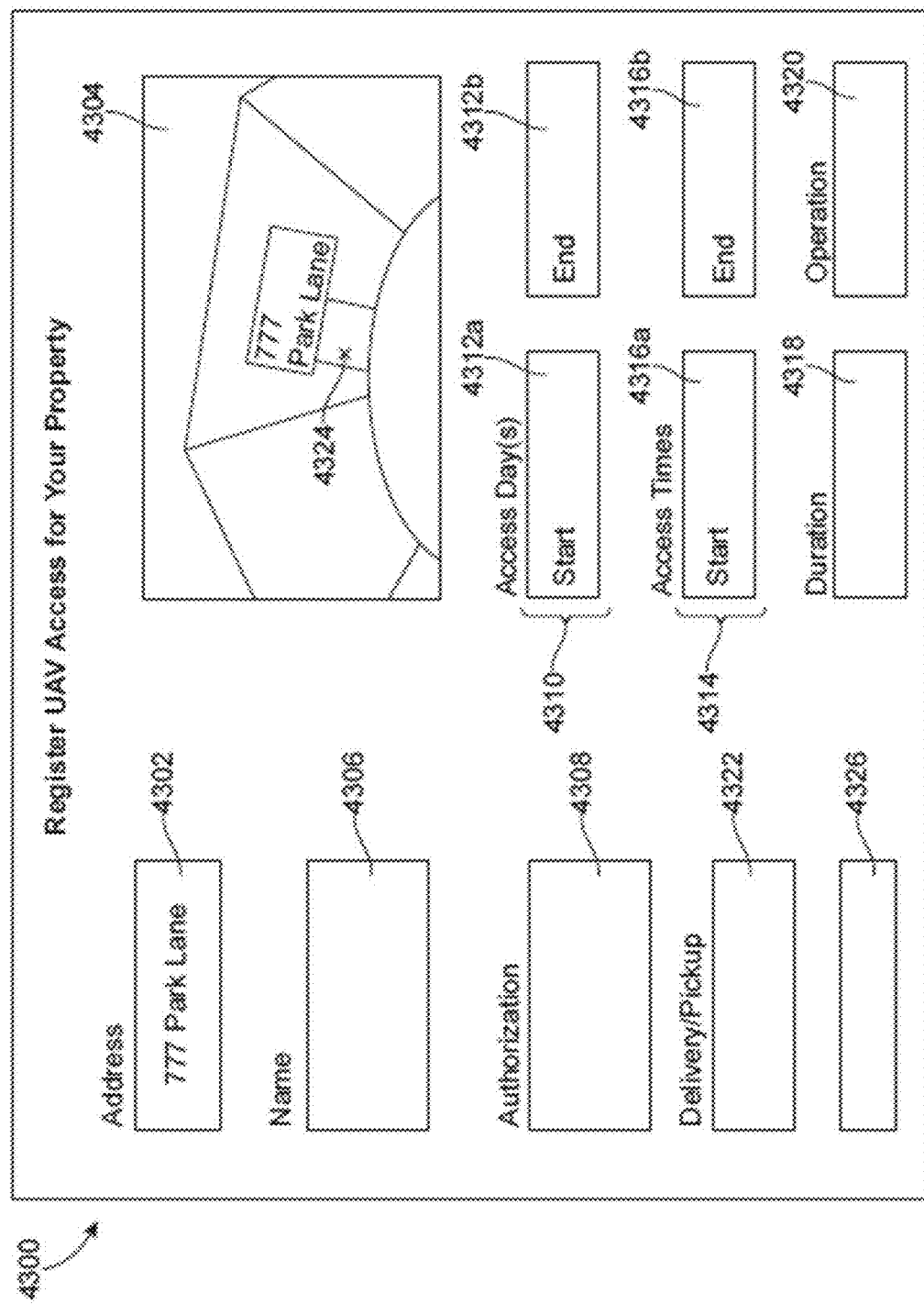
FIG. 43 is a conceptual diagram of an example user interface through which a user may provide information to register unmanned aerial vehicle access rights to property or to airspace associated with a property.

FIG. 43 is a conceptual diagram of an example user interface 4300 through which a user may provide information to register unmanned aerial vehicle access rights (in some examples including delivery, pickup, landing, and/or liftoff rights) to property or to airspace associated with a property (such as airspace above real estate property). A registration system may provide the user interface 4300 for use by property owners or representatives, for example, who wish to register access rights to their property so that unmanned aerial vehicles will be permitted to fly over their property according to the terms of the registered access grant. The user interface, or a portion of the user interface, may be presented, for example, on a display screen, such as a display screen of a computer (such as a desktop or laptop), tablet computing device, smartphone, wearable computing device (such as a smart watch, smart bracelet, or other wearable device), or other appropriate display screen.

The user interface may include an address field 4302, wherein the registration system may receive a property address (such as 777 Park Lane, Tiburon, Calif.), and a visual representation 4304, wherein a depiction (such as a map, photo, image, or the like) of the property may be displayed. The system may receive an address input in the address field 4302 and may display in response a map or visual representation 4304 of property corresponding to the received address. The user may enter a specific address in the address field 4302 and the system may display a map or representation of the property. The user may specify an incomplete address (such as Park Lane, Tiburon, Calif.) in the address field 4302, and the system may present a map (or a list, for example via a drop-down or other type of list) of various properties associated with the incomplete address (such as various properties on Park Lane), and the user may select the appropriate property from among those displayed.

The user interface may include a name field 4306, wherein the registration system may receive a name of the property owner. The user interface may include an authorization field 4308, wherein the registration system may receive an authorization code. The system may verify that one or more of the name and the authorization code corresponds to the registered owner of the property and corresponds to a valid authorization code, respectively, for example.

The user interface may include one or more fields 4310 to denote one or more days for which UAV access should be permitted. The system may receive a start date (such as May 8, 2016) in a start date field 4312a and an end date (such as May 8, 2016, or May 10, 2016, or the like) in an end date field 4312b. In some examples the system may present a calendar so that the user can select the date or dates. The user interface may include one or more fields 4314 to denote a time or times during which UAV access should be permitted. The system may receive a start time (such as 8:00 AM) in a start time field 4316a and an end time (such as 10:00 PM) in an end time field 4316b. In some examples the system may present a clock, time-face, or list on which the user can select the time or times.

The user interface may include a duration field 4318, and the system may receive a time duration that specifies a permitted duration of time (such as 1 minute, 2 minutes, 5 minutes, 30 minutes, or another appropriate length of time) that a UAV may access to the property. The user interface may include an operation field 4320, and the system may receive an operation type or category (such as package delivery, package pickup, video or photo capture access, general flight access, landing access, liftoff access, combinations of the foregoing, and others) permitted for UAVs.

The user interface may include a delivery or pickup field 4322, and the system may receive an indication of a location on the property where a UAV should deliver or pick-up a package. This location may also or alternatively specify a location where a UAV is permitted to land or to liftoff from (for instance, initiate flight). The description may describe the area textually (such as "left side of driveway", "on porch", "behind house", "on deck", "on front steps", or the like), or using one or more location identifiers, such as one or more GPS coordinates, latitude and longitude information, latitude, longitude, and elevation information, or other appropriate location information. The system may receive a photograph (for instance, uploaded by the user) that depicts the delivery area, pickup area, landing area, takeoff area, or the like. The system may display an indicator 4324 on the map to indicate the corresponding area. Alternatively, a user may indicate a delivery area, pickup area, landing area, or liftoff area (or combinations of the foregoing) on the map, as by selecting an area of the map (as an alternative to entering a location in field 4322, for example), and the system may receive the selection and display an indicator 4324 at the location. In some examples, separate locations for one or more of delivery, pick-up, landing, and liftoff may be specified. The user interface may include a field 4326 where one or more of altitude information, such as altitudes or ranges where UAVs are to be permitted to fly over the property (such as above 100 feet AGL, above 200 feet AGL, above 300 feet AGL, or above some other altitude) may be received.

The systems and devices may provide a user interface (not shown) that permits the user to enter payment information associated with the registration request. For example, the system or device may provide a user interface that accepts a credit card or debit card payment, or payment via a third-party payment processor. Such payments may include a fee for registering or renewing one or more access grant areas, or one or more of a landing area, liftoff area, delivery area, or pickup area.

Input may be received that indicates one or more access grant areas associated with the property, as well as the rules or conditions for access, including the rules or conditions discussed herein. For example, the user may be able to specify all or a portion of the property that the user wishes to grant permission for access to an unmanned aerial vehicle. In various examples, the user may indicate the access grant area(s) in a variety of ways, such as by shading or selecting the portion of the property desired for the access grant area, or by describing the area textually, or by other appropriate methods. A user may make such an indication by highlighting a portion of the displayed map, and the system may receive the indication. Alternatively, the user may indicate areas of the property where access is not to be permitted. Methods of selection or indication may be active, interactive, or not active.

Figure 44:
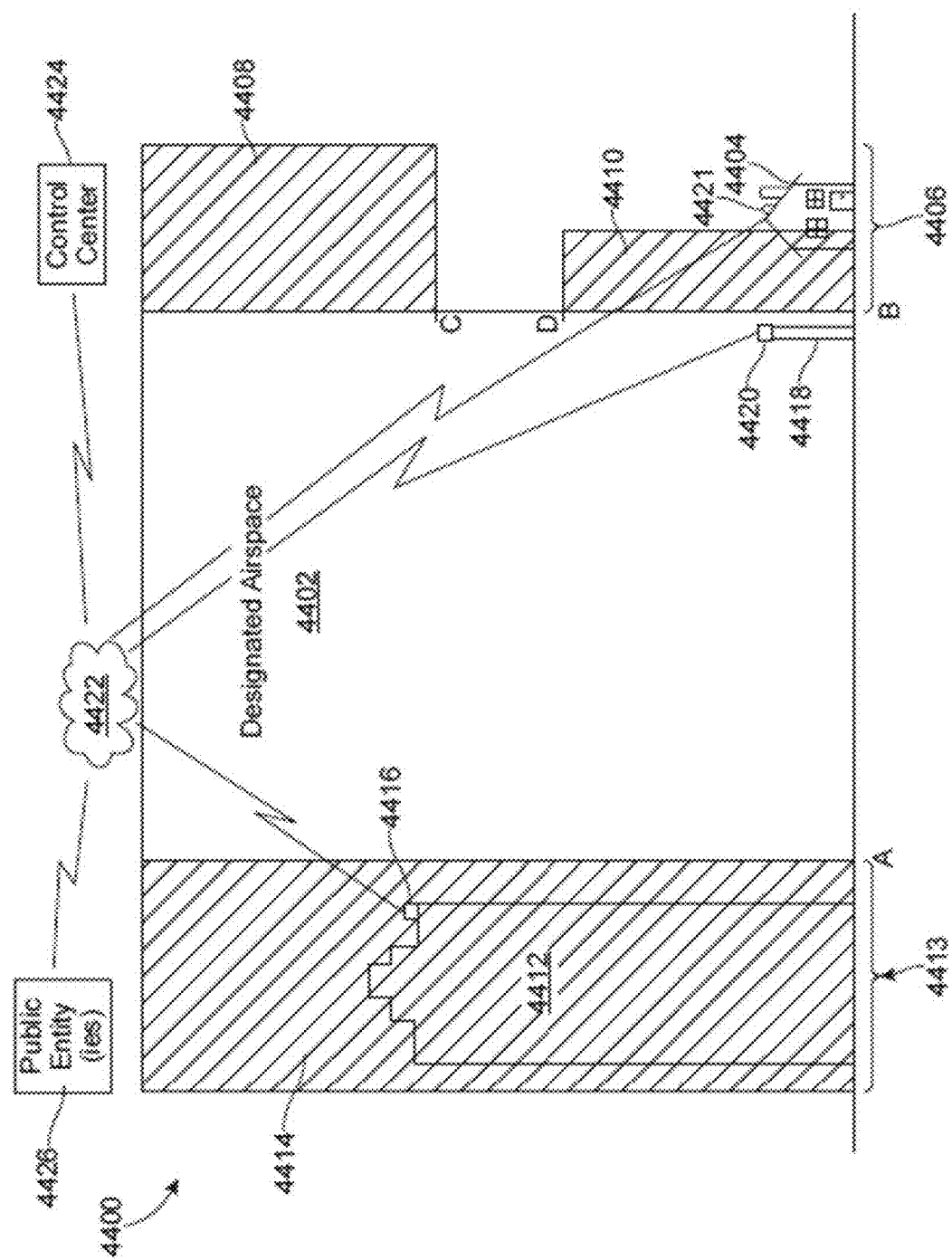
FIG. 44 is an example unmanned aerial vehicle flight environment.

FIG. 44 is an example unmanned aerial vehicle flight environment. The environment 4400 may include a designated airspace 4402, which may correspond to a general area where UAVs are generally permitted to fly, or are generally permitted to fly without additional permission. The designated airspace may correspond to airspace above a right-of way, above a highway, to one or more air corridors, or to any appropriate area where UAV flight is generally permitted. In the depicted example (depicted in two dimensions for simplicity), the designated airspace may be bounded on the left by boundary A and on the right by boundary B. The designated airspace may be additionally is bounded from above, for example at the 400 feet AGL level (or another appropriate level).

The environment may include a residence 4404, located on private property as depicted by property boundary 4406. An owner of private property 406 may register one or more access grant areas associated with property 4406, as discussed herein, which may indicate areas above property 4406 where UAVs are permitted to fly, and may indicate various conditions associated with such areas, including one or more of the conditions discussed herein.

A first access grant area 4408 indicates that UAV flights are permitted over the entirety of property 4406, but only at elevations above the elevation indicated by boundary C, which may correspond to 250 feet AGL in this example. That is, UAVs may fly above property 4406 as defined by first access grant area 4408, but only within the altitude range of 250 feet AGL to 400 feet AGL, in this example.

A second access grant area 4410 indicates that UAV flights are permitted over only a portion of property 4406 and that UAV flights are not permitted over a portion of the property. Also, the second access grant area specifies an altitude limit D, which may correspond to about 180 feet AGL in this example. That is, UAVs may fly above property 4406 as defined by second access grant area 4410, but only at altitudes less than 180 feet AGL, and only over the left portion of the property, in this example.

A user may specify access grant area 4410, access grant area 4412, or another access grant area (not shown) during different days, different times, different conditions, or the like.

The environment may also include an office building 4412, located on private property as depicted by property boundary 4413. An owner of (or authority for) private property 4413 may, for example, register one or more access grant areas associated with property 4413, as discussed herein, which may indicate areas above property 4413 where UAVs are permitted to fly, and may indicate various conditions associated with such areas, including one or more of the conditions discussed herein. A third access grant area 4414 indicates that UAV flights are permitted over the entirety of property 4413, at all altitudes up to 400 feet AGL, in this example.

The environment depicts two communications stations 4416 and 4420, as well as a communications device 4421. Communications station 4416 may mounted to a support member, such as office building 4412. Communications station 4420 may be mounted to a support member, which in the depicted example may be a utility pole 4418. Communications device 4421 may be mounted to the roof of residence 4404 in this example.

A control center 4424 may communicate with the communications stations 4416 and 4420, and with communications device 4412, wirelessly over one or more networks, such as a cloud network 4422. The control center 4424 may include a device or system that registers access grant areas for property owners or that registers delivery areas, pickup areas, landing areas, liftoff areas, or combinations of the foregoing, for property owners. The control center may correspond to a control center as described herein, and in some examples may correspond to a different control center. In examples where the device or system that registers access grant areas and/or landing areas, liftoff areas, delivery areas and pickup areas communicates with a public entity, such as public entity 4426, during the registration process, such communication may also occur over the one or more networks 4422.

Figure 45:
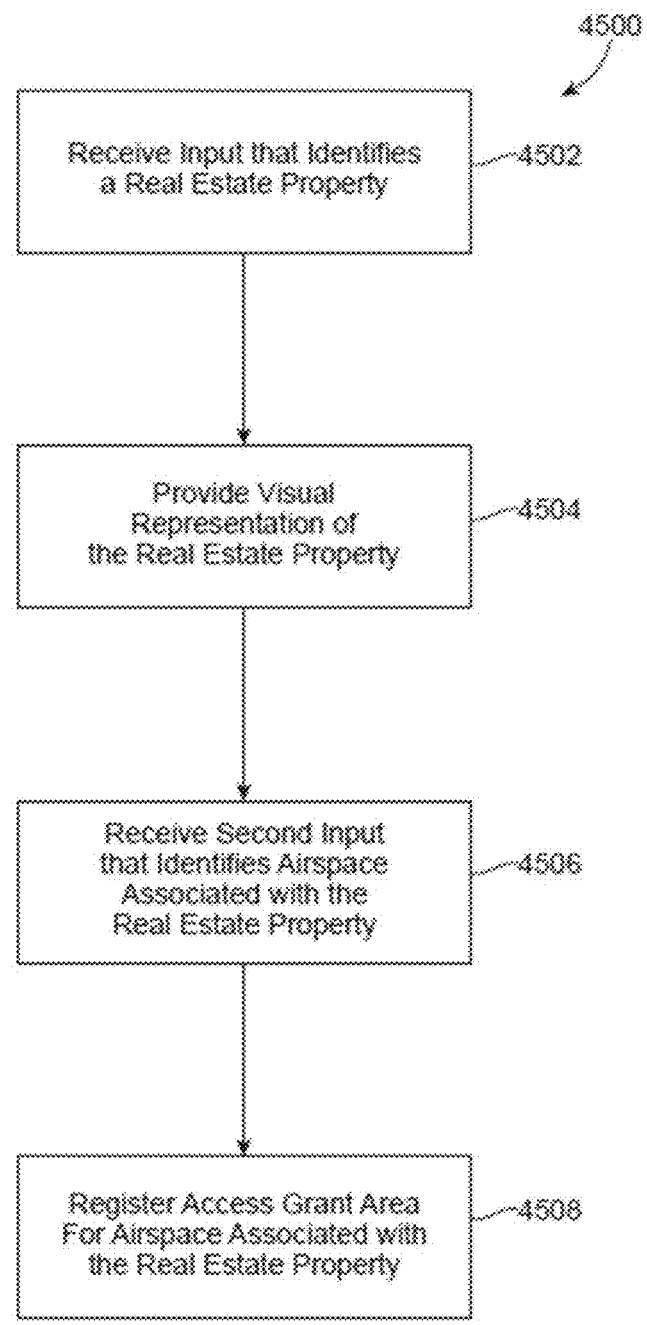
FIG. 45 is a flowchart of an example method for registering an access grant area for a property to permit unmanned aerial vehicle flight within the access grant area.

FIG. 45 is a flowchart of an example method for registering an access grant area for a property to permit unmanned aerial vehicle flight within the access grant area. The method 4500 may include the steps of receiving a first input that identifies a real estate property, providing a visual representation of the real estate property, receiving a second input that identifies airspace associated with the real estate property, and registering an access grant for airspace associated with the real estate property.

The method 4500 may be performed by a device or system, such as a device or system included at a control center (as described herein) or another appropriate location, and may be used to permit private property owners and public property owners to register one or more access grant areas to permit UAV flights over their property according to the access grant area, and optionally according to rules or conditions associated with the access grant area.

At a first step 4502, an input that identifies a real estate property is received. The input may include a physical address for the real estate property. The input may include a photograph or image of the property. The input may include a selection of a property from a list of properties. The input may include a selection of a property displayed on a map (such as where the display displays one, two, three, or more properties).

At a second step 4504, a visual representation of the real estate property is provided. The visual representation may be provided on a display screen of an appropriate computing device. The visual representation may be a map. The visual representation may display one or more other properties (or portions thereof) in addition to the real estate property identified by the input of step 4502.

At a third step 4506, a second input that identifies airspace associated with the real estate property is received. The second input may include a textual description of the airspace. The second input may include a selection on the visual representation provided at step 4504 (such as a selection of all or a portion of the visual representation corresponding to the real estate property). The second input may include one or more location identifiers, such as one or more GPS coordinates, one or more of latitude and longitude indications, or one or more latitude, longitude, and elevation indications. The second input may specify one or more altitudes. In other cases, the second input may not specify one or more altitudes. The second input may be an indication that no UAV flights should be permitted in airspace associated with the real estate property.

One or more of the input of step 4502 or the second input of step 4506 may include a name (such as the name of the property owner). One or more of the input of step 4502 or the second input of step 4506 may include an authorization code. The system or device may verify that the request for registering an access grant area is being made by a user who is authorized to make such a request (for instance, by verifying ownership of the property of by verifying that a received authorization code is valid).

The second input may include one or more rules or conditions. For example, the second input may include an indication of a day or days during which UAV flights may be permitted to access the airspace associated with the real estate property. The second input may include a time period during which UAV flights may be permitted to access the airspace associated with the real estate property. The second input may include a time duration during which UAV flights within the airspace associated with the real estate property must be completed (such as that the UAV should exit the airspace by expiration of the time duration from the time that the UAV entered the airspace). The second input may include an indication of an operation type or category (for instance, package delivery, package pickup, video or photo capture access, general flight access, landing access, liftoff access, combinations of the foregoing, and the like) permitted for UAVs that enter the airspace associated with the real estate property. The second input may include an indication of one or more of a landing area where a UAV may land, a liftoff area where a UAV may initiate flight, a delivery area where a UAV may deliver a package, and a pickup area where a UAV may pick-up a package.

At a fourth step 4508, an access grant area for the airspace associated with the real estate property is registered. The device or system may communicate with a public entity, such as a local or municipal entity, a state entity, or a national entity, and may communicate an address associated with the real estate property and information regarding the requested access grant area to airspace associated with the real estate property to the public entity. The device or system may receive from the public entity a grant or an approval of the access grant area. The device or system may register the access grant area independent of a public entity. Registration of the access grant area may include communicating the registration (such as information associated with the access grant area) to one or more communications stations, so that the one or more communications station may manage aspects of the access grant areas (such as manage permission-granting to UAVs to the one or more access grant area; monitoring UAV traffic in and around the access grant areas, and the like).

Automated Module Removal & Installation

The installation of the modular devices described herein on an existing streetlight or other structure that has an existing electrical socket may be automated. Ordinarily, the installation of a legacy socket device (such as a photocell) would require the use of a cherry picker or small crane to reach the top of streetlights. The streetlight is typically 33 feet or so above ground level. This may present a challenge of significant time and effort to get to the top of the streetlight. It may also present a recurring fall and/or shock risk to the workperson installing and/or removing the device. The risk of fall and the risk of electrical shocks are two of the top four causes of death in the United States construction industry, according to the United States Occupational Safety and Health Organization (OSHA). The installation of replacement photocells on streetlights or other maintenance work may ordinarily be a two person operation, including a driver/operator and a workperson. As the detachment, lowering and raising of the entire streetlight is required in traditional streetlight replacement, the crews may be much larger. However, the existence of a simple twist-in attachment for the base stations, application modules, and camera units described herein, or any combination thereof, may a method for rapid deployment of these modular devices. This method of installation may be accomplished using a simple, automated process, using the system depicted in FIG. 46, which may be supervised by a single operator.

Figure 46:
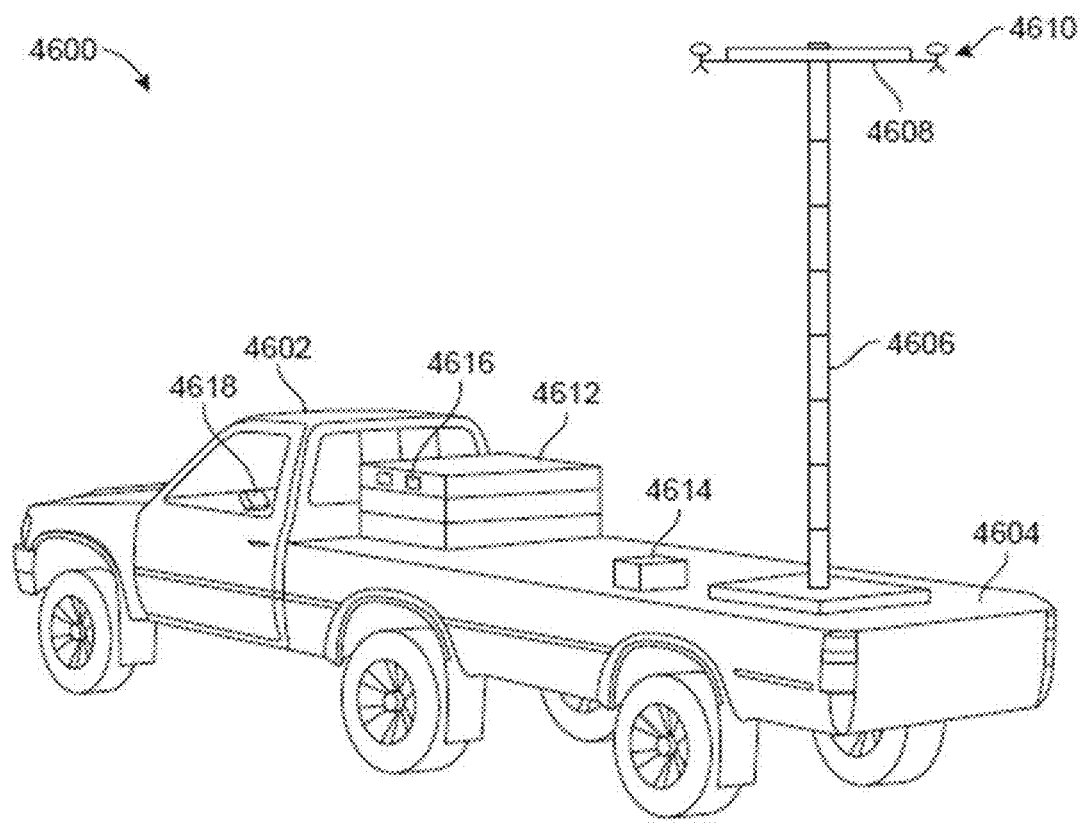
FIG. 46 shows a system for the automated or non-automated installation and removal of application modules.

FIG. 46 shows a system for the automated installation and removal of application modules. The system 4600 may include a truck or van 4602 to which additional components are attached. The truck or van may include a movable base 4604, a telescoping pole 4606, a lateral arm 4608, one or more gripping devices 4610, a new module rack 4612, a recycle bin 4614, a new device 4616, and a console and display 4618. The telescoping pole may be motorized. The telescoping pole may be attached to a moveable base on the rear of a light truck or van. The telescoping pole may be raised and lowered in accordance with the operator's command center in the cab. The top of the telescoping pole may include a controllable motor that rotates the lateral arm. The lateral arm may include an inverted motor on each arm that may be powered to spin a downward facing gripping device clockwise and counterclockwise. Each gripping device may include a distance sensor and a camera for viewing and locating its targets. The system may include a primary gripping device and a secondary gripping device.

A primary gripping device, in conjunction with the sensor and camera, may be configured to: 1) find the location of any legacy device or modular device on the streetlight, 2) grip the device, 3) apply a downward force, 4) twist the device free, and 5) hold the device tightly while the pole is being lowered. A secondary gripping device may be configured to: 1) locate and grip a new device from a rack or bin on the truck or van, 2) hold the new device tightly while the telescoping pole extends to the streetlight elevation, 3) locate an empty twist socket on the top of the streetlight, 4) insert the new device, 5) exert a downward pressure on the new device, 6) twist the new device into place, and 7) release the new device.

The entire process may be executed as follows: 1) the truck or van operator pulls under a streetlight; 2) the operator starts the vehicle's flashers and alert signs to advise motorists and pedestrians; 3) the operator activates the automatic device removal and installation system; 4) the telescoping pole unlocks and elevates slightly to reach the correct level of an adjacent rack of new devices; 5) The moveable base advances so that the primary gripping device is over a new module; 6) the primary gripping device finds and grips a new module; 7) the pole automatically rises upwards towards the streetlight; 8) the movable base of the elevating pole moves laterally to place the telescoping pole adjacent to the streetlight; 9) the secondary gripping system is rotated by the pole motor to hover over the existing legacy device; 10) the telescoping pole lowers slightly; 11) the secondary gripping device grips the legacy device, applies slight pressure, and twists the legacy device; 12) the telescoping pole rises up slightly; 13) the pole motor rotates the bar so that the primary gripping device can hover over the now empty socket; 14) the telescoping pole lowers slightly; 15) the primary gripping device applies downward pressure and then a twisting motion to secure the new device in the streetlight socket; 16) the pole telescopes slightly upwards; 17) the base of the telescoping pole retracts away from the streetlight; 18) Once clear of the streetlight, the telescoping pole retracts; 19) upon reaching the truck bed, the secondary gripping device is rotated over a recycling bin; 20) the secondary gripping device releases the legacy device into a storage container; 21) the entire apparatus retracts to a traveling position, locks itself down, and shuts off.

In certain circumstances, the truck, movable base and telescoping pole may be replaced by a traditional boom truck or cherry picker. In that situation the lateral arm 4608, one or more gripping devices 4610 and the associated console and display 4618 can be fabricated as a separate, portable unit(s) that simply bolts onto a boom truck or cherry picker. This may be far more convenient whether the vehicle is owned or rented at a remote location. Other than the substitution of a traditional lifting platform to lift and position the portable unit, all other steps of operation are the same.

The installation process may be performed in one continuous operation. The raising and lowering of the telescoping pole ounces may accomplish the selection and raising of a new device, the removal of the old device, and the installation of the new device in one cycle. The entire time for installation of a new module may be less than two minutes. As a result, a single operator may safely install many of these smart city modules (such as tens, hundreds, or even thousands) in a single week. The automated installation may mitigate the risk of fall or shock hazard, or of dropping a module. The operator may view the entire operation on the command console which may include a flat screen display. The system may test the functionality of the new module before the operator starts the vehicle and moves to a new location.

Edge Intelligence Powered Platform and User Interface

An edge intelligence powered platform is provided. Systems of the present disclosure may employ an edge intelligence paradigm that at least a portion of the data processing can be performed at the edge. In some instances, a machine learning model may be built and trained on the cloud and run on the edge device or edge system (e.g., hardware accelerator). Systems and methods of the disclosure may provide an efficient and highly scalable edge analytics platform that enables real-time, on-site stream processing of sensor data.

In some cases, an edge computing platform may be, or comprise, the second unit (e.g., application module) as described elsewhere herein. In alternative cases, an edge computing platform may be, or comprise, both the first unit (e.g., base unit) and the second unit (e.g., application module). As described above, the first unit (e.g., base unit, base station) can be configured to be fully operational once installed or implemented to provide immediate and instantaneous detection and/or communication functionality at a first, primary, or base level. Similarly, one or more second units (e.g., application modules) can be installed, implemented, or coupled to the first unit at the top of the streetlight or other support structure within ten, twenty, or thirty seconds. In some cases the first and second units can be installed, implemented, or coupled in no more than thirty seconds, one minute, two minutes, three minutes, five minutes, ten minutes, fifteen minutes, or more time. The second unit (e.g., application module) can be configured to be fully operational once installed, implemented, or coupled to the first unit (e.g., base station) and can provide immediate and instantaneous detection and/or communication functionality at a second or secondary level. In some cases, the first level and/or the secondary level may employ machine learning models for data processing and/or analysis.

Rather than sending massive amounts of sensor data to the cloud for analysis, the provided system can use edge intelligence for more responsive automation while reducing bandwidth costs and latency. In some cases, a software stack of the system can be a combination of services that run on the edge and cloud. Software or services that run on the edge may be referred to as an edge application whereas software or services that run on the cloud may be referred to as a cloud application.

In some cases, the edge application may support ingesting of sensor data into a local storage repository with the option to publish the unprocessed data to a cloud environment for offline analysis. In another example, the edge application may be responsible for ingesting the data from sensors and/or a connected base station onto a high speed data bus and then executing user-defined analytics expressions on the streaming data to gain insights (e.g. detecting events) or to optimize the base station/sensors. In a further example, the edge application may support services for data aggregation, publishing function for sending aggregated data to cloud for further machine learning analysis.

The cloud application may include services that run in the cloud or an on-premises environment to remotely configure and manage the edges or edge computing platforms. In some embodiments, the cloud services may comprise a user interface (UI) for viewing events, sensor data (e.g., streaming data, batch data) or other analytics, as well as for managing the edge computing platform and/or base station. In some cases, the user interface may include a management UI for developing and deploying analytics expressions, and deploying applications to the edge. The cloud application may also be able to translate machine learning models developed in the cloud into sensor expressions that can be executed at the edge.

The edge computing platform may be configured to preprocess sensor data in an intelligent and efficient manner. Machine learning has evolved as a key computation construct in automating discovery of patterns in data such as to build one or more models, and using the models to make intelligent predictions in a variety of applications. In some embodiments, the edge computing platform may provide streaming data processing and data aggregation at the edge. For instance, the edge computing platform may preprocess continuous streams of raw data that can be fed into machine learning analyses. Data processing may include, for example, data normalization, data labeling (e.g., with metadata), data alignment, data segmentation and various others. In some cases, the processing methodology is programmable through APIs by the developers constructing the machine learning analysis. The machine learning algorithm may comprise one or more of the following: a support vector machine (SVM), a naïve Bayes classification, a linear regression, a quantile regression, a logistic regression, a random forest, a neural network, a gradient-boosted decision tree, or another supervised or unsupervised machine learning algorithm.

Figure 47:
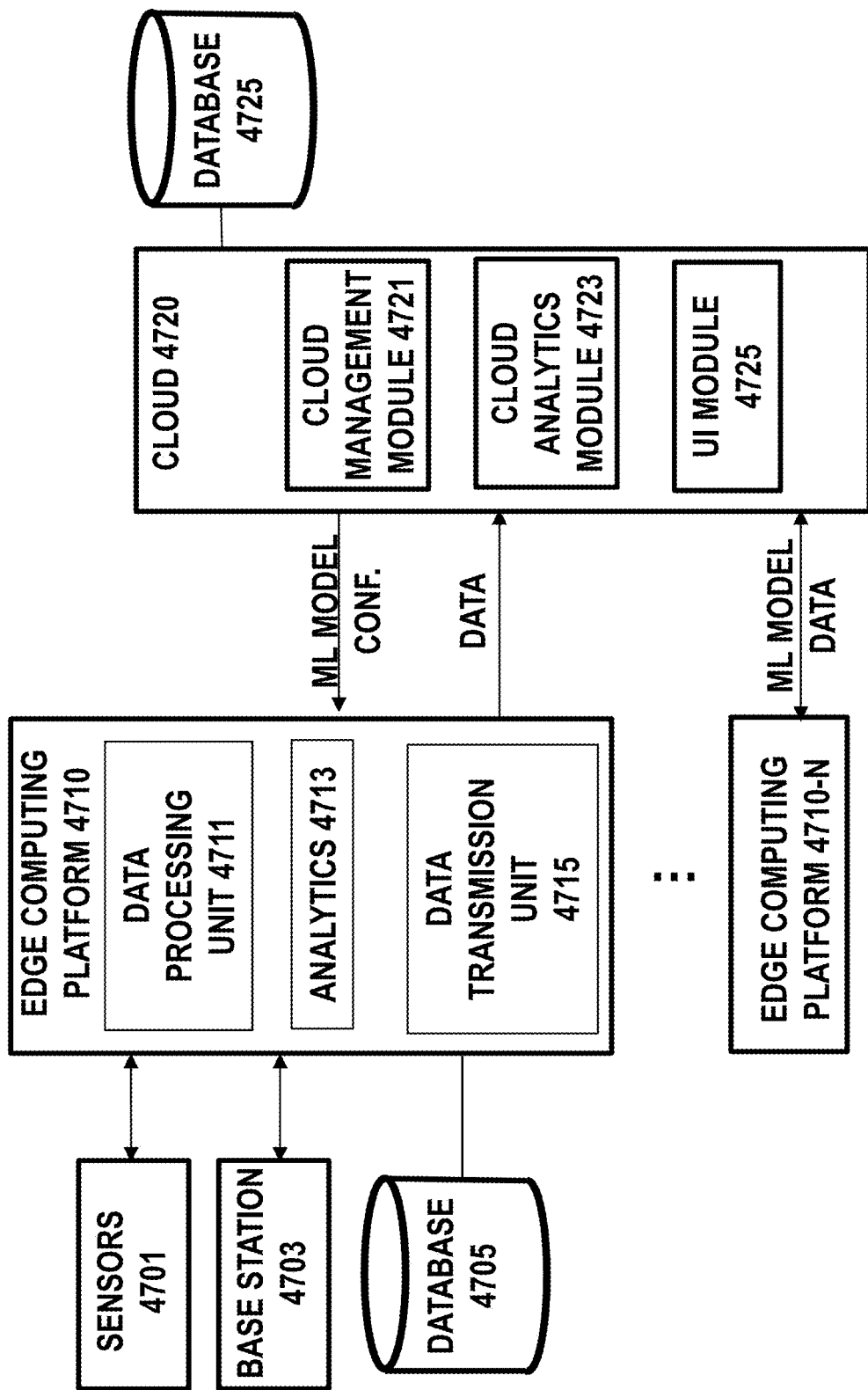
FIG. 47 schematically shows an edge computing platform in communication with a cloud platform.

FIG. 47 schematically shows an edge computing platform 4710 in communication with a cloud platform 4720. The provided system may employ any suitable technologies such as a container and/or micro-service. For example, the edge application can be a containerized application. The system may deploy a micro-service based architecture in the software infrastructure at the edge such as by implementing an application or service in a container. In another example, the cloud application may provide a management console or cloud analytics backed by micro-services.

Container technology virtualizes computer server resources like memory, CPU, and storage that are managed in an operating system (OS) with negligible overhead without requiring replication of the entire OS kernel for each tenant (and hence unlike a hypervisor technology). Containers were developed as a part of the popular Linux open-source operating system and have gained significant traction in software development and datacenter operations ("DevOps") with the availability of advanced administration frameworks like Docker and CoreOS. Other container orchestration frameworks such as Kubernetes may also be utilized. Kubernetes provides a high-level abstraction layer called a "pod" that enables multiple containers to run on a host machine and share resources without the risk of conflict. A pod can be used to define shared services, like a directory or storage, and expose it to all the containers in the pod. The system provides methods for deploying and managing container technologies intelligently in these edge compute infrastructure settings.

The edge computing platform may include an application module. The application module can be any application module as described elsewhere herein (e.g., application module in FIGS. 5-26). The edge computing platform may be a modular platform. The application module may be connected to a base station to form a modular assembly. The base station can be any base station as described elsewhere herein. In some cases, the edge computing platform may include both an application module and a base station.

As shown in FIG. 47, the edge computing platform 4710 may run on an edge gateway or equivalent that is located between the base station 4703, sensors 4701 and cloud 4720. In some embodiments, the edge computing platform 4710 may comprise a data processing unit 4711, analytics 4713, and a data transmission unit 4715. The sensors 4701 can include sensors located at the base station or sensors coupled to the application module (e.g., sensors 610 in FIGS. 6-20).

In some embodiments, the data processing unit 4711 may be configured for providing data ingestion, data alignment, data normalization, data decoding and/or metadata decoration. For instance, the data processing unit 4711 may collect or ingest data from the sensors 4701 and/or base station 4703 via one or more protocols (e.g., MQ Telemetry Transport, OPC Unified Architecture, Modbus, and DDS). The data provided or output by the sensors may be a binary data stream. The transmission or delivery of this data from the sensors to the data processing unit can be by push or pull methods. In some cases, the data processing unit 4711 may enrich the incoming data from the sensors by decoding the raw binary data into consumable data formats (such as JavaScript Object Notation) and also decorating with additional necessary and useful metadata.

The analytics 4713 may perform analysis of the sensor data. In some cases, the analytics may perform functionalities (e.g., a desired functionality for a particular application) described in FIG. 5-FIG. 22. For example, the analytics may perform a secondary level of modular functionality for a system that provides streetlight management, information provision, information collection, communications with, or management of, driverless vehicles (such as unmanned aerial vehicles or driverless ground-based vehicles), and other functionality. In some cases, the analytics may be based on analytic expressions developed in expression language. In some cases, the analytics may comprise containerized applications. The applications can access data stored in a local database 4705. The applications can perform analytics and applications including machine learning, remote monitoring, predictive maintenance, operational intelligence, data aggregation and dispatching, or any other application-specific functions as described in FIG. 5-FIG. 22. The applications may provide real-time monitoring and diagnostics, machine learning, and sensor/device performance optimization.

Data generated by the applications or analytics may include at least intelligence data (e.g., threats, security events) derived from raw sensor data. For instance, data generated by the analytics 4713 may comprise analytics results pertaining to a specific application or functionality. The analytics may include an application module configured to provide specific functionality for a given application and selected from the group consisting of: an unmanned aerial vehicle communication module, an unmanned aerial vehicle management module, a ground vehicle communication module, a ground vehicle management module, a threat detection or threat alert module, an imaging module, a monitoring module, a weather sensing module, a weather alert module, an environmental sensing module, an environmental alert module, a traffic monitoring module, a traffic alert module, an activity sensing module, an activity alert module, a disturbance sensing module, a disturbance alert module, a weapon sensing module, a weapon alert module, a terror sensing module, a terror alert module, an earthquake movement sensing module, an earthquake movement alert module, a smoke or fire sensing module, a smoke or fire alert module, a civil unrest or riot detection module, a civil unrest or riot alert module, a natural disaster sensing module, a natural disaster alert module, an accident sensing module, an accident sensing alert module, a communications module, a roadway construction monitoring module, a building or structure construction monitoring module, an impaired driver monitoring module, an impaired driving alert module, an intersection violation monitoring module, an intersection violation alert module, a shot identification or suspect monitoring module, a shot identification or suspect alert module, a communications repeater module, a wireless internet provision module, a vehicle information logging module, a parking monitor module, an on-request monitoring module, an unmanned aerial vehicle recharge module, a military or port security module, a pipeline integrity module, an air pollution module, an unmanned aerial vehicle detection or security module, and a third party or government agency alert module.

Sensors 4701 are shown as components separate from the edge computing platform 4710. However, it should be noted that sensors 4701 can be a component of the edge computing platform 4710. For example, sensors 4701 can be embedded in the application module as described elsewhere herein. For instance, the application specific module may comprise a sensor or a detection component configured to perform an associated functionality for the application specific module, the sensor or the detection component selected from the group consisting of a camera, a photo cell, a microphone, an activity sensor, a motion sensor, a sound meter, an acoustic sensor, an optical sensor, an ambient light sensor, an infrared sensor, a gas sensor, a gas detector, a particle sensor, a gas particle sensor, an airborne particulate sensor, a smoke sensor, a fire sensor, an environmental sensor, a weather sensor, a temperature sensor, a thermometer, a pressure sensor, a wind sensor, a rainfall sensor, a dew point sensor, a seismic sensor, a radar detector, a lidar detector, a navigation beacon, a global positioning system (GPS) sensor, an accelerometer, a magnetometer, a pullbox, a communications receiver, a cellphone, a wireless router, and a communications sensor configured to detect a transmission.

The database 4705 may be local to the base station and/or the edge computing platform. In some cases, the database 4705 may be a time-series database that is configured for handling time series data, arrays of numbers indexed by time (e.g., a date-time or a date-time range).

The data transmission unit 4715 may be connected to a storage location 4725 in the cloud. The data transmission unit 4715 may transmit processed data (e.g., aggregated data, batch processed data, detection result, etc) to the cloud for further analysis. In some cases, the data transmission unit 4715 may be configured to automatically transmit different data to different entities on the cloud according to a data delivery framework. The data delivery framework can be generated using machine learning techniques.

In some embodiments, the data transmission unit 4715 may be connected to or include a communication module. The communication module can be the same as the communication module as described in FIG. 5. For example, the communications module may communicate using various modes or protocols, including but not limited to GSM voice calls, messaging protocols (such as SMS, EMS, or MMS messaging), CDMA, TDMA, PDC, WCDMA, CDMA2000, GPRS, 4G protocols (such as 4G LTE), 5G protocols, and/or other appropriate protocols. Such communication may occur, for example, through one or more radio-frequency transceivers. In addition, short-range communication may occur, such as using a Bluetooth, Wi-Fi, and/or other such transceivers. The communications module may communicate messages using one or more networks or communication links, such as one or more cellular or other phone-based networks, over remote control radio frequency links, UHF or L-band frequency links, microwave frequency links, the Internet, the "cloud" or one or more networks providing access to the Internet or the cloud, one or more mesh networks, local or wide-area networks, a microwave network, a radio frequency network, or other appropriate datalinks or networks, a public network and/or a private network, or other appropriate datalinks, networks, or communication paths. The communication module may comprise antenna(s) that can be configured for either LoRa (long range wide area network, such as in accordance with the LoRa Alliance), FSK (frequency shift keying), GFSK (Gaussian frequency shift keying), OOK (on-off keying) modulation, or any low power wide area network modulation techniques.

In some embodiments, the data to be transmitted may be dynamically determined based on the available communication modes or methods. The system may monitor the available communication modes or methods, and/or their parameters (e.g., available bandwidth, security, robustness, etc.), in real-time, for example. In some instances, the system may monitor the available communication modes or methods, and/or their parameters, periodically. Based on the available communication modes or methods, the system may select the communication mode or method to use, the type of data to transmit, quality of data, frequency of data transmission, and the like. For instance, when the available bandwidth is limited, selected or critical data may be transmitted, whereas when greater bandwidth is available, data streams (e.g., video data) which require greater higher data rate or bandwidth usage may be transmitted. In an example, when Long Range Radio (LoRA) or Satellite communications is the only available communication method, due to the limited transmission bandwidth, critical data such as an alert indicating a type of detected emergency or basic data such as GPS location may be transmitted. Such limited data may be transmitted at the detection of an event or at predetermined time points. In another example, when a medium bandwidth transmission mode is available (e.g., mesh networking), sensor data including running condition, temperature, location of equipment on the site, fire warnings, the location of workers or materials and the like may be transmitted, and such sensor data may be broadcasted constantly. In a further example, when a transmission mode with greater bandwidth is available (e.g., 3G, 4G, LTE, or 5G cellular networking), sensory data streams may be transmitted or broadcasted constantly. In the case when WiFi is available, data streams (e.g., video data) that require higher data rate or bandwidth usage may be transmitted live.

In some embodiments, the communication modes/methods/protocols, or the data to be transmitted may be dynamically selected based on available wireless resources, signal strength and the like. For example, the LoRa PHY link RF transmit power, bandwidth (BW), and spreading factor (SF) can be dynamically controlled in software to minimize power consumption and maximize range capability without the need to change hardware configuration. In some embodiments, this dynamic control can be based on a GPS location of the communication module, received-signal-strength indicator (RSSI), signal-to-noise ratio (SNR), packet error rate (PER), and/or channel activity detection (CAD).

In some embodiments, the communication module may comprise an interface for establishing/maintaining a wireless link. Establishing/maintaining a wireless link may comprise transmitting wireless signals and receiving wireless signals until the end of a communication session. Establishing/maintaining a wireless link comprises transmitting wireless signals and receiving wireless signals until the end of a communication session. Transmitting wireless signals may include, but not limited to, dissembling data files into data packets, encoding the data, modulating bit streams, and/or generating electromagnetic waves. Receiving wireless signals may include, but not limited to, receiving electromagnetic waves, demodulating waves, decoding bit streams, and/or assembling data packets into data files. In some cases, establishing wireless links may be conditioned on some conditions. By way of non-limiting examples, suitable conditions may include battery life, bandwidth usages, device types, node-state signals, levels of mobility, time of day, subscription fees, neighboring devices, non-cellular signal strengths, cellular signal strengths, noise levels, and/or interference levels.

In some cases, data may be transmitted from the edge computing system or modular device to the cloud according to a transmission scheme. In some cases, the transmission scheme may specify which of the local data (e.g., processed data, raw sensor data, etc.) or which portion of the local data to be moved/transmitted to the cloud. The transmission scheme may also specify a communication protocol, compression or encryption method used for transmission, which of the local data or which portion of the local data is to be communicated to which data center, a cloud database or third-party entity, when and at what frequency this portion of data is transmitted. For example, a data transmission scheme may comprise timing of transmission such as delay time or frequency, and various others (e.g., regulatory rules regarding privacy before data is transmitted). For instance, based on the available communication method, a data transmission scheme may be generated by a predictive model and selected data may be transmitted based on the transmission scheme. Alternatively or in addition to, the data transmission scheme may be determined based on a set of rules. The set of rules may be handcrafted rules. For example, pre-determined or hand-crated rules may be applied to determine a compression method and/or encryption method for a transmission, or what type of data to be transmitted based on the available communication method.

The edge computing platform 4710 may be used to manage or configure the sensors or the base station. For example, the edge computing platform may send sensor configuration and/or control messages to the base station 4730 or the connected sensors 4710. The edge computing platform may be implemented in software, hardware, firmware, embedded hardware, standalone hardware, application specific-hardware, or any combination of these.

In some embodiments, the cloud 4720 may include a cloud management module 4721, a cloud analytics module 4723, and a user interface (UI) module 4725. The cloud management module 4721 may be configured for authorizing access and managing user identity. For instance, the cloud management module may provide identity and access management according to security policies/rules (e.g., enables the right individuals to access the right resources at the right times and for the right reasons). The cloud management module may also be configured for edge provisioning and orchestration. For example, the cloud management module may send administrative capabilities, resource provisioning, configuration, and setup to the edge computing platform. The cloud management module may also transmit machine learning models developed on the cloud to the edge computing platform. The cloud management module may be configured to manage and coordinate applications, resources, and/or data across different edge computing platforms 4710, 4710-N. In some cases, a plurality of edge computing platforms connected to the cloud is a standalone system and is separated from one another. In some cases, two or more edge computing platforms can be stacked together in a manner as described in FIG. 24D.

The cloud analytics module 4723 may enable further analysis of data transmitted from the edge computing platform. The cloud analytics module may include machine learning models or functionalities for event detection, monitoring, and various other high level management/application. In some cases, the cloud analytics module may be configured to perform data processing. As an example, images captured by two or more cameras may be transmitted to the cloud and the cloud analytics module 4723 may process of the images and produce an image with improved resolution and/or more information (e.g., depth information, 3D image, etc). In some cases, analysis results produced by the cloud analytics module may be transmitted to the UI module 4725 for display.

The UI module 4725 may render a graphical user interface (GUI) allowing a user to view analytics produced by the cloud analytics module 4723, data transmitted from the edge computing platform 4710, sensor data, and various other information. The GUI may also allow users to manage and configure the edge computing platform, base station, sensors and/or other edge devices. In some cases, the GUI may be provided on a user device. A user may be permitted to access, view information, and manage the system via a user device.

The user device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). For example, the GUI may show graphical elements that permit a user to set up configurations of the cloud and/or an edge device (e.g., sensors, base station, application module), and view information related to detected events, analytics, sensor data, and various others.

Figure 48:
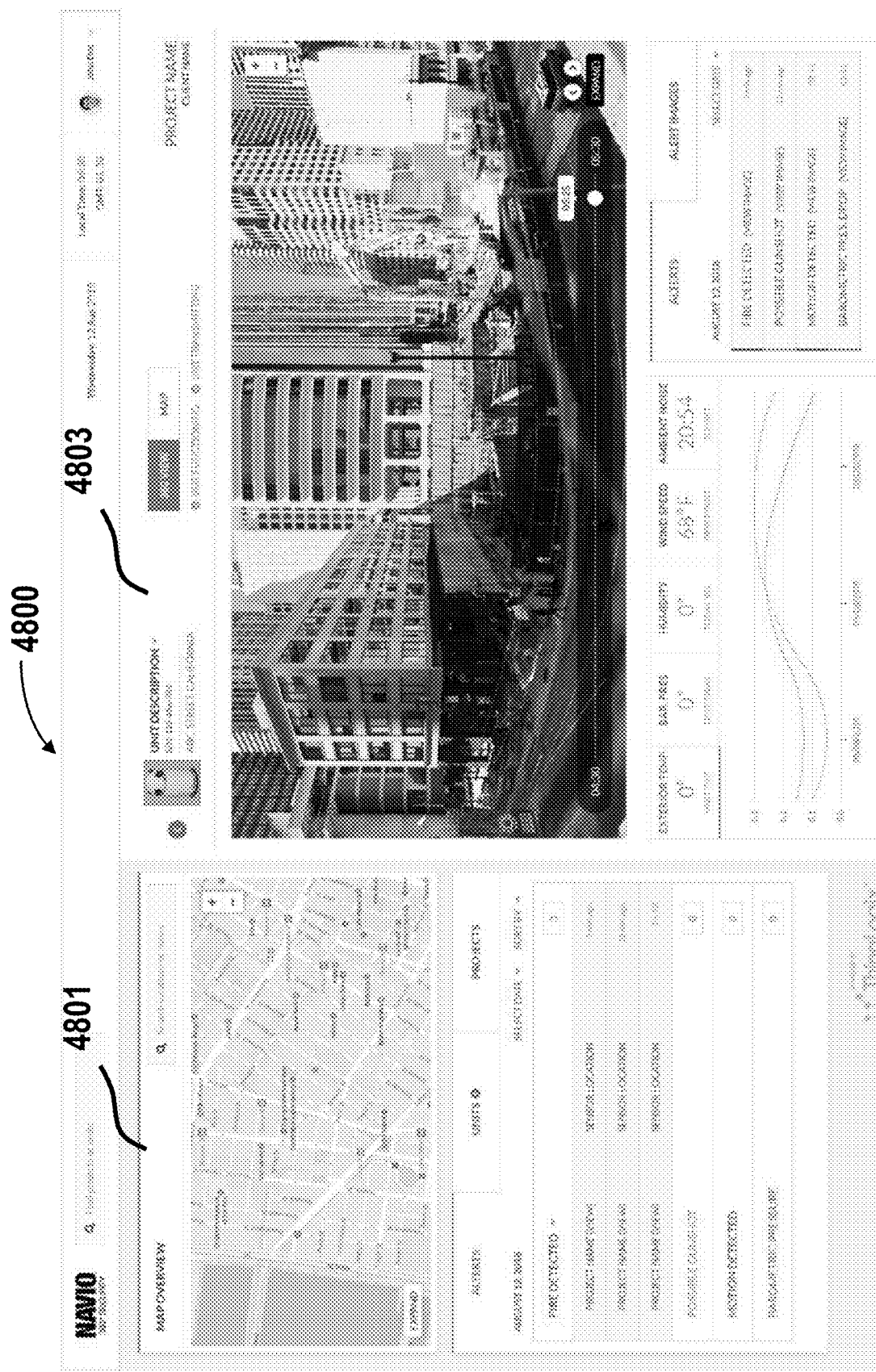
FIG. 48 shows an example of a graphical user interface.

FIG. 48 shows an example of a graphical user interface 4800. The graphical user interface may represent the monitoring of information using any suitable combination of graphics, images, video, audio, text, and the like. In some cases, the graphical user interface may be configured to display one or more panels. The one or more panels may display information provided by one or more edge computing platforms or application modules. For example, the graphical user interface 4800 may comprise a first panel 4801 displaying a map and detected events. This first panel may display information provided by one or more application modules (e.g., threat detection module, weather module, etc). The detected events may have locations shown on the map. The first panel may also display the time of the event is detected, type of event, sensor location, and various other ambient environment information in the monitored area.

The graphical user interface may comprise a second panel 4803 displaying a different view of the same information. Alternatively, the second panel may display different information. For example, the second panel may display sensor data such as a video clip of a monitored area. In another example, the first panel may display information provided by a first application module (e.g., events detected by threat detection module) and the second panel may display different information provided by a second application module (e.g., weather information provided by a weather module).

The graphical user interface may provide images, video, audio, or other types of sensor data obtained by the camera, sensors coupled to the base station, or other edge devices or sources. The sensor data may be a real-time data stream or batch data. A user may be permitted to view real-time sensor data and/or view recorded historical data. In some cases, a portion of the information may be provided from a third party, such as law enforcement, social media, corporate entities, or any other entity. The graphical user interface may permit users to switch between different panels and/or different views. In some cases, information at different process levels may be presented to the user within the same screen. For instance, a user may be presented with event alerts or insights at a higher level, as well as sensor data (e.g., video, image data) at a lower level.

Weather Analysis Device, Model, System

The above-mentioned edge intelligence system may be implemented as a weather analysis system. Accurate local weather reporting and weather and climate prediction are critical for public safety, given the threats of floods, tornadoes, hurricanes, lightening, massive windstorms, and storms, and the resulting damage that often occurs. The weather analysis system of the present disclosure may employ edge computing or AI techniques and can be easily deployed across cities. The weather analysis device may be configured to capture video or photographic still images of weather/climate (e.g., image of cloud formations) and using AI to identify the cloud(s). In addition, the weather analysis device may comprise a plurality of sensors to gather other local weather-related data, such as temperature, barometric pressure, relative humidity, wind speed, and wind direction, among others. The weather analysis device may send the weather information to a central processing unit using Long Range Radio (LoRA) or Satellite communications as described above. This transmission of the information can be highly cost effective, which makes massive, wide-spread deployments of multiple weather analysis devices on multiple streetlights feasible over a specified region or area, thereby allowing the central processing unit to aggregate and incorporate the real-time information into real-time weather reporting, weather prediction, and climate assessment models.

As described above, selected weather related sensor data may be transmitted based on the available communication method. For instance, when Long Range Radio (LoRA) or Satellite communications is the only available communication method, due to the limited transmission bandwidth, critical data such as an alert indicating a type of detected weather/climate emergency or basic data such as GPS location may be transmitted. Such limited data may be transmitted at the detection of an event or at pre-determined time points. The limited data may be processed locally at the edge intelligence gate device. In another example, when a medium bandwidth transmission mode is available (e.g., mesh networking), sensor data including running condition, temperature, location of equipment on the site, fire warnings, and the like may be transmitted, and such sensor data may be broadcasted constantly. In a further example, when a transmission mode with greater bandwidth is available (e.g., 3G, 4G, LTE, or 5G cellular networking), image data streams of the cloud may be transmitted or broadcasted constantly. In the case when WiFi is available, video data of the cloud that require higher data rate or bandwidth usage may be transmitted.

In some cases, the algorithms for determining the transmission schedule or data to be transmitted may be machine learning algorithm trained predictive model. Similarly, the predictive models can be built and trained on the cloud, deployed and run on the edge device or edge system (e.g., hardware accelerator) for interference. For example, data may be transmitted from the edge computing system or modular device to the cloud according to a transmission scheme. In some cases, the transmission scheme may specify which of the local data (e.g., processed data, raw sensor data, etc.) or which portion of the local data to be moved/transmitted to the cloud. The transmission scheme may also specify a communication protocol, compression or encryption method used for transmission, which of the local data or which portion of the local data is to be communicated to which data center, a cloud database or third-party entity, when and at what frequency this portion of data is transmitted. For example, a data transmission scheme may comprise timing of transmission such as delay time or frequency, and various others (e.g., regulatory rules regarding privacy before data is transmitted). For instance, based on the available communication method, a data transmission scheme may be generated by a predictive model and selected data may be transmitted based on the transmission scheme.

The weather analysis device or system can be easy to install on existing streetlights, be power-ready, may perform AI processing on cloud formation imagery to communicate wirelessly and continuously provide cloud formation information for further analysis at a central processing unit. In addition, the weather analysis device or system can be installed on thousands of streetlights at reduced cost.

In some cases, the weather analysis device or system may be deployed in connection with a weather station to extend the weather station's capability. For example, the weather station may be equipped with the weather analysis device to become a weather observer that is able to provide accurate, detailed information about immediate weather, weather trends, and climate change over vast areas of any geographic region (e.g., spanning the United States) and beyond.

Figure 49:
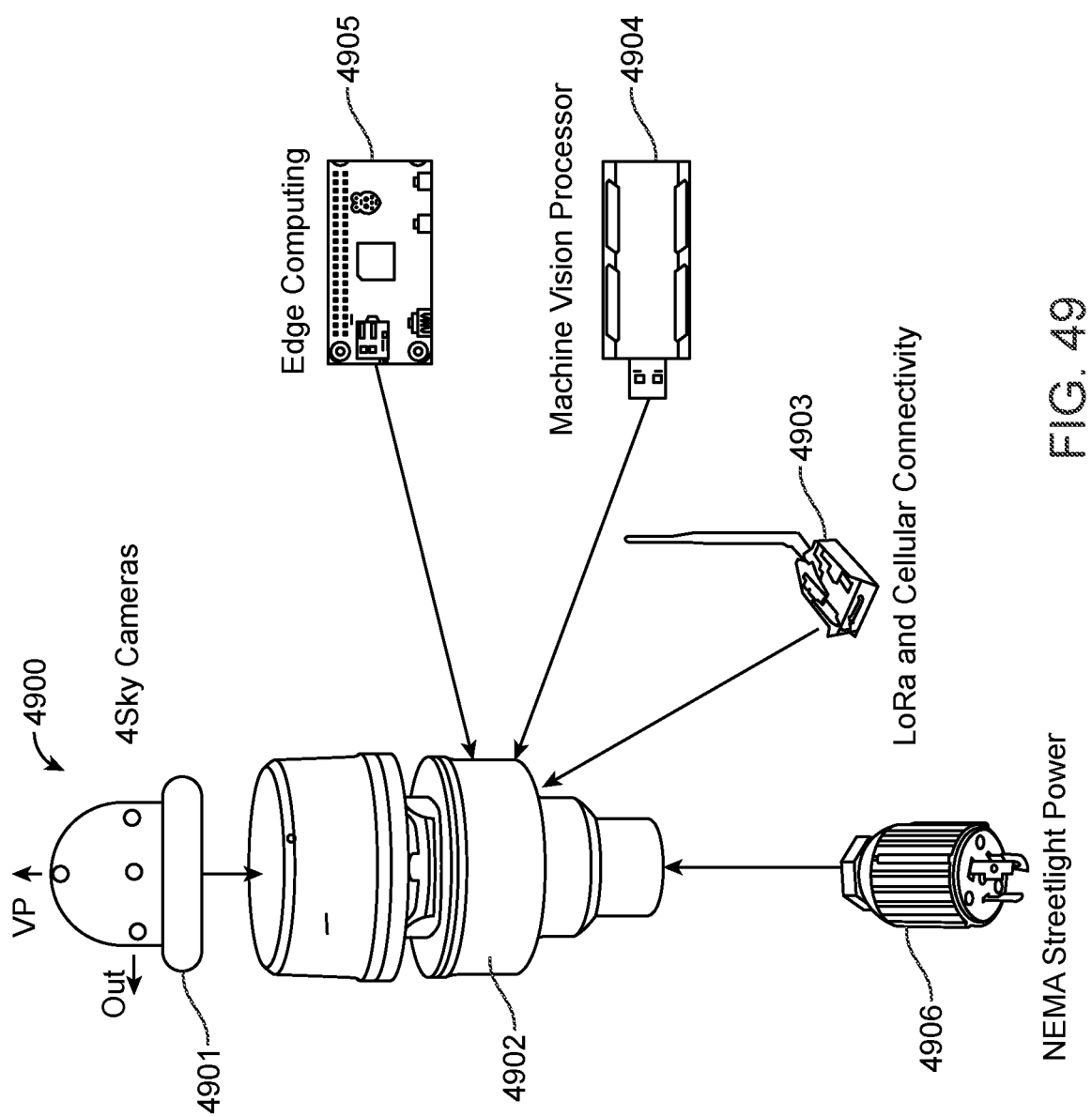
FIG. 49 schematically shows an example weather analysis device, in accordance with some embodiments of the invention.

FIG. 49 schematically shows an example weather analysis device 4900, in accordance with some embodiments of the invention. The weather analysis device 4900 may a modular assembly or modular streetlight assembly including a base station and a camera unit 4901. The modular streetlight assembly may be mounted atop a streetlight, a utility pole, or other support member using a base station 4902, as described herein. The base station may include a plurality of electrical connections for drawing electrical power from, sending signals to and/or receiving signals from the streetlight or other structure. For example, the base station may be attached to a NEMA socket (for electrical power) 4906 at the top of the streetlight. The modular streetlight assembly may include a camera unit 4901. The camera unit may include one or more cameras, as described herein. The camera unit may include one, two, three, four, or more than four cameras. The cameras may be arranged to capture real-time images or video of clouds.

The weather analysis device may comprise an AI-based application module 4904 for processing the raw sensor data (e.g., image, video captured by the camera) locally. The data generated by the application module 4904 may include, for example, cloud formation information, weather/climate report, alert, a cloud pattern, and the like. As described above, the application module may be an edge application that can support ingesting of sensor data into a local storage repository with the option to publish the unprocessed data to a cloud environment for offline analysis. In another example, the edge application may support ingesting the data from camera and/or a connected base station onto a high speed data bus and then executing user-defined analytics expressions on the streaming data to gain insights (e.g. cloud formation information) or to optimize the base station/sensors. In some cases, the edge application or edge computing platform 4905 may support services for data aggregation, publishing function for sending aggregated data to cloud for further machine learning analysis. The edge intelligence paradigm may allow for data processing and prediction/inference performed at the edge application while the predictive models may be built, developed and trained on a cloud/data center.

In some cases, the edge computing platform 4905 may support predictive models with continual training or improvement after deployment. The predictive model provided by the weather analysis system may be dynamically adjusted and tuned to adapt to different deployment environments over time. The predictive model provided by the platform may be improved continuously over time (e.g., during implementation, after deployment). Such continual training and improvement may be performed automatically with little user input or user intervention. For instance, semi-supervised training or unsupervised training may be involved in the continual training stage such that little user input or labeled data is required. In some cases, the predictive model may go through continual training as new sensor data are collected. The new sensor data may be collected by the edge intelligence device (e.g., weather analysis device 4900), aggregated to form training datasets and transmitted to the cloud. The continual training may be performed on the cloud. In an example training process, the training stage may involve pre-training one or more components (e.g., classifier, auto-encoder, etc.) of the predictive model, then the predictive model or a component of the predictive model (e.g., autoencoder) may be further trained to adapt to the edge device/system in which the pre-trained model is implemented in an adaptation stage, and next the predictive model or component of the predictive model (e.g., classifier) may be undergoing further continual training to adapt to changes in the implementation environment over time (e.g., changes in the edge device/system, model performance, application-specific data, etc.) in an optimization stage.

In some cases, sensor data may be transmitted to the cloud which are used to update the model for continual training and the updated model (e.g., parameters of the model that are updated) may be downloaded to the edge computing platform 4905 (e.g., application module) for implementation.

The weather analysis device 4900 may further comprise a communication module 4903. The communication module may transmit raw sensor data, processed data or data generated by the application module to the cloud for further analysis. As described above, in some cases, the data communication module may be configured to automatically transmit different datasets to different entities on the cloud according to a data delivery framework. The data delivery framework can be generated using machine learning techniques. The communication module can be the same as the communication module as described in FIG. 47.

For example, the communication module 4903 may dynamically transmit data based on the available communication modes or methods. For instance, the weather analysis device may monitor the available communication modes or methods, and/or their parameters (e.g., available bandwidth, security, robustness, etc.), in real-time. In some instances, the weather analysis device may monitor the available communication modes or methods, and/or their parameters, periodically. Based on the available communication modes or methods, the weather analysis device may select the communication mode or method to use, the type of data to transmit, quality of data, frequency of data transmission, and the like. For instance, when the available bandwidth is limited, selected or critical data may be transmitted, whereas when greater bandwidth is available, data streams (e.g., video data) which require greater higher data rate or bandwidth usage may be transmitted. In an example, when Long Range Radio (LoRA) or Satellite communications is the only available communication method, due to the limited transmission bandwidth, critical data such as an alert indicating a type of detected weather/climate emergency or basic data such as GPS location may be transmitted. Such limited data may be transmitted at the detection of a triggering event (e.g., weather change) or at pre-determined time points. In another example, when a medium bandwidth transmission mode is available (e.g., mesh networking), sensor data including weather condition, temperature, cloud formation information and the like may be transmitted, and such sensor data may be broadcasted constantly. In a further example, when a transmission mode with greater bandwidth is available (e.g., 3G, 4G, LTE, or 5G cellular networking), sensory data streams may be transmitted or broadcasted constantly. In the case when WiFi is available, data streams (e.g., video data) that require higher data rate or bandwidth usage may be transmitted live.

In some cases, the communication modes/methods/protocols, or the data to be transmitted may be dynamically selected based on available wireless resources, signal strength and the like. For example, the LoRa PHY link RF transmit power, bandwidth (BW), and spreading factor (SF) can be dynamically controlled in software to minimize power consumption and maximize range capability without the need to change hardware configuration. In some embodiments, this dynamic control can be based on a GPS location of the communication module, received-signal-strength indicator (RSSI), signal-to-noise ratio (SNR), packet error rate (PER), and/or channel activity detection (CAD).

In some cases, the algorithms for determining the transmission schedule or data to be transmitted may be machine learning algorithm trained predictive model. Similarly, the predictive models can be built and trained on the cloud, deployed and run on the edge device or edge system (e.g., hardware accelerator) for interference.

Computing Devices, Processors, and Components

Computing devices may include pluralities of the components described herein, including a plurality of processors, a plurality of memories, a plurality of types of memories, a plurality of storage devices, and/or a plurality of buses. A plurality of computing devices may be connected to each other and can coordinate at least a portion of their computing resources to perform one or more operations.

Processors may process instructions for execution within computing devices, including instructions stored in memory and/or on storage devices. Such processing of instructions may cause various operations to be performed, such as the operations, tasks, or methods discussed herein. Processors may be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory may store information within computing devices, including instructions to be executed by one or more processors. Memory may include a volatile memory unit or units, such as synchronous RAM (for instance, double data rate synchronous dynamic random access memory (DDR SDRAM, DDR2 SDRAM, DDR3 SDRAM, and/or DDR4 SDRAM), asynchronous RAM (for instance, fast page mode dynamic RAM (FPM DRAM) or extended data out DRAM (EDO DRAM)), graphics RAM (for instance, graphics DDR4, GDDR4, or GDDR5). Memory may include a non-volatile memory unit or units (such as flash memory). Memory may also include another form of computer-readable medium, such as magnetic and/or optical disks. Storage devices may be capable of providing mass storage for computing devices and may include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products may be tangibly embodied in an information carrier, such as memory, storage devices, cache memory within a processor, and/or other appropriate computer-readable medium. Computer program products may also include instructions that, when executed by one or more computing devices, perform one or more methods or techniques, such as those described herein.

Computing devices may communicate wirelessly through one or more communication interfaces, which may include digital signal processing circuitry when appropriate. Communication interfaces may provide for communications under various modes or protocols, such as GSM voice calls, messaging protocols (such as SMS, EMS, or MMS messaging), CDMA, TDMA, PDC, WCDMA, CDMA2000, GPRS, 4G protocols (such as 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices may also include one or more sensors through which various states of and around the computing devices can be detected. For example, computing devices may include one or more accelerometers that may be used to detect motion of the computing devices and details regarding the detected motion (such as speed, direction, and/or rotation); one or more gyroscopes that can be used to detect orientation of the computing devices in 3D space; light sensors that may be used to detect levels of ambient light at or around the computing devices; touch and presence sensors that may be used to detect contact and/or near-contact with one or more portions of the computing devices; environmental sensors (such as barometers, photometers, and/or thermometers) that can detect information about the surrounding environment (such as ambient air temperature, air pressure, and/or humidity); other motion sensors that may be used to measure acceleration and rotational forces (such as gravity sensors or rotational vector sensors); position sensors that may be used to detect the physical position of the computing devices (such as orientation sensors or magnetometers), and/or other appropriate sensors.

The systems, devices, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

The description herein provides examples of some implementations. Other implementations that are not explicitly described above are also possible, such as implementations based on modifications and/or variations of the features described herein. For example, the techniques described herein may be implemented in different orders, with the inclusion of one or more additional steps, and/or with the exclusion of one or more of the identified steps. Additionally, the steps and techniques described herein as being performed by some computing devices and/or systems may alternatively, or additionally, be performed by other computing devices and/or systems that are described herein or other computing devices and/or systems that are not explicitly described. Similarly, the systems, devices, and apparatuses may include one or more additional features, may exclude one or more of the identified features, and/or may include the identified features combined in a different way than presented herein. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for sensing and responding to detected event and weather in a region, the system comprising:
    a modular edge computing platform configured to provide a predetermined functionality for a particular application, wherein the modular edge computing platform comprises: (i) a wireless communication module to enable communication with a remote entity, (ii) one or more sensors for capturing sensor data according to the predetermined functionality, (iii) one or more processors to process the sensor data to generate processed data using a first model trained using a machine learning algorithm, and determine a transmission scheme to transmit data selected from the processed data and the sensor data to the remote entity via the wireless communication module, wherein the transmission scheme specifies the selection of the data and a transmission schedule, wherein the transmission scheme is generated using a second model, wherein the second model is trained using a machine learning algorithm for predicting a transmission scheme, and wherein the sensor data comprises image data of weather and the first model is trained to identify weather information by processing at least the image data; and
    the remote entity that comprises (i) a cloud analytic configured to receive and analyze the data from the modular edge computing platform, (ii) a cloud user interface module configured to provide a graphical user interface on a user device, wherein the graphical user interface displays one or more results generated by the cloud analytic upon analyzing the data and (iii) a cloud management module configured to update parameters of the first trained model after deployment, wherein the parameters are downloaded to the modular edge computing platform.

2. The system of claim 1, further comprising a base station mechanically and electronically coupled to the modular edge computing platform.

3. The system of claim 2, wherein the base station is coupled to a support member.

4. The system of claim 3, wherein the support member is selected from the group consisting of a streetlight, a utility pole, a vehicle, and a building.

5. The system of claim 2, wherein the base station is configured to be installed and fully operational to provide communications functionality within a range of 10 seconds to 5 minutes.

6. The system of claim 2, wherein the modular edge computing platform is configured to couple with the base station or with a different modular edge computing platform to form a modular assembly.

7. The system of claim 1, wherein the processed data transmitted to the cloud analytic includes intelligence data.

8. The system of claim 1, wherein the predetermined functionality is selected from the group consisting of: threat detection or alerting to detected threats; imaging or monitoring features; weather sensing or weather alerts; environmental sensing or environmental alerts; traffic monitoring or traffic alerts; activity sensing or activity alerts; disturbance sensing or disturbance alerts; earthquake movement sensing or earthquake alerts; smoke and fire sensing or smoke and fire alerts; civil unrest and riot detection or alerting to civil unrest and riots; natural disaster sensing or alerting to detected natural disasters; accident sensing or accident alerts; and pollution monitoring.

9. The system of claim 1, wherein the particular application comprises weather analysis.

10. The system of claim 1, wherein the remote entity further comprises a cloud management module configured to train and develop the model corresponding to the particular application using the machine learning algorithm.

11. The system of claim 1, wherein at least a portion of the training datasets for updating the trained model are transmitted from the modular edge computing platform.

12. The system of claim 1, wherein the graphical user interface displays information provided by multiple modular edge computing platforms including the modular edge computing platform.

13. The system of claim 1, wherein the graphical user interface further displays sensor data.

14. The system of claim 13, wherein the graphical user interface allows a user to manage the modular edge computing platform or a base station connected to the modular edge computing platform.

15. The system of claim 1, wherein the image data of weather comprises an image of cloud and the first model is trained to identify cloud formation information.

16. The system of claim 1, wherein the transmission scheme is generated based on a data rate or bandwidth of one or more available communication modes of the wireless communication module.

17. The system of claim 16, wherein the communication modes comprise a Long Range Radio (LoRA) communication, a mesh networking, a cellular networking or WiFi.

18. A method for sensing and responding to detected event and weather in a region, the method comprising:
    providing a modular edge computing platform for providing a predetermined functionality for a particular application, wherein the modular edge computing platform comprises: (i) a wireless communication module to enable communication with a remote entity, (ii) one or more sensors for capturing sensor data according to the predetermined functionality, (iii) one or more processors to process the sensor data to generate processed data using a first model trained using a machine learning algorithm, and determine a transmission scheme to transmit data selected from the processed data and the sensor data via the wireless communication module, wherein the transmission scheme specifies the selection of the data and a transmission schedule, wherein the transmission scheme is generated using a second model, and wherein the second model is trained using a machine learning algorithm for predicting a transmission scheme, and wherein the sensor data comprises image data of weather and the first model is trained to identify weather information by processing at least the image data;

receiving and analyzing the data from the modular edge computing platform;

displaying one or more analysis results on a graphical user interface provided on a user device upon analyzing the at least portion of the processed data; and update parameters of the first model after deployment, wherein the parameters are downloaded to the modular edge computing platform.

\* \* \* \* \*